(12) United States Patent
Hendricks et al.

(10) Patent No.: US 7,835,989 B1
(45) Date of Patent: *Nov. 16, 2010

(54) ELECTRONIC BOOK ALTERNATIVE DELIVERY SYSTEMS

(75) Inventors: John S. Hendricks, Potomac, MD (US); Michael L. Asmussen, Herndon, VA (US); John S. McCoskey, Castle Rock, CO (US)

(73) Assignee: Discovery Communications, Inc., Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/289,957

(22) Filed: Apr. 13, 1999

Related U.S. Application Data

(63) Continuation-in-part of application No. 07/991,074, filed on Dec. 9, 1992, now abandoned, and a continuation-in-part of application No. 08/336,247, filed on Nov. 7, 1994, now Pat. No. 5,986,690, and a continuation-in-part of application No. 08/160,194, filed on Dec. 2, 1993, now Pat. No. 5,990,927, and a continuation-in-part of application No. PCT/US93/11606, filed on Dec. 2, 1993, and a continuation-in-part of application No. 08/906,469, filed on Aug. 5, 1997, now Pat. No. 6,408,437, and a continuation-in-part of application No. 09/191,520, filed on Nov. 13, 1998, now abandoned.

(51) Int. Cl.
*G06F 17/00* (2006.01)
(52) U.S. Cl. .............................. 705/50; 705/1; 455/4.2; 364/419.1
(58) Field of Classification Search .................... 705/1, 705/50; 348/7, 12
See application file for complete search history.

(56) References Cited

U.S. PATENT DOCUMENTS 3,860,873 A   1/1975   Ringstad (Continued)

FOREIGN PATENT DOCUMENTS

CA   2044574   12/1992

(Continued)

OTHER PUBLICATIONS

Dinaro, et al.; Markets and Products Overview; 1991; pp. 135-148.

(Continued)

*Primary Examiner*—Calvin L Hewitt, II
*Assistant Examiner*—John M Winter
(74) *Attorney, Agent, or Firm*—Arent Fox LLP

(57) ABSTRACT

The invention, an electronic book selection and delivery system, distributes electronic text and graphics to subscribers. The system contains an operations center, a video distribution system or a variety of alternative distribution systems, a home subsystem, and a billing and collection system. The operations center and/or distribution points perform the functions of manipulation of text data, security and coding of text, cataloging of books, message center, and uplink functions. The home subsystem connects to a video distribution system or variety of alternative distribution systems, generates menus and stores text, and transacts through communicating mechanisms. A portable book-shaped viewer is used for viewing the text. The billing system performs the transaction, management, authorization, collection and payments utilizing the telephone system or a variety of alternative communication systems.

57 Claims, 53 Drawing Sheets

U.S. PATENT DOCUMENTS

| | | | |
|---|---|---|---|
| 3,891,792 A | 6/1975 | Kimura | |
| 3,978,470 A | 8/1976 | McGuire | |
| 4,023,408 A | 5/1977 | Ryan et al. | |
| 4,071,697 A | 1/1978 | Bushnell et al. | |
| 4,159,417 A | 6/1979 | Rubincam | |
| 4,160,242 A | 7/1979 | Fowler | |
| 4,179,212 A * | 12/1979 | Lahr | 399/79 |
| 4,197,590 A | 4/1980 | Sukonick et al. | |
| 4,272,819 A | 6/1981 | Katsumata et al. | |
| 4,298,793 A | 11/1981 | Melis et al. | |
| 4,302,193 A | 11/1981 | Haynes | |
| 4,361,848 A | 11/1982 | Poigner et al. | 348/468 |
| 4,381,522 A | 4/1983 | Lambert | |
| 4,398,216 A | 8/1983 | Field et al. | |
| 4,405,829 A | 9/1983 | Rivest et al. | |
| 4,406,626 A | 9/1983 | Anderson et al. | |
| 4,429,385 A | 1/1984 | Cichelli et al. | |
| 4,455,570 A | 6/1984 | Saeki et al. | |
| 4,484,217 A | 11/1984 | Block et al. | |
| 4,488,179 A | 12/1984 | Kruger et al. | |
| 4,513,390 A | 4/1985 | Walter et al. | |
| 4,517,598 A | 5/1985 | Van Valkenburt et al. | 348/478 |
| 4,528,589 A | 7/1985 | Block et al. | |
| 4,528,643 A | 7/1985 | Freeny, Jr. | |
| 4,532,540 A | 7/1985 | Wine | |
| 4,533,948 A | 8/1985 | McNamara et al. | |
| 4,546,382 A | 10/1985 | McKenna et al. | |
| 4,567,512 A | 1/1986 | Abraham | |
| 4,578,531 A | 3/1986 | Everhart et al. | |
| 4,579,533 A | 4/1986 | Anderson et al. | |
| 4,587,520 A | 5/1986 | Astle | |
| 4,602,279 A | 7/1986 | Freeman et al. | |
| 4,604,710 A | 8/1986 | Amezcua et al. | |
| 4,605,964 A | 8/1986 | Chard | |
| 4,613,901 A | 9/1986 | Gilhousen et al. | |
| 4,616,263 A | 10/1986 | Eichelberger | |
| 4,621,282 A | 11/1986 | Ahern | |
| 4,625,076 A | 11/1986 | Okamoto et al. | |
| 4,625,235 A | 11/1986 | Watson | |
| 4,633,462 A | 12/1986 | Stifle et al. | |
| 4,639,225 A | 1/1987 | Washizuka | 434/308 |
| 4,644,470 A | 2/1987 | Feigenbaum et al. | |
| 4,653,100 A | 3/1987 | Barnett et al. | |
| 4,668,218 A | 5/1987 | Virtanen | |
| 4,673,976 A | 6/1987 | Wreford-Howard | |
| 4,688,218 A | 8/1987 | Blineau et al. | |
| 4,688,246 A | 8/1987 | Eilers et al. | |
| 4,694,483 A | 9/1987 | Cheung | |
| 4,694,490 A | 9/1987 | Harvey et al. | |
| 4,697,209 A | 9/1987 | Kiewit et al. | |
| 4,706,121 A | 11/1987 | Young | |
| 4,712,105 A | 12/1987 | Kohler | |
| 4,712,130 A | 12/1987 | Casey | |
| 4,716,543 A | 12/1987 | Ogawa et al. | |
| 4,724,491 A | 2/1988 | Lambert | |
| 4,731,840 A | 3/1988 | Mniszewshi et al. | |
| 4,739,510 A | 4/1988 | Jeffers et al. | |
| 4,742,543 A | 5/1988 | Frederiksen | |
| 4,751,578 A | 6/1988 | Reiter et al. | |
| 4,768,087 A | 8/1988 | Taub et al. | |
| 4,774,655 A | 9/1988 | Kollin et al. | |
| 4,776,011 A | 10/1988 | Busby | |
| 4,792,972 A | 12/1988 | Cook, Jr. | |
| 4,796,220 A * | 1/1989 | Wolfe | 705/56 |
| 4,805,014 A | 2/1989 | Sahara et al. | |
| 4,816,901 A | 3/1989 | Music et al. | |
| 4,816,904 A | 3/1989 | McKenna et al. | |
| 4,820,167 A | 4/1989 | Nobles et al. | |
| D301,037 S | 5/1989 | Matsuda | |
| 4,829,372 A | 5/1989 | McCalley et al. | |
| 4,829,558 A | 5/1989 | Welsh | |
| 4,829,569 A | 5/1989 | Seth-Smith et al. | |
| 4,835,607 A | 5/1989 | Keith | |
| 4,854,878 A | 8/1989 | Malvino | |
| 4,855,725 A | 8/1989 | Fernandez | 345/173 |
| 4,860,379 A | 8/1989 | Schoeneberger et al. | 725/24 |
| 4,866,770 A | 9/1989 | Seth-Smith | |
| 4,868,866 A | 9/1989 | Williams, Jr. | |
| 4,876,736 A | 10/1989 | Kiewit | |
| 4,885,803 A | 12/1989 | Hermann et al. | |
| 4,890,319 A | 12/1989 | Seth-Smith et al. | |
| 4,890,321 A | 12/1989 | Seth-Smith | |
| 4,891,838 A | 1/1990 | Faber | |
| 4,899,292 A | 2/1990 | Montagna | |
| 4,920,432 A | 4/1990 | Eggers et al. | |
| 4,924,513 A | 5/1990 | Herbison et al. | |
| 4,928,168 A | 5/1990 | Iwashita | |
| 4,928,177 A | 5/1990 | Martinez | |
| 4,930,160 A | 5/1990 | Vogel | |
| 4,941,089 A | 7/1990 | Fisher | |
| 4,941,125 A | 7/1990 | Boyne | |
| 4,947,244 A | 8/1990 | Fenwich et al. | |
| 4,947,429 A | 8/1990 | Bestler et al. | |
| 4,949,187 A | 8/1990 | Cohen | |
| 4,959,810 A | 9/1990 | Darbee et al. | |
| 4,961,109 A | 10/1990 | Tanaka | |
| 4,965,819 A | 10/1990 | Kannes | |
| 4,965,825 A | 10/1990 | Harvey et al. | |
| 4,975,951 A | 12/1990 | Bennett | |
| 4,977,455 A | 12/1990 | Young | |
| 4,982,344 A | 1/1991 | Jordan | |
| 4,985,697 A | 1/1991 | Boulton | 707/500.1 |
| D314,383 S | 2/1991 | Hafner | |
| 4,995,078 A | 2/1991 | Monslow et al. | |
| 4,996,597 A | 2/1991 | Duffield | |
| 5,001,554 A | 3/1991 | Johnson et al. | |
| 5,003,384 A | 3/1991 | Durden et al. | |
| 5,003,591 A | 3/1991 | Kauffman et al. | |
| 5,010,499 A | 4/1991 | Yee | |
| 5,014,125 A | 5/1991 | Pocach et al. | |
| 5,015,829 A | 5/1991 | Eilert et al. | |
| 5,020,129 A | 5/1991 | Martin et al. | |
| 5,027,400 A | 6/1991 | Baji et al. | |
| 5,036,394 A | 7/1991 | Morii et al. | 348/468 |
| 5,036,537 A | 7/1991 | Jeffers et al. | |
| 5,038,402 A | 8/1991 | Robbins | |
| 5,046,093 A | 9/1991 | Wachob | |
| 5,047,867 A | 9/1991 | Strubbe et al. | |
| 5,049,862 A | 9/1991 | Dao | |
| 5,049,990 A | 9/1991 | Kondo et al. | |
| 5,054,984 A | 10/1991 | Chan et al. | |
| 5,056,138 A | 10/1991 | Tyson, Sr. | |
| 5,057,917 A | 10/1991 | Shalkauser et al. | 375/240.12 |
| 5,073,930 A | 12/1991 | Green et al. | |
| 5,075,771 A | 12/1991 | Hashimoto | |
| 5,077,607 A | 12/1991 | Johnson et al. | |
| 5,078,019 A | 1/1992 | Aoki | |
| 5,089,956 A | 2/1992 | MacPhail | |
| 5,091,782 A | 2/1992 | Krause et al. | |
| 5,093,718 A | 3/1992 | Hoarty et al. | |
| 5,099,319 A | 3/1992 | Esch et al. | |
| 5,099,331 A | 3/1992 | Truong | |
| D325,581 S | 4/1992 | Schwartz | |
| 5,103,314 A | 4/1992 | Keenan | |
| 5,105,268 A | 4/1992 | Yamanouchi et al. | |
| D326,446 S | 5/1992 | Wong | |
| 5,115,426 A | 5/1992 | Spanke | |
| 5,121,476 A | 6/1992 | Yee | |
| 5,124,980 A | 6/1992 | Maki | |
| 5,128,662 A | 7/1992 | Failla | |
| 5,130,792 A | 7/1992 | Tindell et al. | |
| 5,130,924 A | 7/1992 | Barker et al. | |
| 5,132,789 A | 7/1992 | Ammon et al. | 725/146 |
| 5,132,992 A | 7/1992 | Yurt et al. | 375/240 |

| | | | | | |
|---|---|---|---|---|---|
| 5,133,079 A | 7/1992 | Ballantyne et al. | 5,319,454 A | 6/1994 | Schutte |
| 5,140,419 A | 8/1992 | Galumbeck et al. | 5,319,455 A | 6/1994 | Hoarty et al. |
| D329,238 S | 9/1992 | Grasso et al. | 5,319,542 A | 6/1994 | King et al. |
| 5,144,663 A | 9/1992 | Kudelski et al. | 5,319,649 A | 6/1994 | Raghaven et al. |
| 5,144,665 A | 9/1992 | Takaragi et al. | 5,319,707 A | 6/1994 | Wasilewski et al. |
| 5,146,552 A | 9/1992 | Cassorla et al. | 5,321,846 A | 6/1994 | Yokota et al. |
| 5,146,600 A | 9/1992 | Sugiura | 5,323,240 A | 6/1994 | Amano et al. |
| 5,150,118 A | 9/1992 | Finkle | 5,327,554 A | 7/1994 | Palazzi, III et al. |
| 5,151,782 A | 9/1992 | Ferraro | 5,329,590 A | 7/1994 | Pond |
| 5,151,789 A | 9/1992 | Young | D349,923 S | 8/1994 | Billings et al. |
| 5,152,011 A | 9/1992 | Schwob | 5,339,091 A | 8/1994 | Yamazaki et al. |
| 5,155,590 A | 10/1992 | Beyers, II et al. | 5,339,239 A | 8/1994 | Manabe et al. |
| 5,155,591 A | 10/1992 | Wachob | 5,339,315 A | 8/1994 | Maeda et al. |
| 5,157,783 A | 10/1992 | Anderson | 5,341,166 A | 8/1994 | Garr et al. |
| 5,159,452 A | 10/1992 | Kinoshita et al. | 5,341,425 A | 8/1994 | Wasilweski et al. |
| 5,159,669 A | 10/1992 | Trigg et al. | 5,341,426 A | 8/1994 | Barney et al. |
| 5,166,886 A | 11/1992 | Molnar et al. | 5,341,474 A | 8/1994 | Gelman et al. |
| D331,760 S | 12/1992 | Renk, Jr. | 5,343,239 A | 8/1994 | Lappington |
| 5,172,413 A | 12/1992 | Bradley et al. | 5,343,516 A | 8/1994 | Callele et al. |
| 5,173,051 A | 12/1992 | May et al. | 5,345,580 A | 9/1994 | Tamaru et al. |
| 5,182,639 A | 1/1993 | Jutamulia et al. | 5,345,594 A | 9/1994 | Tsuda .................. 455/18 |
| 5,185,667 A | 2/1993 | Zimmerman et al. | 5,349,638 A | 9/1994 | Pitroda et al. |
| 5,195,181 A | 3/1993 | Bryant et al. | 5,351,075 A | 9/1994 | Herz et al. |
| 5,199,104 A | 3/1993 | Hirayama | 5,353,121 A | 10/1994 | Young et al. |
| 5,202,290 A | 4/1993 | Moskovits et al. | 5,355,162 A | 10/1994 | Yazolino et al. |
| 5,202,817 A | 4/1993 | Koenck et al. | 5,357,276 A | 10/1994 | Banker et al. |
| 5,204,947 A | 4/1993 | Bernstein et al. | 5,365,265 A | 11/1994 | Shibata et al. |
| 5,206,722 A | 4/1993 | Kwan | 5,365,434 A | 11/1994 | Figliuzzi |
| 5,206,929 A | 4/1993 | Langford et al. | 5,367,330 A | 11/1994 | Haave et al. |
| 5,206,954 A | 4/1993 | Inoue et al. | 5,367,571 A | 11/1994 | Bowen et al. |
| 5,208,665 A | 5/1993 | McCalley et al. | 5,367,621 A | 11/1994 | Cohen et al. |
| 5,208,745 A | 5/1993 | Quentin et al. | 5,367,643 A | 11/1994 | Chang et al. |
| 5,210,611 A | 5/1993 | Yee et al. | 5,371,532 A | 12/1994 | Gelman et al. |
| 5,212,553 A | 5/1993 | Maruoka | 5,373,324 A | 12/1994 | Kuroda et al. |
| 5,216,515 A | 6/1993 | Steele et al. | 5,375,068 A | 12/1994 | Palmer et al. |
| 5,220,438 A | 6/1993 | Yamamoto | 5,375,160 A | 12/1994 | Guidon et al. |
| 5,220,649 A | 6/1993 | Forcier | 5,379,057 A | 1/1995 | Clough et al. |
| 5,221,962 A | 6/1993 | Backus et al. | 5,383,112 A | 1/1995 | Clark |
| 5,222,136 A | 6/1993 | Rasmussen et al. | 5,384,588 A | 1/1995 | Martin et al. |
| 5,223,924 A | 6/1993 | Strubbe | 5,388,101 A | 2/1995 | Dinkins |
| 5,231,631 A | 7/1993 | Buhrke | 5,388,196 A | 2/1995 | Pajak et al. |
| 5,233,333 A | 8/1993 | Borsuk | 5,390,348 A | 2/1995 | Magin et al. |
| 5,235,419 A | 8/1993 | Krause et al. | 5,392,387 A | 2/1995 | Fitzpatrick |
| 5,235,619 A | 8/1993 | Beyers et al. | 5,396,546 A | 3/1995 | Remillard |
| 5,235,680 A | 8/1993 | Bijnagte | 5,400,401 A | 3/1995 | Wasilewski et al. |
| 5,237,311 A | 8/1993 | Mailey et al. | 5,404,393 A | 4/1995 | Remillard |
| 5,237,610 A | 8/1993 | Gammie et al. | 5,404,505 A | 4/1995 | Levinson |
| 5,237,614 A | 8/1993 | Weiss | 5,408,258 A | 4/1995 | Kolessar |
| 5,239,665 A | 8/1993 | Tsuchiya | 5,408,465 A | 4/1995 | Guesella et al. |
| 5,241,671 A | 8/1993 | Reed et al. | 5,410,326 A | 4/1995 | Goldstein |
| 5,247,347 A | 9/1993 | Litteral et al. | 5,410,344 A | 4/1995 | Graves et al. |
| 5,247,575 A * | 9/1993 | Sprague et al. ............... 705/53 | 5,412,416 A | 5/1995 | Nemirofsky |
| 5,251,324 A | 10/1993 | McMullan | 5,414,426 A | 5/1995 | O'Donnell et al. |
| 5,253,066 A | 10/1993 | Vogel | 5,416,508 A | 5/1995 | Sakuma et al. |
| 5,253,275 A | 10/1993 | Yurt et al. .................... 375/240 | 5,417,575 A | 5/1995 | McTaggart |
| 5,253,341 A | 10/1993 | Rozmanith et al. | 5,418,559 A | 5/1995 | Blahut |
| 5,256,067 A | 10/1993 | Gildea | 5,418,957 A | 5/1995 | Narayan |
| 5,257,185 A | 10/1993 | Farley et al. | 5,420,974 A | 5/1995 | Morris et al. |
| 5,260,778 A | 11/1993 | Kauffman et al. | 5,424,770 A | 6/1995 | Schmelzer et al. |
| 5,260,788 A | 11/1993 | Takano et al. | 5,425,102 A | 6/1995 | Moy |
| 5,262,875 A | 11/1993 | Mincer et al. | 5,426,594 A | 6/1995 | Wright et al. |
| 5,282,028 A | 1/1994 | Johnson et al. | 5,428,529 A | 6/1995 | Hartrick et al. |
| 5,283,639 A | 2/1994 | Esch et al. .................... 725/32 | 5,432,542 A | 7/1995 | Thibadeau et al. |
| 5,285,272 A | 2/1994 | Bradley et al. | 5,432,561 A | 7/1995 | Strubbe |
| 5,289,271 A | 2/1994 | Watson | 5,437,552 A | 8/1995 | Baer et al. |
| 5,289,288 A | 2/1994 | Silverman et al. | 5,438,372 A | 8/1995 | Tsumori et al. |
| 5,291,554 A | 3/1994 | Morales | 5,440,632 A | 8/1995 | Bacon et al. |
| 5,293,540 A | 3/1994 | Trani et al. | 5,442,390 A | 8/1995 | Hooper et al. |
| 5,293,633 A | 3/1994 | Robbins | 5,442,626 A | 8/1995 | Wei |
| 5,301,172 A | 4/1994 | Richards et al. | 5,444,853 A | 8/1995 | Lentz |
| D346,620 S | 5/1994 | McSorley | 5,446,488 A | 8/1995 | Vogel |
| 5,315,711 A | 5/1994 | Barone et al. | 5,446,490 A | 8/1995 | Blahut et al. |
| 5,318,450 A | 6/1994 | Carver | 5,446,919 A | 8/1995 | Wilkins |

| | | | | | |
|---|---|---|---|---|---|
| D362,429 S | 9/1995 | Lande et al. | 5,598,209 A | 1/1997 | Cortjens et al. |
| 5,453,796 A | 9/1995 | Duffield | 5,598,279 A | 1/1997 | Ishii |
| 5,459,507 A | 10/1995 | Sakuma et al. | 5,598,351 A | 1/1997 | Chater et al. |
| 5,461,667 A | 10/1995 | Remillard | 5,598,523 A | 1/1997 | Fujita |
| 5,465,213 A | 11/1995 | Ross | 5,600,368 A | 2/1997 | Matthews, III |
| 5,465,401 A | 11/1995 | Thompson | 5,600,573 A | 2/1997 | Hendricks et al. |
| 5,466,158 A | 11/1995 | Smith, III | 5,602,596 A | 2/1997 | Claussen et al. |
| 5,467,102 A | 11/1995 | Kuno et al. | 5,604,824 A | 2/1997 | Chui et al. |
| 5,469,206 A | 11/1995 | Strubbe et al. | 5,608,449 A | 3/1997 | Swafford et al. |
| 5,473,362 A | 12/1995 | Fitzgerald et al. | 5,613,109 A | 3/1997 | Yamauchi et al. |
| 5,475,398 A | 12/1995 | Yamazaki et al. | 5,621,456 A | 4/1997 | Florin et al. |
| 5,475,399 A | 12/1995 | Borsuk | 5,621,658 A | 4/1997 | Jackson et al. |
| 5,475,585 A | 12/1995 | Bush | 5,624,265 A | 4/1997 | Redford et al. |
| 5,475,682 A | 12/1995 | Choudhury | 5,625,833 A | 4/1997 | Levine et al. |
| 5,477,262 A | 12/1995 | Bunker et al. | 5,630,103 A | 5/1997 | Smith et al. |
| 5,477,263 A | 12/1995 | O'Callaghan et al. | 5,630,125 A | 5/1997 | Zellweger |
| 5,479,268 A | 12/1995 | Young | 5,631,693 A | 5/1997 | Wunderlich et al. |
| 5,479,508 A | 12/1995 | Bestler et al. | 5,631,694 A | 5/1997 | Aggarwal et al. |
| 5,479,615 A | 12/1995 | Ishii et al. | 5,632,022 A | 5/1997 | Warren et al. |
| 5,481,294 A | 1/1996 | Thomas et al. | 5,634,064 A | 5/1997 | Warnock et al. |
| 5,481,296 A | 1/1996 | Cragin et al. | 5,635,918 A | 6/1997 | Tett |
| 5,481,542 A | 1/1996 | Logston | 5,636,036 A | 6/1997 | Ashbey |
| 5,483,278 A | 1/1996 | Strubbe et al. | 5,638,443 A | 6/1997 | Stefik |
| 5,484,292 A | 1/1996 | McTaggart | 5,640,193 A | 6/1997 | Wellner |
| 5,485,176 A | 1/1996 | Ohara | 5,640,196 A | 6/1997 | Behrens et al. |
| 5,485,221 A | 1/1996 | Banker et al. | 5,644,354 A | 7/1997 | Thompson et al. |
| 5,486,686 A | 1/1996 | Zdybel, Jr. et al. | 5,646,675 A | 7/1997 | Copriviza et al. |
| 5,495,581 A | 2/1996 | Tsai | 5,649,230 A | 7/1997 | Lentz |
| 5,497,187 A | 3/1996 | Banker et al. | 5,657,414 A | 8/1997 | Lett et al. |
| 5,497,459 A | 3/1996 | Tanihira et al. | 5,661,516 A | 8/1997 | Carles |
| 5,499,330 A | 3/1996 | Lucas et al. | 5,663,748 A | 9/1997 | Huffman |
| 5,500,794 A | 3/1996 | Fujita et al. | 5,663,757 A | 9/1997 | Morales |
| 5,502,576 A | 3/1996 | Ramsay et al. | 5,666,493 A | 9/1997 | Wojoik et al. |
| 5,506,902 A | 4/1996 | Kubota | 5,682,206 A | 10/1997 | Wehmeyer et al. |
| 5,509,074 A | 4/1996 | Choudhury et al. | 5,689,641 A | 11/1997 | Ludwig et al. |
| 5,512,934 A | 4/1996 | Kochanski | 5,689,648 A | 11/1997 | Diaz et al. |
| 5,515,098 A | 5/1996 | Carles | 5,689,663 A | 11/1997 | Williams |
| 5,517,254 A | 5/1996 | Monta et al. | 5,691,777 A | 11/1997 | Kassaatly |
| 5,519,780 A | 5/1996 | Woo et al. | 5,696,906 A | 12/1997 | Peters et al. |
| 5,521,631 A | 5/1996 | Budow et al. | 5,696,982 A | 12/1997 | Tanigawa et al. |
| 5,524,193 A | 6/1996 | Covington et al. | 5,697,793 A | 12/1997 | Huffman et al. |
| 5,524,201 A | 6/1996 | Shwarts et al. | 5,708,960 A | 1/1998 | Kamisaka |
| 5,526,035 A | 6/1996 | Lappington et al. | 5,710,887 A | 1/1998 | Chelliah et al. |
| 5,526,469 A | 6/1996 | Brindle et al. | 5,715,314 A * | 2/1998 | Payne et al. .................... 705/78 |
| 5,528,281 A | 6/1996 | Grady et al. ................. 725/93 | 5,715,515 A | 2/1998 | Akins, III |
| 5,528,490 A | 6/1996 | Hill | 5,721,832 A | 2/1998 | Westrope et al. |
| 5,530,235 A | 6/1996 | Stefik | 5,721,908 A | 2/1998 | Lagarde et al. |
| 5,531,227 A | 7/1996 | Schneider | 5,721,956 A | 2/1998 | Martin et al. |
| 5,531,600 A | 7/1996 | Baer | 5,722,418 A | 3/1998 | Bro |
| 5,532,920 A * | 7/1996 | Hartrick et al. ............. 715/500 | 5,724,091 A | 3/1998 | Freeman et al. |
| 5,534,888 A | 7/1996 | Lebby et al. | 5,724,521 A | 3/1998 | Dedrick |
| 5,538,430 A | 7/1996 | Smith | 5,726,909 A | 3/1998 | Krikorian |
| 5,544,320 A | 8/1996 | Konrad | 5,727,065 A | 3/1998 | Dillon |
| 5,544,342 A | 8/1996 | Dean | 5,734,719 A | 3/1998 | Tsevdos et al. |
| 5,550,863 A | 8/1996 | Yurt et al. | 5,734,823 A | 3/1998 | Saigh et al. |
| 5,553,216 A | 9/1996 | Yoshioka et al. | 5,734,891 A | 3/1998 | Saigh |
| 5,555,441 A | 9/1996 | Haddad | 5,737,725 A | 4/1998 | Case |
| 5,557,722 A | 9/1996 | DeRose et al. | 5,737,747 A | 4/1998 | Vishlitzky et al. |
| 5,557,744 A | 9/1996 | Kobayakawa et al. | 5,739,814 A | 4/1998 | Ohara et al. |
| 5,561,708 A | 10/1996 | Remillard | 5,740,549 A | 4/1998 | Reily et al. |
| 5,561,803 A | 10/1996 | Kilis | 5,742,680 A | 4/1998 | Wilson |
| 5,565,908 A | 10/1996 | Ahmad | 5,748,441 A | 5/1998 | Loritz et al. |
| 5,565,999 A | 10/1996 | Takahashi | 5,749,735 A | 5/1998 | Redford |
| 5,570,126 A | 10/1996 | Blahut et al. | 5,754,172 A | 5/1998 | Kubota et al. |
| 5,572,625 A | 11/1996 | Raman et al. | 5,758,257 A | 5/1998 | Herz et al. |
| 5,572,652 A | 11/1996 | Robusto et al. | 5,760,771 A | 6/1998 | Blonder |
| 5,579,055 A | 11/1996 | Hamilton et al. | 5,761,468 A | 6/1998 | Emberson |
| 5,579,057 A | 11/1996 | Banker et al. | 5,761,485 A | 6/1998 | Munyan .................... 345/839 |
| 5,581,560 A | 12/1996 | Shimada et al. | 5,761,606 A | 6/1998 | Wolzien |
| 5,581,686 A | 12/1996 | Koppolu et al. | 5,761,681 A | 6/1998 | Huffman |
| 5,585,858 A | 12/1996 | Harper et al. | 5,764,276 A | 6/1998 | Martin et al. |
| 5,586,235 A | 12/1996 | Kauffman et al. | 5,767,896 A | 6/1998 | Nemirofsky |
| 5,587,724 A | 12/1996 | Matsuda | 5,768,521 A | 6/1998 | Dedrick |

| | | | | | | |
|---|---|---|---|---|---|---|
| 5,771,354 | A | 6/1998 | Crawford | 6,014,184 | A | 1/2000 | Knee et al. |
| 5,774,170 | A | 6/1998 | Hite et al. | 6,016,484 | A | 1/2000 | Williams et al. |
| 5,778,374 | A | 7/1998 | Dang et al. | 6,025,837 | A | 2/2000 | Mathews, III et al. |
| 5,784,565 | A | 7/1998 | Lewine | 6,025,871 | A | 2/2000 | Kantor et al. |
| 5,786,521 | A | 7/1998 | Darsow | 6,029,045 | A | 2/2000 | Picco et al. |
| 5,787,171 | A | 7/1998 | Kubota et al. | 6,029,141 | A | 2/2000 | Bezos et al. |
| 5,787,254 | A | 7/1998 | Maddalozzo et al. | 6,029,176 | A | 2/2000 | Cannon |
| 5,788,504 | A | 8/1998 | Rice et al. | 6,034,680 | A | 3/2000 | Kessenich et al. ............ 345/733 |
| 5,790,176 | A | 8/1998 | Criag | 6,044,385 | A | 3/2000 | Gross et al. |
| 5,790,935 | A | 8/1998 | Payton | 6,052,717 | A | 4/2000 | Reynolds et al. ............ 709/218 |
| 5,793,414 | A | 8/1998 | Shaffer | 6,055,544 | A | 4/2000 | DeRose et al. |
| 5,796,954 | A | 8/1998 | Hanif | 6,061,504 | A | 5/2000 | Tzelnic et al. |
| 5,798,785 | A | 8/1998 | Hendricks et al. | 6,091,823 | A | 7/2000 | Hosomi et al. |
| 5,799,071 | A | 8/1998 | Azar et al. | 6,091,930 | A | 7/2000 | Mortimer et al. |
| 5,799,157 | A | 8/1998 | Escallon | 6,101,485 | A | 8/2000 | Fortenberry et al. |
| 5,802,465 | A | 9/1998 | Hamalainen et al. | 6,112,049 | A | 8/2000 | Sonnenfeld |
| 5,802,526 | A | 9/1998 | Fawcett et al. | 6,115,040 | A | 9/2000 | Bladow et al. |
| 5,805,204 | A | 9/1998 | Thompson et al. | 6,115,482 | A | 9/2000 | Sears et al. |
| 5,815,662 | A | 9/1998 | Ong | 6,161,093 | A | 12/2000 | Watari et al. |
| 5,815,671 | A | 9/1998 | Morrison | 6,163,796 | A | 12/2000 | Yokomizo |
| 5,819,301 | A | 10/1998 | Rowe et al. | 6,167,435 | A | 12/2000 | Druckenmiller et al. |
| 5,835,732 | A | 11/1998 | Kikinis et al. | 6,173,335 | B1 | 1/2001 | Culbert |
| 5,844,600 | A | 12/1998 | Kerr | 6,177,936 | B1 | 1/2001 | Cragun |
| 5,844,890 | A | 12/1998 | Delp et al. | 6,195,667 | B1 | 2/2001 | Duga et al. |
| 5,850,218 | A | 12/1998 | LaJoie et al. | 6,204,885 | B1 | 3/2001 | Kwoh |
| 5,850,520 | A | 12/1998 | Griebenow et al. | 6,229,694 | B1 | 5/2001 | Kono |
| 5,850,629 | A | 12/1998 | Holm et al. | 6,243,071 | B1 | 6/2001 | Shwarts et al. |
| 5,859,594 | A | 1/1999 | King et al. | 6,249,785 | B1 | 6/2001 | Paepke |
| 5,862,325 | A | 1/1999 | Reed et al. | 6,252,876 | B1 | 6/2001 | Brueckheimer |
| 5,862,329 | A | 1/1999 | Aras et al. | 6,252,879 | B1 | 6/2001 | Zhang |
| 5,864,823 | A | 1/1999 | Levitan | 6,260,024 | B1 | 7/2001 | Shkedy |
| 5,870,717 | A | 2/1999 | Wiecha | 6,269,483 | B1 | 7/2001 | Broussard |
| 5,870,767 | A | 2/1999 | Kraft, IV | 6,279,017 | B1 | 8/2001 | Walker |
| 5,877,755 | A | 3/1999 | Helhake | 6,281,986 | B1 | 8/2001 | Form |
| 5,877,801 | A | 3/1999 | Martin et al. | 6,295,542 | B1 | 9/2001 | Corbin |
| 5,881,269 | A | 3/1999 | Dobbelstein | 6,298,441 | B1 | 10/2001 | Handelman et al. |
| 5,884,288 | A | * 3/1999 | Chang et al. ................... 705/40 | 6,301,584 | B1 | 10/2001 | Ranger |
| 5,890,122 | A | 3/1999 | Van Kleeck et al. | 6,313,828 | B1 | 11/2001 | Chombo |
| 5,890,177 | A | 3/1999 | Moody et al. | 6,314,474 | B1 | 11/2001 | Walter et al. |
| 5,892,900 | A | 4/1999 | Ginter et al. | 6,320,591 | B1 | 11/2001 | Briencewic |
| 5,892,915 | A | 4/1999 | Duso et al. | 6,331,865 | B1 | 12/2001 | Sachs et al. |
| 5,893,109 | A | 4/1999 | DeRose et al. | 6,331,867 | B1 | 12/2001 | Eberhard et al. |
| 5,893,132 | A | * 4/1999 | Huffman et al. ............ 707/532 | 6,334,109 | B1 | 12/2001 | Kanevsky et al. |
| 5,898,852 | A | 4/1999 | Petolino et al. | 6,335,678 | B1 | 1/2002 | Heutschi |
| 5,903,319 | A | 5/1999 | Busko et al. | 6,339,842 | B1 | 1/2002 | Fernandez et al. |
| 5,903,652 | A | 5/1999 | Mital | 6,344,853 | B1 | 2/2002 | Knight |
| 5,903,901 | A | 5/1999 | Kawakura et al. | 6,351,750 | B1 | 2/2002 | Duga et al. |
| 5,906,397 | A | 5/1999 | MacWilliams | 6,363,418 | B1 | 3/2002 | Conboy et al. |
| 5,914,706 | A | 6/1999 | Kono | 6,385,614 | B1 | 5/2002 | Vellandi |
| 5,917,543 | A | 6/1999 | Uehara | 6,411,973 | B1 | 6/2002 | Yianilos |
| 5,917,915 | A | 6/1999 | Hirose | 6,415,316 | B1 | 7/2002 | Van Der Meer |
| 5,918,213 | A | 6/1999 | Bernard et al. | 6,438,233 | B1 | 8/2002 | Yoshimune et al. |
| 5,923,656 | A | 7/1999 | Duan | 6,452,614 | B1 | 9/2002 | King et al. |
| 5,926,624 | A | 7/1999 | Katz et al. | 6,452,933 | B1 | 9/2002 | Duffield et al. |
| 5,929,848 | A | 7/1999 | Albukerk et al. | 6,460,036 | B1 | 10/2002 | Herz |
| 5,930,768 | A | 7/1999 | Hooban | 6,462,729 | B2 | 10/2002 | Morita |
| 5,933,498 | A | * 8/1999 | Schneck et al. ................ 380/4 | 6,486,895 | B1 | 11/2002 | Robertson |
| 5,937,162 | A | 8/1999 | Funk et al. | 6,493,734 | B1 | 12/2002 | Sachs et al. |
| 5,940,073 | A | 8/1999 | Klosterman et al. | 6,507,342 | B1 | 1/2003 | Hirayama |
| 5,956,034 | A | 9/1999 | Sachs et al. | 6,510,531 | B1 | 1/2003 | Gibbons |
| 5,956,483 | A | 9/1999 | Grate et al. | 6,535,505 | B1 | 3/2003 | Hwang et al. |
| 5,957,695 | A | 9/1999 | Redford et al. | 6,546,016 | B1 | 4/2003 | Gerszberg et al. |
| 5,957,697 | A | 9/1999 | Iggulden et al. | 6,556,561 | B1 | 4/2003 | Himbeault et al. |
| 5,959,945 | A | 9/1999 | Kleiman | 6,557,173 | B1 | 4/2003 | Hendricks |
| 5,963,246 | A | 10/1999 | Kato | 6,585,776 | B1 | 7/2003 | Bates et al. |
| 5,978,841 | A | 11/1999 | Berger | 6,597,314 | B1 | 7/2003 | Beezer |
| 5,986,677 | A | 11/1999 | Jones et al. | 6,606,603 | B1 | 8/2003 | Joseph |
| 5,986,690 | A | 11/1999 | Hendricks .................... 725/60 | 6,611,531 | B1 | 8/2003 | Chen et al. |
| 5,990,927 | A | 11/1999 | Hendricks et al. | 6,634,028 | B2 | 10/2003 | Handelman |
| 5,991,594 | A | 11/1999 | Froeber | 6,654,754 | B1 | 11/2003 | Knauft et al. |
| 5,999,214 | A | 12/1999 | Inagaki | 6,657,654 | B2 | 12/2003 | Narayanaswami |
| 6,009,401 | A | 12/1999 | Horstmann | 6,675,384 | B1 | 1/2004 | Block et al. |
| 6,012,890 | A | 1/2000 | Celorio | 6,683,631 | B2 | 1/2004 | Carroll |

| | | | | | | |
|---|---|---|---|---|---|---|
| 6,714,238 B2 | 3/2004 | Urisaka et al. | CA | 2458307 | 2/2009 | |
| 6,725,203 B1 | 4/2004 | Seet et al. | CA | 2361371 | 4/2009 | |
| 6,813,249 B1 | 11/2004 | Lauffenburger et al. | CA | 2369779 | 4/2009 | |
| 6,847,403 B1 | 1/2005 | Forsberg, Jr. et al. | CA | 2459059 | 4/2009 | |
| 6,886,000 B1 | 4/2005 | Aggarwal et al. | DE | 3423846 | 1/1986 | |
| 6,891,551 B2 | 5/2005 | Keeley et al. | DE | 3935294 | 4/1991 | |
| 6,976,028 B2 | 12/2005 | Fenton | DE | 42 12 184 | 10/1993 | |
| 6,990,464 B1 | 1/2006 | Pirillo | EP | 0103438 | 3/1984 | |
| 7,020,663 B2 | 3/2006 | Hay | EP | 140302 | 5/1985 | |
| 7,039,643 B2 | 5/2006 | Sena et al. | EP | 0145063 | 6/1985 | |
| 7,051,351 B2 | 5/2006 | Goldman et al. | EP | 0149536 | 7/1985 | |
| 7,181,468 B2 | 2/2007 | Spring | EP | 0158548 | 10/1985 | |
| 7,181,692 B2 | 2/2007 | Siegel | EP | 0158767 | 10/1985 | |
| 7,185,274 B1 | 2/2007 | Rubin et al. | EP | 0167237 | 1/1986 | |
| 7,350,704 B2 | 4/2008 | Barsness | EP | 0243312 | 10/1987 | |
| 2002/0034296 A1 | 3/2002 | Yoshimune | EP | 0277014 | 8/1988 | |
| 2002/0087555 A1 | 7/2002 | Murata | EP | 0281293 | 9/1988 | |
| 2002/0120635 A1 | 8/2002 | Joao | EP | 0299830 | 1/1989 | |
| 2003/0018543 A1 | 1/2003 | Alger et al. | EP | 0314572 | 5/1989 | |
| 2003/0093336 A1 | 5/2003 | Ukita et al. | EP | 0328440 | 8/1989 | |
| 2003/0093382 A1 | 5/2003 | Himeno et al. | EP | 0340643 | 11/1989 | |
| 2003/0124502 A1 | 7/2003 | Chou | EP | 0355697 | 2/1990 | |
| 2003/0198932 A1 | 10/2003 | Stuppy | EP | 0377334 | 7/1990 | |
| 2003/0200145 A1 | 10/2003 | Krassner et al. | EP | 0384986 | 9/1990 | |
| 2003/0236836 A1 | 12/2003 | Borthwick | EP | 0396186 | 11/1990 | |
| 2004/0039934 A1 | 2/2004 | Land et al. | EP | 0399200 | 11/1990 | |
| 2004/0201609 A1 | 10/2004 | Obrador | EP | 0402809 | 12/1990 | |
| 2004/0215658 A1 | 10/2004 | Carnegie et al. | EP | 0420123 | 4/1991 | |
| 2004/0219494 A1 | 11/2004 | Boon | EP | 0420123 A2 | 4/1991 | |
| 2004/0268224 A1 | 12/2004 | Balkus et al. | EP | 0187961 | 5/1991 | |
| 2005/0144133 A1 | 6/2005 | Hoffman | EP | 0424648 | 5/1991 | |
| 2006/0204942 A1 | 9/2006 | Kimball | EP | 0425834 | 5/1991 | |
| 2006/0259239 A1 | 11/2006 | Nouri | EP | 0450841 | 10/1991 | |
| 2007/0016657 A1 | 1/2007 | Ito | EP | 0472070 | 2/1992 | |
| | | | EP | 0472070 A2 | 2/1992 | |
| FOREIGN PATENT DOCUMENTS | | | EP | 0513553 | 4/1992 | |
| | | | EP | 0506435 | 9/1992 | |
| CA | 2257659 | 11/1993 | EP | 0513763 | 11/1992 | |
| CA | 2177154 | 6/1995 | EP | 0516533 | 12/1992 | |
| CA | 2458564 | 6/1995 | EP | 0539106 | 4/1993 | |
| CA | 2458346 | 5/2004 | EP | 093/22877 | 11/1993 | |
| CA | 2458564 | 5/2004 | EP | 0567800 | 11/1993 | |
| CA | 2459528 | 10/2004 | EP | 0570785 | 11/1993 | |
| CA | 2458337 | 12/2004 | EP | 09322877 | 11/1993 | |
| CA | 2458564 | 12/2004 | EP | 0586954 | 3/1994 | |
| CA | 2458346 | 4/2005 | EP | 0620689 | 10/1994 | |
| CA | 2458355 | 11/2005 | EP | 0646856 | 4/1995 | |
| CA | 2458337 | 12/2005 | EP | 0646856 A2 | 4/1995 | |
| CA | 2458317 | 3/2006 | EP | 0702491 | 3/1996 | |
| CA | 2459063 | 3/2006 | EP | 0372384 | 5/1997 | |
| CA | 2361371 | 7/2006 | EP | 0810534 A | 12/1997 | |
| CA | 2458258 | 10/2006 | EP | 0810534 A2 | 12/1997 | |
| CA | 2459048 | 10/2006 | EP | 0838798 | 4/1998 | |
| CA | 2458317 | 11/2006 | EP | 95904787.9 | 5/1998 | |
| CA | 2458355 | 11/2006 | EP | 0892388 | 1/1999 | |
| CA | 2459063 | 12/2006 | EP | 0924629 A | 6/1999 | |
| CA | 2458337 | 1/2007 | EP | 0924687 | 6/1999 | |
| CA | 2459059 | 5/2007 | EP | 0701220 | 7/2001 | |
| CA | 2458379 | 6/2007 | EP | 0726535 | 5/2003 | |
| CA | 2459048 | 6/2007 | EP | 00968375.6 | 3/2004 | |
| CA | 2459529 | 6/2007 | EP | 00909958.1 | 5/2004 | |
| CA | 2361371 | 10/2007 | EP | 00974003.6 | 7/2004 | |
| CA | 2458307 | 10/2007 | EP | 00974006.9 | 7/2004 | |
| CA | 2458355 | 11/2007 | EP | 00923211.7 | 5/2005 | |
| CA | 2459779 | 11/2007 | EP | 00923210.9 | 6/2005 | |
| CA | 2459780 | 11/2007 | EP | 00909958.1 | 7/2005 | |
| CA | 2459059 | 3/2008 | EP | 00968375.6 | 7/2005 | |
| CA | 2458317 | 5/2008 | EP | 00909966.4 | 6/2006 | |
| CA | 2459063 | 5/2008 | EP | 00974003.6 | 6/2006 | |
| CA | 2359690 | 9/2008 | EP | 00909958.1 | 9/2006 | |
| CA | 2459779 | 1/2009 | EP | 00909958.1 | 10/2006 | |
| CA | 2459780 | 1/2009 | EP | 00943086.9 | 12/2006 | |
| CA | 2385097 | 2/2009 | EP | 00925915.1 | 4/2007 | |

| | | | | | | |
|---|---|---|---|---|---|---|
| EP | 00960077.6 | 10/2007 | | JP | 515760/95 | 4/2004 |
| GB | 1204190 | 12/1967 | | JP | 515760/95 | 12/2004 |
| GB | 1204190 | 9/1970 | | MX | 2001/010300 | 9/2004 |
| GB | 2149544 | 6/1985 | | MX | 2001/010298 | 4/2005 |
| GB | 2149544 A | 12/1985 | | MX | 2001/007581 | 7/2006 |
| GB | 2168227 | 6/1986 | | MX | 2001/010298 | 11/2006 |
| GB | 2 177 873 A | 1/1987 | | MX | 2002/002555 | 1/2007 |
| GB | 2269302 A | 2/1994 | | MX | 2002/000197 | 2/2007 |
| GB | 2344009 | 5/2000 | | MX | 2002/002984 | 3/2007 |
| JP | 060-143086 | 7/1985 | | MX | 2001/007580 | 2/2008 |
| JP | 01-020454 | 2/1986 | | MX | 2001/007580 | 6/2008 |
| JP | 61-028150 | 2/1986 | | MX | 2001/010300 | 6/2008 |
| JP | 061060150 | 3/1986 | | MX | 2001/010298 | 9/2008 |
| JP | 061060150 | 8/1986 | | MX | 2002/002555 | 9/2008 |
| JP | 062-24777 | 2/1987 | | MX | 2001/010300 | 11/2008 |
| JP | 62-24777 | 2/1987 | | MX | 2001/007580 | 3/2009 |
| JP | 062-140134 | 6/1987 | | MX | 2001/007581 | 3/2009 |
| JP | 62-140134 | 6/1987 | | TW | 234223 | 11/1994 |
| JP | 62-245167 | 10/1987 | | TW | 235358 | 12/1994 |
| JP | 062-245167 | 10/1987 | | TW | 235359 | 12/1994 |
| JP | 62245167 | 10/1987 | | TW | 236065 | 12/1994 |
| JP | 64-086778 | 3/1989 | | TW | 236744 | 12/1994 |
| JP | 0186778 | 3/1989 | | TW | 238461 | 1/1995 |
| JP | 01-130683 | 5/1989 | | WO | WO 80/00209 | 2/1980 |
| JP | 01130683 | 5/1989 | | WO | WO 83/03020 | 9/1983 |
| JP | 01-142918 | 6/1989 | | WO | WO 84/00237 | 1/1984 |
| JP | 064-007786 | 11/1989 | | WO | WO 86/01962 | 3/1986 |
| JP | 64-007786 | 11/1989 | | WO | WO 87/01481 | 3/1987 |
| JP | 02-284571 | 11/1990 | | WO | WO 88/01463 | 2/1988 |
| JP | 03-114375 | 5/1991 | | WO | WO 89/09528 | 10/1989 |
| JP | 03-198119 | 8/1991 | | WO | WO 8909528 | 10/1989 |
| JP | 03225445 | 10/1991 | | WO | WO 89/12370 | 12/1989 |
| JP | 04-170183 | 6/1992 | | WO | WO 90/10988 | 9/1990 |
| JP | 05-046045 | 2/1993 | | WO | WO 91/00670 | 1/1991 |
| JP | 05056405 | 3/1993 | | WO | WO 9100670 | 1/1991 |
| JP | 05-046045 | 5/1993 | | WO | WO 91/03112 | 3/1991 |
| JP | 05-236437 | 9/1993 | | WO | WO 91/11769 | 8/1991 |
| JP | 05233547 | 9/1993 | | WO | WO 91/15841 | 10/1991 |
| JP | 05236437 | 9/1993 | | WO | WO 92/10040 | 6/1992 |
| JP | 05250106 | 9/1993 | | WO | WO 92/11713 | 7/1992 |
| JP | 05-334167 A | 12/1993 | | WO | WO 92/12599 | 7/1992 |
| JP | 05334167 A | 12/1993 | | WO | WO 92/17027 | 10/1992 |
| JP | 0405334167 A | 12/1993 | | WO | WO 92/21206 | 11/1992 |
| JP | 06-068339 A | 3/1994 | | WO | WO 93/06692 | 4/1993 |
| JP | 06068339 A | 3/1994 | | WO | WO 9307713 | 4/1993 |
| JP | 0406068339 A | 3/1994 | | WO | WO 93/09490 | 5/1993 |
| JP | 06134489 | 5/1994 | | WO | WO 93/09631 | 5/1993 |
| JP | 06187359 | 7/1994 | | WO | WO93/015466 | 8/1993 |
| JP | 07-230466 A | 8/1995 | | WO | WO 93/22877 | 11/1993 |
| JP | 07230466 A | 8/1995 | | WO | WO 94/01964 | 1/1994 |
| JP | 07230466AB | 8/1995 | | WO | WO 94/07327 A1 | 3/1994 |
| JP | 07 235909 | 9/1995 | | WO | WO 94/13107 | 6/1994 |
| JP | 07-235909 | 9/1995 | | WO | WO 94/14282 | 6/1994 |
| JP | 08-008850 A | 1/1996 | | WO | WO 94/16527 | 7/1994 |
| JP | 08008850 A | 1/1996 | | WO | WO 1994/023537 | 10/1994 |
| JP | 08008851 | 1/1996 | | WO | WO 95/15649 | 6/1995 |
| JP | 08-051614 A | 2/1996 | | WO | WO 9515649 A | 6/1995 |
| JP | 408051614 A | 2/1996 | | WO | WO 96/08109 | 3/1996 |
| JP | 08-228328 | 9/1996 | | WO | WO 96/17306 | 6/1996 |
| JP | 040 8228328 | 9/1996 | | WO | WO 96/25006 | 8/1996 |
| JP | 08314790 | 11/1996 | | WO | WO 96/41473 | 12/1996 |
| JP | 09227193 | 8/1997 | | WO | WO 97/13368 | 4/1997 |
| JP | 09-227193 | 9/1997 | | WO | WO 97/18665 | 5/1997 |
| JP | 09237096 | 9/1997 | | WO | WO 97/12105 | 6/1997 |
| JP | 09 284571 | 10/1997 | | WO | WO 97/20224 | 6/1997 |
| JP | 09-284571 | 10/1997 | | WO | WO 97/20274 | 6/1997 |
| JP | 09282218 | 10/1997 | | WO | WO 97/22049 | 6/1997 |
| JP | 10070530 | 3/1998 | | WO | WO 97/22062 | 6/1997 |
| JP | 10-285568 A | 10/1998 | | WO | WO 97/22063 | 6/1997 |
| JP | 410285568 A | 10/1998 | | WO | WO 97/22064 | 6/1997 |
| JP | 11003341 | 1/1999 | | WO | WO 97/22065 | 6/1997 |
| JP | 11-068770 | 3/1999 | | WO | WO 97/22067 | 6/1997 |
| JP | 11068770 | 3/1999 | | WO | WO 97/22079 | 6/1997 |

| | | |
|---|---|---|
| WO | WO 97/22080 | 6/1997 |
| WO | WO 97/22097 | 6/1997 |
| WO | WO 97/22099 | 6/1997 |
| WO | WO 97/22100 | 6/1997 |
| WO | WO 97/22101 | 6/1997 |
| WO | WO 97/22102 | 6/1997 |
| WO | WO 97/22103 | 6/1997 |
| WO | WO 97/22104 | 6/1997 |
| WO | WO 97/22105 | 6/1997 |
| WO | WO 97/22106 | 6/1997 |
| WO | WO 97/22107 | 6/1997 |
| WO | WO 97/22108 | 6/1997 |
| WO | WO 97/22109 | 6/1997 |
| WO | WO 97/22110 | 6/1997 |
| WO | WO 97/22111 | 6/1997 |
| WO | WO 97/22112 | 6/1997 |
| WO | WO 9720274 | 6/1997 |
| WO | WO 97/12819 | 7/1997 |
| WO | WO 97/23819 | 7/1997 |
| WO | WO9737344 | 10/1997 |
| WO | WO 97/41688 A1 | 11/1997 |
| WO | WO 97/45798 | 12/1997 |
| WO | WO 98/02836 | 1/1998 |
| WO | WO 98/08344 | 2/1998 |
| WO | WO 9808344 | 2/1998 |
| WO | WO 9808344 A | 2/1998 |
| WO | WO 98/18086 | 4/1998 |
| WO | WO 9818086 | 4/1998 |
| WO | WO 9827494 | 6/1998 |
| WO | WO 98/48566 | 10/1998 |
| WO | WO 98/53581 | 11/1998 |
| WO | WO 99/26415 | 11/1998 |
| WO | WO 99/12349 | 3/1999 |
| WO | WO 99/18701 A1 | 4/1999 |
| WO | WO 99/26415 | 5/1999 |
| WO | WO 99/44144 | 9/1999 |
| WO | WO 99/45491 | 9/1999 |
| WO | WO 9944144 A | 9/1999 |
| WO | WO 99/45491 | 10/1999 |
| WO | WO 99/52285 | 10/1999 |
| WO | WO 99/66719 | 12/1999 |
| WO | WO 00/62228 A3 | 10/2000 |
| WO | WO 01/18665 A1 | 3/2001 |
| WO | WO 01/18665 A1 | 3/2001 |
| WO | WO 97/18665 | 3/2001 |
| WO | WO 97/22111 | 6/2006 |
| WO | WO 2007/0022107 | 2/2007 |
| WO | WO 2007/022107 | 2/2007 |

OTHER PUBLICATIONS

Hartley, et al.; Enhancing Teaching Using the Internet; Feb. 1996; pp. 218-228.
Bieber, et al.; Fourth Generation Hypermedia: some missing links for the World Wide Web; Jul. 1997; pp. 31-65.
Bogdan Czejdo; Using an ER Query and Update Interface for Rapid Prototyping of Hypertext Systems; Feb. 1990; pp. 227-236.
Speech Technology; Electronic Dictionary Pronounces Over 83,000 Words; Apr. 1989; pp. 78-79.
Pasquier-Boluck, et al.; Prototyping an Interactive Electronic Book System Using an Object-Oriented Approach; Aug. 1988; pp. 177-190.
Rauch, et al.; Enabling the Book Metaphor for the World Wide Web: Disseminating on-line information as dynamic web documents; Jun. 1997; pp. 111-128.
Boyle, et al.; A Survey and Classification of Hypertext Documentation Systems; Jun. 1992; pp. 98-111.
Yankelovich, et al.; Reading and Writing the Electronic Book; Oct. 1985; pp. 15-30.
Antelman et al. "Collection Development in the Electronic Library," Proceedings of the 21rst annual ACM SIGUCCS Conference on User Services, San Diego, CA, p. 50-56, 1993.
Herron T.L., "Teaching with the Internet" Internet and Higher Education, US, JAI Press, Stamford, CT, vol. 1, No. 3, 1998, pp. 217-222, XP002118719, ISSN: 1096-7516.
Azuma J., "Creating Educational Web Sites", IEEE Communications Magazine, US, IEEE Service Center, Piscataway, N.J., vol. 37, No. 3, Mar. 1999, pp. 109-113, XP000823980, ISSN: 0163-6804.
Goldberg, M.W. et al., "World Wide Web-Course tool: An environment for building WWW-based courses", Computer Networks and ISDN Systems, NL, North Holland Publishing, Amsterdam, vol. 28, No. 11, May 1, 1996, pp. 1219-1231, XP004018222, ISSN: 0169-7552.
"An Interactive Lesson in the Interactive Course Series", Waite Group Press, Macmillan Computer Publishing, 'Online! 1996, XP000829591, Retrieved from the Internet: URL:http://www.waite.com/> 'retrieved on 1996.
Goorfin, L., "Electronic Dictionary Pronounces over 83,000 Words", Speech Technology, Man-Machine Voice Communications, US, Media Dimensions Inc., New York, vol. 4, No. 4, Apr. 1, 1989, pp. 78-79, XP000033505, ISSN: 0744-1355.
Hartley, S. et al., "Enhancing Teaching Using the Internet", SIGCSE/SIGCUE Conference on Integrating Technology into Computer Science Education, US, New York, ACM, vol. CONF. 1, Jun. 2, 1996, pp. 218-228, ISBN: 0-89791-844-4.
"BSD Kernel Interfaces Manual-PTY(4)", Mac OS X Man Pages, original publication, Nov. 30, 1993.
Sandrick, Karen, "Internet Marketing: Software for the hard sell," Health Management Technology, Oct. 1998, vol. 19, No. 11, 6 pages.
Proceedings of the Symnposium on Optical Character Recognition, Washington, D.C., 1962, Edited by Fisher, George, et al., 6 pages.
Rethinking Ink, Science News, Jun. 20, 1998, 4 pages.
Computer Organization and Design, Patterson, David, and John Hennessay, 1998, 4 pages.
"A Survey and Classification of Hypertext Documentation Systems," Boyle, C. et al.; *IEEE Transactions on Professional Communication*; IEEE Inc.; New York; vol. 35, No. 2; Jun. 1, 1992.
"An Interactive Lesson in the Interactive Course Series" Waite Group Press, MacMillan Computer Publishing, "Online! 1996, XP00082591, Retrieved from the Internet: <URL:http//www.waite.com/> retrieved on 1996!
"An Interactive Lesson in the Interactive Course Series," Waite Group Press, Macmillian Computer Publishing, 'Online! 1996, XP000829591 Retrieved from the Internet: <URL:http://www.waite.com/> 'retrieved on 1996!
"Electronic Dictionary Pronounces over 83,000 Words," *Speech Technology*; Man-Machine Voice Communications, U.S., Media Dimensions Inc.; New York, vol. 4, No. 4; Apr. 1, 1989, pp. 78-79.
"Enabling the book metaphor for the World-Wide-Web: disseminating on-line information as dynamic Web documents," Rauch, T. et al.; *IEEE Transactions on Professional Communications*, Jun. 1997; vol. 40, No. 2, pp. 111-128.
"Fourth generation hypermedia: some missing links for the World Wide Web," *International Journal of Human-Computer Studies*; U.S.; Academic Press: New York; vol. 47, No. 1; Jul. 1997; pp. 31-65.
"Multimedia Systems," *A Dynamic Policy of Segment Replication for Load-Balancing in Video-On-Demand Servers*; Dan, et al.; Jul. 1995.
"Prototyping an Interactive Electronic Book System Using and Object-oriented Approach," Pasquier-Boltuck, J. et al.; *ECOOP*; european Conference on Object-oriented Programming; Aug. 15, 1988; pp. 177-190.
"Reading and Writing the Electronic Book," *Computer*; U.S. IEEE Computer Society, Long Beach, Calif., U.S. vol. 18, No. 10, Oct. 1, 1985.
"Subscription Teletext for Value Added Services", Dr. G.T. Sharpless, IEEE Transactions on Consumer Electronics, Aug. 1985, No. 3, p. 283.
"The Internet bookstore opens for business", Medford: Jul./Aug. 1994. vol. 11, Iss. 4; p. 21 (1 page).
"Using an ER Query and Update Interface for Rapid Prototyping of Hypertext Systems," Czejdo, B.; Proceedings of the Annual Hawaii International Conference on System Sciences; Jan. 1, 1990.
A Store-and-Forward Architecture for Video-on-Demand Service.
A Survey and Classification of Hypertext Documentation Systems, IEEE Transaction on Professional Communication.

A.D. Gelman, et al.; A Store-And-Forward Architecture for Video-On-Demand Service; ICC 91 Conf.; Jun. 23-26, 1991;pp. 842-846.
Alcatel Teletra: Markets and Products Overview.
Alexander Felman, et al., "An Architecture for Interactive Applications", May 1993, pp. 848-852.
An Interactive Lesson . . . .
An interactive lesson in the interactive course series, Aug. 1996.
An Interactive Videotex System for Two-Way CATV Networks.
*Applied Cryptography Protocols, Algorithms, and Source Code in C* (pp. 34-44); Schneier, Bruce; Pub. 199 by John Wiley & Sons.
Azuma J.: "Creating Eduational Web Sites", IEE Communications Magazine, U.S. IEEE Service Center, Piscataway, N.J., vol. 37, No. 3, Mar. 1999, pp. 109-113.
Barnes, 10 Minute Guide to Windows 3.1., Alpha Books, 1992, pp. 60-64.
Basch, Reva, "Books Online: Visions, Plans, and Perspectives for Electronic Text", Online. Medford: Jul. 1991. vol. 15, Iss. 4; 13 (11 pages).
Bestler, "Flexible Data Structure and Interface Rituals for Rapid Development of OSD Applications", pp. 223-236, Jun. 1993.
Biber, et al.; Fourth generation hypermedia: some missing links for the World Wide Web; Jul. 1997; pp. 31-65.
Bogdan Czejdo, "Using an ER Query and Update Interface for Rapid Prototyping of Hypertext Systems", Jan. 1990, pp. 227-236.
Boltuck et al.; Prototyping an Interactive Electronic Book System Using an Object-Oriented Approach; Aug. 1988; pp. 1770190.
*Books Online . . .* ; Basch; Jul. 1991.
Boom, "An Interactive Videotext System", pp. 397-401, Nov./Dec. 1986.
Boyle C. et al.: "A Survey and Classificatoin of Hypertext Documentation Systems", IEE Transactions on Professional Communications, US, IEE Inc., New York, vol. 35, No. 2, Jun. 1, 1992, pp. 98-111.
Broering, "The Electronic Library and IAIMS at Georgetown University", Policy Issuees in Information and Communication Techniques in Medical Applications, 1988. Symposium Record Sep. 29-30, 1988 pp. 27-29.
Caejdo B.: "Using an ER Query and Update Interface for Rapid Prototyping of Hypertext Systems", Proceedings of the Annual Hawaii International Conference on System Sciences, Jan. 1, 1990, p. 231.
Caitlin Bestler, "Flexible Data Structures and Interface Rituals for Rapid Development of OSD Applications", Jun. 1993, pp. 223-236.
Chan, "Principles, Structure and Format", Immroth's Guide to the Library of Congress Classification, 4th Edition, 1990, Chapter 2, pp. 19-51.
Consumer Digest advertisement; Xpand Your TV's Channel Capability; Fall/Winter 1992; p. 215.
Craig Boyle, et al., "A Survey and Classification of Hypertext Documentation Systems", Jun. 1992, pp. 98-111.
Creating Educational Web Sites.
Czejdo B.: "Using an ER Query and Update Interface for Rapid Prototyping of Hypertext Systems" Proceedings of the Annual Hawaii International Conference on System Sciences, Jan. 1, 1990, p. 231.
Dan A. et al.: "A Dynamic Policy of Segment Replication for Load-Balancing in Video-on-Demand Servers", Multimedia Systems, Springer Verlag, DE, vol. 3, No. 3, Jul. 1995, pp. 93-103.
Daniel M. Moloney, Digital Compression in Today's Addressable Environment; 1993 NCTA Technical Papers; Jun. 6, 1993; pp. 308-316.
DeBuse, SO That's a Book . . . Advancing Technology and the Library, Mar. 1988, Information Technology and Libraries, vol. 7, Issue 1, pp. 7-18.
Digital Compression in Today's Addressable Environment.
Dinaro et al., "Markets and Products Overview", 1991.
Dr. G. T. Sharpless, IEE Transactions on Consumer Electronics, vol. CE-31, No. 3, Aug. 1985, pp. 283-289.
*Electronic Books as . . .* ; Valauskas; Auust 1993.
Electronic Dictionary Pronoucnes . . . , Speech Technology.
Enabling the Book Metaphor, IEEE Transactions on Professional Communication.
Endo et al., "Electronic Book in 3.5 Floppy Disk", Consumer Electronics, 1994. Digest of Technical Papers, IEEE 1994 International Conference on Jun. 21-23, 1994 pp. 316-317.
Enhancing Teaching.
*Flexibl Data Structures and Interface Rituals for Rapid Development of OSD Applications*, Caitlin Bestler, 93 NCTA Tech. Papers, pp. 223-236; Jun. 6, 1993.
Fourth Generation Hypermedia . . . , Int'l Journal of Human-Computer Sciences Studies.
Fox, et al., Users, user interfaces, and objects: Envision, a Digital Library, Sep. 1993, Journal of the American Society for Information Science, vol. 44, issue 8, p. 480.
Für Geschlossene.
*Fur Geschlossene*; Funkschau; Aug. 25, 1989.
Gelman, et al., "An Architecture For Interactive Applications", May 1993, pp. 848-852.
Goldberg M W et al: "World Wide Web—course tool: An environment for building WWW-based courses" Computer Networks and ISDN Systems, NL, North Holland Publishing. Amsterdam, vol. 28, No. 11, May 1, 1996.
Goorfin L.: "Electronic Dictionary Pronounces over 83,000 Words" Sp[eech Technology, Man-Machine Voice Communications, U.S., Media, Dimensions, Inc. New York, vol. 4, No. 4, Apr. 1, 1989, pp. 78-79.
Great Presentations advertisement; Remote, Remote; 1987; p. 32H.
H. Van Den Boom, An Interactive Videotex System for Two-Way CATV Networks, Dec. 1986, pp. 397-401.
Hartley S et al.: "Enhancing Teaching Using the Internet" SIGCSE/SIGCUE Conference on Integrating Technology into Computer Science Education, US, New York, ACM, vol. CONF. 1, Jun. 2, 1996, pp. 218-228.
Henri van den Boom; An Interactive Videotex System for Two-Way CATV Networks; Nov. 1986; pp. 397-401.
Herron T L: "Teaching with the Internet" Internet and Higher Education US, JAI Press, Stamford, CT, vol. 1, No. 3, 1998, pp. 217-222.
Hong Consumer Products From SVI; Nov. 1988; p. 379 Kong Enterprise advertisement; Two Innovative New Hong Kong Enterprise; Advertisement Two Innovative New Consumer Products From SVI, Nov. 1988, p. 279.
HP-41 C Operating Manual, Hewlett Packard Co., Dec. 1982.
Human Factors in Telecommunications; Sorce et al.
Indian Patent Application 762-Cal-93.
Indian Patent Application 765-Cal-93.
Inter et al., "The Dewey Decimal Classification", Special Libraries: A Cataloging Guide, 1998, Chapter 11, pp. 211-239.
*Interactive Videotex*; van den Boom, Nov.-Dec. 1986.
John Reimer: Memories in My Pocket; BYTE; Feb. 1991; pp. 251-258.
Junichi Azuma; Creating Education Web Sites; Mar. 1999; pp. 109-113.
Kubota H. et al.: "Terrestrial Data Multiplex Broadcasting News Delivery System and Its Terminal", IEE Transactions on Consumer Electronics, U.S., IEE Inc., New York, Vo.. 43, No. 3, Aug. 1, 1997, pp. 504-509.
Lewis et al.; ("Shared books: collaborative publication management for an office information system"); ACM SIGIOS Bulletin Conference sponsored by ACM SIGOIS and IEEECS TC-OA on Office information systems, vol. 9, Issue 2-3, Apr. 1988.
Mann et al.; ("A coherent distributed file cache with directory write-behind") ACM Transactions on Computer Systems (TCOS), vol. 12, Issue 2, May 1994.
Marco Dinaro, Alcatel Telettra; Markets and Products Overview; Revue HF Tijdschrift 15; 1991; pp. 135-148.
Markets and Products Overview; Dinaro et al.
Medley, et al.; Enhancing teaching using the Internet; Feb. 1996: pp. 218-228.
Memories in My Pocket; Reimer; Byte, pp. 251, 252, 254, 255, 256, 258, Feb. 1991.
Michael Bieber, et al.; Fourth Generation Hypermedia: some missing links for the World Wide Web; 1997; pp. 31-65.
Miyazawa, et al., An electronic book: APT Book, Aug. 1990, Human-Computer Interaction, INTERACT '90, Proceedings of the IFIP TC 13 Third International Conference, Cambridge, UK, pp. 513-519.

*Multimedia Systems, A Dynaic Policy of Segment Replicatoin for Load-Balancing in Video-On-Demand Servers (see 111)*; Dan et al.; Jul. 1995.
Nicole Yankelovich, et al., "Reading and the Electronic Book", Oct. 1985, pp. 16-30.
O'Gorman, "Image and document processing techniques for the RightPages electronic library system", Conference B: Pattern Recognition Methodology and Systems, Proceedings, 11th IAP International Conference on Aug. 30-Sep. 3, 1992 pp. 260-263.
Olshansky & Joyce: Subscriber Distribution Networks Using Compressed Digital Video; Journal of Lightwavw Tech; Nov. 1992; pp. 1760-1765.
Pasquier-Boltuck J et al: Prototyping an Interactive Electronic Book System Using an Object-Oriented Approach; ECOOP. European Conference on Object-Oriented Programming. Aug. 15, 1998, pp. 177-190.
Pobiak, "Adjustable access electronic books", Computing Applications to Assist Persons with Disabilities, 1992, Proceedings of the John Hopkins National Search for Feb. 1-5, 1992 pp. 90-94.
Prototyping an Interactive Electronic Book System.
Raman, T.V., Audio System for Technical Readings, May 1994, Cornell University, pp. 1-129.
Rauch T et al: "Enabling the Book metaphor for the World-Wide-Web: Disseminating on-Line Information as Dynamic Web Documents" IEEE Transactions on Professional Communications. Jun. 1997. IEEE, USA, vol. 40, No. 2, pp. 111-128.
Rawlins, "The New Publishing—Technology's impact on the publishing industry over the next decade", Nov. 12, 1991, pp. 1-65.
RE 36,207.
RE. 36.207 (5,185,667).
Reading and Wriring the Electronic Book, IEEE Computer Science.
Reimer; "Memories in My Pocket", Feb. 1991, pp. 251-258.
*Remote, Remote*, Great Presentations advertisement, p. 32H; Nov. 1988.
Schatz, "Building an electronic scientific community", System Sciences, 1991. Proceeding of the Twenty-Fourth Annual Hawaii International Conference on vol. iii, Jan. 8-11, 1991 pp. 739-748 vol. 3.
Schepers C.: "Fur Geschlossene Benutzergruppen" Funkschau, De, Franzis-Verlag K.G. Munchen, No. 18, Aug. 25, 1989, pp. S53-S54.
Sharpless, Dr. G. T., "Subscription teletext for value added services", IEEE Transactions on Consumer Electronics, vol. CE-31, No. 3, Aug. 1985.
Simpson, Alan, Mastering Wordperfect® 5.1 & 5.2 for Windows, 1993, Sybex, Inc., pp. 72-73.
Soloview; ("Prefetching in segmented disk cache for multi-disk systems") Proceedings of the fourth workshop on I/O in parallel and distributed systems: part of the federated computing research conference; May 1996.
Speech Technology, "Electronic Dictionary Pronounces Over 35,000 Words", pp. 78-79 (1989).
Stephen Hartley, et al.; Enhancing Teaching Using the Internet; Feb. 6, 1996; pp. 218-228.
Subscriber Distribution Networks Using Compressed Digital Video.
Subscription Teletex for Value Addes Services.
Teaching with the Internet.
*Technology's Impact on . . .* ; Rawlins; Nov. 21, 1991.
Telman, et al.; A Store-and-Forward Architecture for Video-on-Demand Service; 1991; pp. 842-846.
Terrestrial Data . . . .
Terri Herron; Teaching with the Internet; 1998; pp. 217-222.
*The Internet Bookstore . . .* ; Jul./Aug. 1994.
Thyra Rauch, et al., "Enabling the book metaphor for the World Wide Web: Disseminating on-line information as dynami[c] Web documents", Jun. 1997, pp. 111-128.
Two Innovatice New Consumer Products from SVI.
Using an ER Query ad Upate Interface . . . , Proceedings of the Annual Hawaii.
Valauskas, Edward J, "Electronic books as databases", Database. Aug 1993. vol. 16, Iss. 4; p. 84 (3 pages).
Van Den Boom, "An Interactive Videotex System for Two-Way CATV Networks", vol. 40, No. 6, pp. 397-401, Dec. 1986.
Waite Group Press; AN Interactive Lesson in the Interactive Course Series, 1996.

*World Wide Web—Course Tool*, Goldberg, M.W., et al., May , 1996.
Xpand your TV's Channel Capability.
Yankelovich N et al: "Reading and Writing the Electronic Book" Computer, US, IEEE Computer Society. Long Beach, CA, US, vol. 18, No. 10.
U.S. Appl. No. 29/030,157, filed Sep. 24, 1996.
U.S. Appl. No. 12/010,045, filed Sep. 8, 2009.
U.S. Appl. No. 09/964,883, filed Sep. 4, 2009.
U.S. Appl. No. 09/964,883, filed Feb. 17, 2009.
U.S. Appl. No. 09/964,883, filed Sep. 17, 2008.
U.S. Appl. No. 09/964,883, filed Feb. 6, 2008.
U.S. Appl. No. 09/964,883, filed Jun. 22, 2007.
U.S. Appl. No. 09/964,883, filed Jan. 3, 2007.
U.S. Appl.No. 09/964,883, filed Jul. 12, 2006.
U.S. Appl. No. 09/964,883, filed Feb. 2, 2006.
U.S. Appl. No. 09/964,883, filed Jun. 15, 2005.
U.S. Appl. No. 09/964,883, filed Sep. 27, 2004.
U.S. Appl. No. 09/964,882, filed Aug. 10, 2007.
U.S. Appl. No. 09/964,882, filed May 22, 2006.
U.S. Appl. No. 09/964,882, filed Dec. 2, 2005.
U.S. Appl. No. 09/964,882, filed Mar. 22, 2005.
U.S. Appl. No. 09/964,880, filed Jul. 22, 2005.
U.S. Appl. No. 09/964,880, filed Jan. 12, 2005.
U.S. Appl. No. 09/964,857, filed May 9, 2005.
U.S. Appl. No. 09/964,857, filed Jul. 7, 2004.
U.S. Appl. No. 09/723,282, filed Feb. 8, 2006.
U.S. Appl. No. 09/723,282, filed Aug. 17, 2005.
U.S. Appl. No. 09/723,282, filed Jun. 3, 2004.
U.S. Appl. No. 09/723,280, filed May 19, 2005.
U.S. Appl. No. 09/723,280, filed Jun. 7, 2004.
U.S. Appl. No. 09/722,823, filed Aug. 24, 2005.
U.S. Appl. No. 09/722,823, filed Jan. 4, 2005.
U.S. Appl. No. 09/722,744, filed Jul. 18, 2002.
U.S. Appl. No. 09/722,744, filed Jan. 16, 2002.
U.S. Appl. No. 09/722,743, filed Oct. 5, 2005.
U.S. Appl. No. 09/722,743, filed Dec. 16, 2004.
U.S. Appl. No. 09/722,742, filed Jan. 11, 2008.
U.S. Appl. No. 09/722,742, filed May 29, 2007.
U.S. Appl. No. 09/722,742, filed Oct. 2, 2006.
U.S. Appl. No. 09/722,742, filed Apr. 13, 2006.
U.S. Appl. No. 09/722,742, filed Oct. 7, 2003.
U.S. Appl. No. 09/722,741, filed Mar. 24, 2005.
U.S. Appl. No. 09/722,741, filed Jun. 28, 2004.
U.S. Appl. No. 09/722,740, filed Aug. 24, 2005.
U.S. Appl. No. 09/722,740, filed May 24, 2004.
U.S. Appl. No. 09/722,626, filed Apr. 10, 2009.
U.S. Appl. No. 09/722,626, filed Dec. 5, 2008.
U.S. Appl. No. 09/722,626, filed Jun. 9, 2008.
U.S. Appl. No. 09/722,626, filed Oct. 30, 2007.
U.S. Appl. No. 09/722,626, filed May 8, 2007.
U.S. Appl. No. 09/722,626, filed Aug. 1, 2006.
U.S. Appl. No. 09/722,626, filed Feb. 22, 2006.
U.S. Appl. No. 09/722,626, filed Jun. 20, 2005.
U.S. Appl. No. 09/722,519, filed Dec. 20, 2006.
U.S. Appl. No. 09/722,519, filed Aug. 15, 2006.
U.S. Appl. No. 09/722,519, filed Mar. 15, 2006.
U.S. Appl. No. 09/722,519, filed Nov. 22, 2005.
U.S. Appl. No. 09/722,519, filed Apr. 14, 2005.
U.S. Appl. No. 09/722,519, filed Aug. 10, 2004.
U.S. Appl. No. 09/722,463, filed Jan. 18, 2006.
U.S. Appl. No. 09/722,463, filed Jul. 27, 2005.
U.S. Appl. No. 09/722,463, filed Jan. 12, 2005.
U.S. Appl. No. 09/722,462, filed Jun. 6, 2005.
U.S. Appl. No. 09/722,462, filed Jun. 4, 2004.
U.S. Appl. No. 09/722,460, filed May 17, 2005.
U.S. Appl. No. 09/722,460, filed Jun. 18, 2004.
U.S. Appl. No. 09/722,456, filed Feb. 9, 2007.
U.S. Appl. No. 09/722,456, filed Aug. 11, 2006.
U.S. Appl. No. 09/722,456, filed Feb. 23, 2006.
U.S. Appl. No. 09/722,456, filed May 5, 2005.
U.S. Appl. No. 09/722,456, filed Jun. 16, 2004.
U.S. Appl. No. 09/539,773, filed Jul. 30, 2009.
U.S. Appl. No. 09/539,773, filed Jun. 24, 2009.

U.S. Appl. No. 09/539,773, filed Feb. 25, 2009.
U.S. Appl. No. 09/539,773, filed Aug. 25, 2008.
U.S. Appl. No. 09/539,773, filed Nov. 29, 2007.
U.S. Appl. No. 09/539,773, filed Nov. 24, 2006.
U.S. Appl. No. 09/539,773, filed Aug. 2, 2006.
U.S. Appl. No. 09/539,773, filed Apr. 4, 2006.
U.S. Appl. No. 09/539,773, filed Jun. 15, 2005.
U.S. Appl. No. 09/539,773, filed Jun. 22, 2004.
U.S. Appl. No. 09/520,344, filed Apr. 6, 2009.
U.S. Appl. No. 09/520,344, filed Oct. 23, 2008.
U.S. Appl. No. 09/520,344, filed Jun. 13, 2008.
U.S. Appl. No. 09/520,344, filed Dec. 26, 2007.
U.S. Appl. No. 09/520,344, filed Aug. 3, 2007.
U.S. Appl. No. 09/520,344, filed Jun. 23, 2005.
U.S. Appl. No. 09/441,892, filed Nov. 12, 2008.
U.S. Appl. No. 09/441,892, filed Apr. 29, 2008.
U.S. Appl. No. 09/441,892, filed Nov. 2, 2007.
U.S. Appl. No. 09/441,892, filed Jun. 18, 2007.
U.S. Appl. No. 09/441,892, filed Nov. 24, 2006.
U.S. Appl. No. 09/441,892, filed Feb. 3, 2006.
U.S. Appl. No. 09/441,892, filed May 17, 2005.
U.S. Appl. No. 09/441,892, filed Aug. 24, 2004.
U.S. Appl. No. 09/427,939, filed Jun. 19, 2009.
U.S. Appl. No. 09/427,939, filed Aug. 16, 2007.
U.S. Appl. No. 09/427,939, filed Mar. 29, 2007.
U.S. Appl. No. 09/427,939, filed Jun. 7, 2006.
U.S. Appl. No. 09/427,939, filed May 20, 2005.
U.S. Appl. No. 09/427,938, filed May 28, 2009.
U.S. Appl. No. 09/427,938, filed Dec. 3, 2008.
U.S. Appl. No. 09/427,938, filed Apr. 18, 2008.
U.S. Appl. No. 09/427,938, filed Oct. 19, 2007.
U.S. Appl. No. 09/427,938, filed Jun. 15, 2007.
U.S. Appl. No. 09/427,938, filed Jan. 31, 2007.
U.S. Appl. No. 09/427,938, filed Jun. 7, 2006.
U.S. Appl. No. 09/427,938, filed Apr. 25, 2005.
U.S. Appl. No. 09/400,296, filed Dec. 30, 2005.
U.S. Appl. No. 09/400,296, filed Apr. 8, 2005.
U.S. Appl. No. 09/391,461, filed Jun. 25, 2009.
U.S. Appl. No. 09/391,461, filed Jan. 7, 2009.
U.S. Appl. No. 09/391,461, filed Jul. 3, 2008.
U.S. Appl. No. 09/391,461, filed Dec. 13, 2007.
U.S. Appl. No. 09/391,461, filed Jun. 22, 2007.
U.S. Appl. No. 09/391,461, filed Nov. 17, 2006.
U.S. Appl. No. 09/391,461, filed Mar. 28, 2006.
U.S. Appl. No. 09/391,461, filed Jun. 15, 2005.
U.S. Appl. No. 09/391,461, filed Jun. 30, 2004.
U.S. Appl. No. 09/344,499, filed Aug. 10, 2009.
U.S. Appl. No. 09/344,499, filed Feb. 18, 2009.
U.S. Appl. No. 09/344,499, filed Feb. 8, 2008.
U.S. Appl. No. 09/344,499, filed Jun. 14, 2007.
U.S. Appl. No. 09/344,499, filed Dec. 15, 2006.
U.S. Appl. No. 09/344,499, filed Jun. 30, 2006.
U.S. Appl. No. 09/344,499, filed May 6, 2005.
U.S. Appl. No. 09/344,492, filed Jul. 13, 2009.
U.S. Appl. No. 09/344,492, filed Jan. 23, 2009.
U.S. Appl. No. 09/344,492, filed Aug. 5, 2008.
U.S. Appl. No. 09/344,492, filed Jan. 23, 2008.
U.S. Appl. No. 09/344,492, filed Jul. 11, 2007.
U.S. Appl. No. 09/344,492, filed Dec. 19, 2006.
U.S. Appl. No. 09/344,492, filed Jun. 26, 2006.
U.S. Appl. No. 09/344,492, filed Jan. 24, 2006.
U.S. Appl. No. 09/344,492, filed Jun. 6, 2005.
U.S. Appl. No. 09/335,268, filed Jan. 22, 2009.
U.S. Appl. No. 09/335,268, filed Jul. 9, 2008.
U.S. Appl. No. 09/335,268, filed Jan. 10, 2008.
U.S. Appl. No. 09/335,268, filed May 17, 2007.
U.S. Appl. No. 09/335,268, filed Oct. 2, 2006.
U.S. Appl. No. 09/335,268, filed Apr. 13, 2006.
U.S. Appl. No. 09/335,268, filed Oct. 28, 2005.
U.S. Appl. No. 09/335,268, filed Feb. 24, 2005.
U.S. Appl. No. 09/328,672, filed Feb. 19, 2009.
U.S. Appl. No. 09/328,672, filed Jun. 16, 2004.
U.S. Appl. No. 09/289,958, filed Jul. 7, 2009.
U.S. Appl. No. 09/289,958, filed Dec. 24, 2008.
U.S. Appl. No. 09/289,958, filed Jul. 29, 2008.
U.S. Appl. No. 09/289,958, filed Jan. 18, 2008.
U.S. Appl. No. 09/289,958, filed Jul. 31, 2007.
U.S. Appl. No. 09/289,958, filed Mar. 23, 2007.
U.S. Appl. No. 09/289,958, filed Jun. 6, 2006.
U.S. Appl. No. 09/289,958, filed Jan. 3, 2005.
U.S. Appl. No. 09/289,957, filed Jul. 22, 2009.
U.S. Appl. No. 09/289,957, filed Nov. 18, 2008.
U.S. Appl. No. 09/289,957, filed Mar. 25, 2008.
U.S. Appl. No. 09/289,957, filed Jul. 6, 2007.
U.S. Appl. No. 09/289,957, filed Oct. 11, 2006.
U.S. Appl. No. 09/289,957, filed Apr. 21, 2006.
U.S. Appl. No. 09/289,957, filed Nov. 3, 2005.
U.S. Appl. No. 09/289,957, filed Nov. 4, 2004.
U.S. Appl. No. 09/289,956, filed Sep. 9, 2009.
U.S. Appl. No. 09/289,956, filed Mar. 17, 2009.
U.S. Appl. No. 09/289,956, filed Nov. 13, 2008.
U.S. Appl. No. 09/289,956, filed Jun. 12, 2008.
U.S. Appl. No. 09/289,956, filed Mar. 22, 2007.
U.S. Appl. No. 09/289,956, filed Jul. 24, 2006.
U.S. Appl. No. 09/289,956, filed Jan. 30, 2006.
U.S. Appl. No. 09/289,956, filed Jun. 23, 2005.
U.S. Appl. No. 09/237,828, filed Oct. 3, 2007.
U.S. Appl. No. 09/237,828, filed Mar. 5, 2007.
U.S. Appl. No. 09/237,828, filed Sep. 8, 2006.
U.S. Appl. No. 09/237,828, filed May 12, 2005.
U.S. Appl. No. 09/237,828, filed Aug. 25, 2004.
U.S. Appl. No. 09/237,827, filed Aug. 28, 2009.
U.S. Appl. No. 09/237,827, filed Mar. 2, 2009.
U.S. Appl. No. 09/237,827, filed Aug. 18, 2008.
U.S. Appl. No. 09/237,827, filed Jan. 9, 2008.
U.S. Appl. No. 09/237,827, filed Jul. 23, 2007.
U.S. Appl. No. 09/237,827, filed May 16, 2007.
U.S. Appl. No. 09/237,827, filed Jan. 12, 2007.
U.S. Appl. No. 09/237,827, filed Aug. 2, 2006.
U.S. Appl. No. 09/237,827, filed Oct. 19, 2005.
U.S. Appl. No. 09/237,827, filed Jan. 26, 2005.
U.S. Appl. No. 09/237,826, filed Aug. 3, 2009.
U.S. Appl. No. 09/237,826, filed Feb. 13, 2009.
U.S. Appl. No. 09/237,826, filed Aug. 15, 2008.
U.S. Appl. No. 09/237,826, filed Dec. 7, 2007.
U.S. Appl. No. 09/237,826, filed Jun. 27, 2007.
U.S. Appl. No. 09/237,826, filed Dec. 19, 2006.
U.S. Appl. No. 09/237,826, filed Jun. 14, 2006.
O.S. Appl. No. 09/237,826, filed Dec. 6, 2005.
U.S. Appl. No. 09/237,826, filed Jun. 6, 2005.
U.S. Appl. No. 09/237,826, filed May 25, 2004.
U.S. Appl. No. 09/237,825, filed Jun. 15, 2005.
U.S. Appl. No. 09/237,825, filed Jun. 4, 2004.
U.S. Appl. No. 08/336,247, filed May 12, 1998.
U.S. Appl. No. 08/336,247, filed Jul. 24, 1997.
U.S. Appl. No. 08/336,247, filed Apr. 29, 1997.
U.S. Appl. No. 08/336,247, filed Aug. 28, 1996.
U.S. Appl. No. 08/336,247, filed Jun. 27, 1996.
U.S. Appl. No. 08/336,247, filed Nov. 1, 1995.
IPER dated Mar. 6, 1996 for PCT/US94/13808.
Written Opinion dated Nov. 16, 1995 for PCT/US94/13808.
ISR dated Apr. 5, 1995 for PCT/US94/13808.
ISR dated Feb. 21, 2002 for PCT/US01/10559.
IPER dated Apr. 11, 2002 for PCT/US01/04946.
Written Opinion dated Dec. 4, 2001 for PCT/US01/04946.
ISR dated Oct. 16, 2001 for PCT/US01/04946.
Partial ISR dated Nov. 18, 2002 for PCT/US00/29813.
IPER dated Oct. 18, 2001 for PCT/US00/09542.
Written Opinion dated Jun. 19, 2001 for PCT/US00/01708.
ISR dated Jun. 26, 2000 for PCT/US00/01708.
ISR dated Feb. 4, 2003 for PCT/US00/29813, 2388649, CAX.
IPER dated Jan. 25, 2002 for PCT/US00/29813, 2388649, CAX.
Written Opinion dated Sep. 5, 2001 for PCT/US00/29813, 2388649, CAX.
ISR dated Feb. 21, 2003 for PCT/US00/29809, 2388648, CAX.
IPER dated Feb. 11, 2002 for PCT/US00/29809, 2388648, CAX.

Written Opinion dated Sep. 5, 2001 for PCT/US00/29809, 2388648, CAX.
IPER dated Mar. 25, 2002 for PCT/US00/25826, 2385097, CAX.
Written Opinion dated Nov. 2, 2001 for PCT/US00/25826, 2385097, CAX.
ISR dated Jun. 22, 2001 for PCT/US00/25826, 2385097, CAX.
Written Opinion dated May 29, 2001 for PCT/US00/09542, 2371379, CAX.
ISR dated Nov. 2, 2000 for PCT/US00/09542, 2371379, CAX.
ISR dated Nov. 2, 2000 for PCT/US00/09541, 2369759, CAX.
IPER dated Feb. 14, 2002 for PCT/US00/31740, 2001-539201, JPX.
Written Opinion dated Oct. 19, 2001 for PCT/US00/31740, 2001-539201, JPX.
ISR dated Sep. 18, 2001 for PCT/US00/31740, 2001-539201, JPX.
IPER dated Aug. 22, 2003 for PCT/US00/17266, 2001-506518, JPX.
Written Opinion dated Jan. 31, 2003 for PCT/US00/17266, 2001-506518, JPX.
ISR dated Sep. 21, 2001 for PCT/US00/15810, 2001-502044, JPX.
ESR dated Oct. 4, 2005, 00974003.6, EPX.
IPER dated Feb. 13, 2002 for PCT/US00/24819, 00960077.6, EPX.
Written Opinion dated Aug. 13, 2001 for PCT/US00/24819, 00960077.6, EPX.
ISR dated Dec. 7, 2000 for PCT/US00/24819, 00960077.6, EPX.
ISR dated Jan. 18, 2001 for PCT/US00/17266, 00943086.9, EPX.
IPER dated Sep. 8, 2001 for PCT/US00/15810, 00941287.5, EPX.
IPER dated Jan. 2, 2002 for PCT/US00/09541, 00925915.1, EPX.
Written Opinion dated Aug. 13, 2001 for PCT/US00/09541, 00925915.1, EPX.
IPER dated Feb. 14, 2001 for PCT/US00/09543, 00923211.7, EPX.
ISR dated Oct. 24, 2000 for PCT/US00/09543, 00923211.7, EPX.
IPER dated Nov. 1, 2001 for PCT/US00/01708, 00909966.4, EPX.
IPER dated Feb. 2, 2001 for PCT/US00/01625, 00909958.1, EPX.
ISR dated Jul. 24, 2000 for PCT/US00/01625, 00909958.1, EPX.
Tan, Q. et al., "A brief overview of current TV set-top box developments", Systems, Man, and Cybernetics, 1996, IEEE International Conference on: Oct. 14-17, 1996, 2127-2132.
Perry, T.S., "Consumer electronics", Spectrum, IEEE, Jan. 1997, vol. 34, No. 1, 43-48.
The Internet Protocol Journal, Dec. 1998, vol. 3, No. 1, http://www.noc.garr.it/docum/journal/ipj_dic_98.pdf.
T.P. David, "Networking requirements and solutions for a TV WWW Browser" 1997 from http://scholar.lib.vt.edu/theses/public/etd-82497-16476/materials/etd.pdf.
Atzori, L. et al., "Multimedia information broadcasting using digital TV channels", Broadcasting, IEEE Transactions on, Dec. 1997, vol. 43, No. 4, 383-392.
Encryption. Free On-line dictionary of computing: http://foldoc.doc.ic.ac.uk/foldoc/2003-04-12.
Encode. Free On-line dictionary of computing: http://foldoc.doc.ic.ac.uk/foldoc/1999-07-06.
The project Gutenberg entitled: "The Bible: Old and New Testaments, King James Version by Anonymous", released on Aug. 1, 1989.
"'Optical Disks' May be Books of the Future", Steven Kosek and Dennis Lynch; Chicago Tribune, Sep. 15, 1985, p. 31.
"Transmission Control Protocol; Request for Comment 793", Sep. 1981, pp. 1-85.
"A Survey and Classification of Hypertext Documentation Systems," Boyle, C. et al.; *IEEE Transactions on Professional Communication*; IEEE Inc.; New York; vol. 35, No. 2; Jun. 1, 1992, pp. 98-111.
"An Interactive Lesson in the Interactive Course Series" Waite Group Press, MacMillan Computer Publishing, "Online! 1996, XP00082591, Retrieved from the Internet: <URL:http//www.waite.com/> retrieved in 1996.
"Electronic Dictionary Pronounces over 83,000 Words," Goorfin, L., *Speech Technology*; Man-Machine Voice Communications, U.S.; Media Dimensions Inc.; New York, vol. 4, No. 4; Apr. 1, 1989, pp. 78-79.
"Fourth generation hypermedia: some missing links for the World Wide Web," Bieber, M. et al., *International Journal of Human-Computer Studies*; U.S.; Academic Press: New York; vol. 47, No. 1; Jul. 1997; pp. 31-65.

"*A Dynamic Policy of Segment Replication for Load-Balancing in Video-On-Demand Servers*," Dan, A. et al.; Multimedia Systems, vol. 3, No. 3, Jul. 1995, pp. 93-103.
"Reading and Writing the Electronic Book," Yankelovich, N. et al., *Computer*; U.S. IEEE Computer Society, Long Beach, Calif., U.S. vol. 18, No. 10, Oct. 1, 1985, pp. 15-30.
"Subscription Teletext for Value Added Services", Dr. G.T. Sharpless, IEEE Transactions on Consumer Electronics, Aug. 1985, vol. CE-31, No. 3, pp. 283-289.
"The Internet bookstore opens for business", Medford: Jul./Aug. 1994. vol. 11, Iss. 4; p. 21 (1 page).
"Using an ER Query and Update Interface for Rapid Prototyping of Hypertext Systems," Czejdo, B.; Proceedings of the Annual Hawaii International Conference on System Sciences; Jan. 1, 1990, pp. 227-236.
"A Store-and-Forward Architecture for Video-on-Demand Service," Gelman, A.D. et al., ICC Conference, 1991, pp. 842-846.
Dinaro, M. et al., "Markets and Products Overview," Revue HF Tijdschrift, 1991, vol. 15, No. 3/4, pp. 135-148.
Alexander Gelman, et al., "An Architecture For Interactive Applications", May 1993, pp. 848-852.
Boom, H., "An Interactive Videotex System for Two-Way CATV Networks," 1986, vol. 40, No. 6, pp. 397-401.
"*Applied Cryptography Protocols, Algorithms, and Source Code in C*," Schneier, Bruce; 1996 by John Wiley & Sons, pp. 34-44.
Basch, Reva, "Books Online: Visions, Plans, and Perspectives for Electronic Text", Online, Medford: Jul. 1991, vol. 15, Iss. 4; pp. 13-23.
Bestler, C., "Flexible Data Structure and Interface Rituals for Rapid Development of OSD Applications", NCTA Technical Papers, pp. 223-236, Jun. 1993.
Broering, N. C., "The Electronic Library and IAIMS at Georgetown University", Policy Issues in Information and Communication Techniques in Medical Applications, 1988. Symposium Record, Sep. 29-30, 1988, pp. 27-29.
Chan, L. M., "Principles, Structure and Format", Immroth's Guide to the Library of Congress Classification, 4th Edition, 1990, Chapter 2, pp. 19-51.
Consumer Digest advertisement; "Xpand Your TV's Channel Capability;" Fall/Winter 1992; p. 215.
Daniel M. Moloney, "Digital Compression in Today's Addressable Environment;" 1993 NCTA Technical Papers; Jun 6, 1993; pp. 308-316.
DeBuse, R., "So That's a Book . . . Advancing Technology and the Library," Mar. 1988, Information Technology and Libraries, vol. 7, Issue 1, pp. 7-18.
Endo, K. et al., "Electronic Book in 3.5" Floppy Disk", Consumer Electronics, Digest of Technical Papers, IEEE 1994 International Conference on Jun. 21-23, 1994 pp. 316-317.
Fox E. A., et al., "Users, user interfaces, and objects: Envision, a Digital Library," Sep. 1993, Journal of the American Society for Information Science, vol. 44, issue 8, p. 480-491.
Schepers, C., "Für Geschlossene Benutzergruppen" Funkschau, DE, Franzis-Verlag K.G. Munchen, No. 18, Aug. 25, 1989, pp. S53-S54.
Goldberg M W et al: "World Wide Web—course tool: An environment for building WWW-based courses," Computer Networks and ISDN Systems, NL, North Holland Publishing. Amsterdam, vol. 28, No. 11, May 1, 1996.
Great Presentations advertisement; "Remote, Remote;" 1987; p. 32H.
Hartley S et al.: "Enhancing Teaching Using the Internet" SIGCSE/SIGCUE Conference on Integrating Technology into Computer Science Education, US, New York, ACM, vol. Conf. 1, Jun. 2, 1996, pp. 218-228.
Herron T L: "Teaching with the Internet" Internet and Higher Education, US, JAI Press, Stamford, CT, vol. 1, No. 3, 1998, pp. 217-222.
Hong Kong Enterprise; Advertisement, "Two Innovative New Consumer Products From SVI," Nov. 1988, p. 379.
HP-41 C Operating Manual—A Guide for the Experienced User, Hewlett Packard Co., Jun. 1980.
"Applying Interactive Voice Response Technology in Psychiatric Practice", Sorce J. F. et al., Human Factors in Telecommunications; R. V. Decker's Verlag, Heidelberg, Germany, pp. 397-407.

Intner, S. S. et al., "The Dewey Decimal Classification", Special Libraries: A Cataloging Guide, 1998, Chapter 11, pp. 211-239.

John Reimer, "Memories in My Pocket;" BYTE; Feb. 1991; pp. 251-258.

Kubota H. et al.: "Terrestrial Data Multiplex Broadcasting News Delivery System and Its Terminal", IEE Transactions on Consumer Electronics, U.S., IEE Inc., New York, vol. 43, No. 3, Aug. 1, 1997, pp. 504-509.

Lewis, B.T. et al.; "Shared books: collaborative publication management for an office information system"; ACM SIGIOS Bulletin Conference sponsored by ACM SIGOIS and IEEECS TC-OA on Office information systems, vol. 9, Issue 2-3, Apr. 1988, pp. 197-204.

Mann et al.; "A coherent distributed file cache with directory write-behind" ACM Transactions on Computer Systems (TCOS), vol. 12, Issue 2, May 1994.

Miyazawa, M. et al., "An electronic book: APT Book," Aug. 1990, Human-Computer Interaction, INTERACT '90, Proceedings of the IFIP TC 13 Third International Conference, Cambridge, UK, pp. 513-519.

O'Gorman, L., "Image and document processing techniques for the RightPages electronic library system", Conference B: Pattern Recognition Methodology and Systems, Proceedings, 11th IAP International Conference on Aug. 30-Sep. 3, 1992 pp. 260-263.

Olshansky R. et al., "Subscriber Distribution Networks Using Compressed Digital Video;" Journal of Lightwave Technology; Nov. 1992; vol. 10, No. 11, pp. 1760-1765.

Pobiak, B.C., "Adjustable access electronic books", Computing Applications to Assist Persons with Disabilities, 1992, Proceedings of the John Hopkins National Search for Feb. 1-5, 1992 pp. 90-94.

Raman, T.V., "Audio System for Technical Readings," May 1994, Cornell University, pp. 1-129.

Rawlins, "The New Publishing—Technology's impact on the publishing industry over the next decade", Nov. 12, 1991, pp. 1-65.

Schatz, "Building an electronic scientific community", System Sciences, 1991. Proceeding of the Twenty-Fourth Annual Hawaii International Conference on vol. iii, Jan. 8-11, 1991 pp. 739-748 vol. 3.

Simpson, Alan, Mastering Wordperfect® 5.1 & 5.2 for Windows, 1993, Sybex, Inc., pp. 72-73.

Soloview; "Prefetching in segmented disk cache for multi-disk systems" Proceedings of the fourth workshop on I/O in parallel and distributed systems: part of the federated computing research conference; May 1996.

Valauskas, Edward J, "Electronic books as databases", Database, Aug. 1993. vol. 16, Iss. 4; p. 84-86.

Technology Update, Wordperfect Corporation Introduces Wordperfect 6.0 for DOS, http://www.nfbnet.org/files/word_processing/WP60.TXT, Mar. 24, 1993.

T.V. Raman, "An Audio View of (LA)Tex Documents," Proceedings of the 1191 Annual Meeting, pp. 1001-1008.

Microsoft Press Computer Dictionary Second Edition, Microsoft Press, 1994, p. 418.

Cerf, V. et al., "A protocol for Packet Network Intercommunication," May 1974, IEEE Transactions on Communications Col. COM-22, No. 5, 637-647.

Holzmann, G., "Design and Validation of Computer Protocols," Nov. 1990, Prentice Hall, pp. 1-512.

Hearst, "Changing Network Society: New Technology in the Internet," (the original title: Interfaces for Searching the Web), Dec. 1998, Japan Nikkei Science, $1^{st}$ edition, 80-85.

Shunji Ichiyama, "WWW-based Digital Library System," Jul. 1996, NEC Giho (technical journal), NEC Creative, vol. 49, 33-39.

Minoru Ashizawa, "Using Digital Libraries as a Community Hall for Worldwide Information Spiral Development," May 1998, Journal of the Institute of Electronics, Information and Communication Engineers, Japan, vol. J81-D-II, No. 5, 1014-1024.

Akira Kojima, "Navigable Digital Library System Using Video-based Walk-through Technology," Mar. 1996, Technical Research Report of the Institute of Electronics, Information and Communication Engineers, Japan, vol. 95, No. 580, 31-36.

Toshiyuki Kamiya, "Development of Electronic Library Interface with 3D Walk-through and CG Librarian," Jan. 1995, Research Report of Information Processing Society of Japan, vol. 95, No. 1, 27-35.

Mamoru Sato, "Electronic Library Search using Animation," Apr. 1989, Science and Technology Information Service, Japan, National Diet Library, No. 88, 11-17.

Mamoru Sato, "SON-GO-KU: A dream of Automated Library," Mar. 1989, Joho Kanri (Journal of Information Processing and Management), the Japan Information Center of Science and Technology, vol. 31, No. 12, 1023-1034.

English language translation of citation No. 12, JP08008851.
English language translation of citation No. 13, JP09237096.
English language translation of citation No. 14, JP10070530.

* cited by examiner

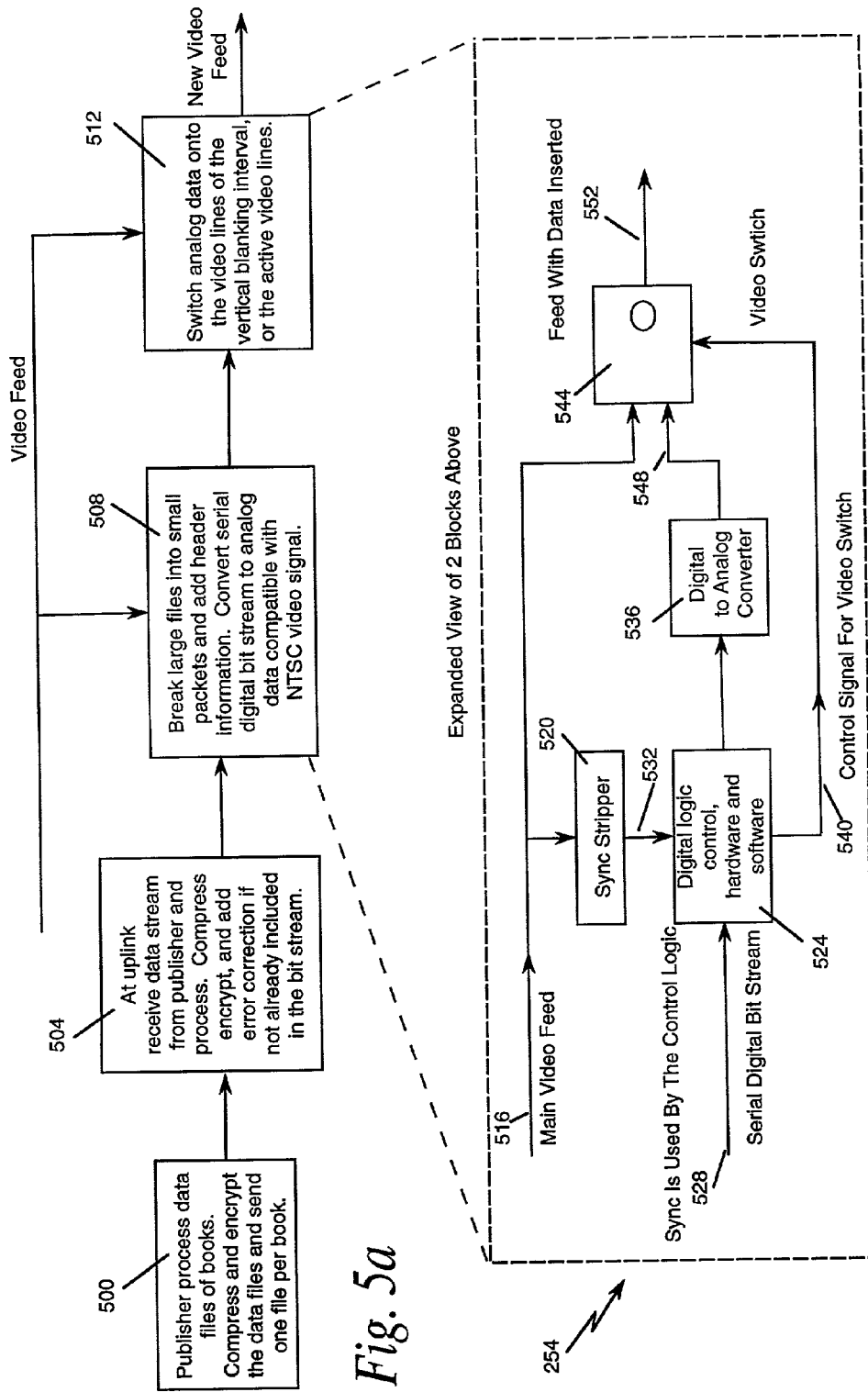

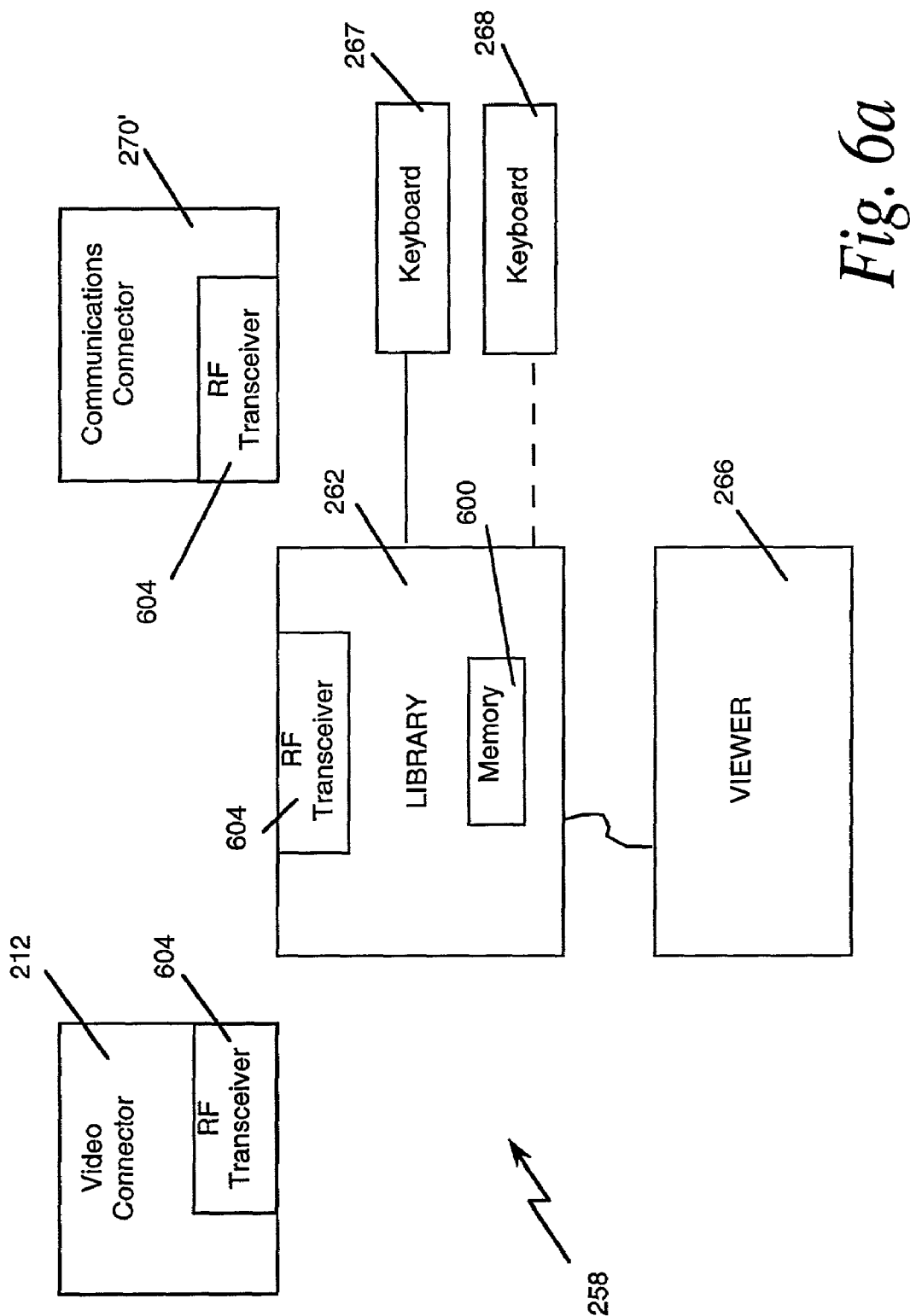

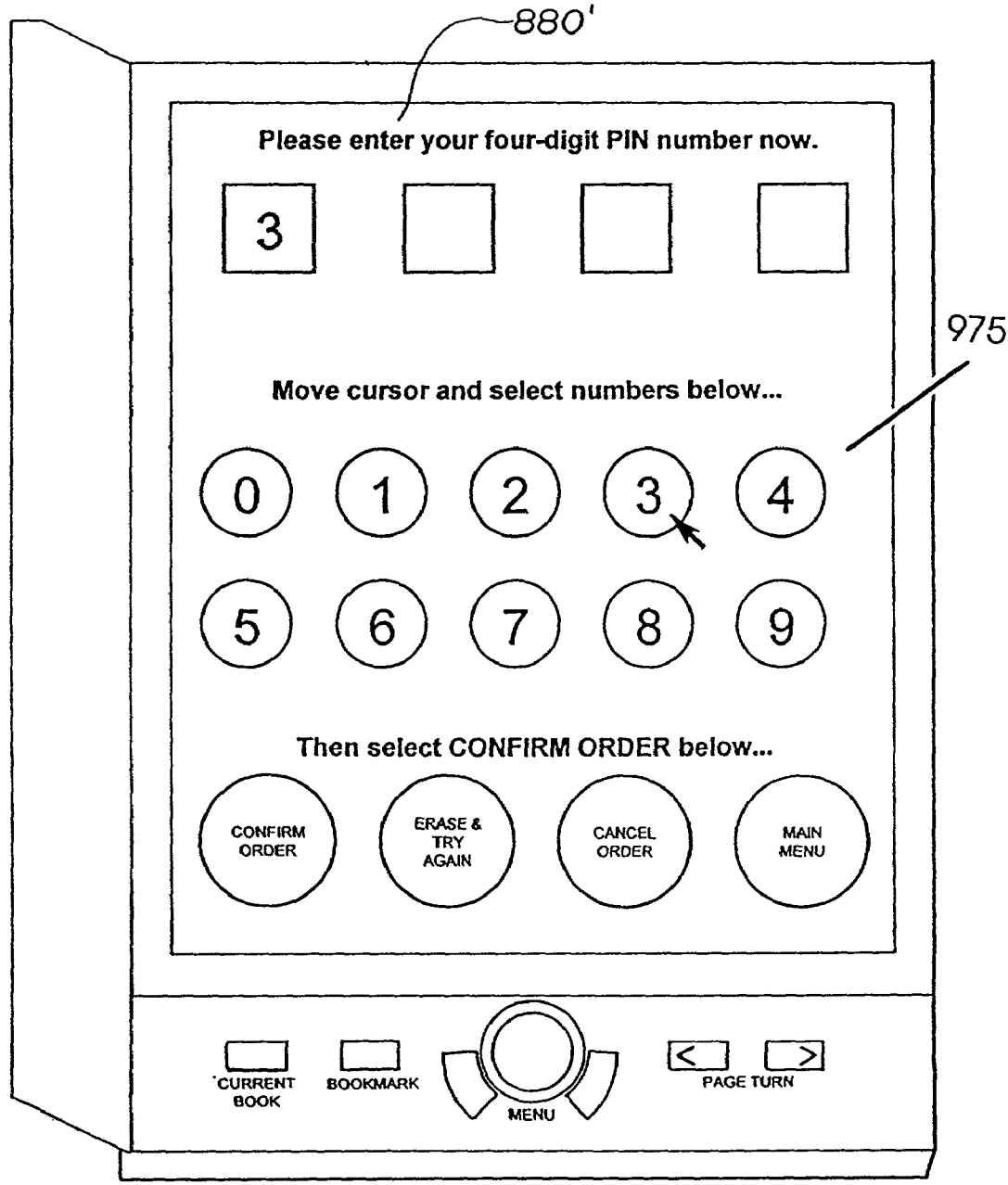

US 7,835,989 B1

ELECTRONIC BOOK ALTERNATIVE DELIVERY SYSTEMS

RELATED APPLICATIONS

This application is a continuation-in-part of U.S. application Ser. No. 07/991,074 entitled TELEVISION PROGRAM PACKAGING AND DELIVERY SYSTEM WITH MENU DRIVEN SUBSCRIBER ACCESS, filed Dec. 9, 1992, now abandoned and U.S. application Ser. No. 08/336,247 entitled ELECTRONIC BOOK SELECTION AND DELIVERY SYSTEM, filed Nov. 7, 1994 now U.S. Pat. No. 5,985,690, and U.S. application Ser. No. 08/160,194 filed Dec. 2, 1993 now U.S. Pat. No. 5,990,927 and PCT/US93/11606 entitled ADVANCED SET-TOP TERMINAL FOR CABLE TELEVISION DELIVERY SYSTEMS, filed Dec. 2, 1993, and U.S. application Ser. No. 08/906,469 entitled REPROGRAMMABLE TERMINAL FOR SUGGESTING PROGRAMS OFFERED ON A TELEVISION PROGRAM DELIVERY SYSTEM, filed Aug. 5, 1997 now U.S. Pat. No. 6,408,437, and U.S. application Ser. No. 09/191,520 entitled DIGITAL BROADCAST PROGRAM ORDERING, filed Nov. 13, 1998 now abandoned. These applications are incorporated by reference herein. Also incorporated by reference are co-pending U.S. application Ser. No. 09/237,827 entitled ELECTRONIC BOOK HAVING LIBRARY CATALOG MENU AND SEARCHING FEATURES, filed Jan. 27, 1999, U.S. application Ser. No. 09/237,828 entitled ELECTRONIC BOOK ELECTRONIC LINKS, filed Jan. 27, 1999, and U.S. application Ser. No. 09/289,956 entitled ELECTRONIC BOOK ALTERNATIVE DELIVERY METHODS, filed on date herein.

BACKGROUND ART

Sparked by the concept of an information superhighway, a revolution will take place in the distribution of books. Not since the introduction of Gutenberg's movable typeset printing has the world stood on the brink of such a revolution in the distribution of text material. The definition of the word "book" will change drastically in the near future. Due to reasons such as security, convenience, cost, and other technical problems, book and magazine publishers are currently only able to distribute their products in paper form. This invention solves the problems encountered by publishers.

TECHNICAL FIELD AND BRIEF SUMMARY OF INVENTION

The electronic book selection and delivery system is a new way to distribute books to bookstores, public libraries, schools and consumers. The technological breakthroughs of this invention provide a secure electronic system for both delivering selected books and receiving payments. The system has an unusual combination of features that provides the consumer with a daily use household appliance that has a high tech aura while being very practical, portable, and easy to use.

An advantage of the system is that it eliminates the distribution of any physical object such as a paper book or computer memory device from any book or text distribution system. The purchase of a book becomes a PAY-PER-READ™ event avoiding the overhead, "middle-men," printing costs, and time delay associated with the current book distribution system. Published material and text such as the President's speech, a new law, a court decision on abortion, or O. J. Simpson's testimony can be made immediately available to the consumer at a nominal fee. Alternatively, books may be made available free to the end use consumer, subsidized by advertisers who sponsor books or embed advertising within the books.

The system is a novel combination of new technology involving the television, cable, telephone, and computer industries. It utilities high bandwidth data transmissions, strong security measures, sophisticated digital switching, high resolution visual displays, novel controls, and user friendly interface software.

The primary components of the text delivery system are the subsystem for preparing the text for delivery and the subsystem for receiving and selecting text that was delivered. An embodiment of the system includes additional components and optional features that enhance the system. The system may be configured for use by bookstores, public libraries, schools and consumers. In one embodiment, the system for consumer use is made up of four subsystems, namely: (1) an operations center, (2) a distribution system, (3) a home subsystem including reception, selection, viewing, transacting and transmission capabilities, and (4) a billing and collection system. Alternative configurations of the system are defined to allow for a variety of traditional and non-traditional delivery methods.

The operations center performs several primary functions: manipulating text data (including receiving, formatting and storing of text data), security encoding of text, cataloging of books, providing a messaging center capability, and performing uplink functions. In one embodiment, the system delivers the text from the operations center to consumer homes by inserting text data within analog video signals. The insertion of text is generally performed with an encoder at an uplink site that is within or near the operations center. The system can use several lines of the Vertical Blanking Interval (VBI), all the lines of the analog video signal, a digital video signal or unused portions of bandwidth to transmit text data. Using the VBI delivery method, the top ten or twenty book titles may be transmitted with video during normal programming utilizing existing cable or broadcast transmission capability without disruption to the subscriber's video reception. Using the entire video signal, thousands of books may be transmitted within just one hour of air time. Nearly any analog or digital video or data distribution system may be used to deliver the text data. The text data may also be transmitted over other low and high speed signal paths including a telephone network (e.g., a public switched telephone network) having a high speed connection such as an asynchronous digital subscriber line (ADSL) connection and the Internet, for example.

The home subsystem performs at least four functions: connecting to the distribution system, selecting text, storing text, and transacting through a communicating mechanism. The components of the home subsystem may be configured in a variety of hardware configurations. Each function may be performed by a separate component, the components may be integrated, or the capability of existing cable set top converter boxes, computers, and televisions may be utilized. A connector, library unit and viewer unit may be used. In one embodiment, the connector portion of the home subsystem receives an analog video signal and strips or extracts the text from the video. The home library stores the text signal, provides a user friendly software interface to the system and processes the transactions at the consumer home. The viewer provides a screen for viewing text or menus and novel user friendly controls. Alternative embodiments are presented that support delivery of text using a variety of communication mechanisms.

The viewing device may be a portable book shaped viewer which stores one or more books for viewing and provides a screen for interacting with the home library unit. A high resolution LCD display is used to both read the books and to interact with the home library software. In one embodiment, an optional phone connector or return-path cable connection initiates the telephone calls and, with the aid of the library, transmits the necessary data to complete the ordering and billing portion of the consumer transaction. Alternative embodiments are presented that support ordering and billing using a variety of communication mechanisms. The user friendly controls include a bookmark, current book and page turn button. The billing and collection system performs transaction management, authorizations, collections and publisher payments automatically.

A system similar to the system for consumer use may be used in bookstores, schools and public libraries.

BRIEF DESCRIPTION OF DRAWINGS

FIG. 5a is a flow diagram of processing at the operations center and uplink.

FIG. 5b is a block diagram of a hardware configuration for an uplink site.

FIG. 6a is a block diagram of a hardware configuration for a four component home subsystem.

FIGS. 14c, 14d, 14e, 14f, 14g, 14h, 14i and 14j are schematics showing examples of submenus.

DETAILED DESCRIPTION OF INVENTION

Figure 1A:
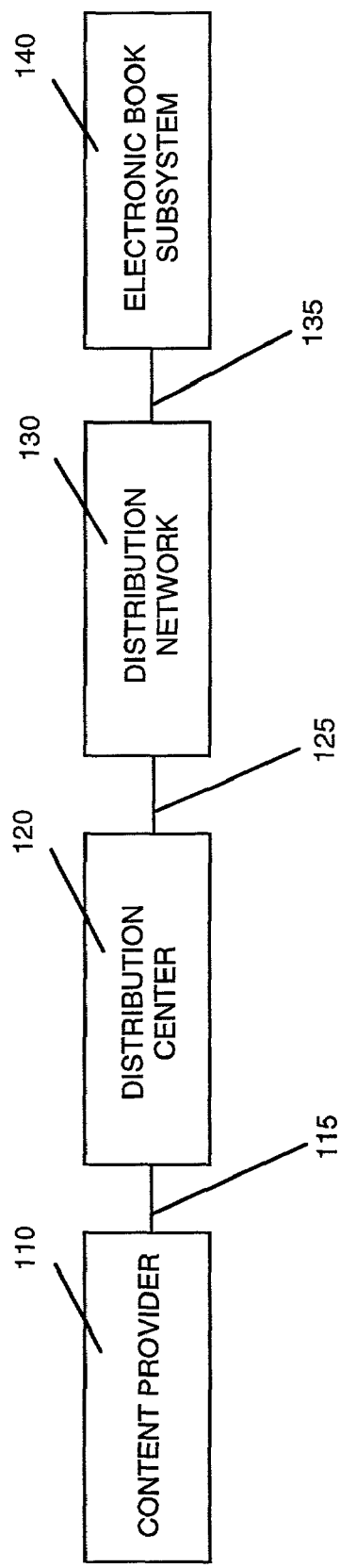
FIG. 1a is a block diagram of the primary components of an electronic book selection and delivery system.

FIG. 1a shows an electronic book distribution system 100 that may be used for distributing an electronic book. A content provider 110 may publish hard copy versions of books or other printed media including newspapers, magazines, and product catalogs, for example. The content provider 110 may convert printed materials to an electronic format and provide the electronic formatted materials to a distribution point, or center 120, over uplink path 115. The uplink path 115 may be a wired or a wireless path. The uplink path 115 may be a telecommunications network, for example. The uplink path 115 may be a satellite relay path or a wireless telephone path. The uplink path 115 may involve providing electronic books to the distribution center on a fixed media, such as a CD-ROM, for example.

In FIG. 1a, the content provider 110 and the distribution center 120 are shown as separate components of the electronic book distribution system 100. However, the content provider 110 and the distribution center 120 may be co-located.

The distribution center 120 may convert printed matter into an electronic format. Alternately, the distribution center 120 may receive electronic files from an outside source, such as the content provider 110. The distribution center 120 may process and store electronic books.

The distribution center 120 distributes electronic books. The distribution may be, for example, over distribution path 125, distribution network 130, and distribution path 135 to an electronic book subsystem or terminal 140, which may include an electronic book viewer (not shown). The terminal may also be a television, a set top terminal, a personal computer, or similar device. An apparatus and method for distributing electronic books is disclosed in greater detail later. The distribution network 130 may be an electronic book store, an Internet web site, a wired or wireless telecommunications network, an intranet, a radio program delivery system, a television program delivery system, including cable television, satellite television broadcast, and over-the-air broadcast, for example. The electronic book distribution network 130 could include direct delivery through a mail delivery system of electronic books on a fixed media, such as a CD-ROM, for example.

Figure 1B:
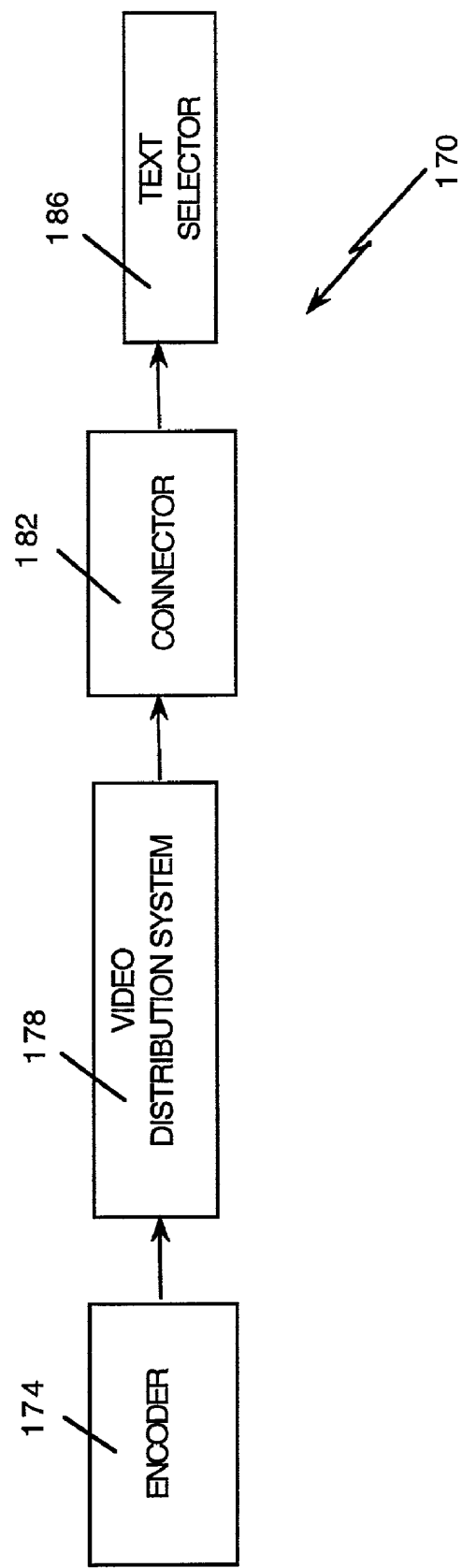
FIG. 1b is a block diagram of an electronic book selection and delivery system that uses a composite video signal.

FIG. 1b shows components of an electronic book distribution system 170 using a television program delivery system to distribute electronic books.

In the embodiment shown in FIG. 1b, the components of the electronic book selection and delivery system 170 are an encoder 174, a video distribution system 178, a connector 182, and a text selector 186. The encoder 174 places textual data on a video signal to form a composite video signal. Although the composite signal may contain only textual data, it usually carries both video and textual data. A variety of equipment and methods may be used to encode text data onto a video signal. The video distribution system 178 distributes the composite video signal from the single point of the encoder 174 to multiple locations, which have connectors 182. The connector 182 receives the digital or analog video signal from the video distribution system 178 and separates, strips or extracts the text data from the composite video signal. If necessary, the extracted text data is converted into a digital bit stream. The text selector 186 works in connection with the connector 182 to select text.

Using the connector 182 and text selector 186 combination, various methods of selecting and retrieving desired text from a composite or video signal are possible. Text may be preselected, selected as received or selected after being received and stored. One method is for the connector 182 to strip or extract all the text from the video signal and have the text selector 186 screen all the text as received from the connector 182. The text selector 186 only stores text in long term or permanent memory if the text passes a screening process described below.

Figure 2:
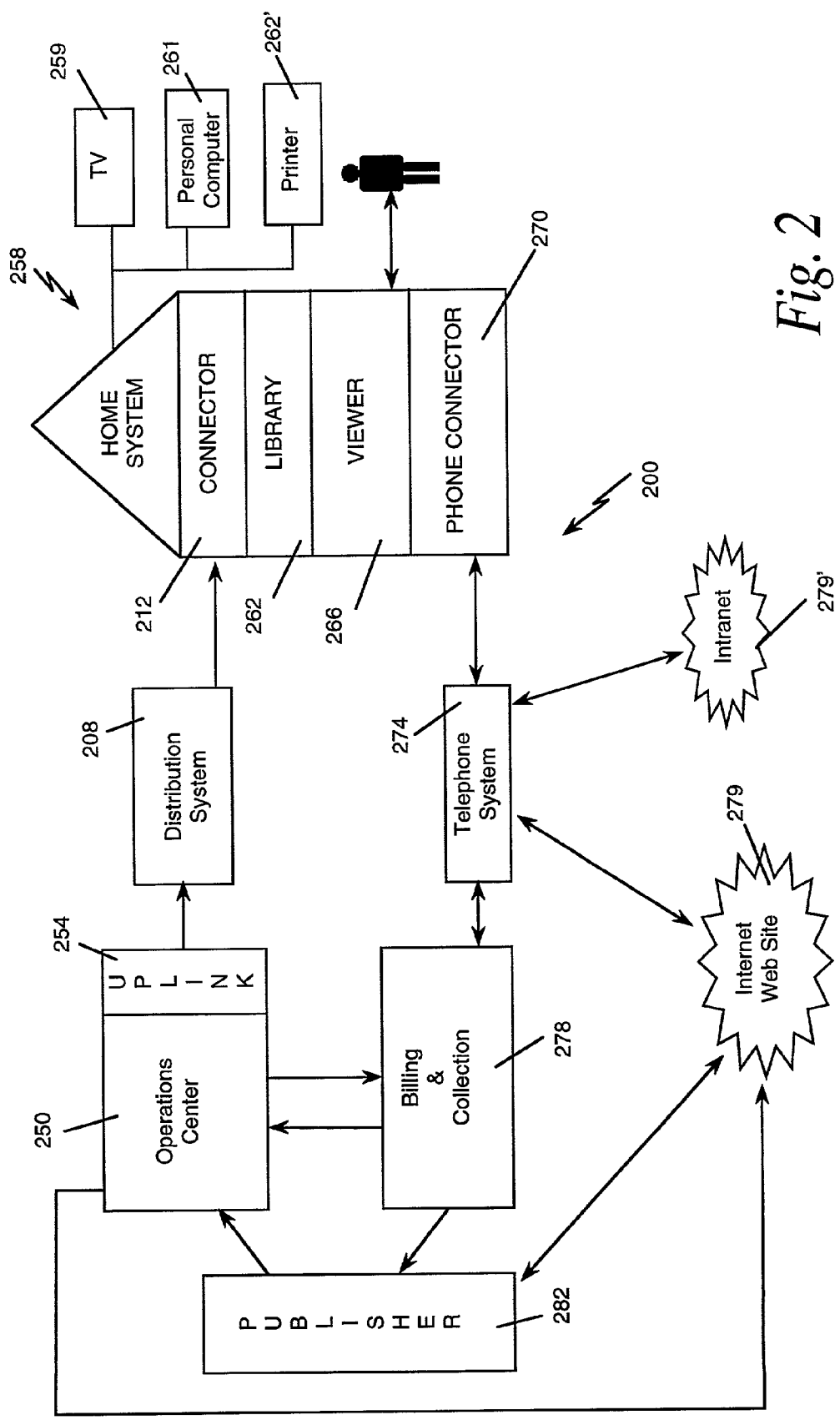
FIG. 2 is a schematic showing an overview of the electronic book selection and delivery system.

FIG. 2 shows another embodiment of an electronic book selection and delivery system 200. The delivery system 200 includes: an operations center 250 including an uplink site 254, a video distribution system 208, an electronic book device, or home system 258 including a video connector 212, a library 262, a viewer 266, and a phone connector 270, telephone system 274, an Internet web site 279 and a billing and collection system 278. Also as shown in FIG. 2, the home system 258 may include connections to a television 259 and a personal computer 261 may be used to display menu screens, electronic books, electronic files, or any other information associated with the electronic book delivery system 200. In addition, the television 259 and the personal computer 261 may provide control functions that replicate and supplement those of the viewer 266.

The operations center 250 receives textual material from outside sources 282 such as publishers, newspapers, and on-line services. Alternately, the outside sources may maintain electronic books at the Internet web site 279. The outside sources 282 may convert textual and graphical material to digital format, or may contract with another vendor to provide this service. The operations center 250 may receive the textual and graphical material in various digital formats and may convert the textual material to a standard compressed format for storage. In so doing, the operations center 250 may create a pool of textual material that is available to be delivered to the home system 258. The textual material may be grouped by books or titles for easy access.

As used herein, "book" means textual or graphical information such as contained in any novels, encyclopedias, articles, magazines, newspapers, catalogues, periodicals, or manuals. The term "title" may represent the actual title assigned by an author to a book, or any other designation indicating a particular group, portion, or category of textual information. The title may refer to a series of related textual information, a grouping of textual information, or a portion of textual data. For example, "Latest Harlequin Romance", "Four Child Reading Books (Ages 10-12)," "Encyclopedia 'BRITANNICA'™," "President's Speech," "Instruction Manual," "Schedule of 4th of July Events," "Pet Handbooks," "Roe v. Wade," and "The Joy of Cooking," are suitable titles. Also, the title may be a graphical symbol or icon. Thus, a picture of a wrench may be a title for a repair book, a picture of a computer a title for a computer book, a graphical symbol of a telephone a title for a telephone book, a drawing of a dagger a title for a mystery book, a picture of a bat and ball a title for a sports book, and a picture of tickertape a title for a business book.

The operations center 250 includes the uplink site 254 for placing the text onto a telecommunications signal and sending the telecommunications signal into a distribution system. The uplink site 254 would generally include an encoder 204 (not shown in FIG. 2) to encode the text onto the telecommunications signal.

Many analog and digital video distribution systems may be used with the electronic book delivery system 200, such as cable television distribution systems, broadcast television distribution systems, video distributed over telephone systems, direct satellite broadcast distribution systems, and other wire and wireless video distribution systems. Nearly any distribution system which can deliver a telecommunications signal, including a video signal, will work with the electronic book delivery system 200. It is also possible to distribute the electronic book without using a telecommunications signal as described in the embodiments presented in Section VII below.

The home system 258 performs five functions: (1) connecting with a video distribution system; (2) selecting data; (3) storing data; (4) displaying data; and (5) handling transactions. An important optional function of the home system 258 is communicating using, in one embodiment, a telephone communication system 274. The home system 258 may be made up of four parts: a video connector 212 or similar type of connector for connecting with the distribution system 208, a library 262 for storing and processing, a viewer 266 for viewing menus and text and a telephone connector 270 for connecting with a telephone communications system 274. Additional embodiments are presented in Section VII that address alternative communication mechanisms.

The billing and collection system 278 may be co-located with the operations center 250 or located remote from the operations center 250. The billing and collection system 278 may be in communication with the home system 258 using telephone-type communication systems (for example 274). Any of a number of communication systems as presented in Section VII, such as a cellular system or the Internet, will operate with the billing and collection system 278. The billing and collection system 278 records the electronic books or portions of text that are selected or ordered by the subscriber. The collection system will charge a subscriber's credit account or bill the subscriber. In addition, the billing and collection system 278 may monitor that amount due to publishers or other outside sources 282 who have provided textual data or other services such as air time to enable the text delivery system 200 to operate.

Also shown in FIG. 2 is an intranet 279'. The intranet 279' may be used as a part of a private distribution network for distributing and circulating electronic books. For example, a university library may use the intranet 279' to circulate electronic books to university students and professors.

Figure 3:
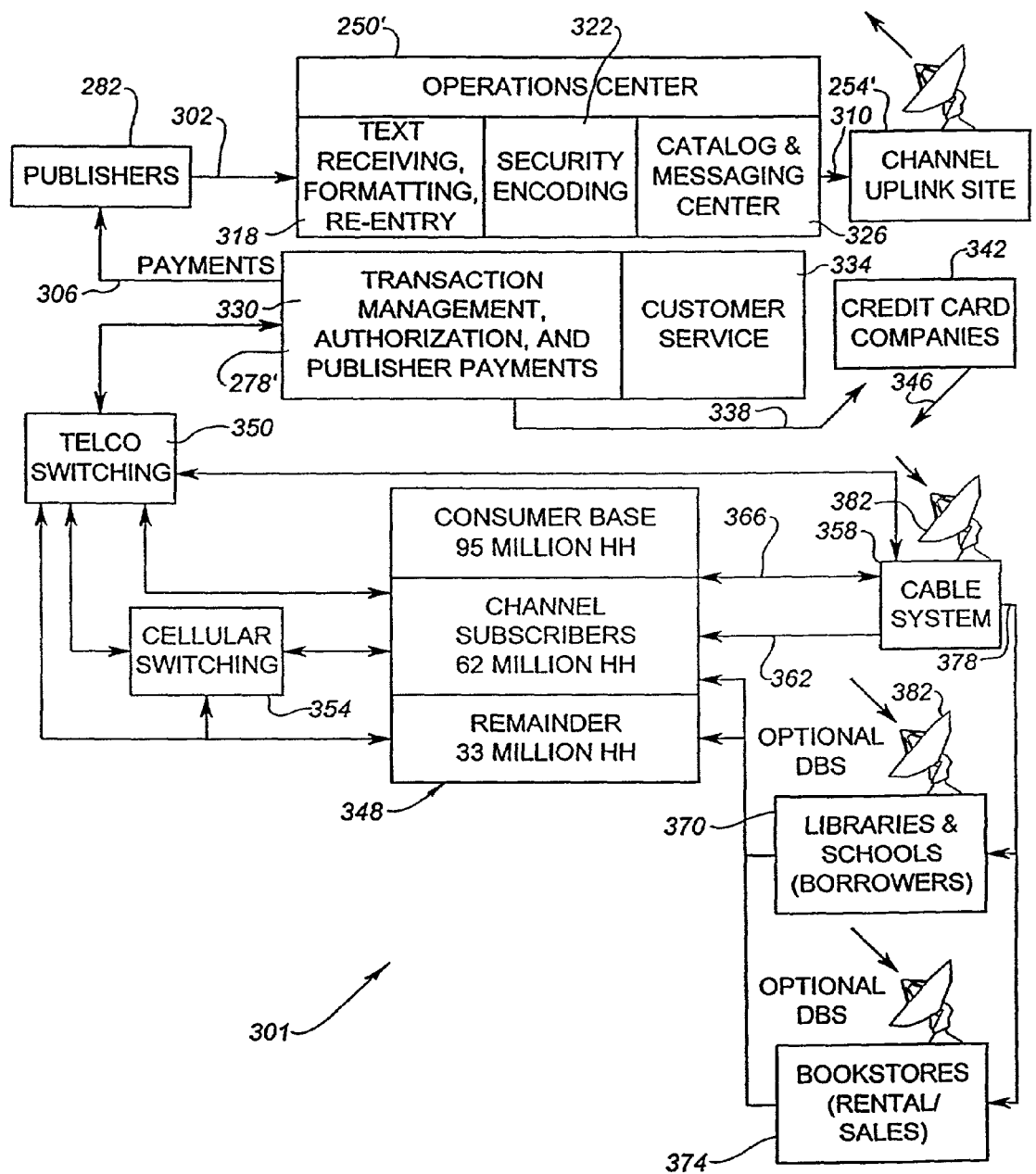
FIG. 3 is a schematic of a delivery plan for the electronic book selection and delivery system.

FIG. 3 is an expanded overview of a delivery plan 301 for the electronic book delivery system 200. It is a comprehensive delivery plan 301 to support various types of users and various billing systems. FIG. 3 shows that publishers 282 may provide text transfer 302 to the operations center 250' and receive payments 306 from the billing and collection system 278'. A separate channel uplink site 254' is shown in this configuration receiving data 310 from the operations center 250'. The operations center 250' has three separate sections (318, 322, 326) one for text receiving, formatting and re-entry 318, a second for security encoding 322 and a third section for catalog and messaging center functions 326.

The collection and billing system 278' shown has two sections (330, 334) one for transaction management, authorizations and publisher payments 330, and the other for customer service 334. The customer service section 334 provides for data entry and access to customer account information. Transaction accounting information 338 is supplied to credit card companies 342 by the transaction management section 330 of the billing and collection system 278'. The credit card companies 342 provide billing 346 to customers either electronically or by mail.

Methods for communicating between the subscriber base 348 and the billing and collection system 278' include: by telephone switching 350 alone, cellular switching 354 and telephone switching 350 combined, and by use of the cable system 358 and the telephone switching 350. The system shown supports both one-way 362 and two-way cable communication 366 with subscribers. Additional communication methods are presented in Section VII. Public libraries and schools 370 as well as bookstores 374 may use the delivery system 301.

Public libraries and schools 370 could have a modified system to allow the viewer to be checked-out or borrowed while bookstores 374 would rent or sell the viewer and sell electronic book data. The bookstores 374 as well as the public libraries and schools 370 may be serviced by cable 378. Optional direct broadcast systems (DBS) 382 can also be used with the system 200 as detailed in Section VII.

I. The Operations Center

Figure 4:
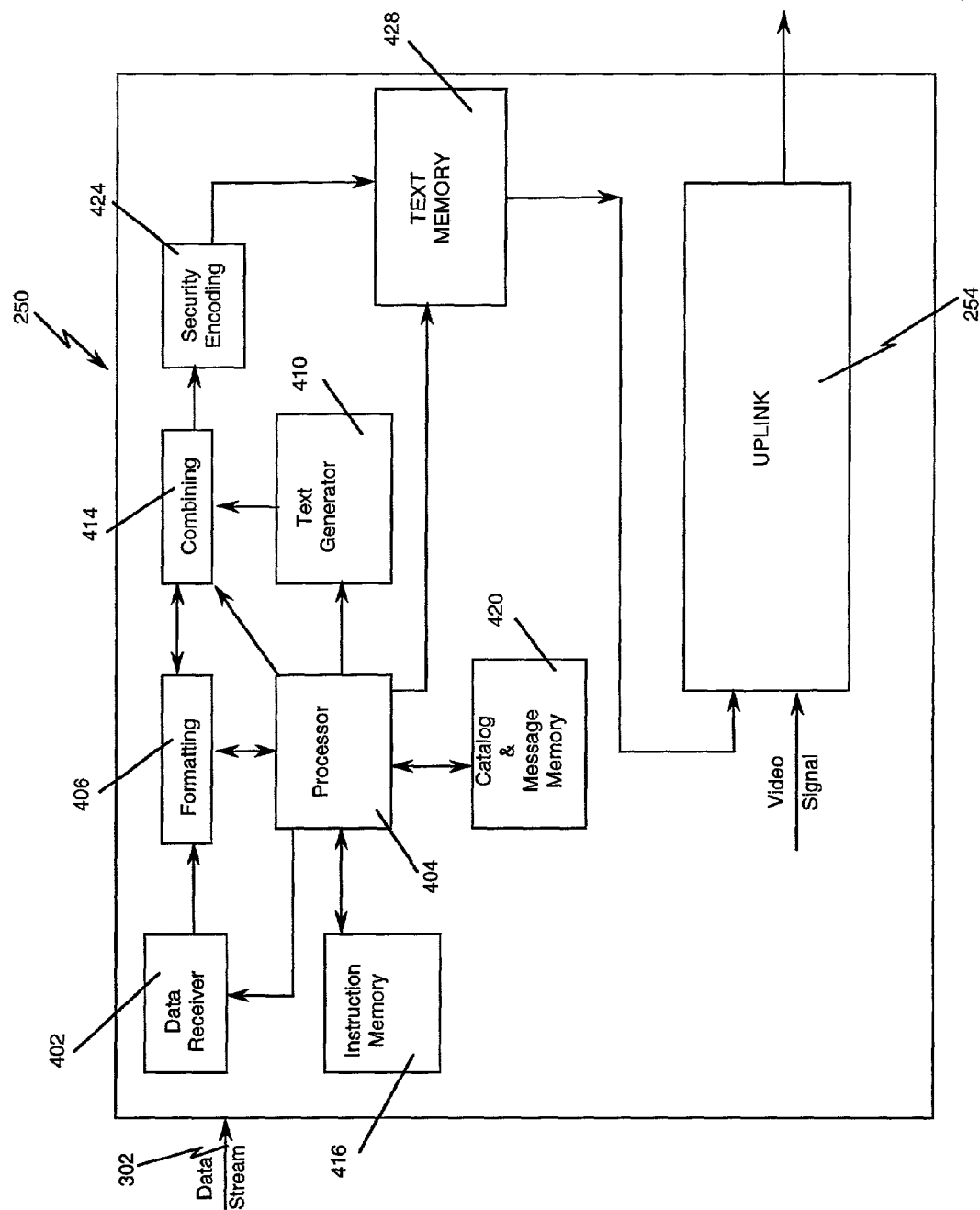
FIG. 4 is a block diagram of the operations center.

FIG. 4 is a schematic of the operations center 250, which includes the uplink 254. The operations center 250 may gather text or books by receiving, formatting, storing, and encoding. A data stream 302 containing text may be received at the operations center 250 by a data receiver 402. The data receiver 402 is under the control of a processor 404. After reception, the data stream is formatted using digital logic for formatting 406 which is also under the control of the processor 404. If any additional text is generated at the operations center 250 locally for insertion into the distributed signal, the text generation is handled through text generator hardware 410, which may include a data receiver and a keyboard (not shown). Following processing by the text generator 410, the additional text can be added to the text received by the combining hardware 414 that includes digital logic circuitry (not shown).

The processing at the operations center 250 is controlled by a processor 404, which uses an instruction memory 416. The processor 404 and instruction memory 416 may be supplied by a personal computer or mini-computer, for example. To perform the catalog and messaging functions, the operations center 250 uses a catalog and message memory 420 and the text generator 410 if necessary.

The data stream of text, catalog and messages may be encoded by security module encoding 424 prior to being sent to the uplink module 254. Various encoding techniques may be used by the security encoding module 424 such as the commercial derivative of NSA's encryption algorithm (Data Encryption System (DES)) and General Instrument's DigiCipher II. Following encoding, the encoded text may be stored in text memory 428 prior to being sent to the uplink 254. A first-in-first-out text memory arrangement may be used under the control of the processor 404. Various types of memory may be used for the text memory 428 including RAM. The operations center 250 may use file server technology for the text memory 428 to catalog and spool books for transmission as is described below. The operations center 250 may also store the electronic book as compressed data files.

In an embodiment, to transmit textual data, the distribution system 208 (see FIG. 2) may use high bandwidth transmission techniques such as those defined by the North American Broadcast Teletext Standard (NABTS) and the World System Teletext (WST) standard. Using the WST format (where each line of the Vertical Blanking Interval contains 266 data bits), a four hundred page book, for example, may be transmitted during regular television programming using four lines of the Vertical Blanking Interval at a rate of approximately one book every 1.6 minutes (63,840 bits per second). Alternatively, books may be transmitted over a dedicated channel, which interrupts programming so that 246 lines of video can be used to transmit approximately 2,250 books every hour (3.9 Mbits per second). A teletext type format is the simplest but possibly the slowest text format to use with the electronic book delivery system 200. In either event, an encoder 204 may be used at an uplink site 254 to insert textual data into the analog video signal. In many other respects, the delivery of the textual information may be completed using an existing cable television plant and equipment. Alternative transmit formats and delivery systems are presented in Section VII.

FIG. 5a is a flowchart of steps involved in processing text from the publisher or provider 282 that may occur at the operations center 250. As shown in block 500, the publisher 282 processes data files of text for books, compresses, encrypts and sends the data files to the operations center 250 or uplink 254. Text files for books may be sent one book at a time. As shown in block 504, the uplink 254 or operations center 250 receives and processes the data stream from the publisher 282. Generally, part of this processing includes encryption and error correction. Text files may be delivered for receipt by multiple home subsystems simultaneously, or to a specific individual home subsystem.

In FIG. 5a, the electronic books are distributed to consumers using a video distribution system such as a cable television system. However, the electronic books may also be packaged as data packets and distributed over other telecommunications networks such as a digital wireless telephone network, for example.

In one embodiment, as shown in block 508, files are broken into smaller packets of information. Header information is added to the packets. The bit stream is converted from a serial digital bit stream to an analog bit stream that is compatible with an NTSC video signal. Block 512 shows the switching of analog data into the video lines of a video signal. The analog data may be placed either in the VBI or the active video lines. In some instances, unused portions of bandwidth (such as 5-40 MHZ, 70-75 MHZ, 100-109 MHZ or other guard bands) may be used instead of the video lines. Alternate transmission methods are presented in Section VII.

FIG. 5b is an example of a hardware configuration to perform some of the functions for blocks 508 and 512. A video feed 516 is received and processed through a sync stripper 520. The stripped sync signal 532 is used by the digital logic control 524. The digital logic control 524 receives the sync signal 532 and a serial digital bit stream 528 for processing. The digital logic control 524 passes the serial digital bit stream to the Digital to Analog converter 536 and outputs a control signal 540 for the video switch 544. The video switch 544 integrates the video feed 516 and analog data stream 548 into a video feed with analog data signal inserted 552.

As an alternative to cable, broadcast or other television delivery methods, the public telephone system may be used to transmit books to the subscribers. An average book would take about 7 minutes to transmit over the public telephone system. Using the telephone system, it is not necessary to combine video and text into a composite signal. In most other respects, the operations center would remain similar whether text delivery was by telephone or cable. File server technology (such as that described in U.S. Pat. No. 5,262,875, entitled AUDIO/VIDEO FILE SERVER INCLUDING DECOMPRESSION/PLAYBACK MEANS, issued to Mincer, et al., and, U.S. Pat. No. 5,218,695, entitled FILE SERVER SYSTEM HAVING HIGH-SPEED WRITE EXECUTION, issued to Noveck, et al., incorporated herein by reference) may be used at the operation center with a telephone system text delivery method.

As another alternative to cable, television, and telephone system delivery, the public telephone system may be used to provide access to the Internet, where the Internet web site 279 may be accessed. Electronic books may be ordered, paid for, and delivered directly from the Internet web site 279 over the telephone system.

When a wireless telephone network is used to distribute electronic books, or otherwise communicate with the home system 258, the home system may receive data using any one or more standard protocols including time division multiple access (TDMA), code division multiple access (CDMA), Global Systems for Mobile Communications (GSM) and Advanced Mobile Telephone System (AMPS) protocols.

In any delivery system using the telephone system, individual subscribers may increase the electronic book deliver rate by incorporating high speed modems or other communications devices such as an Integrated Services Digital Network (ISDN) connector, or by use of an Asymmetric Digital Subscriber Line (ADSL). These alternative delivery methods are presented in Section VII.

II. The Home Subsystem

Figure 6B:
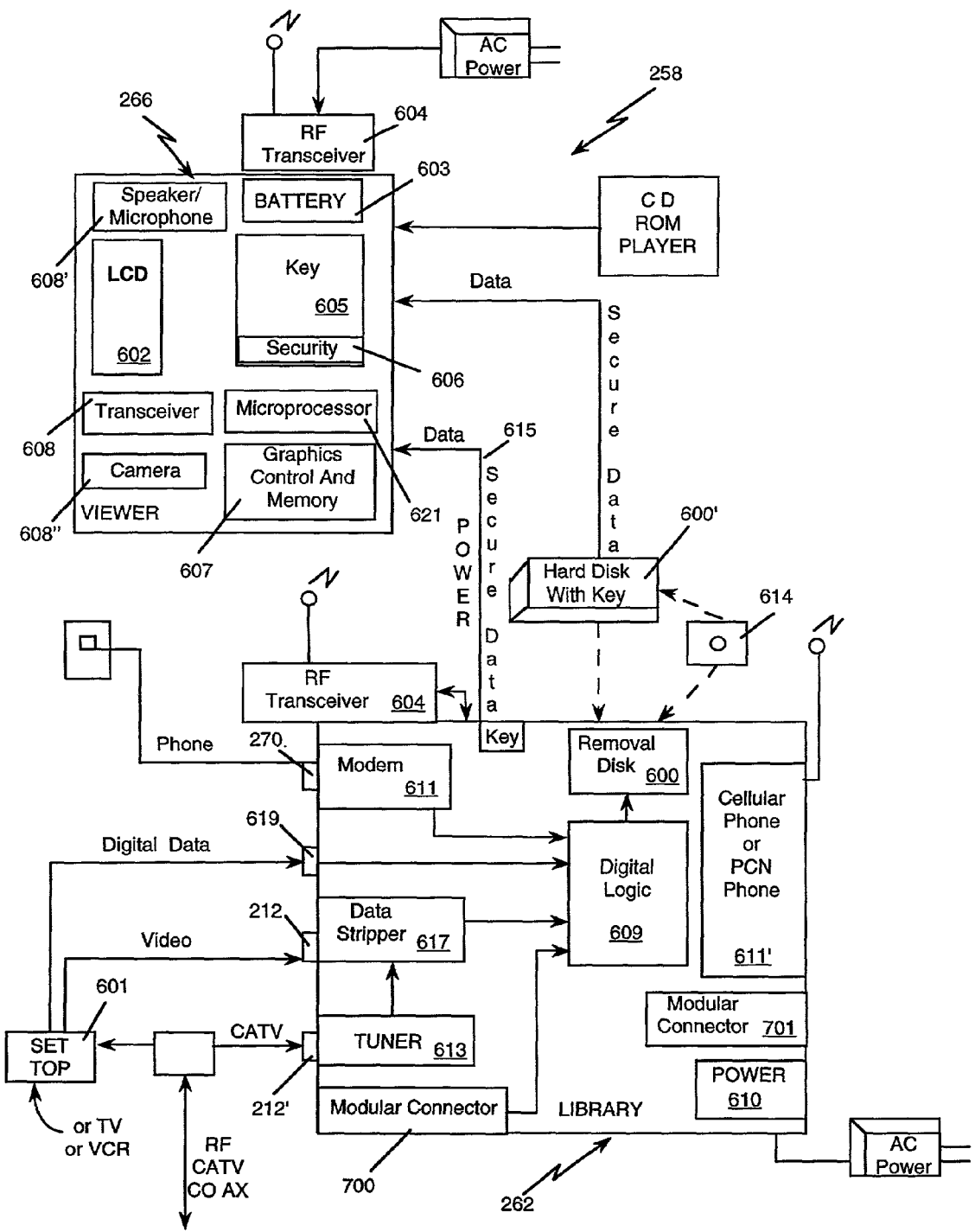
FIG. 6b is a schematic of a two unit home subsystem.

The hardware configuration for a four component home system 258 is shown in FIG. 6*a*. FIG. 6*b* shows a hardware configuration for a two component home subsystem. The home system 258 performs several functions, such as receiving data and video transmissions, stripping (or extracting) the data from the video signal, screening and storing the data, providing user friendly interface controls and software, displaying menus and text, processing transactions, initiating telephone calls and transmitting billing data. Various hardware configurations may be utilized to achieve the desired functions of the home system 258. For example, as shown in FIG. 6*b*, the home system 258 can be configured to utilize the reception and channel tuning capability of the current installed subscriber base of cable converter boxes and televisions 601 and networked computers. The home system 258 can also be designed as an advanced set top terminal converter box with menu generation capability, electronic memory and a telephone modem as described in section V below. Alternatively, the home system 258 can be configured to support alternate delivery and ordering methods as described in Section VII.

The electronic components, which make up the home system 258 can be arranged in a variety of ways. In the four unit subsystem of FIG. 6*a* the viewer 266 and library 262 are wired together while the remaining components communicate through RF transceivers 604. In a simple version of the home system 258 there are only two units, a library 262 and a viewer 266. FIG. 6*b* shows a two unit home system 258 with certain optional features.

The viewer 266 is generally equipped with a high resolution viewing area 602, digital logic (including a key 605, security 606, and a microprocessor 621), video graphics control and memory 607, power supply circuitry 602 (not shown), an optional battery 603 and an optional RF transceiver 604. In a two unit arrangement, the library 262 contains the connector function to the electronic book distribution system 208, connector function to a public telephone communications system, and memory 600 (which may be removable and portable 600'). More specifically, the library 262 would include data stripping functions 617, digital logic 609, memory storage 600, power circuitry 610, optional connections 611 (including cellular or PCN 611'), optional battery (not shown), optional tuner module 613 and an optional RF transceiver 604. The connector 212 and the public telephone system connection 270, as well as the removable portable memory unit 600 of the library 262 may be broken out into separate components. (FIG. 6*b* shows a removable portable hard disk memory 600' with removable cartridges 614.) Finally, the home system 258 may include an attached keyboard 267 or a wireless keyboard 268. Both the attached keyboard 267 and the wireless keyboard 268 may be used to communicate with the viewer 266 (not shown) or the library unit 262. The wireless keyboard 268 may communicate using radio frequency (RF) signaling, for example.

In an alternate arrangement, all functions of the home system 258 may be incorporated into a single unit. The functions of the library 262, for example, may be carried out by a card or chipset in the viewer 266. All the communications devices needed to couple the home system 258 to various telecommunications networks may also be incorporated into the viewer. All interfaces between the home system 258 and the subscriber may be included with the viewer 266. In this embodiment, the viewer 266 may include a communication device for receiving inputs from a separate keyboard. The viewer 266 may also include a built-in video camera 608" that may be used to transmit images of the subscriber. Using the transceiver 608, the camera 608" and the speaker/microphone 608', the subscriber may use the viewer 266 for video conferencing, for example.

Therefore, the home system 258 may have as many as five separate components, which communicate with each other. The two, three, four or five separate components which make up the home subsystem can communicate with each other in a variety of ways, including hardwired connection 615, RF transceiver 604 and other wireless methods.

RF communications may be used in the home, allowing separate components to be located throughout the home without restriction. The data communicated between the units may be secure data. In addition, the library 262 may provide power to the viewer 266 through the hard wire communication link 615.

To receive and strip data from a video signal at the consumer's home, a device such as a cable interface device or cable connector 212 is used. The cable connector device includes a tuner 613, while the cable interface device makes use of existing tuning equipment in the home. In either configuration, data is stripped from the video signal and stored at the subscribers location in the library 262. The phone connector 270, optional connector 611, and modular connector 701 initiate communications and transmit ordering and billing information to the operations center 250 or billing and collection system 278. A digital connector 619 is provided to communicate digital information with the set top 601. The library 262 is the intelligent component of the home subsystem, incorporating the hardware and software necessary to store the text data, generate menus and effect the purchase transactions. In addition to an RF transceiver 604, the home library 262 also includes the necessary jacks and connections to allow the system to be connected to the viewer 266. As shown in FIG. 6b, the library 262 communicates the text data to the viewer 266 in a secure format, which requires a key 605 for decryption. The text may be decrypted page by page just before viewing.

a. The Video Connector

Figure 7:
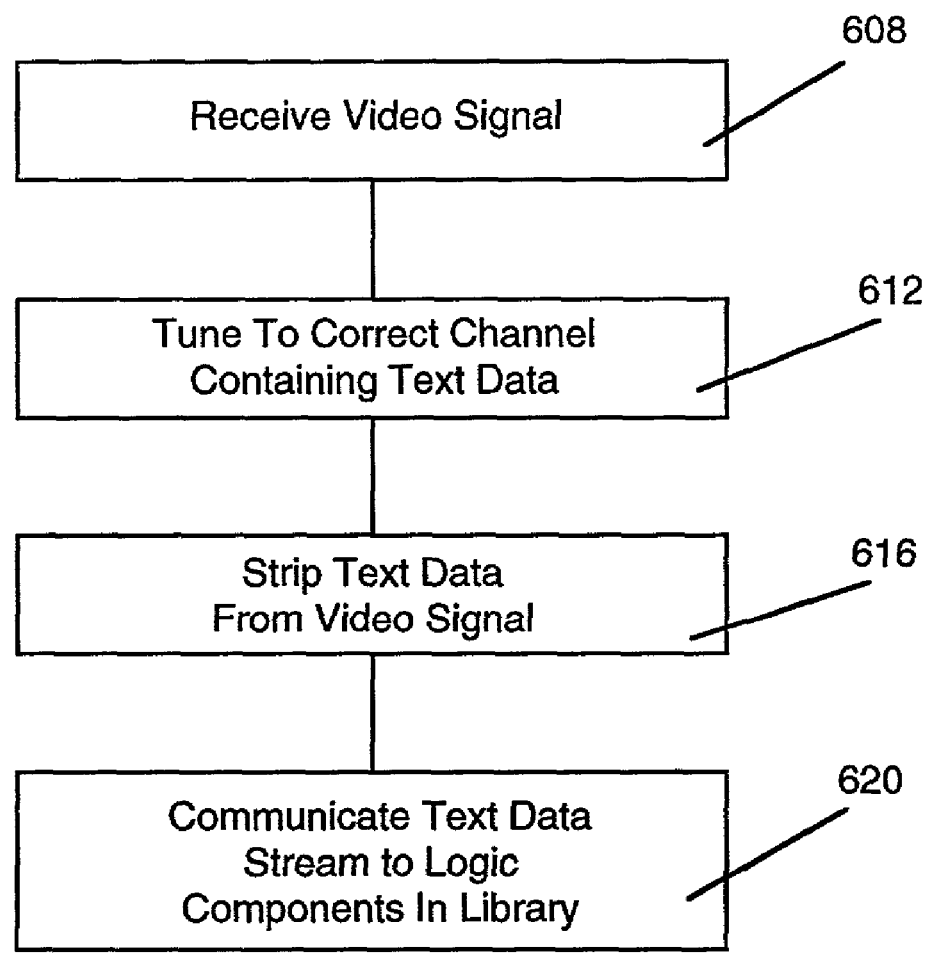
FIG. 7 is a flow diagram of processes performed by a video connector.

FIG. 7 shows the flow of the processes performed by the video connector 212. The video connector 212 receives the video signal 608, tunes to the channel containing the text data 612, strips the text data from the video signal 616, and communicates the text data stream to logic components in the library 620.

The connection to the video distribution system may be a cable connector to a cable television delivery system, as shown in FIG. 6b. The cable connector includes a data stripper circuit 617, which accepts video input from either a set top converter, TV or VCR 601, or an optional tuner block 613 that receives the CATV signal through the cable connector 212'. The data stripper circuit 617 strips data out of the video, and outputs a digital bit stream to the digital logic portion 609 of the library unit 262. The data is embedded in the video signal either in the vertical blanking interval or the active video portion in an encrypted and compressed format. The data stripper circuit 617 can be placed inside the set top converter box 601, TV, or in the library unit. The data stripper circuit 617 outputs the digital bit stream to be used by the library digital logic 609.

The video connector 212 may also contain a channel tuner module 613 that can tune to the video channel and provide access to the video that contains the data to be stripped. Using the optional tuner module 613, a set top converter, VCR, or TV tuner is not needed in the home subsystem. The optional tuner module 613 would instead receive the CATV signal directly through the cable connector 212. Additional connector options, which allow for the receipt of text files using alternative delivery methods, are presented in Section VII. This ubiquitous access is provided using the modular connector 700 as depicted in FIG. 6b.

b. Library

Figure 8:
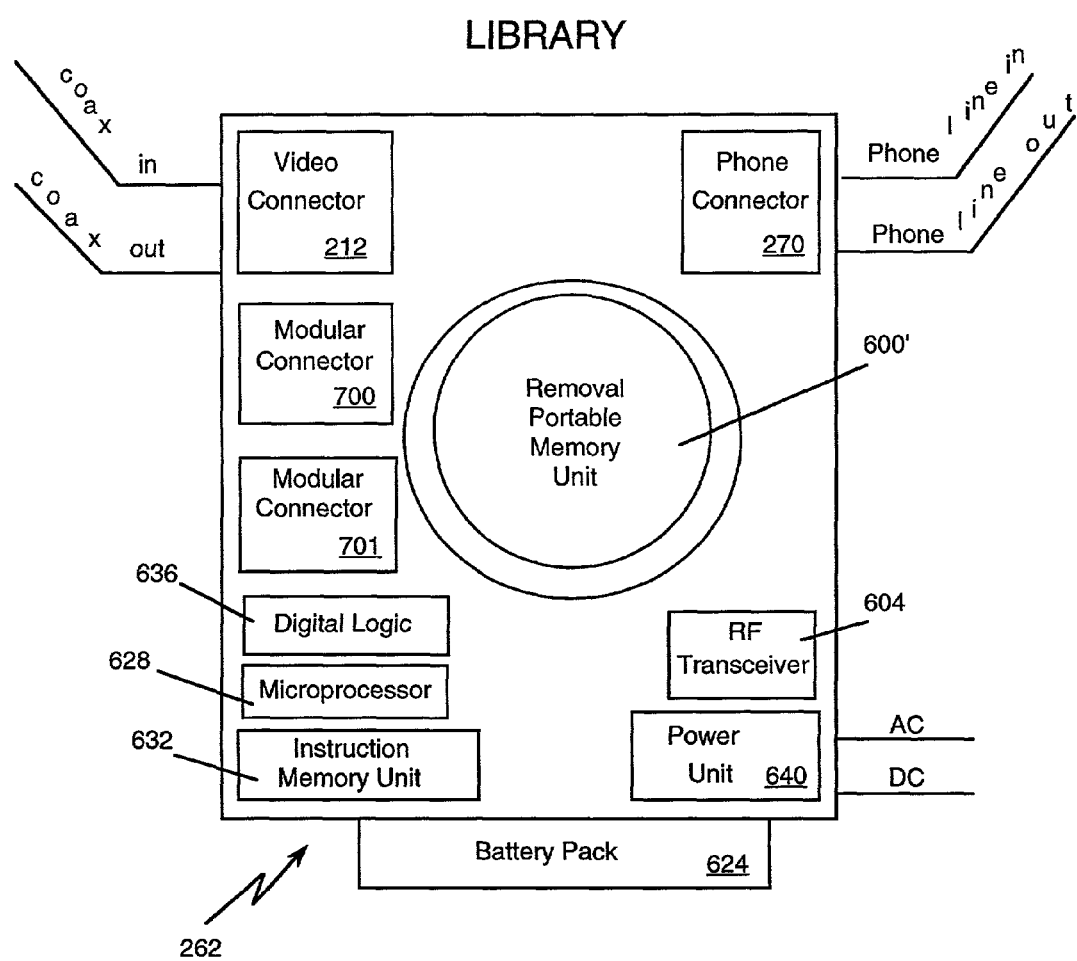
FIG. 8 is a block diagram for an example of a library unit.

An embodiment of the library 262 for a two unit home subsystem is shown in both FIG. 6b and FIG. 8. The embodiment shown includes the following optional parts: the video connector 212, phone connector 270, RF transceiver 604, and battery pack 624 in addition to a removal portable memory 600', microprocessor 628, instruction memory unit 632, digital logic 636, and power unit 640.

The library 262 contains a digital logic section 609 (not shown in FIG. 8) which includes the microprocessor 628, the digital logic 636 and the instruction memory unit 632. The microprocessor 628 may be a secure microprocessor such as the Mot SC21 device sold by Motorola. The digital logic section 609 will receive the serial digital bit stream from the data stripper circuit 617 and process the data. Error correction will also be performed by the digital logic section 609 and the data will be checked for proper address. If the address of the data is correct and the library 262 is authorized to receive the data, the data will be transferred to the memory storage unit 600, 600'. Authorization to receive the data is provided by the cable headend or another distribution point. An authorization code may be sent in the serial digital bit stream. The digital logic section 609 will send appropriate text and graphical data to the memory storage unit 600, 600'. It transfers this data in a compressed and encrypted format and the data remains stored in a compressed and encrypted format.

i. Memory Storage Unit

The memory storage unit of the library may be a removable portable memory unit 600' (as shown in FIGS. 6a, 6b and 8). A variety of options are available for memory storage: a hard disk drive, such as an 80 megabyte, a 200 megabyte, a hard disk with removable platters, and CD ROM. Referring to FIG. 6b, a hard disk drive unit 600', which contains removable platters, may also be used. This would provide virtually unlimited library storage capacity. Data will be stored in the memory storage unit in a compressed and encrypted format. As is also shown in FIG. 6b, the data may also contain a key or unique ID number that matches the ID or key of the viewer 266. This matching of a unique key or ID number prevents unauthorized transfer of text data from the memory storage unit to an unauthorized viewer. Small memory devices such as smart cards, electronic memory cards or PCM CIA cards (personal computer memory card industry association) may also be used to store the data.

ii. Power Circuitry

As shown in FIGS. 6b and 8, the library 262 will accept power from AC wall power 610, DC power 640, or optional battery power 624. The power circuitry 610, 640 may provide all the voltage necessary from either the battery 624 or AC unit for the various circuitry in the library. The power circuitry 610, 640 may also provide power to the viewer through a single data cable when connected to the viewer. The power circuitry 610, 640 will recharge the battery using AC power when in operation. With the optional battery unit 624 installed, the library 262 becomes a portable unit and can still provide power to the viewer 266. In order to extend battery life, power conservation measures may be utilized, such as shutting down the memory system when not in use. When the viewer unit 266 is being utilized and the library circuitry is not being utilized, virtually all power may be shut down to the library 262.

iii. Connection to the Public Telephone System

In an embodiment, the connection to the telephone system may be provided by a connector device 611, which consists of a modem. Various available modems may be used to perform this function. As shown in FIG. 6b, cellular phone or PCN phone connections 611' may also be provided. When the home system 258 is first initialized, the modem may be used to transfer the name and credit card information of the consumer to the billing and collection system 278. The telephone connection 270 may be utilized each time an electronic book is purchased by a consumer to complete and record the transaction. The telephone connection 270 may also be used to receive the text data from the operations center 250, bypassing the video distribution system 208. The phone connection 270 may be a separate unit as shown in FIG. 6b. However, alternate means exist to connect the home system 258 to the billing and collection system 278 or the operation center 250. The modular connector 701 (shown in FIGS. 6b and 8) provides access to each communication network to provide a path from the home system 258 to the billing and collection system 278 or the operations center 250. These alternatives are presented in detail in Section VII.

iv. Library Processing

Figure 9:
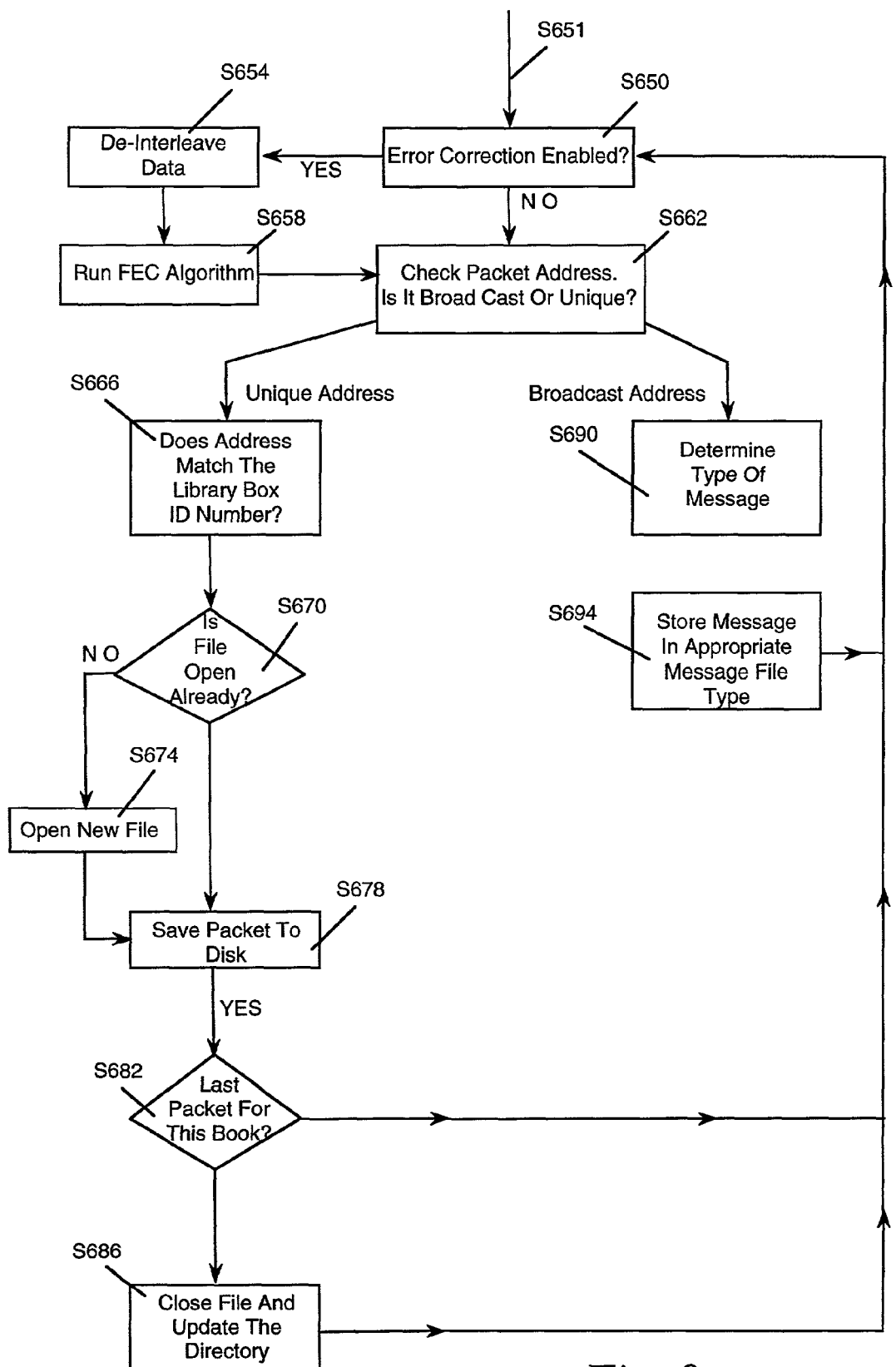
FIG. 9 is a flow diagram of processes performed by a library unit on the received data stream.

FIG. 9 shows for one embodiment, an example of processing performed by the digital logic section 609 of the library 262 on the data stream 651 received from the video connector 212 or stripper circuit 617. In step S650, digital logic section 609 checks the data stream 651 for error correction. If an error is detected, in step S654 digital logic section 609 de-interleaves the data and in step S658 runs a FEC (Forward Error Correcting) algorithm. In steps S650, S654 and S658, the digital logic section 609 performs the error correction needed on the data stream. If no error correction is necessary the digital logic section 609 proceeds to step S662 and checks data packets individually for packet address.

If the address is a unique address, the process moves to step S666 and the digital logic section 609 checks whether the address of the packet matches the library box ID number. The library box ID number is a unique number associated with the library 262. The library box ID is used to ensure security of the data. The process then moves to step S670 and the digital logic section 609 determines whether an electronic file has already been opened into which the data packet can be saved. If no data file has been opened, the digital logic section 609 opens a new data file for that packet. If an electronic file has been opened, the process moves to step S678 and the digital logic section 609 saves the packet in the electronic file on disk. The process moves to step 682 and the digital logic section 609 checks to see if this is the last packet for a particular book for a particular textual data block being received. If it is the last packet of information, the process moves to step 686 and the digital logic section 609 closes the electronic file and updates the directory of available electronic files. Following either step S682 or S686, the process returns to receive another data packet from the data stream received from the data stripper block.

If the packet address is checked and the address is determined to be a broadcast address, the process moves to step S690 and the digital logic section 609 determines the type of message that is being sent. The message may be an index of book titles, menu (and menu graphics) information, announcements, special offerings, discounts, promotions, and previews, for example. The process then moves to step S694 and the digital logic section 609 stores the message in an appropriate electronic message file. The process then returns to step S650 to receive another data packet and perform another error check.

Using the process of FIG. 9, the library 262 is able to receive, store and update directories related to the textual data and graphical data (that can be used to depict pictures in a given book or to generate menus). Variations of the processes are possible depending on the format of the data and operating system of the library 262.

Figure 10:
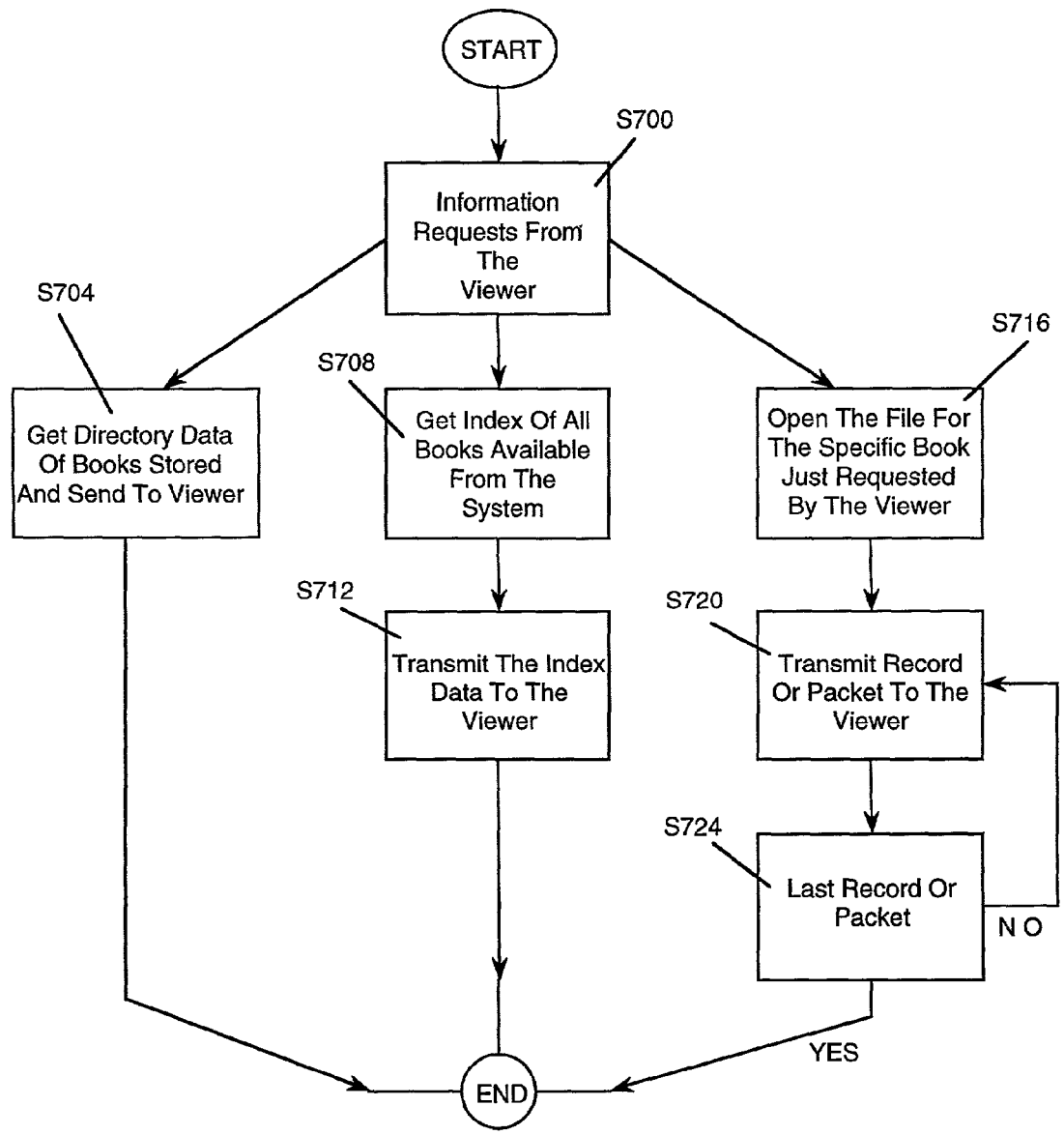
FIG. 10 is a flow diagram of processes performed by a library unit on information requests from a viewer.

FIG. 10 shows an example of the processing of information requests from the viewer 266 at the library 262. Information requests from the viewer 266 are received either through the cable connecting the viewer 266 to the library 262 or through wireless transmissions such as RF. It is possible in some embodiments for subscribers' requests to come from a set top converter box 602 (see Section V).

Information requests received from the viewer 266 generally fall into three categories: (1) directory data of books stored in the library 262, (2) index of all available books on the system, and (3) requests for a specific book (step S700). In step S704, the digital logic section 609 answers a request from the viewer 266 for a directory of data showing the books stored at the viewer 266. The directory of data is sent to the viewer 266 so that it may be displayed to the subscriber. In step S708, the digital logic section 609 handles requests from the viewer 266 for an index of all available books on the system. The library 262 will obtain an index of all the available books on the system and transmit that index, in step S712, with menu information to the viewer 266. In step S716, the digital logic section 609 replies to a request from the viewer 266 for a specific book. In step S720, the digital logic section 609 opens an electronic file for the specific book requested by the viewer 266 and transmits the record or transmits the information on a packet-by-packet basis to the viewer 266. This process of transmitting the specific book, record, or packets to the viewer 266 continues until the last record or packet has been sent in step S724.

In addition to the processes shown on FIG. 10 in handling a request for a specific book, the library 262 also orders and receives specific books from the operations center 250 using the process as described in step S716. Following a request for a specific book which is not stored at the library 262, the library 262 will proceed to determine the next available time the book will be on the video distribution system 208 or an alternative delivery system and ensure reception and storage of that book (process not shown). In performing this process the library 262 will transmit to the viewer information on when it will obtain the text data for the book so that the subscriber may view the book. In addition to timing information, price and other ordering information may also be passed by the library 262 to the subscriber.

c. The Viewer

Figure 11:
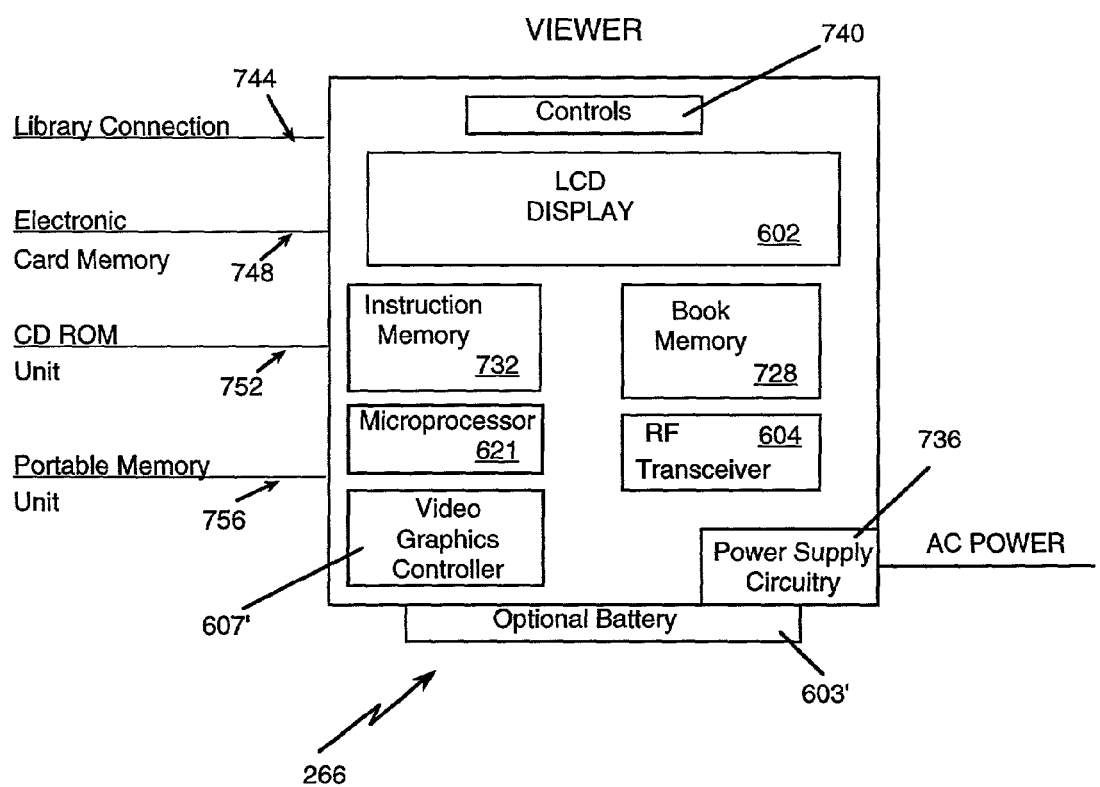
FIG. 11 is a block diagram showing the components for an example of a viewer.

FIG. 11 is a block diagram of a viewer 266 showing its internal components. The viewer 266 of FIG. 11 is similar to the viewer 266 depicted in FIG. 6b. The viewer 266 is designed to physically resemble a bound book. The viewer 266 is made up of five primary components and seven optional components: (1) LCD display 602, (2) digital circuitry (not shown), (3) video graphics controller 607', (4) controls 740, (5) book memory 728, (6) optional power supply circuitry 736, (7) optional battery 603', (8) optional RF transceiver 604, and (9) optional cellular or mobile connector (such as 611') (10) optional keyboards 267 and 268, and (11) an optional speaker/microphone 608', (12) optional alternative communication interface devices.

(1) A high resolution LCD screen 602, of VGA quality, may be used by the viewer 266 to display text and graphic images. The screen may be the size of one page of an electronic book. A two page screen or two screens may also be used with the viewer 266.

(2) Digital circuitry that includes a secure microprocessor 621, instruction memory 732, and digital logic. Data is transferred to the viewer 266 in compressed and encrypted format. The secure microprocessor 621 compares the ID number of the viewer 266 with the incoming data stream and only stores the text data if the ID number of the viewer 266 matches that within the incoming data stream. The viewer 266 may be configured to not output text data or other data and that the data is decompressed and decrypted only at the moment of viewing and only for the current page being viewed. These measures provide additional security against unauthorized access to data.

(3) A video graphics controller 607' that is capable of assisting and displaying VGA quality text and graphic images is included in the viewer 266. The graphics controller 607' is controlled by the digital circuitry described above. Text may be displayed in multiple font sizes.

(4) The viewer 266 of FIG. 11 has touch panel controls 740. These unique and novel controls 740 allow the consumer to select stored electronic books and electronic books from catalogues, move a cursor, and turn pages in an electronic book. Typically, the controls 740 include forward and reverse page buttons 742, 741, a ball 743 for cursor movement, one or more selection buttons 745, a current book button 747 and a bookmark button 749 (see FIG. 14a).

Figure 14A:
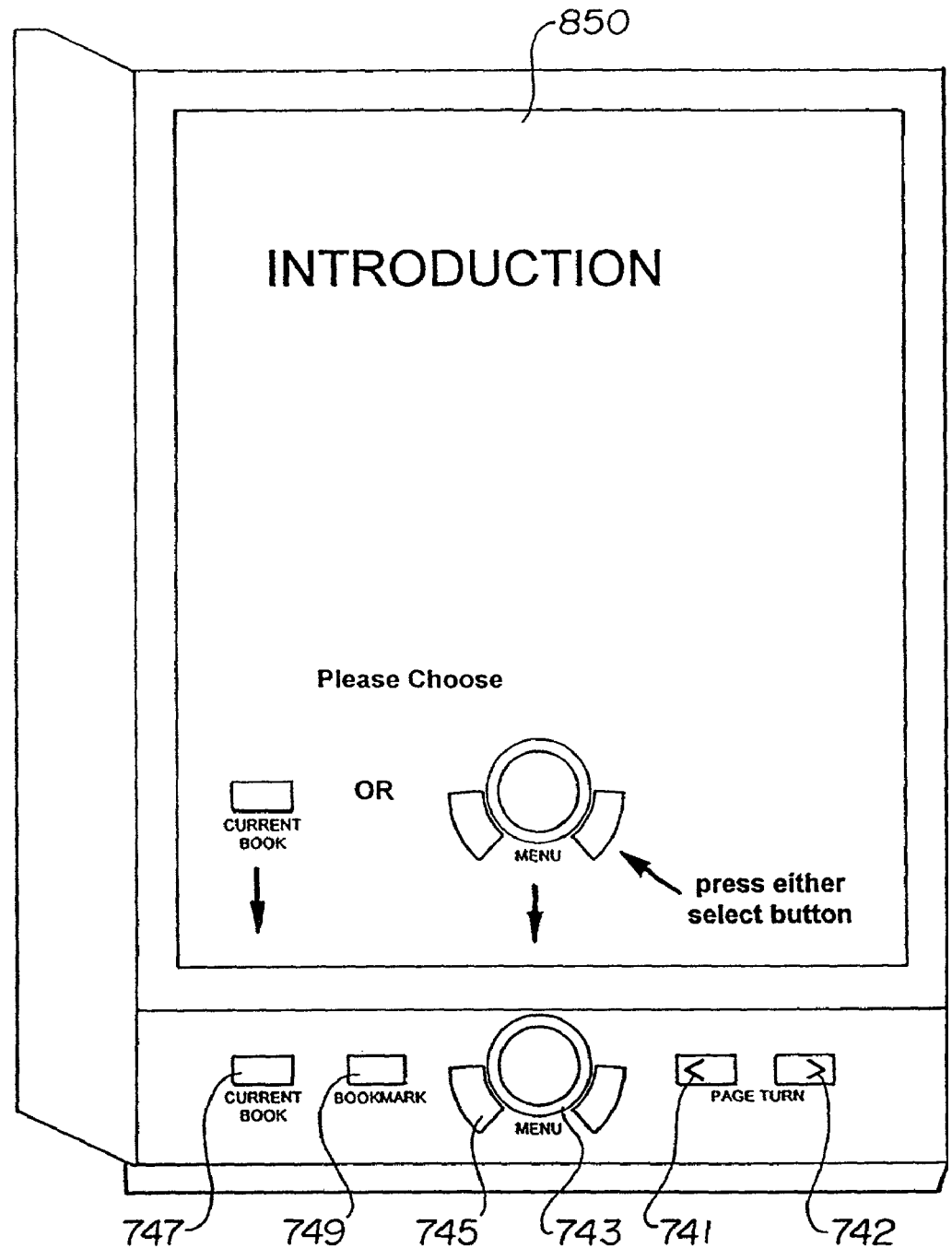
FIG. 14a is a schematic of an introductory menu.

The controls 740 should be easy to use and conveniently located. Referring to FIG. 14a, the controls for the viewer 266 may be located below the screen 602 at the bottom portion of the viewer 266. The next page turn button 742 is the most used button 740 and is located towards the right edge of the page.

The subscriber is likely to use right hand thumb movements to work the controls particularly the page turn buttons 741, 742. Therefore, the buttons may be arranged in such a manner that the buttons are easily controlled by a subscriber's right thumb. Generally, this can be accommodated either on the lower portion of the viewer 266 (as shown) or along the right hand margin of the viewer 266 (not shown). The current book button 747 and bookmark button 749 are usually the least used of the controls 740. Therefore, in the example shown, those buttons 747, 749 are located on the inside portion towards the binder of the viewer 266.

Locating the ball 743 or other cursor movement device (such as four pointer arrows not shown) in the bottom center of the viewer 266 is both easier for the subscriber to use and easier in manufacturing the viewer 266. The selection buttons for the cursor 745 may be located below the middle diameter of the cursor ball 743 on the right and left sides of the ball as shown. If pointer arrows are used for cursor movement, a selection button 745 may be located in the center of the four arrow buttons (not shown). Again, the most used controls 740 should be located where a subscriber's right hand thumb would normally rest.

(5) Book memory 728 for at least one electronic book or more of text is included in the viewer 266. The memory 728 stores text and any graphics, which represent pictures in a book. The memory 728 can also store menu graphics data. Two different memory 728 devices may be used in the viewer 266, one for the instructions for the microprocessor 621 in the digital circuitry and a second type of memory may be used for the book memory 728 (and graphics). Various memory devices available on the market may be used such as, ROM, RAM or a small hard disk. Since an electronic book requires approximately 0.6 megabytes of storage, a small hard disk providing approximately 60 MBytes of storage provides memory to store approximately 100 electronic books.

Text for electronic books may be displayed in various font sizes. To accommodate various fonts for display, a variety of fonts are stored in instruction 732 or book memory 728. Thus larger or smaller fonts may be recalled from memory 621, 728 to create displays desired by the subscriber.

(6) Power supply circuitry 736 in the viewer 266 will accept power from either an AC power source or from an optional battery 603', or the library 262. The power supply circuitry 736 provides the necessary voltages to accommodate the various systems within the viewer 266.

(7) An optional battery 603' is provided in one embodiment. The battery 603' is automatically recharged when AC power is available.

(8) An optional RF transceiver 604 which provided two-way data link between the viewer 266 and other components of the home subsystem can also be included in the viewer 266.

(9) Also, the viewer 266 may include a cellular transceiver (not shown) for mobile communications.

(10) The optional wired (attached) keyboard 267 and wireless (e.g., RF) keyboard 268 (see FIG. 6a) may be used with the viewer 266 to provide communications between the subscriber and the viewer 266.

(11) The optional speaker and microphone 608' allow the viewer 266 to provide audio signals to the subscriber, and allow the subscriber to provide an audio input. The speaker and microphone 608' may be used in conjunction with the cellular transceiver 608 or other telecommunications equipment to provide for reception and transmission of telephony and data.

(12) The optional alternative communication interface devices allow the viewer 266 to make use of a variety of communication paths.

The viewer 266 of FIG. 11 has parts available for providing connections to: a library 744, electronic card memory 748, CD ROM units 752, and a portable memory unit 756 (such as that shown in FIG. 6b as 600'). Various electronic memory cards such as PCMCIA can be used with the viewer 266 to supply and store electronic books.

Security, low power consumption and excellent display technology are desired features of the viewer 266 design. The viewer 266 should be lightweight and portable. The viewer 266 contains a software operating system that allows electronic books to be stored, read and erased and includes the capability to order electronic books and retain them in memory 728 for a predefined period of time determined by the system operator. The software can be configured to allow the electronic book to be read during a period of time (i.e., two weeks) and then automatically erased, read once and erased, or held in memory permanently. Each viewer 266 may have a unique key 605. All of the data storage may be encrypted with the key 605 for an individual viewer 266 to prevent more than one viewer 266 accessing the text file or electronic book file.

Figure 12:
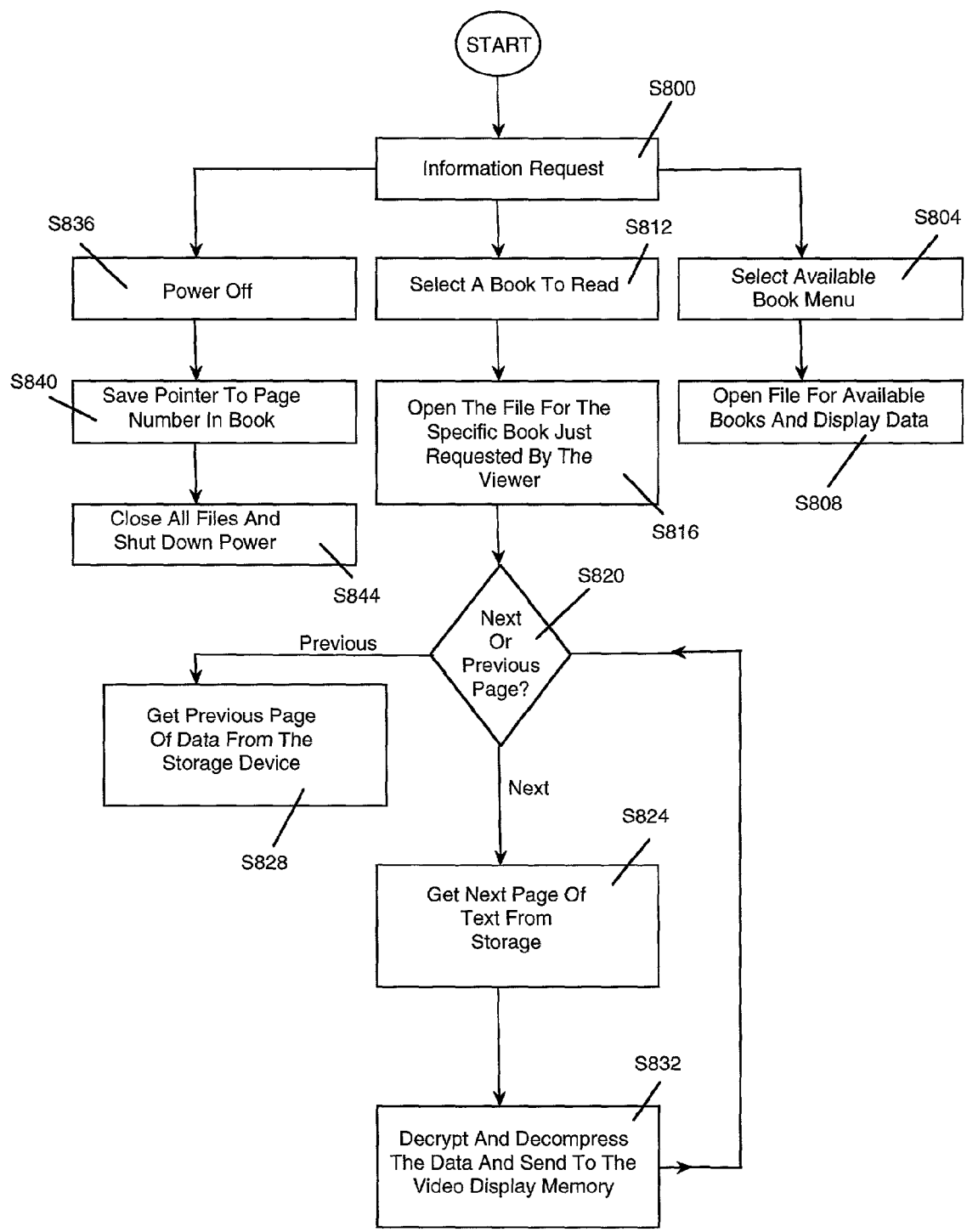
FIG. 12 is a flow diagram of processes performed by a viewer on an information request from a subscriber.

FIG. 12 is a flow diagram of some of the processes executed by the microprocessor 621 in the viewer 266. The viewer 266 may receive inputs from the subscriber through touch panel controls 740. In step S800, the subscriber's information requests are then processed by the microprocessor 621.

In step S804, if the subscriber requests a menu of available electronic books, the microprocessor 621 will select an electronic book menu. In step S808, the microprocessor 621 will open the electronic files that list the electronic books which are available (related to the category of topic of the menu) and display the menu with the names of the available electronic books.

If the subscriber selects a particular book to read, then in step S812, the microprocessor 621 will process the selection and determine the electronic file that contains the specific electronic book. In step S816, the microprocessor 621 will open the file for that specific electronic book and normally access the first page. (If a pointer has already been set in that books electronic file, the process may default to that page.) In step S820, the microprocessor 621 will then determine which page needs to be displayed. That is, the microprocessor 621 will determine whether a next page, previous page or a bookmarked page needs to be displayed. If the pointer for the electronic file is not in the correct location then in step S828, the microprocessor 621 will move the pointer and obtain the previous page of data from the stored file. Otherwise, in step S824, the microprocessor 621 will normally obtain the next page of text from the stored electronic file. In step S832, the microprocessor 621 will decrypt and decompress the text data and send the data to the video display. The video display will generally have a video display memory associated with it. In step S832, the microprocessor 621 will send the data directly to that video display memory. The circuitry for the display then completes the process of displaying the page of text.

If the subscriber, through the controls 740, requests (from step S800) that the power be turned off, then in step S836, the microprocessor 621 initiates power off. In step S840, the microprocessor 621 saves the pointer in memory to the page number in the book that the viewer 266 is currently reading. In step S844, the microprocessor 621 closes all the electronic files and signals the power circuitry to shut down the power to the various circuits in the viewer 266. With these examples of basic processes the viewer 266 is able to display book selections and display text from those electronic books.

d. Menu System

Figure 13:
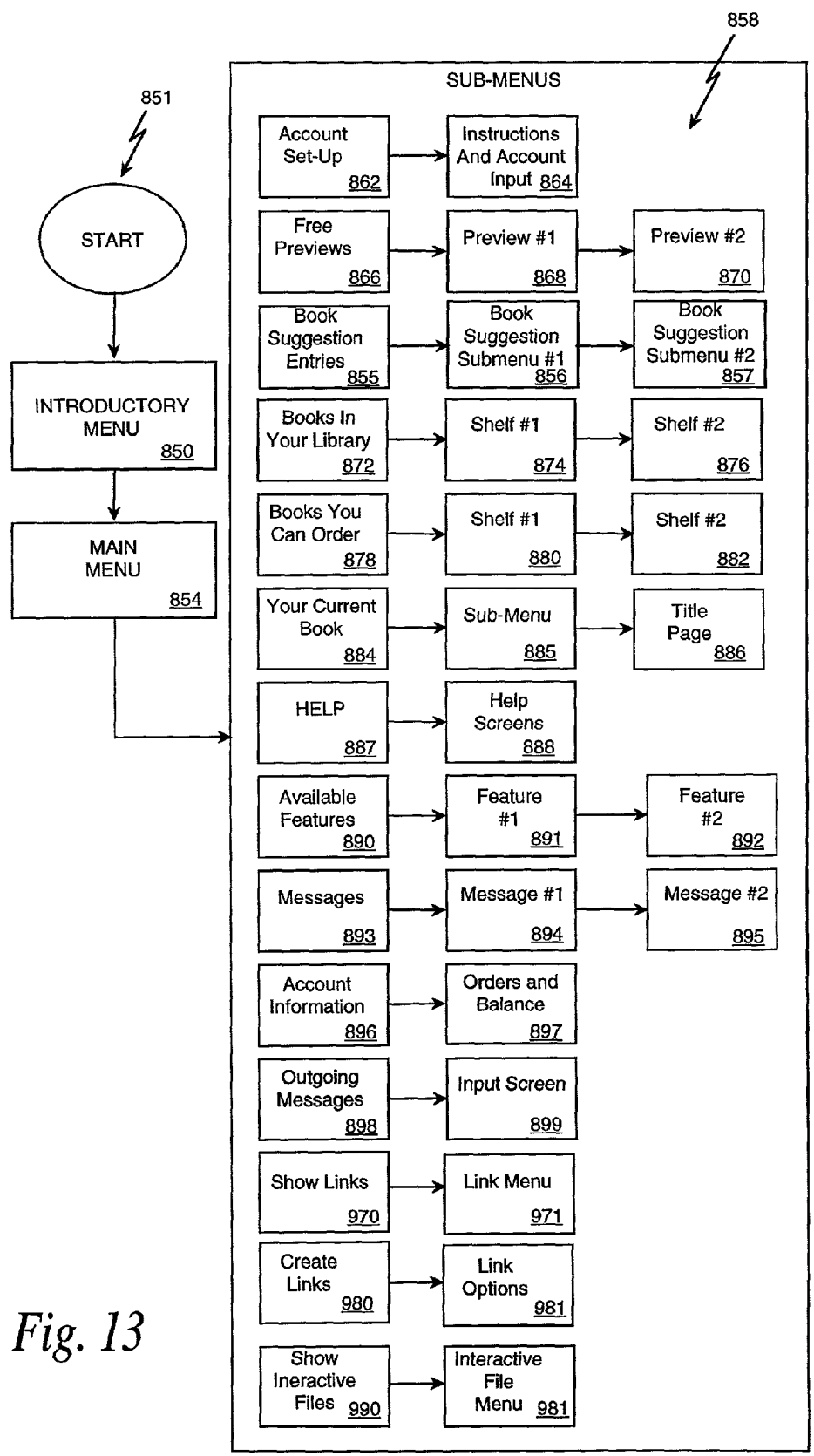
FIG. 13 is a chart depicting a menu structure and sequencing of menus in a menu system.

Referring generally to FIG. 13, the electronic book system 200 may have a menu system 851 for selecting features and books from the electronic book system 200. The operating software and memory required for the menu system 851 may be located at the viewer 266 (e.g., the instruction memory 732 and/or book memory 728). However, it can also be located at the library 262 (e.g., the instruction memory 632) or the library 262 and the viewer 266 can share the software and memory needed to operate the menu system 851. Since the menus are usually displayed on the viewer, and since the viewer 266 may be capable of operating in the absence of the library 262, the basic software and memory to create the menus is more conveniently located at the viewer 266.

The menu system 851 allows sequencing between menus and provides menu graphics for graphical displays such as on the LCD display 602 of the viewer 266. In an electronic book system that uses a set top converter these menus may also be displayed on a television screen. In an electronic book system that uses a computer, these menus may also be displayed on the computer monitor. In an embodiment, the menus provide just basic text information from which the subscriber makes choices. In other embodiments, the menus provide visual displays with graphics and icons to assist the subscriber and allow for subscriber interaction and real-time ordering of electronic books or other content available to the subscriber.

FIG. 13 depicts the menu system 851 with sequencing. The primary menus in the menu system 851 are an introductory menu 850, a main menu 854 and various submenus 858. In the embodiment shown, there are three levels of submenus 858. In certain instances one or two submenus 858 is sufficient to easily direct the subscriber to the selection or information requested. However, there are features in which three or more submenus 858 make the user interface more friendly for the subscriber. Each level of submenus 858 may consist of multiple possible menus for display. The particular menu displayed depends on the selection by the subscriber on the previous shown menu. An example of this tree sequence of one to many menus are the help submenus 887, 888. Depending upon the specific help requested, a different level two help menu is displayed to the subscriber.

Figure 14B:
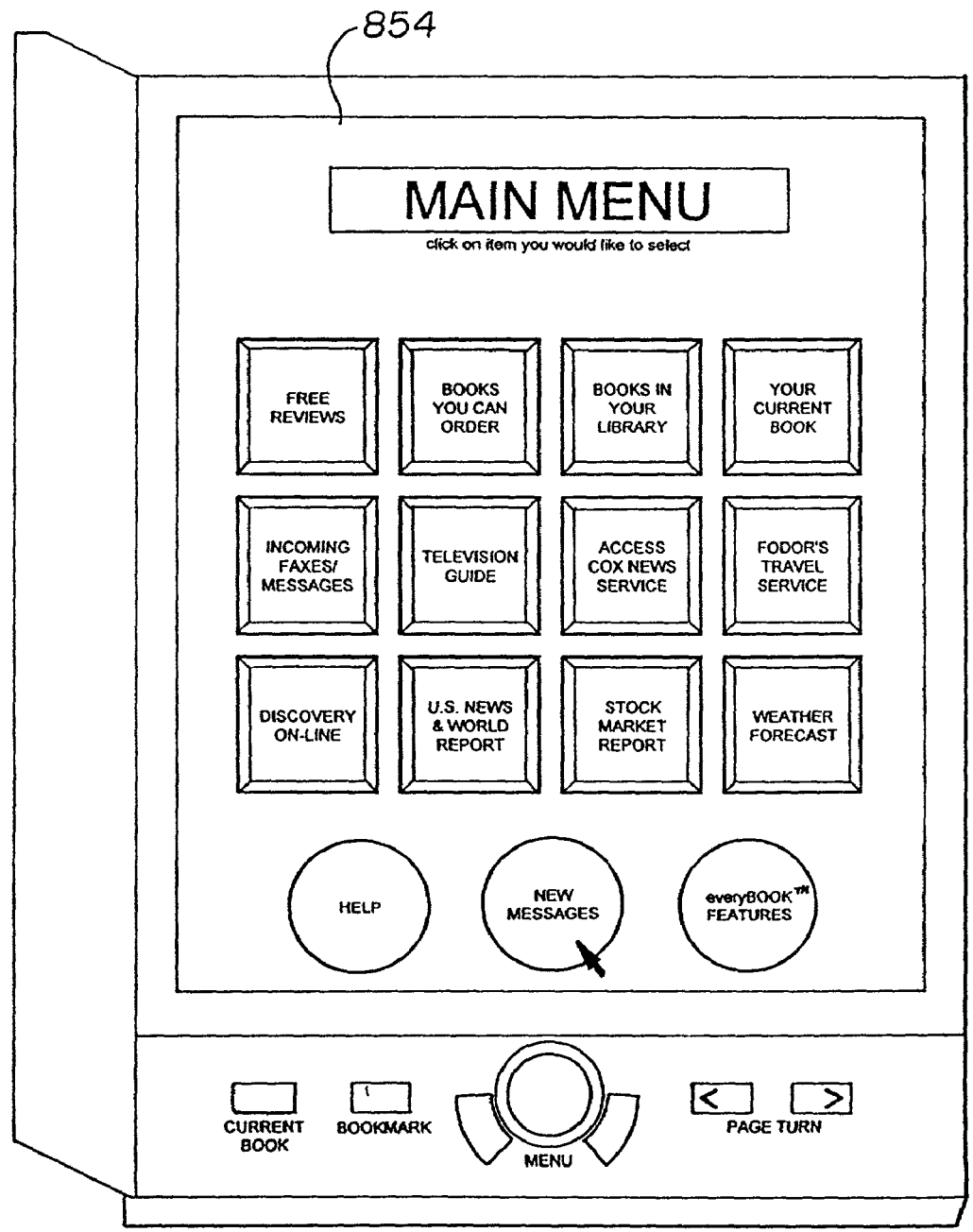
FIG. 14b is a schematic showing an example of a main menu.

An example of an introductory menu 850 is shown on FIG. 14a. Generally the introductory menu 850 introduces the viewer 266 to the system and provides initial guidance, announcements and instruction. The introductory menu 850 is followed by a main menu 854, an example of which is shown in FIG. 14b. The main menu provides the viewer 266 with the basic selection or features available in the system. FIG. 14b is an example of a main menu 854 offering many additional features and submenus 858 to the subscriber. For example, FIG. 14b shows that the viewer 266 is able to choose by a point and click method, many options including: (1) free previews, (2) books you can order, (3) books in your library, (4) your current book, (5) help, (6) on-line services and (6) other system features. Following a selection on the main menu 854, a corresponding submenu 858 is shown.

Figure 14C:
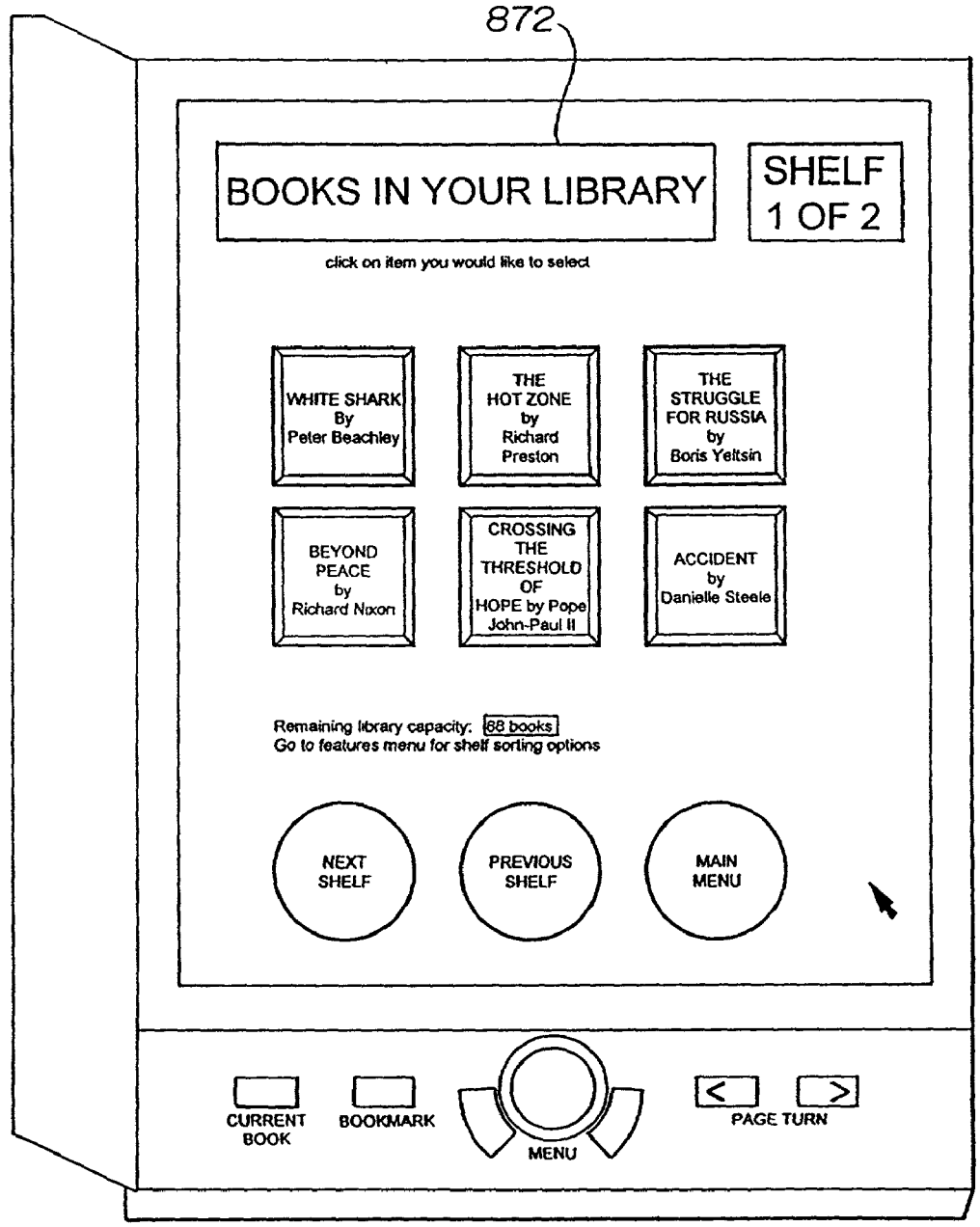
Figure 14D:
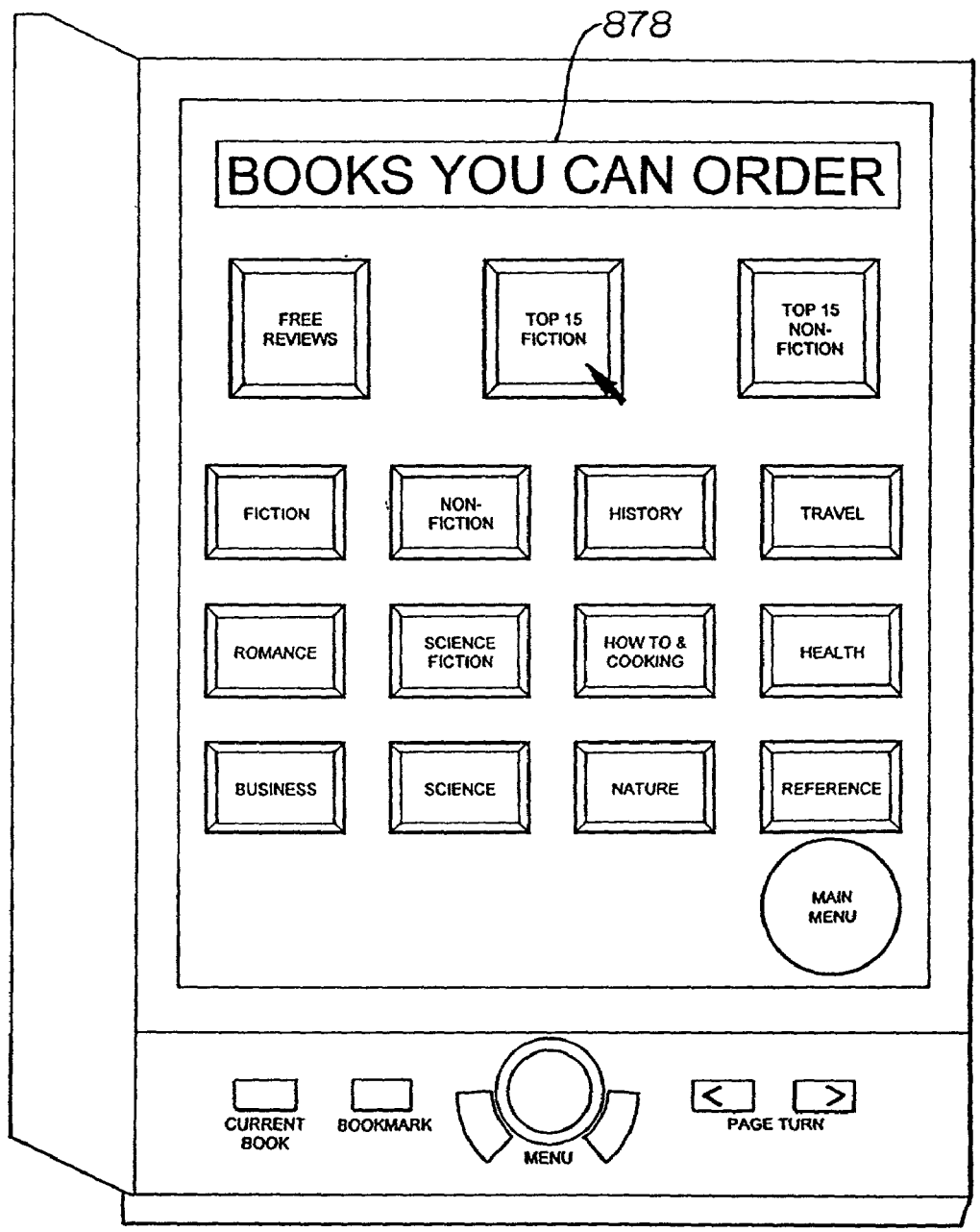
Figure 14E:
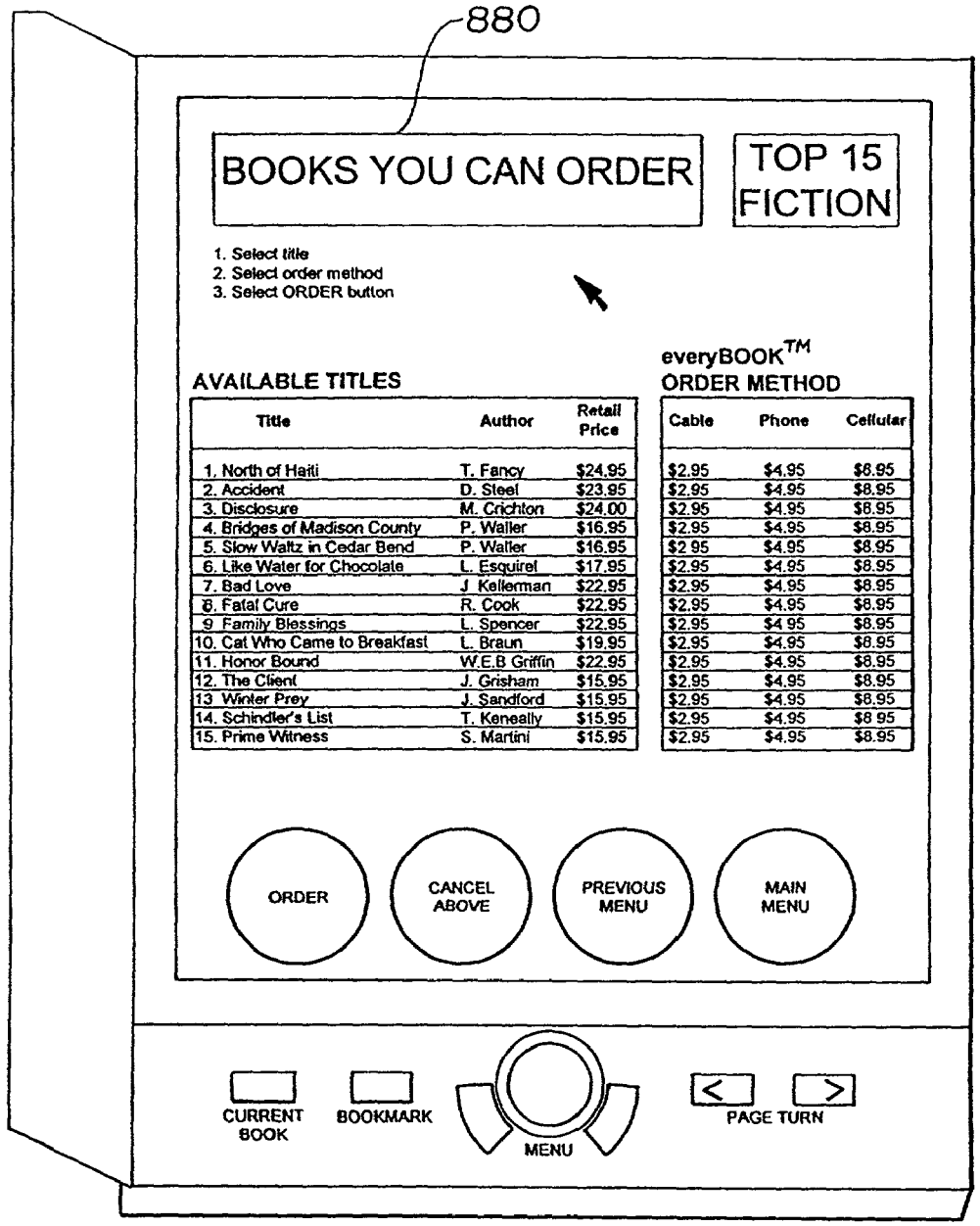

FIG. 13 shows fourteen available primary or first level submenus. They are (1) account set up 862, (2) free previews 866, (3) book suggestion entries 855, (4) books in your library 872, (5) books you can order 878, (6) your current book 884, (7) help 887, (8) available features 890, (9) messages 893, (10) account information 896, (11) outgoing message submenu 898, (12) show links submenu 970, (13) create links submenu 980, and (14) show interactive files submenu 990. FIG. 14c is an example of a first level submenu for books in your library 872. This "Book In Your Library" example submenu 872 shows six available books by title and author and provides the subscriber with the ability to check a different shelf of books 874 or return to the main menu 854. FIGS. 14d and 14e show example submenus 858 for books that may be ordered using the "Books You Can Order" submenu 878.

FIG. 14f is an example of a confirmation menu which confirms a subscribers order. In this particular example, the subscriber is required to enter a PIN number to complete the subscriber's order. Any alpha-numeric or similar password may be used to ensure the subscriber is an authorized subscriber. In one embodiment, the subscriber confirms an order with a PIN or password and then receives a final confirmation screen. The final confirmation screen is primarily text and may state:

Your book order is now being processed using CABLE.
Your book will be delivered overnight and your VISA account will be charged $2.95.
Your book will be available for reading at 6:00 AM EST tomorrow. Make sure that:
1. your Library Unit and Cable Connection Unit are plugged in with aerials up tonight; and
2. you tune your cable converter to THE BOOK Channel. The TV set does not have to remain on.

or similar language.

Figure 14G:
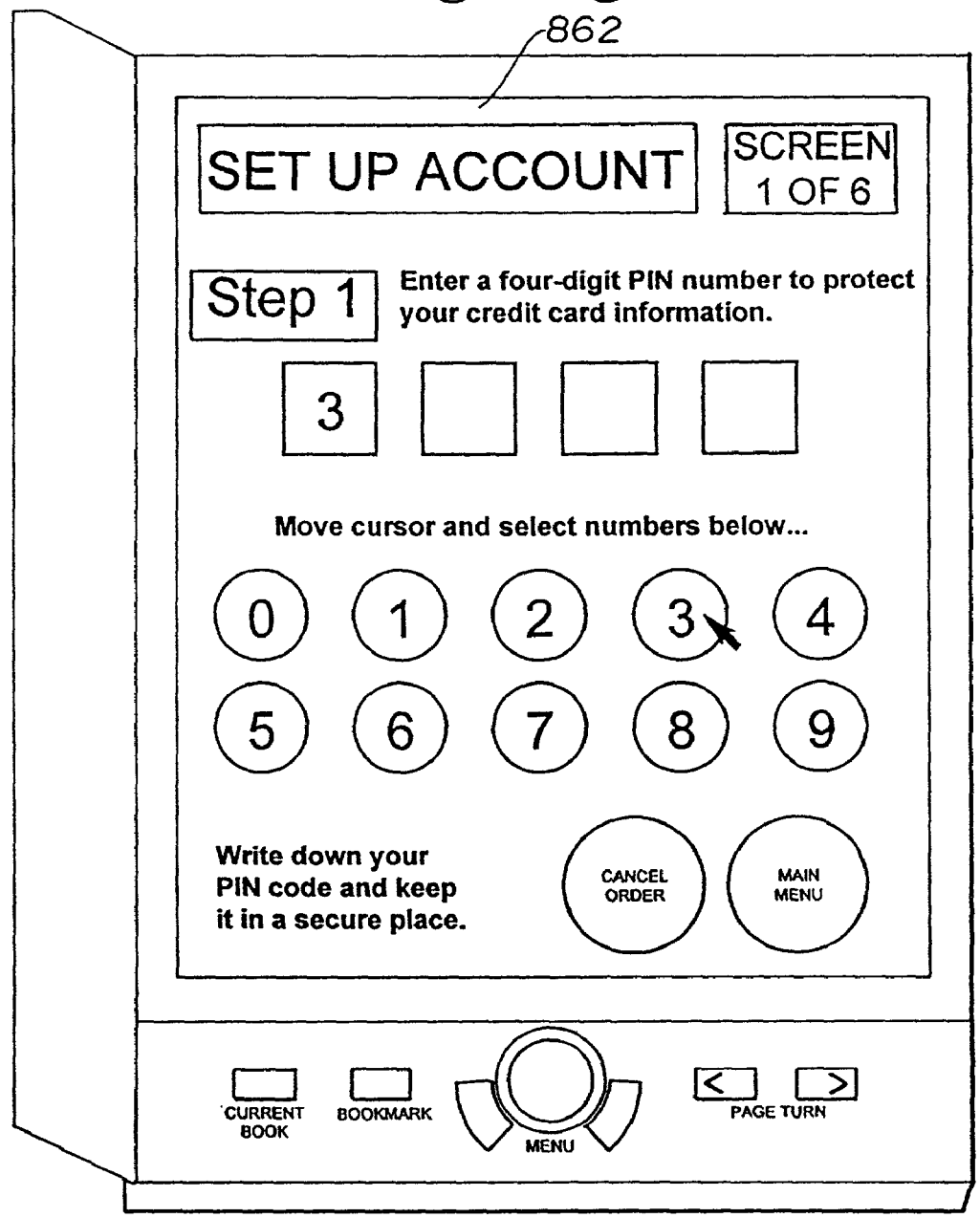
Figure 14H:
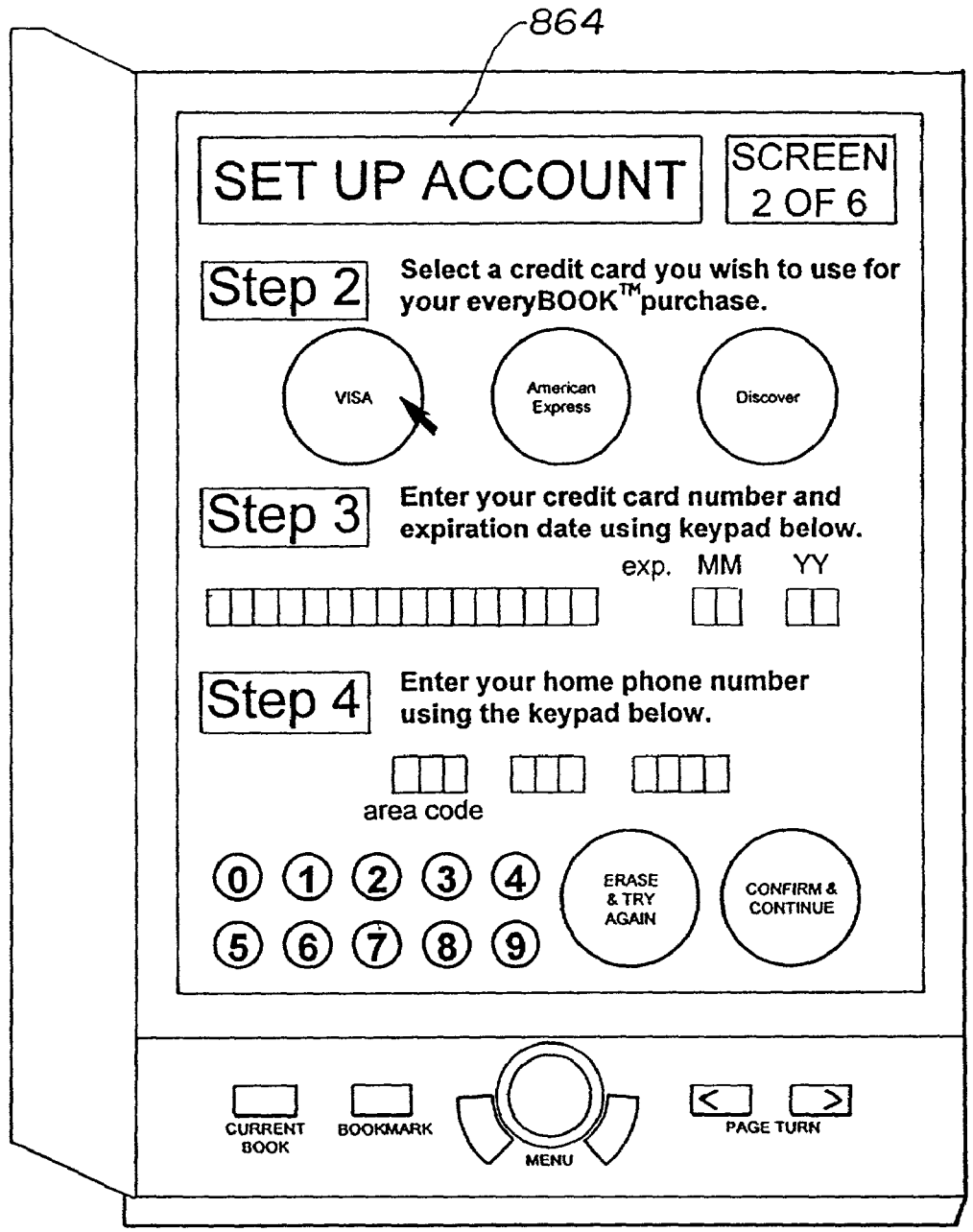

Examples of the "Account Set Up Menu" 862 and further submenus 858 related to account set up (which provide instructions and account input 864) are shown in FIG. 14g and FIG. 14h. These submenus 858 allow initialization of an account at the operations center 250 and orders to be charged to credit cards. The submenus 858 include the ability to enter data related to your desired PIN number or password, credit cards, phone numbers, etc. In one embodiment, the account set up be performed using the telephone system. A confirmation menu verifies that the account has been properly set up with the desired PIN or password and credit card. However, additional set-up methods are presented in Section VII.

Figure 14I:
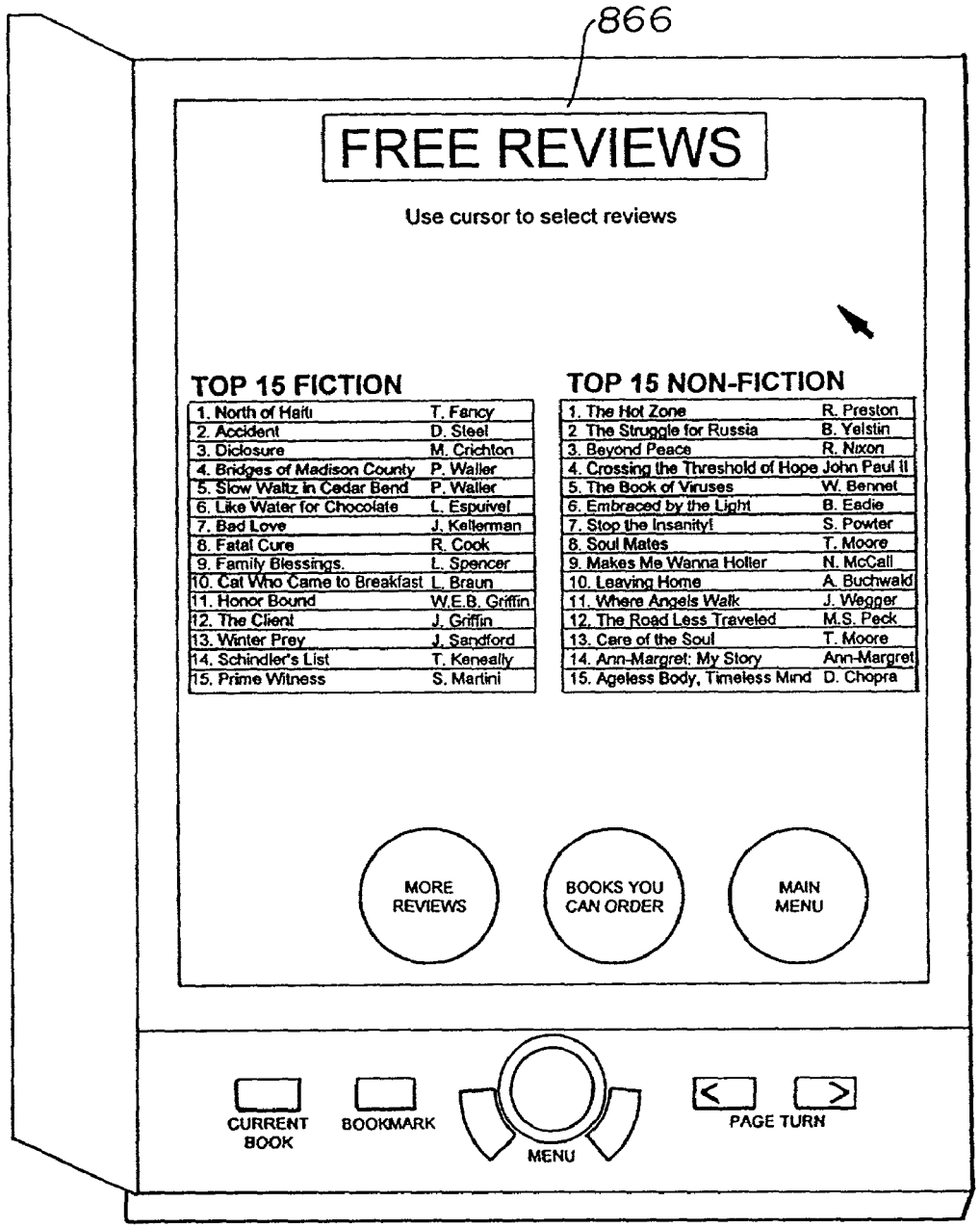
Figure 14J:
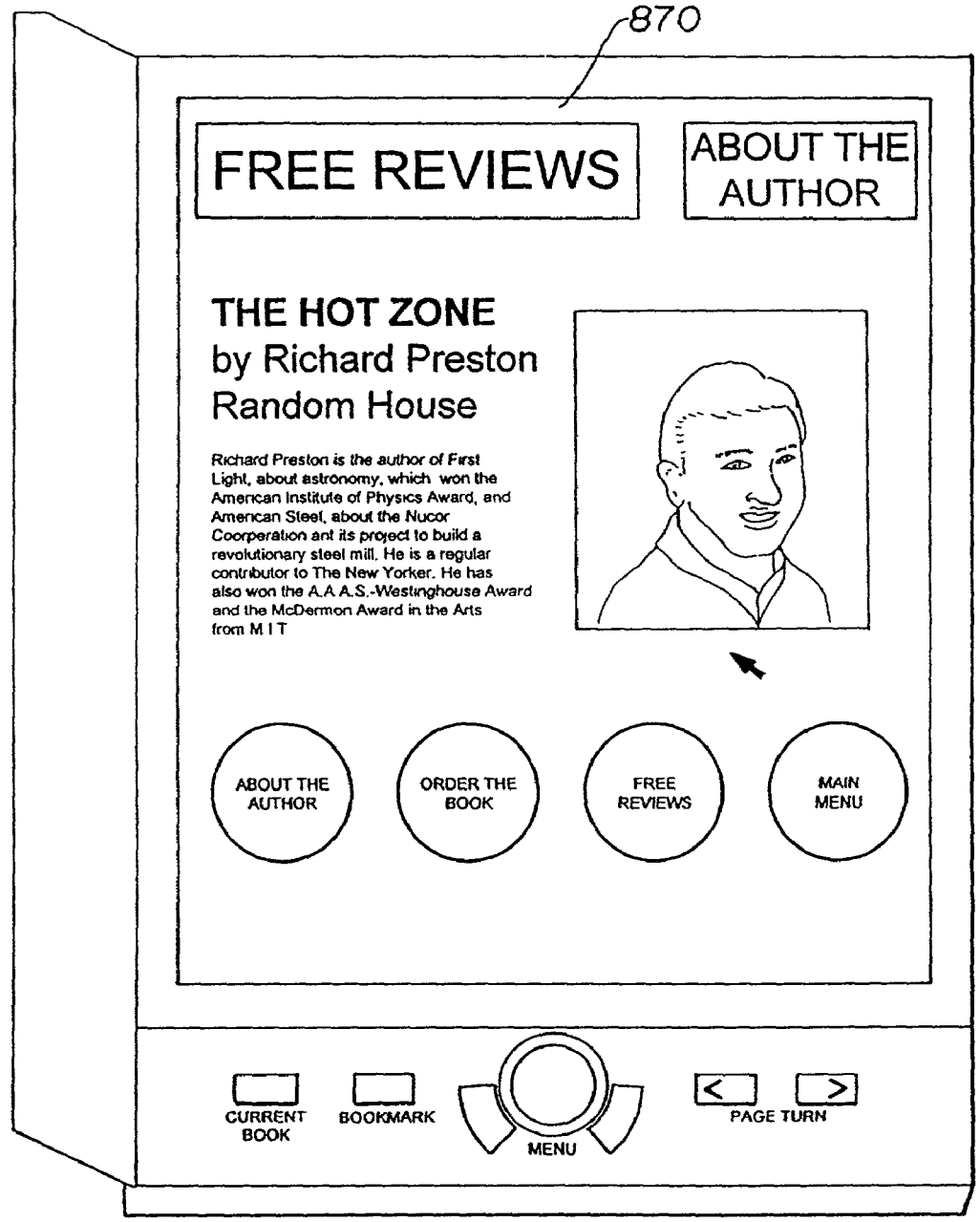

Free previews for books 866 are also provided by submenus (868, 870). Examples of the free preview menus are shown in FIG. 14i and FIG. 14j. FIG. 14i shows a menu depicting various books for which previews are available for viewing. Following a book selection, a screen submenu showing an excerpt of the selected book cover's description is provided along with an excerpt from a critic's review of the selected book. In one embodiment, this preview screen for a particular book also allows the subscriber to select a submenu which provides information about the author. The book preview submenu may also include a still video picture or graphics portraying a book cover or a scene from the book. An example of such a still video picture or graphics is shown in FIG. 14j which depicts a preview screen 870 about the author. The author's preview screen 870 shows a picture of the author, provides a short biography, and may allow the subscriber to order the author's books. The price for ordering the authors various books may also be shown on the menu.

In addition to free previews, in other embodiments, the electronic book system 200 provides the subscriber with a book suggestion feature (see 855). This is accomplished using the menu system 851 and the processor with associated memory located at the viewer 266, library 262 or at the distribution point (1020 or 250). When necessary, information for the book suggestion feature is sent in the text data of the signal to the home system 258. With this feature, books or authors are suggested to a subscriber based upon historical data of the subscriber's previous orders, demographics or mood of the subscriber, other indicators, and/or by text word searches.

In one book suggestion embodiment, text word searches of preview information (such as book cover descriptions, critics reviews and biographies about the author) and/or text of books or other titles are performed by the library 262 using databases stored in the library memory 600. Personalized book or author suggestions are made to the subscriber by obtaining information from the subscriber indicative of general subscriber interests. Subscriber entries may be solicited from the subscriber using the book suggestion entry submenu 855. The system uses these subscriber entries either directly or indirectly to search for books or authors to suggest to the subscriber.

Generally, the electronic book suggestion methods may be categorized into two categories, either responsive methods (which respond to a series of subscriber menu entries), or intelligent methods (which analyze data to suggest a book). Using a responsive or intelligent method, the system 200 determines a list of suggested titles or authors and creates a second or third level submenu 856, 857 to suggest the titles for subscriber selection.

Responsive methods of suggesting titles include, for example, the use of mood questions, searching for authors, and keyword searching. Using the instruction memory 732 and menu generation hardware (e.g., 607) of the viewer 266, a series of mood questions can be presented on menus to determine a subscribers interest at a particular time. For this methodology, the operations center's 250 processor 404 and instruction memory 416 assign each title mood indicators (and sub-indicators) from a group such as light, serious, violent, short, long, dull, exciting, complex, easy-read, young theme, old theme, adventure, romance, drama, fiction, science-fiction, etc. These indicators are sent to the home system 258 with the text data and are stored in library memory 600. Based upon the subscriber entries, the processor associates a set of indicators with the subscriber's request and a set of books with matching indicators are located for suggesting to the subscriber.

Responsive searches for authors or keywords (a search word provided by the subscriber) are generally performed by the library processor 628 and instruction memory 632 on data stored in the library memory 600. For example, a keyword given by the subscriber may be searched for a match in library memory 600 storing the book reviews, critics and previews databases. Thus, if a subscriber provided an entry of the word "submarine" on an appropriate submenu, the title "Hunt For Red October" may be located by the microprocessor 628 using instruction from a routine in instruction memory 632.

Intelligent methods of suggesting programs include analyzing personal profile data on the subscriber and/or historical data about the subscriber such as past books ordered by the subscriber (or buy data). This method may be performed at the distribution point or operations center 250 by the on-site processor 404 using subscriber databases stored in memory 428. The home system 258 receives the text data including program suggestion information from the distribution point or operations center 250 and generates the program suggestion submenus 855, 856, 857 using the same text data receiving 212 and viewer menu generation hardware (e.g., 607, 621) described above. Software routines and algorithms stored in instruction memories (e.g. 632, 732) are used to analyze historical data and book ordered data to determine a line of books to suggest to the subscriber.

The algorithms for this powerful feature of suggesting books or authors to subscribers is disclosed in great detail in U.S. Pat. No. 5,798,785, entitled TERMINAL FOR SUGGESTING PROGRAMS OFFERED ON A TELEVISION PROGRAM DELIVERY SYSTEM, filed Dec. 2, 1993, which is incorporated herein by reference.

Referring to FIG. 13, submenus 858 are shown on the "Books In Your Library" submenu 872 and may be broken into shelf numbers with submenus for each shelf 874, 876. The submenus 858 for the "Books You Can Order" submenu 878 is similarly broken out into submenus by shelves 880, 882. These shelves may each be a category or genre of books. Books may be grouped into categories such as best sellers, novels, fiction, romance, etc. See FIG. 14*d*.

Referring to FIG. 13, the submenu 858 for "Your Current Book" 884 allows a subscriber to select a current book 884 and then determine what page to view. This selection is confirmed with a level two submenu 885. The help submenu 887 provides the subscriber with additional help screens 888. The submenus 858 for available features 890 may be broken out into a sequence of separate submenus for each feature 891, 892.

Referring to FIG. 13, messages can also be sent with the electronic book selection and delivery system 200. A level one message screen provides the subscriber with the ability to select from various messages the subscriber has pending 893. Each message is then shown on a separate submenu screen 894, 895. The message may contain text and graphics.

Referring to FIG. 13, account information is shown on a level one submenu 896 and then follow-on submenus 858 show the recent orders and your account balance 897. There is also a level one submenu for outgoing messages 898 which has a follow-on submenu used as an input screen 899.

In addition to the specific features and submenus described in FIG. 13 and FIG. 14*a* through FIG. 14*j*, many other variations and features are possible. When a book is finally selected for viewing the title page 886 will appear on the screen followed by a page of text.

III. The Billing and Collection System

In one embodiment, the billing and collection system 278 (shown in FIGS. 2 and 3) utilizes the latest technology in electronic transaction and telephone switching to track orders, authorize deliveries, bill consumers, and credit publishers automatically. The telephone calls initiated by the phone connector 270 are received by the billing and collection system 278 which responds immediately without human intervention by placing the order and charging the consumers credit card account. Data is compiled periodically and publishers 282 are credited for sales of their books or other text. The billing and collection system 278 may also connect with subscribers through two-way cable connections, cellular, or other communication means. These additional methods are detailed in Section VII.

The billing and collection system 278 communicates with the operations center to track changes in available books and to provide statistical data to the operations center 250.

IV. Public Library, School, and Bookstore System

Figure 15:
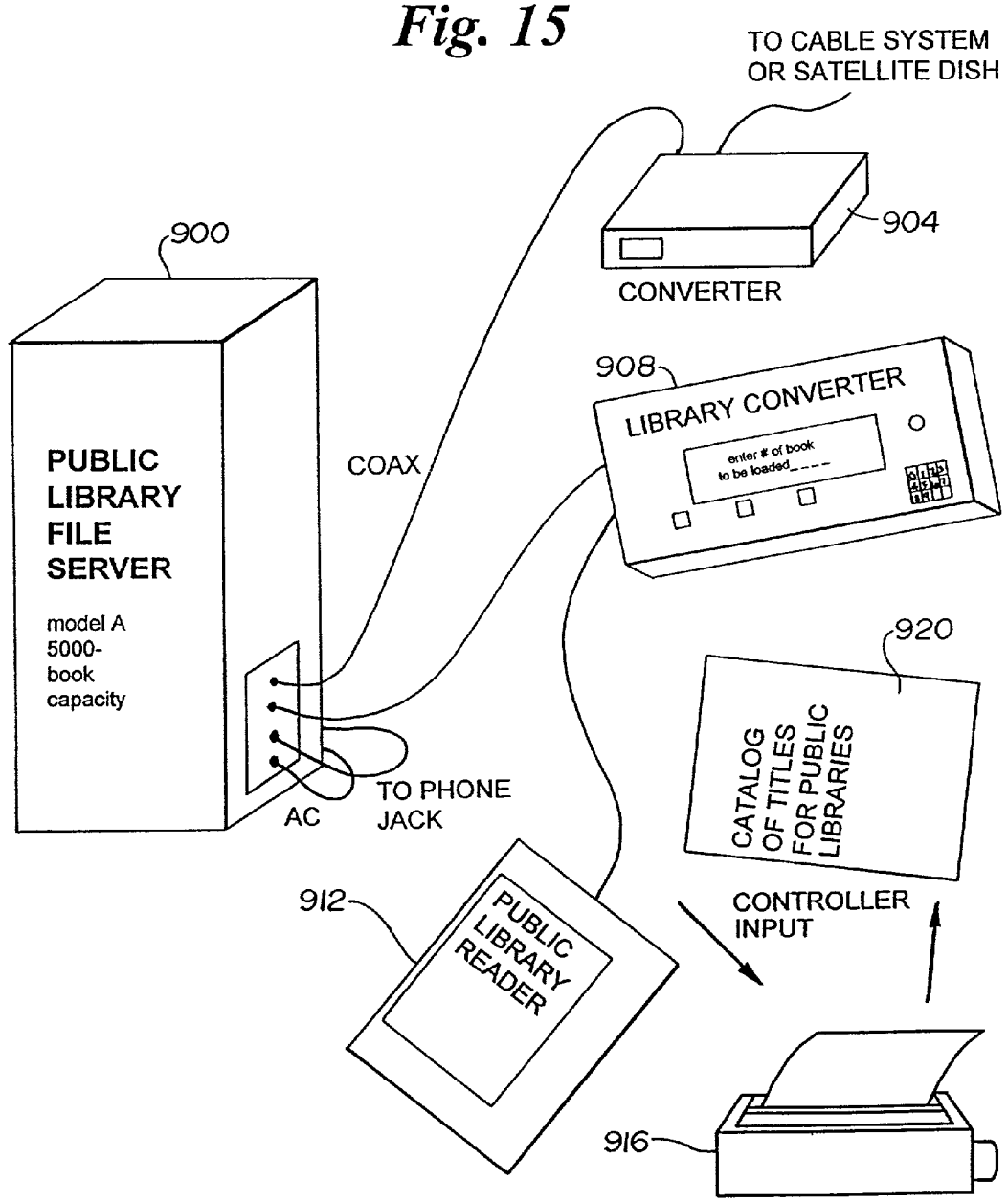
FIG. 15 is a schematic diagram of an electronic book system for a bookstore or public library.

The electronic book system can be modified to be used at public libraries, schools, bookstores, newsstands, or stand-alone kiosks. FIG. 15 shows one possible arrangement of components for the distribution location. The main unit is the file server 900. The file server 900 is a large electronic memory unit that can store thousands of books, newspapers, or periodicals. Various electronic storage means may be used in the file servers, such as hard disks, read-write CD ROMs and read-only CD ROMs.

The system comprises five components; the file server 900, a converter or video connector 904 or connector capable of interfacing to one of the alternative delivery systems presented in Section VII, a controller 908, a viewer 912, and a catalog printer 916. The software for controlling the system is primarily located in the controller 908. The converter or video connector 904 is similar to those described above. In this configuration the controller unit 908 monitors the data being transferred to the file server 900 by the converter 904. The controller 908 may be provided with a viewing screen and several control buttons. When it is necessary to have a larger screen to perform more sophisticated controlling of the system a viewer 266 may be connected to the controller 908 and the viewer screen and controls 740 may be used.

For security reasons, the controller 908 is only able to download books to public viewers 912 which are authorized to receive books from the particular file server 900. Also for security reasons it is not desirable that the public viewer 912 have access to more than one file server 900. In this way, security can be maintained over the text data for books. The public viewer 912 may be limited to receiving one or two books at a time from the controller 908. When the user of the public viewer 912 needs a new or additional book, the user returns the viewer 912 to the school or public library where the user receives a new book from the controller 908.

In order to track the books that are available on the file server 900, the titles of the available books may be printed on a catalog printer 916. The catalog printer 916 is connected to the library controller 908 and the titles of the books are downloaded to the catalog printer 916. For security reasons, the coded text for any of the electronic books may not be authorized for printing using the controller 908 and catalog printer 916. In order to maintain security over the data, none of the electronic book data may be allowed to be downloaded to the printer 916. Once a complete printout of available book titles, magazines, or other textual material is complete, a hard copy of the catalog 920 can be maintained at the file server 900.

The system shown may also be used at bookstores. The bookstores can rent the public viewer 912 to customers with the text for one or two books loaded onto the public viewer 912. The public viewer 912 may be provided with an automatic timeout sequence. The timeout sequence would erase the textual data for the books after a certain period of time, for example, two weeks. It is expected that after a period of time (perhaps within two weeks) the renter would return the public viewer 912 to the bookstore and receive additional books for viewing. Using this arrangement, it is also possible for the bookstore to (permanently) sell a viewer 912 to a regular customer. The customer then returns to the bookstore from time to time to receive textual data for a book which the customer can then store permanently on the customer's own viewer 912. Various other configurations are possible for bookstores, schools and public libraries using the file server 900 and public viewer 912 described.

V. Use of a Set Top Converter

Existing set top converter boxes such as those made by Scientific Atlanta or General Instruments are presently unequipped to handle the book selection system of the present invention. Although set top converters may be built which include the library functions, hardware modifications are necessary in order to use the book selection system with existing set top converter technology.

Figure 16A:
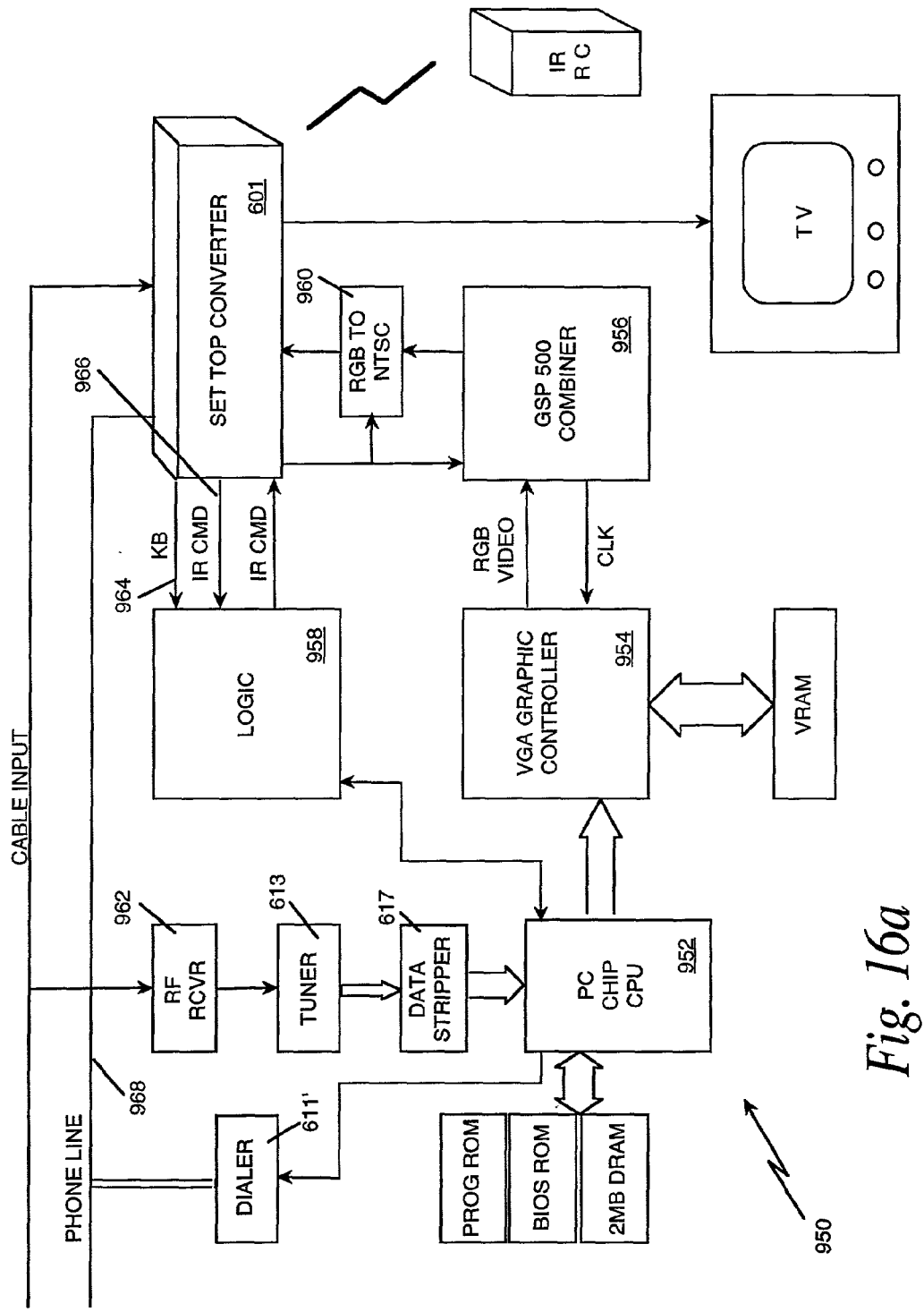
FIG. 16a and FIG. 16b are schematics of hardware modifications or upgrades to a set top converter.
Figure 16B:
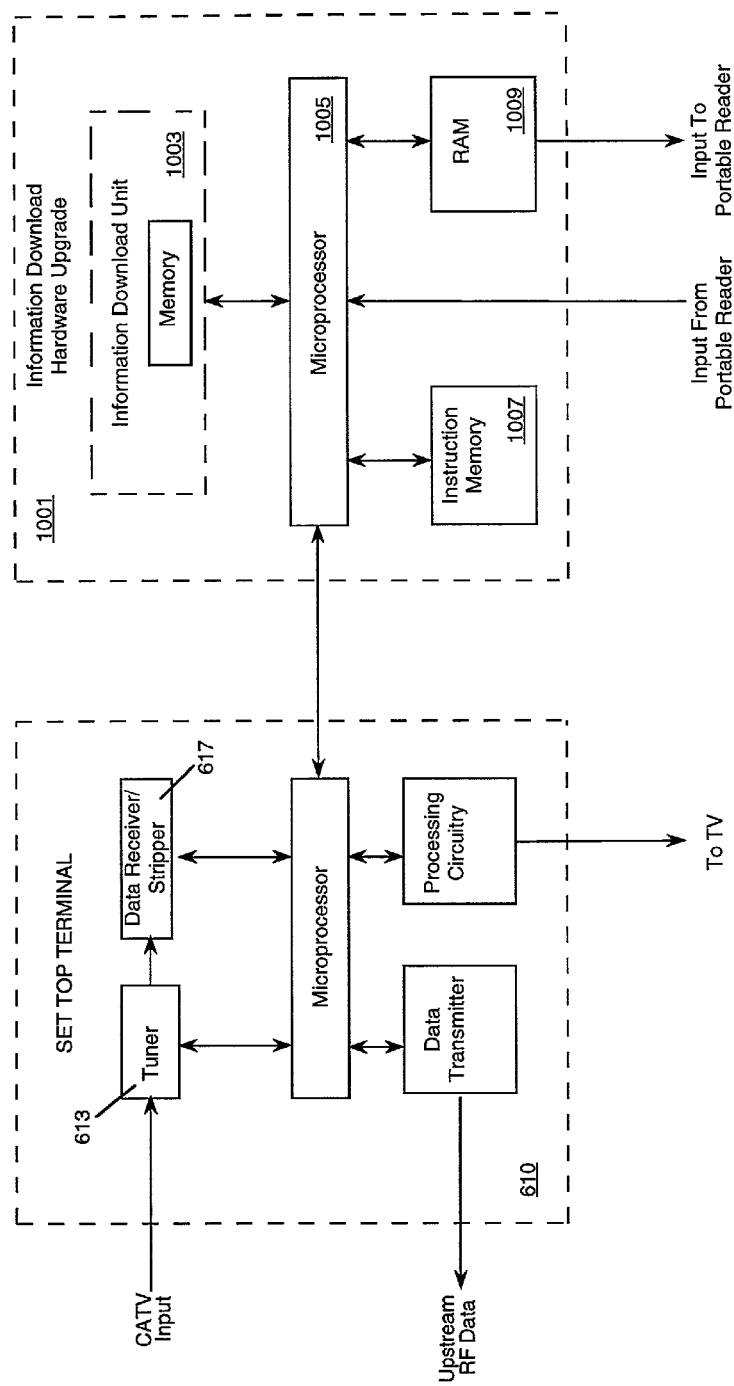

FIGS. 16*a* and 16*b* are examples of hardware modifications or upgrades. A port is used to attach hardware upgrades described below to a set top terminal. Two upgrades are possible to set top converters 601 to assist in receiving and selecting electronic books, a menu generation card upgrade (FIG. 16*a*) and an information download unit (FIG. 16*b*). Each of these upgrades may be connected to the set top terminal unit through an upgrade port. A four wire cable, ribbon cable, FireWire (IEEE 1394B) interface connector, USB connector, or the like may be used to connect the upgrade to the set top converter 601.

A card addition 950 to a set top converter 601 is depicted in FIG. 16*a*. The card 950 shown provides the additional functionality needed to utilize the book selection system with existing set top converter 601 technology. The card 950 may be configured to slip inside the frame of a set top terminal and become part of the set top terminal, an advanced set top terminal. The primary functions the card 950 adds to the set top converter 601 are the interpreting of data signals, generating of menus, sequencing of menus, and, ultimately, the ability of the subscriber to select a book using either the television or a viewer 266. The card 950 also provides a method for a remote location, such as the cable headend, to receive information on books ordered. The books ordered information and control commands may be passed from the cable headend to the card 950 using telephone lines or alternative ordering methods as presented in Section VII.

The primary components of the card 950 are a PC chip CPU 952, a VGA graphic controller 954, a video combiner 956, logic circuitry 958, NTSC encoder 960, a receiver 962, demodulator (not shown), and a connector 611', which consists of a dialer. The card 950 operates by receiving the data text signal from the cable headend through the coaxial cable. The logic circuitry 958 of the card 950 receives data 964, infrared commands 966, and synchronization signals (not shown) from the set top converter 601. Menu selections made by the viewer 266 on the remote control are received by the set top converter's 601 IR equipment and passed through to the card 950. The card 950 interprets the IR signal and determines the book (or menu) the subscriber has selected. The card 950 modifies the IR command to send the information to the set top converter 601. The modified IR command contains the channel information needed by the set top converter 601. Using the phone line 968 and dialer 611', the card 950 is able to transmit electronic books ordered information to the cable headend. It is also possible to receive the electronic books over the telephone lines and other telecommunications networks, including wireless networks, and by-pass the video distribution system.

These commands are passed through the interface linking the set top terminal's microprocessor with the microprocessor of the hardware upgrades. In this way, subscriber inputs, entered through the set top terminal keypad or remote control, can be transferred to any of the hardware upgrades for processing and responses generated therein can then be sent back to the set top terminal for display. In one embodiment the IR commands 966 are transferred from set top terminal 601 to hardware upgrade.

Hardware upgrades may include a microprocessor, interactive software, processing circuitry, bubble memory, and a long-term memory device. In addition to these basic components, the hardware upgrade may make use of an additional telephone modem or CD-ROM device.

An information download hardware upgrade 1001 shown in FIG. 16*b* allows the subscriber to download large volumes of information from the operations center 250 or cable headend using a set top terminal 610. The hardware upgrade 1001 will enable subscribers to download data, such as electronic books and electronic magazines, to local storage. Primarily, the hardware upgrade 1001 is an additional local storage unit 1003 (e.g., hard disk, floppy, optical disk or magnetic cartridge and may include a microprocessor 1005, instruction memory 1007, and a random access memory 1009, as shown in FIG. 16*b*). A small portable viewer may also provided with the upgrade 1001 to enable downloaded text to be read without the use of a television.

The downloadable information may be text or graphics supplied by the operations center 250 or cable headend. With the upgrade 1001, electronic books may be downloaded and read anywhere with the viewer 266. Using the upgrade 1001, electronic books may be downloaded and stored in compressed form for later decompression. The electronic books may be decompressed only at the time of viewing. Important text that the public desires immediate access may made available through this system. Text such as the President's speech, a new law, or a recent abortion decision rendered by the Supreme Court may be made immediately available.

In one embodiment, electronic book ordering information is stored at each set top terminal 610 until it is polled by the cable headend using a polling request message format. An example of a polling request message format consists of six fields, namely: (1) a leading flag at the beginning of the message, (2) an address field, (3) a subscriber region designation, (4) a set top terminal identifier that includes a polling command/response (or P/F) bit, (5) an information field, and (6) a trailing flag at the end of the message. A similar response frame format for information communicated by the set top terminal to the cable headend in response to the polling request may be used.

Figure 17:
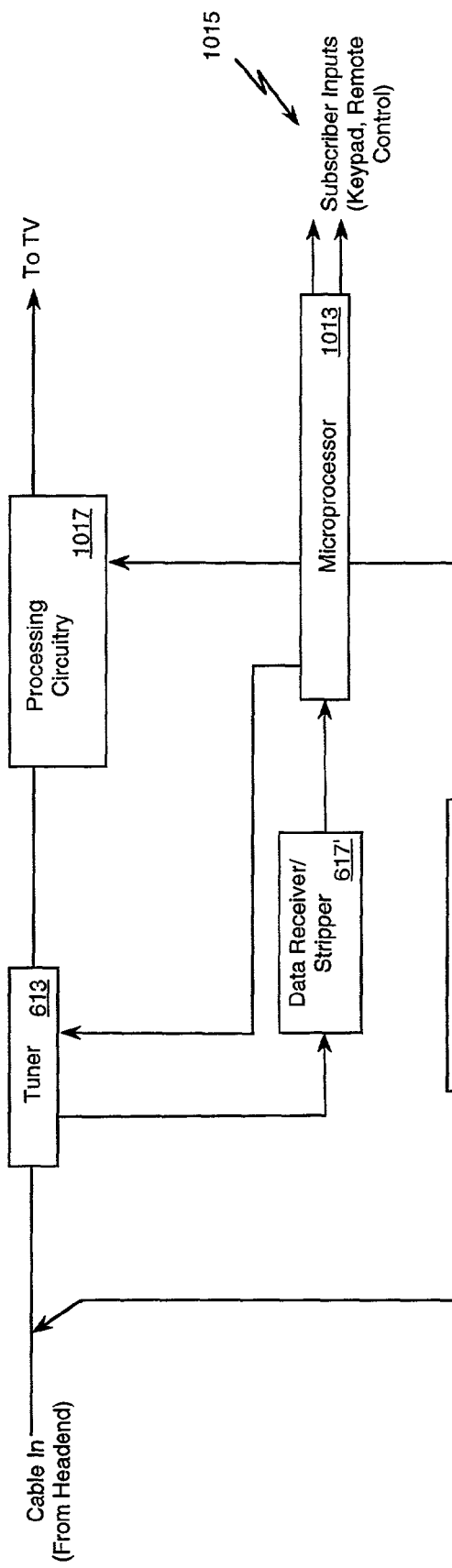
FIG. 17 is a schematic showing a set top terminal that includes a data receiver and data transmitter.

FIG. 17 shows components of a set top terminal 610'. The components include a data receiver 617' and a data transmitter 1011. The data transmitter provides upstream data communications capability between the set top terminal 610' and the cable headend. Upstream data transmissions are accomplished using the polling system described and, using a data transmitter 1011. Both receiver 617' and transmitter 1011 may be built into the set top terminal 610' itself or added through an upgrade module. Regardless of the specific hardware configuration, the set top terminal's data transmission capabilities may be accomplished using the hardware shown in FIG. 17.

FIG. 17 shows RF signals, depicted as being received by a data receiver 617' and tuner 613 working in unison. Both of these devices are interfaced with the microprocessor 1013, which receives inputs 1015, from the subscriber, either through a set top terminal's keypad, a remote control unit or viewer 266. Generally, all cable signals intended for reception on the subscriber's TV are accessed by the tuner 613 and subsequently processed by the processing circuitry 1017. This processing circuitry 1017 typically includes additional components (not shown) for descrambling, demodulation, volume control and remodulation on a Channel 3 or 4 TV carrier.

Data targeted to individual set top terminals is received by the data receiver 617' according to each set top terminal's specific address or ID. In this way, each addressable set top terminal 610' only receives its own data. The data receiver 617' may receive set top terminal 610' specific data in the information field of the signal frame described or on a separate data carrier located at a convenient frequency in the incoming spectrum.

The received data includes information regarding electronic books and menus available for selection. The subscriber may enter a series of commands 1015 using a keypad or remote control in order to choose an electronic book or menu. Upon receipt of such commands, the set top terminal's microprocessor 1013 instructs the tuner to tune to the proper frequency of the channel carrying data and subsequently instructs the processing circuitry 1017 to begin descrambling of this data.

Upon selection of an electronic book, the microprocessor 1013 stores any selection information in local memory (not shown) for later data transmission back to the cable headend. The set top terminal's microprocessor 1013 coordinates all CATV signal reception and also interacts with various upstream data transmission components. Typically, the data transmitter 1011 operates in the return frequency band between 5 and 30 MHZ. In an alternative embodiment, the frequency band of 10 to 15 MHZ may be used. Regardless, however, of the frequency band used, the data transmitter 1011 sends information to the cable headend in the information field of the response frame described. Those skilled in the art will recognize that a number of variations and combinations of the above-described set top terminal hardware components may be used to accomplish upstream data transmissions.

VI. Books-on-Demand System

Figure 18A:
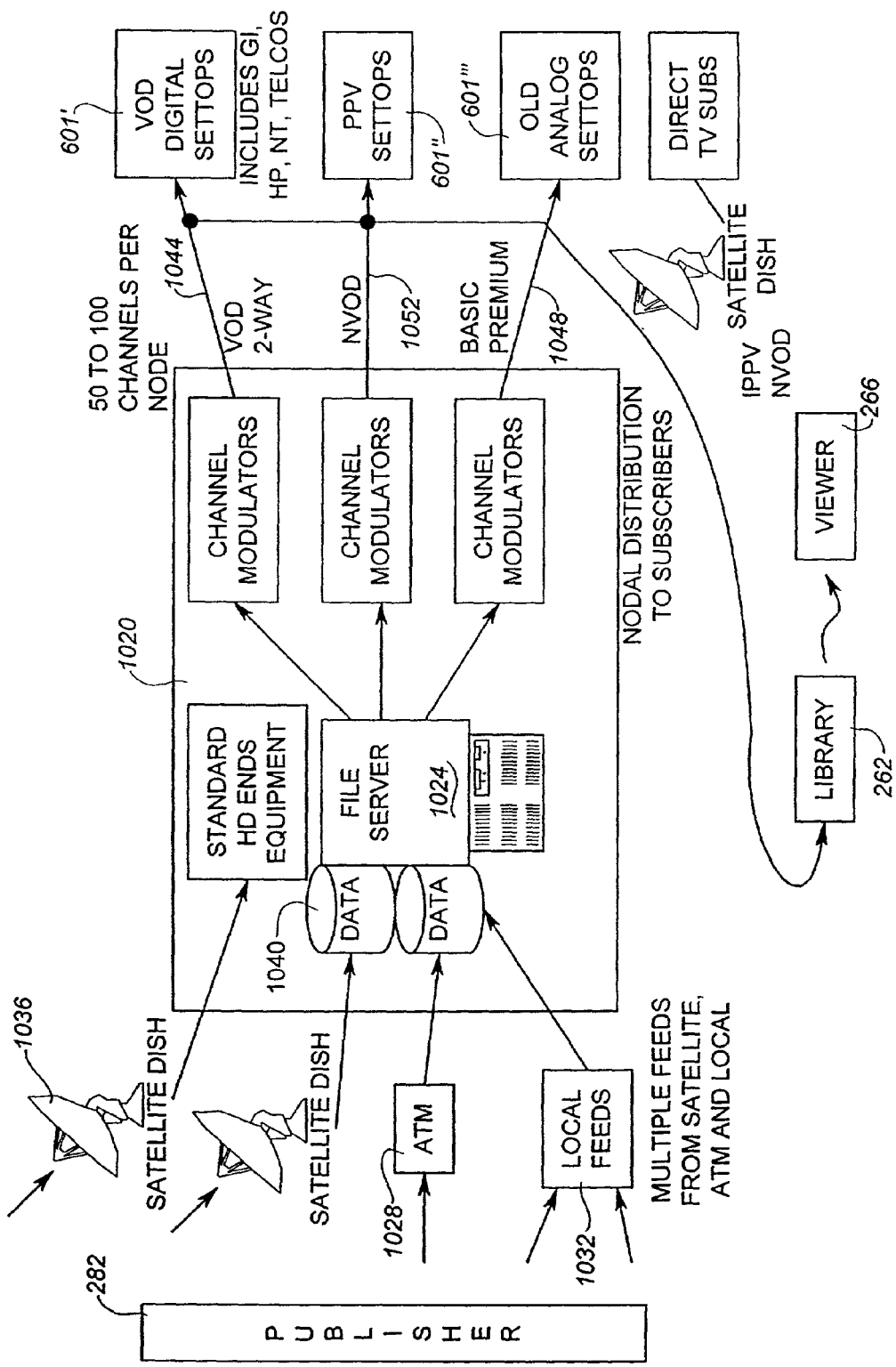
FIG. 18a is a schematic of a book-on-demand system.

The electronic book system 200 described may also be configured in a book-on-demand style. FIG. 18a shows one example of a configuration for a book-on-demand system. A book on demand system requires more powerful two-way communications between the consumer's home, bookstore, school or public library and either the operations center 250 or a distribution site 1020 such as the cable headend. In one embodiment, this type of two-way communication can be provided by the hardware shown in FIG. 17 and described above. Additional methods related to alternative communication paths are presented in Section VII.

Referring to FIG. 18a, in a book-on-demand system, the subscriber selects the book to be download from an available menu of books (see for example FIGS. 14d and 14e). The data for menus of available books is usually sent to the subscriber location by the distribution site 1020. After the subscriber's menu selection, information about the subscriber selection (or request) is then communicated to either a distribution point 1020 (such as a cable headend) or the operations center 250. Upon receipt of this request, the needed textual and graphical information for the book is spooled and sent to the subscriber. In this manner, electronic books are only sent when requested by the subscriber and are sent immediately upon demand for the electronic book (or text).

In order to support such a demand system, the text delivery and distribution must be conducted on a strong nodal architecture distribution system, such as, a video-on-demand cable or telephone television system, through use of individual telephone calls on the public telephone system or cellular phone system, through the use of the Internet, or a number of other data network options.

The book-on-demand system allows for a greater selection of electronic books to the subscriber and limits the amount of communicated book data that is unnecessary or unneeded. It also provides the electronic book to the subscriber in a much timelier fashion.

In addition to a stronger distribution system, a book-on-demand system requires a distribution point 1020 to have more sophisticated equipment to access and "spool out" the textual information. This can be accomplished using file server technology 1024 for storing the books and distribution technology such as ATM 1028 or telephone-type switching (not shown) to distribute the textual information. The file server 1024 and distribution technology that can be used in configuring such a book-on-demand system is described in U.S. Pat. No. 5,262,875 and U.S. Pat. No. 5,218,695, cited above.

FIG. 18a shows an embodiment for a book-on-demand system that utilizes file server technology. In addition to books, the embodiment of FIG. 18a will support distribution of nearly any digital data. Books or textual files are received from publishers 282 and other sources through local feeds 1032, ATM 1028, or by satellite dish 1036, for example. The data is then stored in memory 1040 at the file server 1024. In one embodiment, the distribution point 1020 is a cable headend that receives requests from subscribers and delivers text to subscribers over a two-way communication system (such as a video-on-demand system (VOD) 1044).

The library 262 can be connected to either a basic premium-type service cable system 1048, a near video-on-demand type cable system (or pay-per-view (PPV) 1052) or a video-on-demand cable system 1044. In connecting with either of these three systems the library 262 may access the cable directly or may access the system through a set top terminal 601', 601", or 601'''.

Using the two-way video-on-demand system 1044, a subscriber is able to request a specific book title and receive that text immediately following its request. To accomplish this, the distribution point 1020 transmits a list of available books through the cable delivery system to the library 262. The library 262 displays the list of available books on a menu or similar format. As described earlier, the library 262 may use menus which list categories of available books to form its request from the distribution point 1020. After selecting a book the library 262 then sends a request signal on the two-way communication system 1044 back to the distribution point 1020. This request signal can be handled in two ways. The library 262 either initiates the request or the distribution point 1020 polls the various libraries on to the two-way system 1044. Upon receiving the request for the book title, the text associated with that book title is transmitted to the library 262 using the two-way cable system 1044.

Figure 18B:
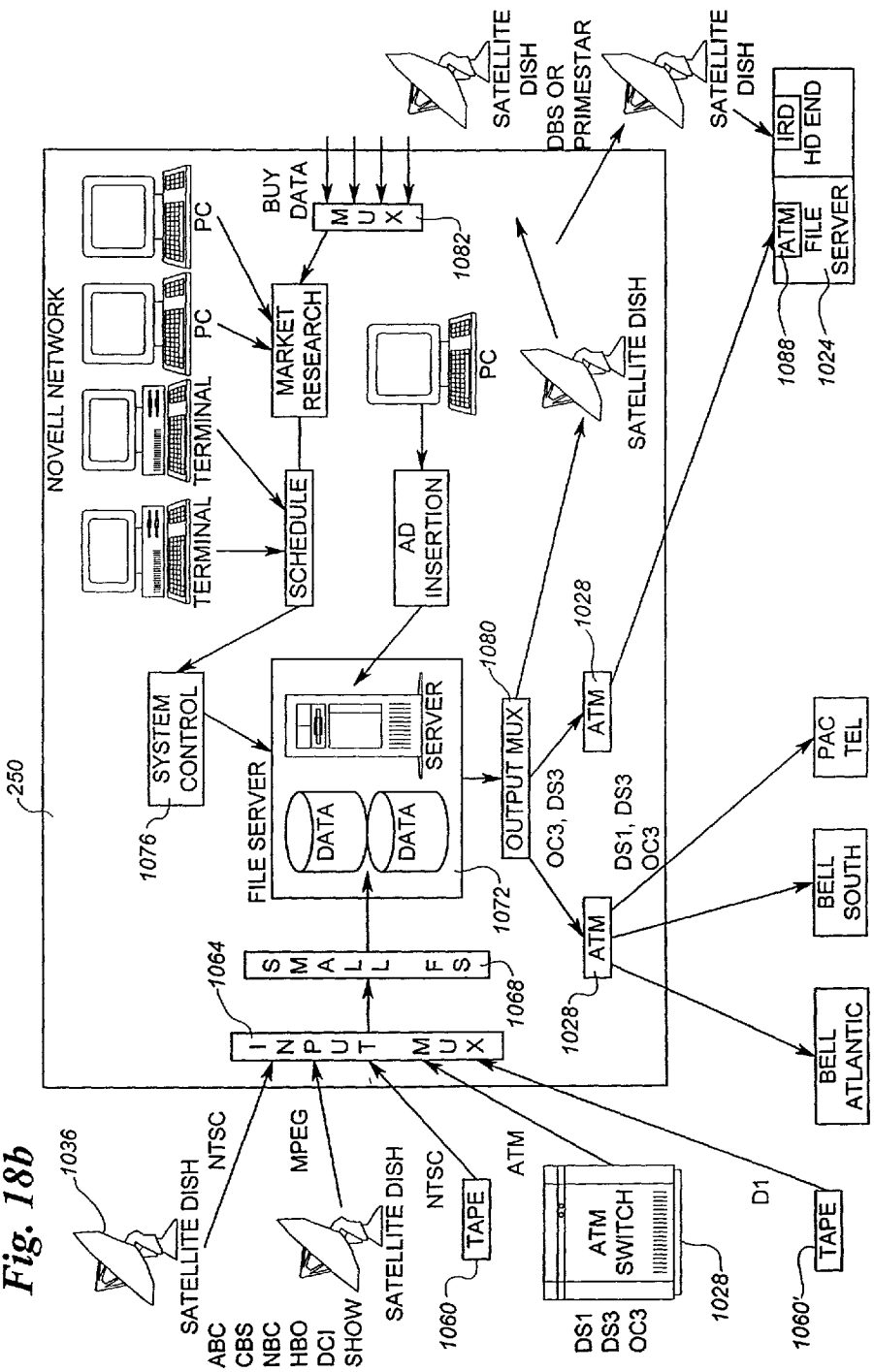
FIG. 18b is a schematic of an operations center supporting a book-on-demand system.

FIG. 18b is an expanded view of an operations center 250 that supports a regional or national book-on-demand system. In fact, the operations center 250 shown supports distribution of nearly any digital data. The operations center 250 supports multiple feeds to receive digital information by tape 1060, 1060', ATM 1028, or satellite 1036. The information is processed through an input MUX 1064 and a small file server 1068 before reaching the master file server 1072. Digital data such as books received from publishers 282 is then stored on the master file server 1072. The digital data may be stored compressed in a standard format such as MPEG2.

A system controller 1076 provides control over the regional or national book-on-demand system. Books may be packaged into groups to provide feeds to various cable headends. In addition, scheduling and marketing research are conducted at the operations center 250. In order to handle the scheduling and market research, book buy data is received at the operations center 250 through a multiplexer 1082. Book buy information can be provided by the operation center 250 to the billing and collection system 278.

The operations center 250 is also equipped to insert messages or advertisements into the file server. These messages or advertisements will eventually be received by the subscribers.

The master file server 1072 uses an output multiplexer 1080 and ATM 1028 as well as satellite connections to distribute digital data. In one embodiment, cable headends receive text data on books from the master file server 1080 through the output multiplexer 1028 and an ATM system 1028. After receiving the digital book data, the cable headends store the books in a local file server 1024. FIG. 18a's distribution point 1020 is an example of a cable headend which may receive data from the operations center 250 of FIG. 18b through an ATM hookup 1088 or satellite hookup.

VII. Alternative Delivery and Ordering Methods

Electronic books and related data, including electronic book menu data, may be provided to subscribers by use of an on-demand delivery system in which electronic books are delivered after an order is received by the delivery system. The delivery system may supply the electronic books in real time or near-real time (i.e., near on-demand), or after a delay period that allows the delivery system to process, package and transmit the electronic book. Alternatively, the delivery system may broadcast one or more electronic books in a continuous fashion. In this alternative, the subscriber indicates a desired electronic book from a list of the broadcast electronic books. The delivery system may include a billing system that debits a subscriber's account, or debits a credit card, for example, upon delivery of the electronic book. The delivery system, or a related authorization system, may provide a local authorization code that allows the subscriber to decrypt, store and view the desired electronic book.

a. Use of TV Program Broadcast Delivery System for Electronic Book Delivery i. Delivery System Description In addition to advances in television broadcast technology, government regulatory agencies have placed requirements on the broadcast television industry. In particular, the over-the-air broadcast television networks will soon transition to high definition television (HDTV)—a digital broadcast television standard. These broadcasters may elect to provide a single HDTV digital signal in their allotted bandwidth, with the remaining bandwidth used for standard definition television (SDTV) digital programming. Alternatively, broadcasters may elect to make use of their bandwidth for data-related services, such as the delivery of electronic books.

This embodiment relates to an electronic book delivery system using a digital television program delivery system. This embodiment may be used in at least two domains: delivery of electronic books embedded in the broadcast digital multiplex signal using terrestrial, over-the-air media; and delivery of electronic books embedded in the broadcast digital multimedia signal over an existing cable television system. Over-the-air delivery includes standard terrestrial television broadcasts. Cable delivery systems include coaxial cable systems, fiber optic delivery systems, and telephone delivery systems (including T1 and T3 lines, Integrated Services Digital Network (ISDN) lines and Asymmetric Digital Subscriber Lines (ADSL)). In addition, electronic books may be delivered within the broadcaster's signal by direct satellite broadcast, by wireless broadcasts, and by other wired means including local area networks.

Figure 19:
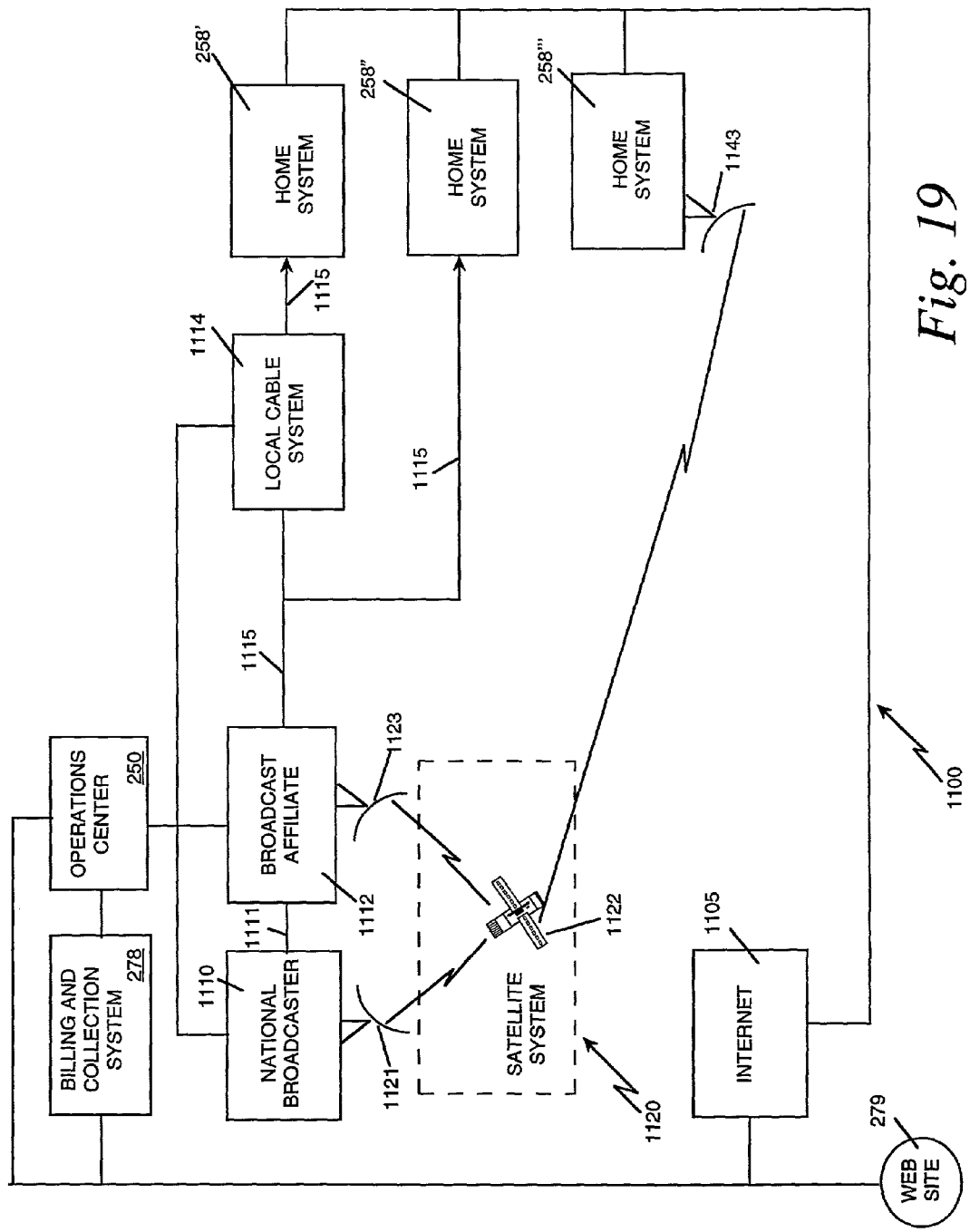
FIG. 19 is a diagram of a digital television program environment.

FIG. 19 shows a broadcast television environment 1100 in which a broadcast program provider, such as a national broadcaster 1110, provides digital multiplex television programming with embedded electronic book data 1111 to a broadcast affiliate 1112. The programming with embedded electronic book data 1111 may be provided to the broadcast affiliate 1112 by any suitable means. For example, the national broadcaster 1110 may provide the programming with embedded electronic book data 1111 by satellite transmission using a satellite broadcast system 1120. The satellite broadcast system 1120 may include an uplink site 1121, a satellite 1122, and a downlink site 1123. The satellite broadcast system 1120 may transmit the programming with embedded electronic book data 1111 to the broadcast affiliate 1112 and directly to home systems 258', 258", and 258''' at remote locations such as subscribers' homes, for example.

The broadcast affiliate 1112 may provide digital multiplex television programming with embedded electronic book data 1115 to intermediate locations such as local cable system 1114. Alternately, the broadcast affiliates 1112 may provide the programming with embedded electronic book data 1115 directly to the subscriber's home systems 258', 258", and 258'''. The local cable system 1114 that receives the programming with embedded electronic book data 1115 may in turn provide the programming with embedded electronic book data 1115 to the home systems 258', 258", and 258'''.

The home systems 258', 258", and 258''' may receive digital television signals from any device capable of receiving digital TV signals, including digital televisions, digital set top boxes and personal computers, or any combination of these devices, or home subsystems may have a built-in digital TV receiver. The home systems 258' 258", and 258''' may receive the programming with embedded electronic book data 1115 by cable, including coaxial cable and fiber optic cable, by telephone cable (including T1 and T3 lines, Integrated Services Digital Network (ISDN) lines and Asymmetric Digital Subscriber Lines (ADSL)). Alternately, the home systems 258', 258", and 258''' may receive the programming with embedded electronic book data 1111 directly from the national broadcaster 1110 using the satellite broadcast system 1120. For example, the home system 258''' 'receives direct broadcast satellite programming with embedded electronic book data using a backyard satellite antenna 1143.

Also coupled to the home systems 258', 258", and 258''' may be an Internet 1105. The Internet 1105 provides access to web sites such as the web site 279. The Internet 1105 may also connect to the billing and collection system 278, or operations center 250, which is responsible for formatting and delivering the electronic book data to the broadcast affiliate 1112 and the national broadcaster 1110 to be embedded into their respective program signals for delivery. The operations center 250 may use the Internet 1105 to post electronic book ordering menus, such as provided in the menu system 851 shown in FIG. 13. The billing and collection system 278 may use the Internet 1105 to receive orders and payment for the purchases of electronic books. The electronic book ordering menu 851 may be provided as part of the broadcast from the national broadcaster 1110, the broadcast affiliate 1112, or the local cable system 1114. Alternatively, the electronic book ordering menu 851 may be downloaded from an Internet web site or alternately viewed directly on the Internet web site. The use of the Internet 1105 for these purposes will be described later in more detail.

In FIG. 19, the national broadcaster 1110 may be a television program broadcaster. Alternately, the national broadcaster 1110 may be a radio program broadcaster, or a combined television and radio broadcaster. The national broadcaster 1110 may also broadcast any other type of data or communication, either separately or in combination. Likewise, the broadcast affiliate 1112 may broadcast television or audio or both and may also broadcast any other data or communication, either separately or in combination. The national broadcaster 1110 and the broadcast affiliate 1112 may broadcast analog signals and any type of digital signals including packet data. Digital data broadcast by the national broadcaster 1110 and the broadcast affiliate 1112 may include high definition television and standard definition television signals.

Figure 20:
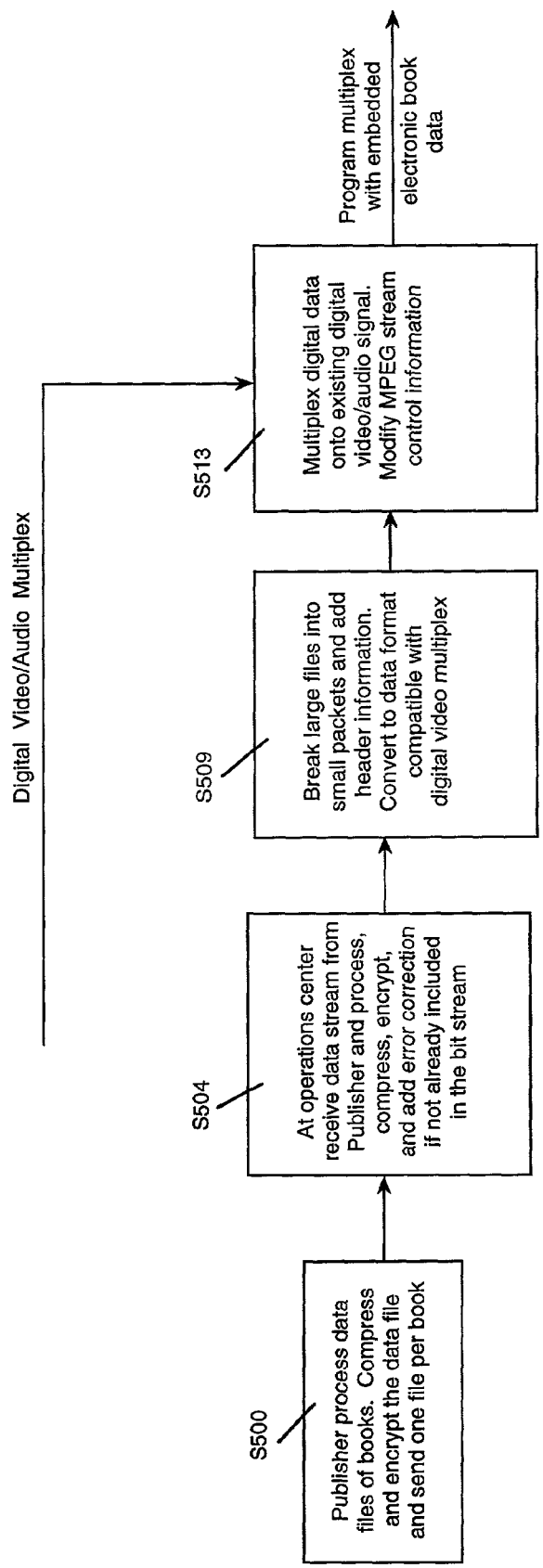
FIG. 20 is a flowchart of steps involved in processing text at an operations center.

FIG. 20 is a flowchart of steps involved in processing text from the publisher or provider 282 that may occur at the operations center 250. As shown in step S500, the publisher 282 processes data files of text for books, and compresses, encrypts and sends the data files to the operations center 250. Text files for books may be sent one book at a time. As shown in step S504, the operations center 250 receives and processes the data stream from the publisher 282. Part of this processing may include encryption and error correction and storage for future delivery purposes. Text files may be delivered for receipt by multiple home systems simultaneously, or to a specific individual home system.

In one embodiment, as shown in step S509, files are broken into smaller packets of information. Header information is added to the packets. The bit stream is converted from a serial digital bit stream to a digital stream that is compatible for insertion into the broadcaster's video/audio program multiplex signal. Step S513 shows the multiplexing of digital data into the appropriate data fields within the video/audio program multiplex. The digital data may be treated as an ancillary MPEG2 service, being placed into the multiplex as private data, carried either in the adaptation header of the MPEG2 transport packets or in a separate transport stream altogether. Step S513 also shows the operations center 250 performing the necessary modification to the industry standard MPEG Program Map Table and Program Specific Information.

ii. In-Home Reception Options for a Broadcast Delivery System

Figure 21A:
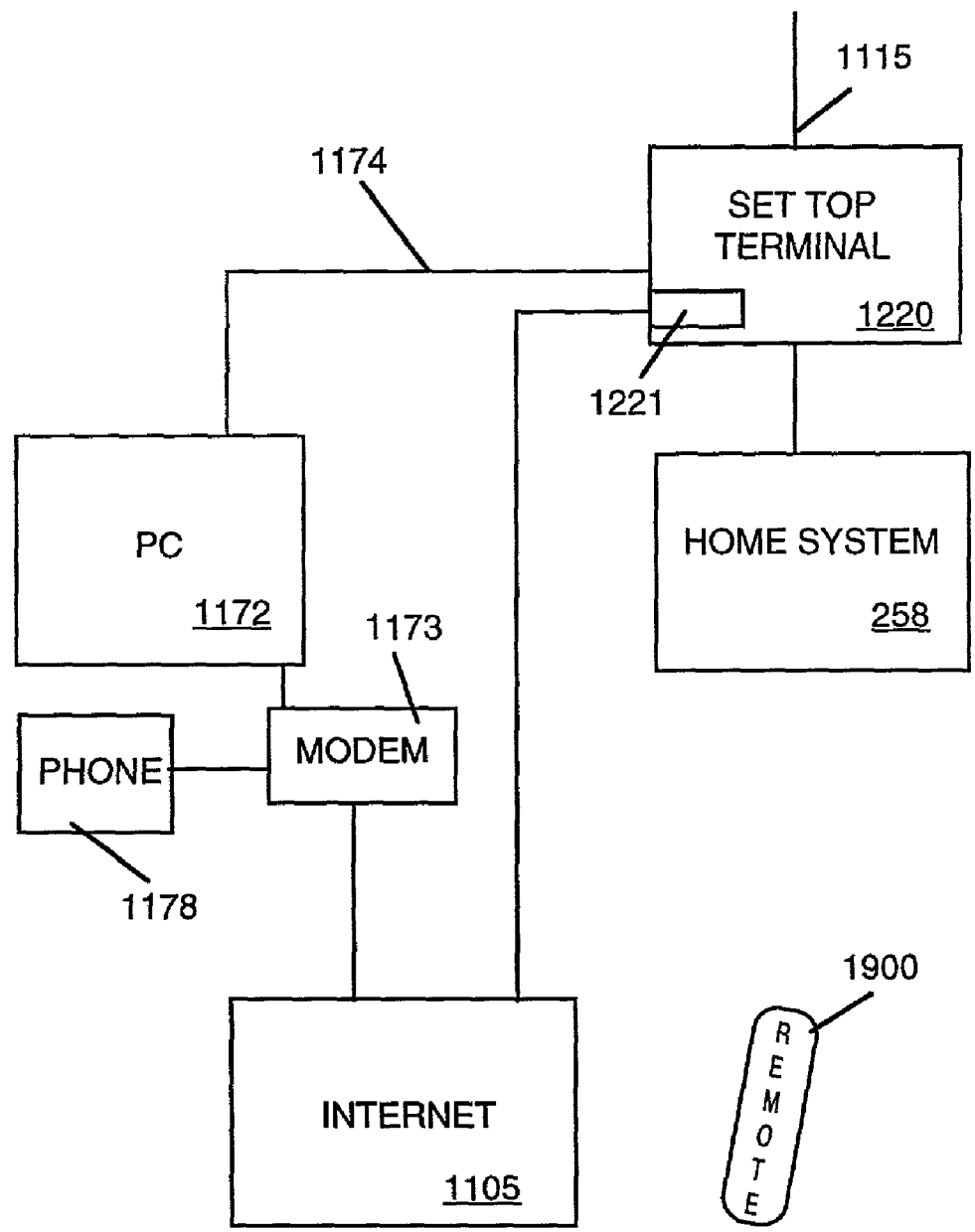
FIGS. 21a-21g are diagrams of remote location reception options.

FIGS. 21*a*-21*g* show reception options at the remote locations such as at a subscriber's home. In FIG. 21*a*, the home system 258 is coupled to a digital set top terminal 1220. The set top terminal 1220 receives the programming with embedded electronic book data 1115 from the broadcast affiliate 1112 or the local cable system 1114. Alternately, the national broadcaster 1110 may provide the programming with embedded electronic book data by use of the satellite broadcast system 1120. In this alternative, the set top terminal 1220 would be coupled to a local, or backyard, satellite dish antenna or similar device. In yet another alternative, the set top terminal 1220 receives programming from both the satellite broadcast system 1120, the local cable system 1114, and directly from the broadcast affiliate 1112 using terrestrial broadcast.

Also shown in FIG. 21*a* is a telephone 1178 that may be used to communicate with the billing and collection system 278, and a personal computer (PC) 1172 and a modem 1173 that may be used to communicate with the Internet 1105. The personal computer 1172 may be coupled to the set top terminal 1220 using signal path 1174. The signal path 1174 may include a cable connection such as a RS-232 cable, USB format interface, Firewire interface, and connectors or by wireless means, such as infrared signaling and radio frequency signaling, for example.

The set top terminal 1220 performs the necessary processing to send the programming with embedded electronic book data 1115 to the home system 258. The set top terminal 1220 may demultiplex the programming with embedded electronic book data 1115 and supply the demultiplexed signal to the home system 258. To do this, the set top terminal 1220 extracts the data related to the electronic book from the digital program multiplex signal.

The set top terminal 1220 may receive commands from a remote control 1900. The set top terminal 1220 may include communication devices 1221 that allow reception and transfer of data with external sources such as the Internet 1105. For example, the set top terminal 1220 may include a telephone modem, a cable modem, a wireless modem, a fiber optic connector, a LAN connector, or any combination of these devices. Using this connection to the Internet 1105, the set top terminal 1220 and PC 1172 may access the billing and collection system 278 or alternatively connect to the Internet 1105 to access the Internet web site 279 to view electronic book ordering menus 851 provided by the operations center 250.

The set top terminal 1220 has input and output ports for communication with other local and remote devices. Although the local cable system 1114 or terrestrial broadcast methods are the most prevalent transmission mediums for delivering programming with embedded electronic book data to the home, telephone lines (including T1 and T3 lines, Integrated Services Digital Network (ISDN) lines and Asymmetric Digital Subscriber Lines (ADSL)), cellular networks, fiber optics, local area networks, Personal Communication Networks, and analog and digital satellites and similar technology for transmitting to the home can be used interchangeably. The set top terminal 1220 may have output ports that provide communications from the set top terminal 1220 to the home system 258 and a television. Also, the set top terminal 1220 may contain a phone jack that can be used for maintenance, trouble shooting, reprogramming and additional customer features. The phone jack may also be used to connect the set top terminal 1220 with the Internet 1105 for the purpose of ordering electronic books. Alternately, the set top terminal may support other communication interfaces using the appropriate interface device connector. The electronic book data embedded within the programming 1115 contains data, such as the electronic book ordering menu 851 information, to advise the subscriber which electronic books are available for purchase. Once the electronic book ordering menus 851 have been received by the home system 258, the home system 258 can generate the appropriate menus. Alternately, menu retrieval or viewing and electronic book selecting and ordering may be achieved using the Internet web site 279 on the Internet 1105, which is accessed using the provided modem interface.

Figure 21B:
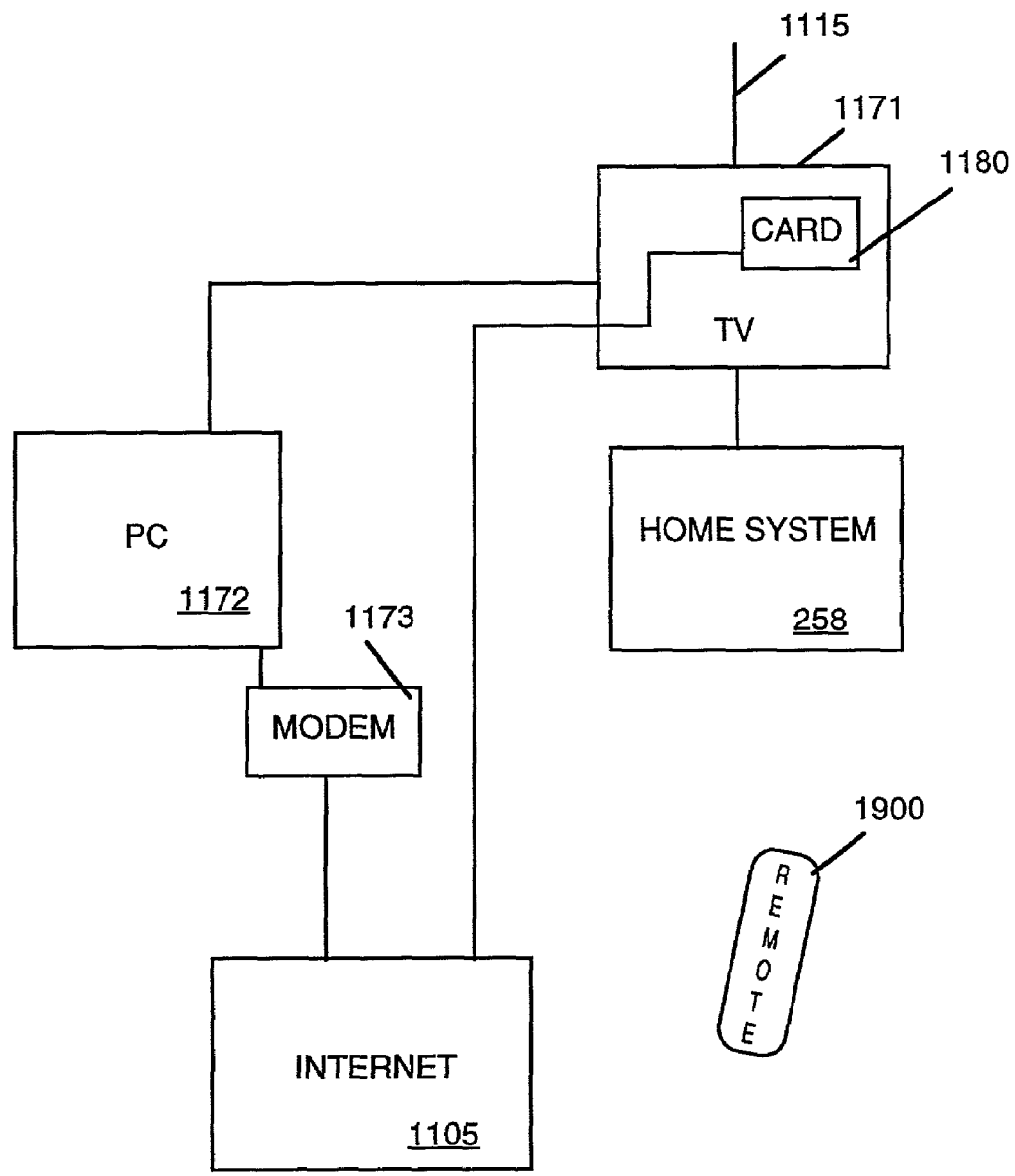

FIG. 21*b* shows an alternate arrangement of components for receiving the broadcast digital programming with embedded electronic book data 1115 and providing it to a home system 258. In FIG. 21*b*, the digital television 1171 is coupled to the broadcast affiliate 1112 to receive the programming 1115. The digital television 1171 may also receive the programming with embedded electronic book data 1115 from the local cable system 1114 or from the satellite broadcast system 1120.

The digital television 1171 may include an optional smart card 1180 that performs the functions described above for the set top terminal 1220. For example, the smart card 1180 may include a cable modem, a telephone modem, a wireless modem, a fiber optic connector, or a LAN connector. Also shown in FIG. 21*b* is the personal computer 1172 and the modem 1173, which function as before to connect to the Internet 1105. The functions of the digital television 1171 may be controlled by the remote control 1900, using either infrared signals or radio frequency signals, for example. Using this connection to the Internet 1105, the television 1171 and PC 1172 may access the billing and collection system 278 or alternatively connect to the Internet 1105 to access the web site 279 to view electronic book ordering menus 851 provided by the operation center 250.

Figure 21C:
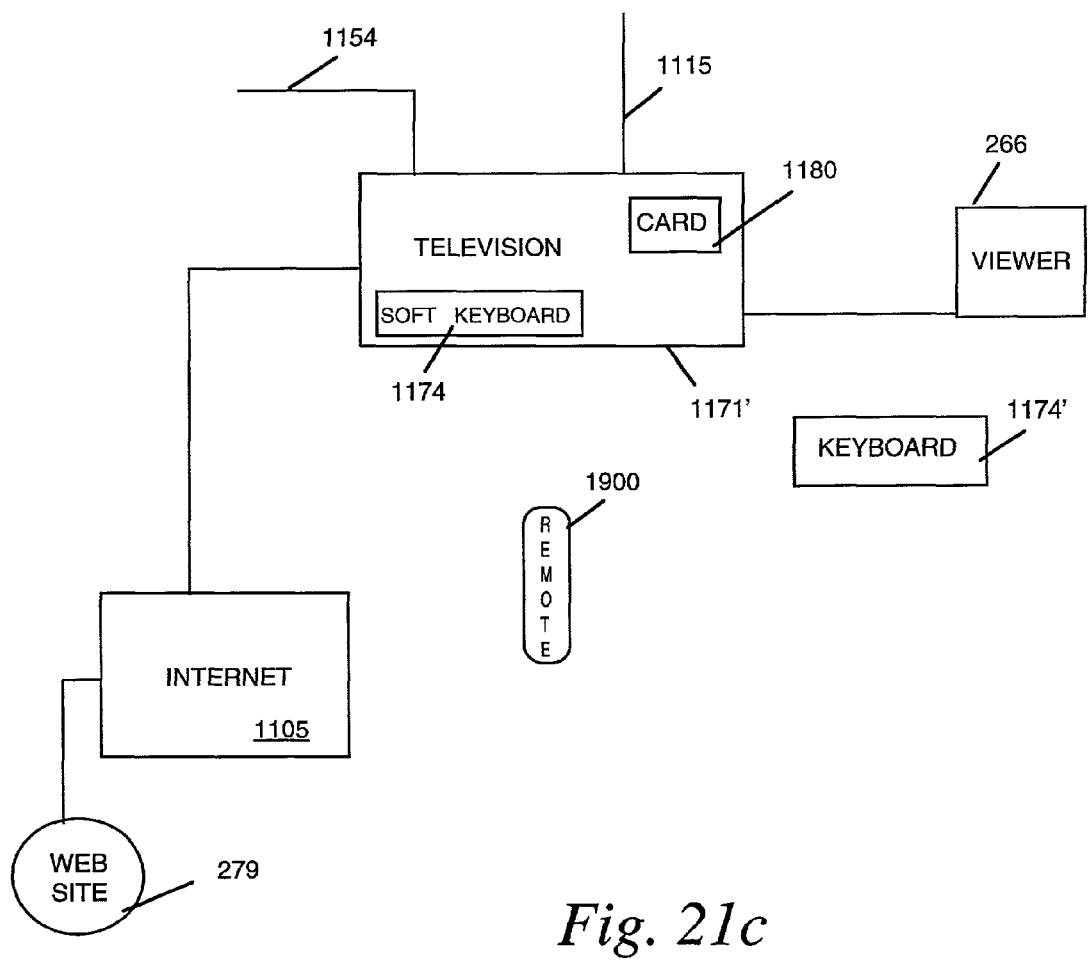

FIG. 21*c* shows another arrangement of components for receiving the broadcast digital programming with embedded electronic book data 1115. In FIG. 21*c*, a digital television 1171' incorporating the smart card 1180 receives the programming with embedded electronic book data 1115 from the local cable system 1114 and performs all the functions of the library 262 described previously, including connecting to the viewer 266. The television 1171' could also receive the programming with embedded electronic book data 1115 using other media including direct satellite broadcast, fiber optic connections, local area networks, such as an ethernet, the Plain Old Telephone Service (POTS), other telephone delivery systems (including T1 and T3 lines, Integrated Services Digital Network (ISDN) lines and Asymmetric Digital Subscriber Lines (ADSL)) and by over-the-air broadcast from the broadcast affiliate 1112. The television 1171', incorporating the smart card 1180, includes some or all of the functionality of the personal computer 1172 shown in FIG. 21*b*, for example. The television 1171' connects to the Internet 1105 and is able to access the web site 279 to view electronic book ordering menus 851 provided by the operations center 250. The remote control 1900 may be used to control the television 1171' and library 262. The television 1171' may also, in its programming, include a soft key board 1174 that is displayed on the display of the television 1171'. The remote control 1900 can then be used to operate "soft keys" on the soft key board 1174. The television 1171' may also incorporate a separate key board 1174' that is used to control the television 1171' and the library 262 and to operate the television 1171' in its personal computer role. The key board 1174' may be connected to the television 1171' by a wired connection. Alternately, the key board 1174' may communicate with the television 1171' and library 262 by wireless means including infrared signaling, radio frequency signaling and by other optical means including a laser. The television 1171' and library 262 may connect to a telephone system using signal path 1154.

Figure 21D:
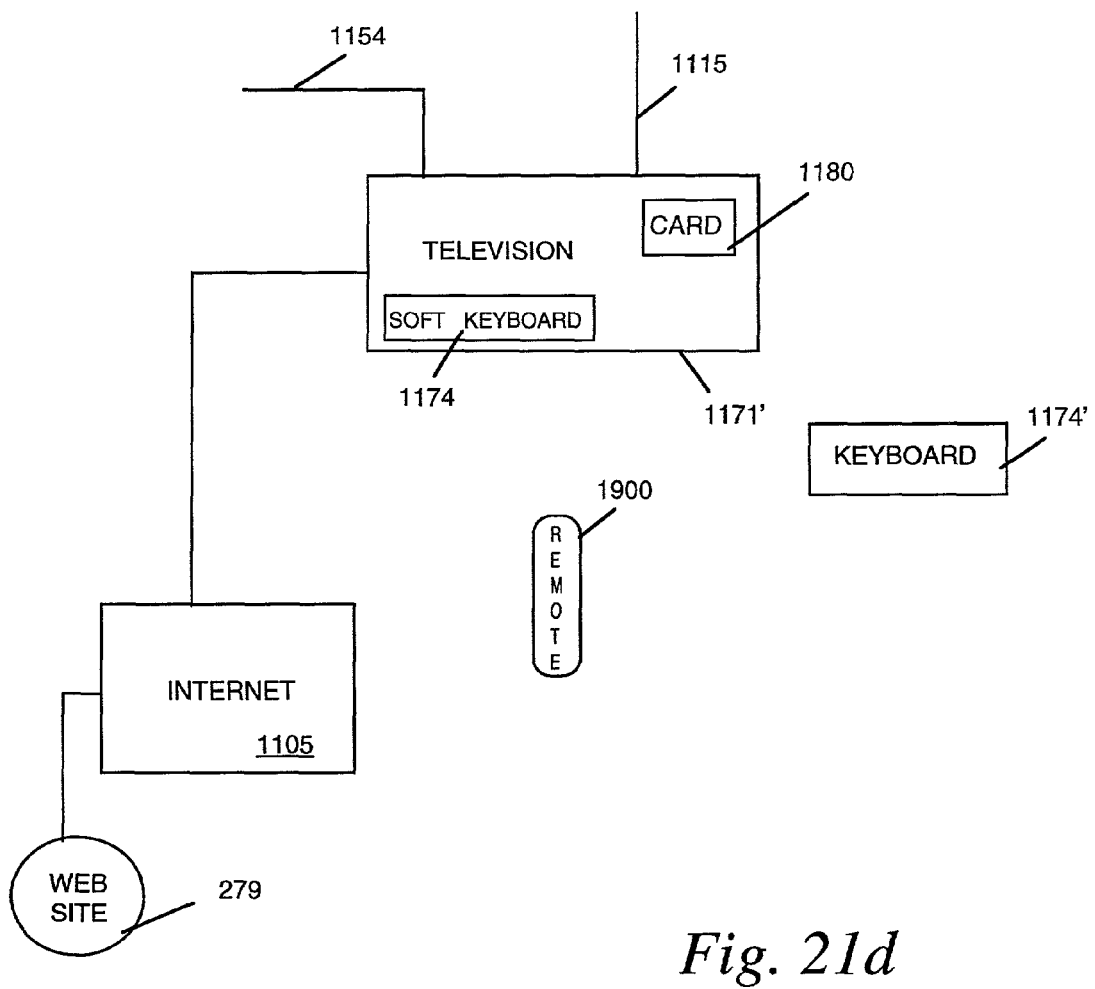

FIG. 21*d* shows yet another arrangement of components for receiving the broadcast digital programming with embedded electronic book data 1115. In FIG. 21*d*, a digital television 1171' incorporating a smart card that functions as a complete electronic book home system 258 receives the programming with embedded electronic book data 1115 from the local cable system 1114 and performs all the functions of the home system 258 described previously, and displays the electronic book data on the television display. The television 1171' could also receive the programming with embedded electronic book data 1115 using other media including direct satellite broadcast, fiber optic connections, local area network, such as an ethernet, the POTS, other telephone delivery systems (including T1 and T3 lines, Integrated Services Digital Network (ISDN) lines and Asymmetric Digital Subscriber Lines (ADSL)) and by over-the-air broadcast from the broadcast affiliate 1112. The television 1171', incorporating the home system 258 functionality, may include some or all of the functionality of the personal computer 1172 shown in FIG. 21*b*, for example. The television 1171' connects to the Internet 1105 and is able to access the web site 279 to view electronic book ordering menus 851 provided by the operations center 250. The remote control 1900 may be used to control the television 1171' and home system 258. The television 1171' may also, in its programming, include a soft keyboard 1174 that is displayed on the display of the television 1171'. The remote control 1900 can then be used to operate "soft keys" on the soft keyboard 1174. The television 1171' may also incorporate a separate keyboard 1174' that is used to control the television 1171' and home system 258 and to operate the television 1171' in its personal computer role. The keyboard 1174' may be connected to the television 1171' by a wired connection. Alternately, the keyboard 1174' may communicate with the television 1171' and home system 258 by wireless means including infrared signaling, radio frequency signaling and by other optical means including a laser. The television 1171' and home system 258 may connect to a telephone system using signal path 1154.

Figure 21E:
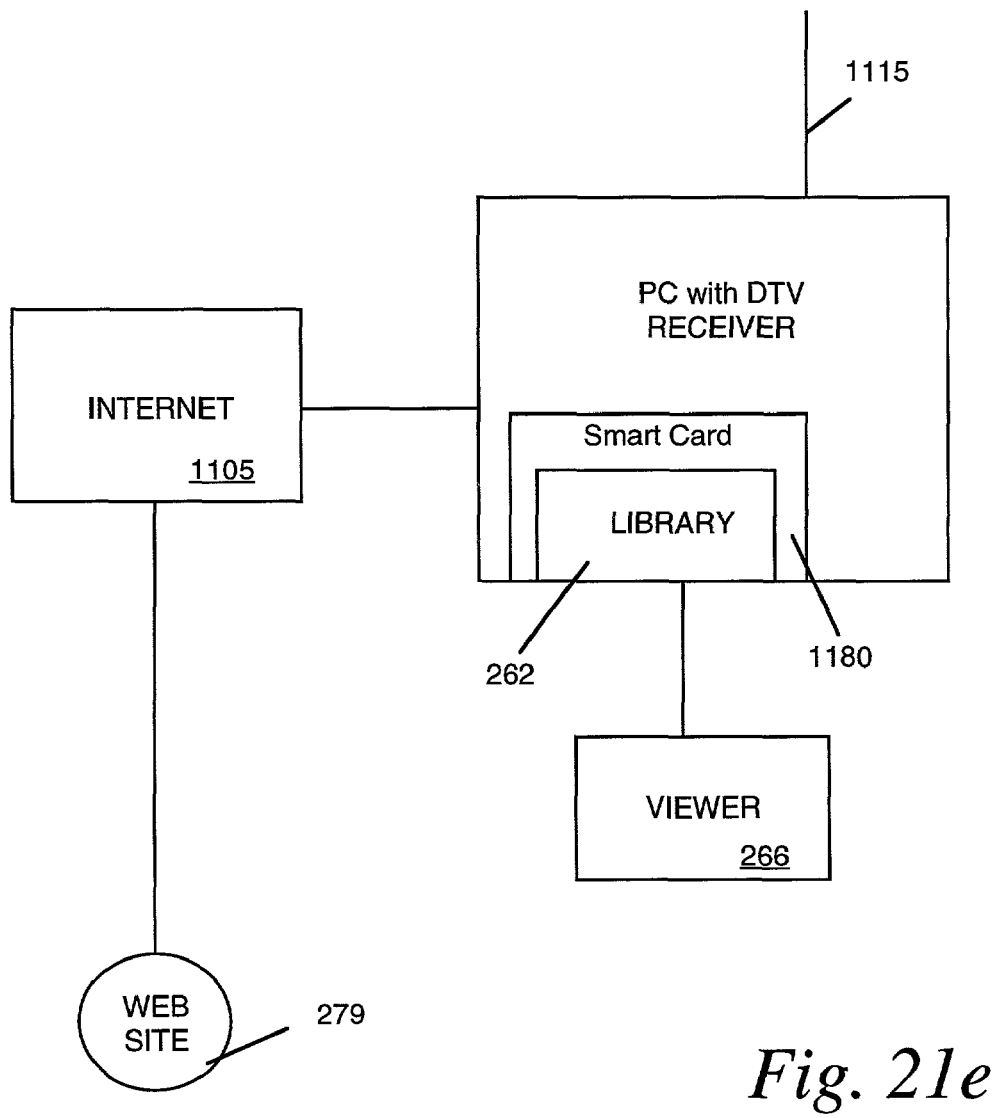

FIG. 21*e* shows another arrangement of components for receiving the broadcast digital programming with embedded electronic book data 1115. In FIG. 21*e*, a PC 1172 with digital TV receiver incorporating the smart card 1180 receives the programming with embedded electronic book data 1115 from the local cable system 1114 and performs all the functions of the library 262 described previously, including connecting to a viewer 266. The PC 1172 could also receive the programming with embedded electronic book data 1115 using other media including direct satellite broadcast, fiber optic connections, local area network, such as an ethernet, the POTS, other telephone delivery systems (including T1 and T3 lines, Integrated Services Digital Network (ISDN) lines and Asymmetric Digital Subscriber Lines (ADSL)) and by over-the-air broadcast from the broadcast affiliate 1112. The PC 1172 connects to the Internet 1105 and is able to access the web site 279 to view electronic book ordering menus 851 provided by the operations center 250.

Figure 21F:
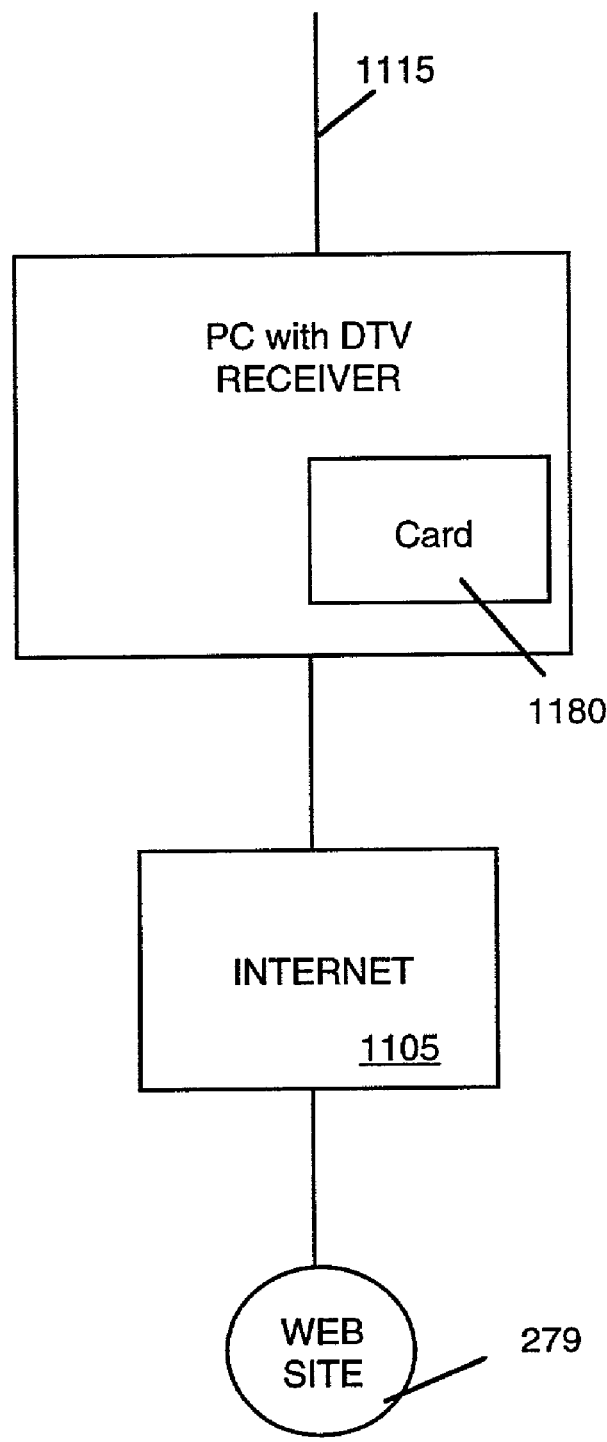

FIG. 21*f* shows another arrangement of components for receiving the broadcast digital programming with embedded electronic book data 1115. In FIG. 21*f*, the PC 1172 with digital TV receiver incorporating a smart card that functions as a complete electronic book home system 258 receives the programming with embedded electronic book data 1115 from the local cable system 1114 and performs all the functions of the home system 258 described previously. The PC 1172 could also receive the programming with embedded electronic book data 1115 using other media including direct satellite broadcast, fiber optic connections, local area network, such as an ethernet, the POTS, other telephone delivery systems (including T1 and T3 lines, Integrated Services Digital Network (ISDN) lines and Asymmetric Digital Subscriber Lines (ADSL)) and by over-the-air broadcast from the broadcast affiliate 1112. The PC 1172 connects to the Internet 1105 and is able to access the web site 279 to view electronic book ordering menus 851 provided by the operations center 250.

Figure 21G:
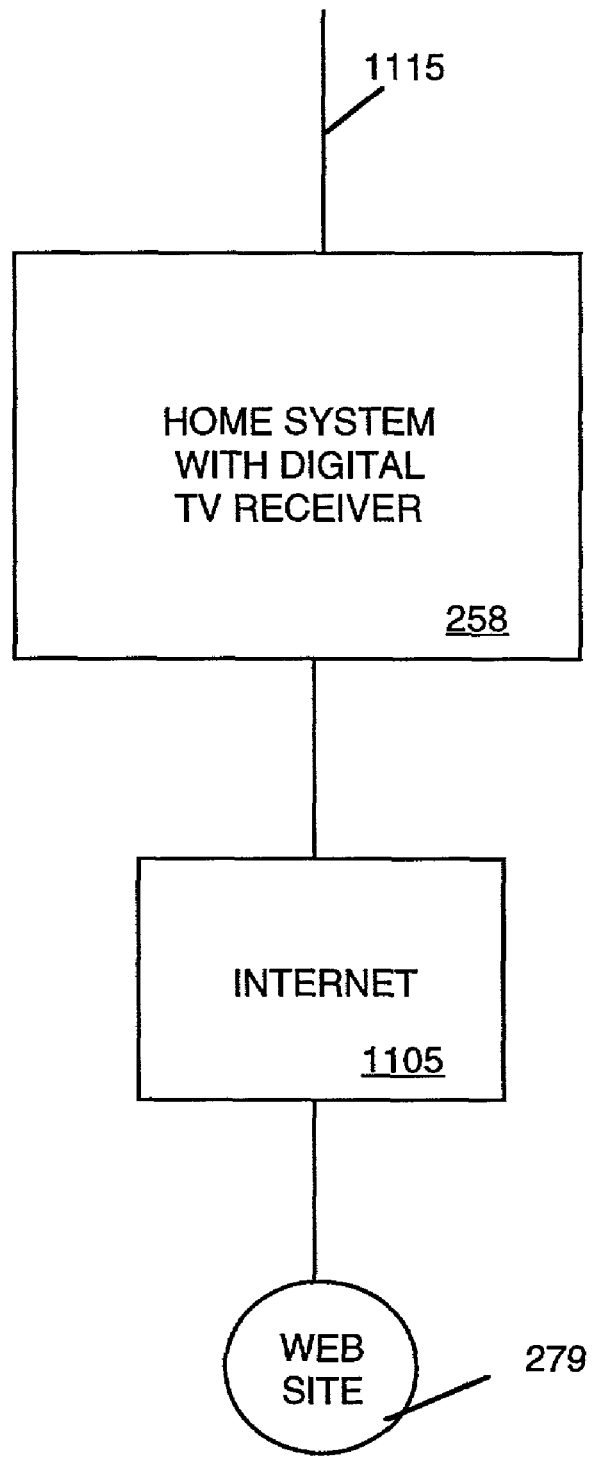

FIG. 21*g* shows another arrangement of components for receiving the broadcast digital programming with embedded electronic book data 1115. In FIG. 21*g*, the home system 258 contains a digital TV receiver 1613 to receive the programming with embedded electronic book data 1115 from the local cable system 1114. The home system 258 connects to the Internet 1105 and is able to access the web site 279 to view electronic book ordering menus 851 provided by the operations center 250.

Figure 22:
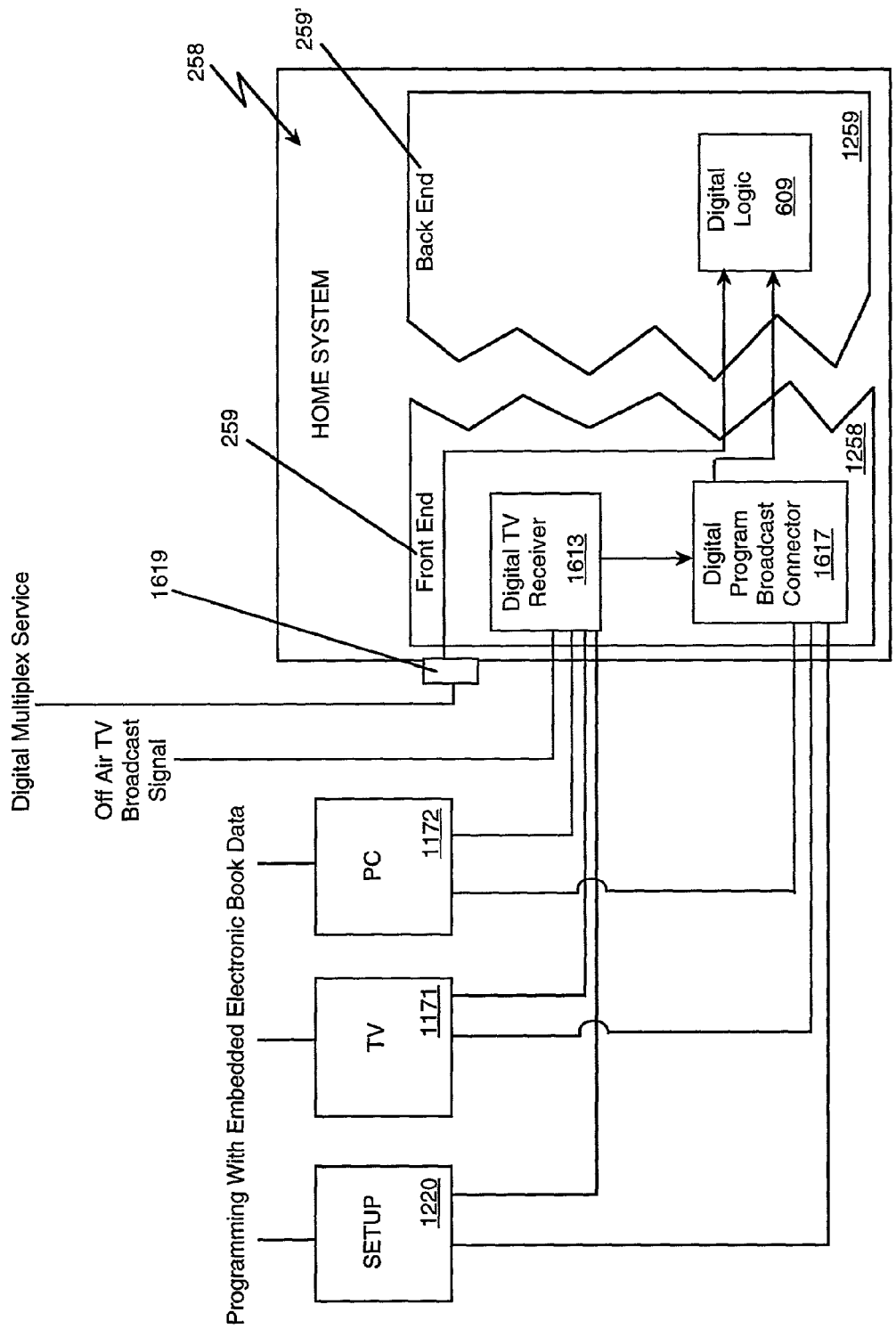
FIG. 22 presents a hardware configuration of a home subsystem used to receive a program broadcast.

FIG. 22 presents the hardware configuration of a home system 258 to support delivery of electronic books using the TV program broadcast delivery system. The home system 258 in FIG. 22 includes a home system front end 259 and home system backend 259'. The home system front end 259 can vary based on the delivery system from which electronic book data is being received. The home system backend 259' and its associated components and functionality are consistent regardless of the delivery system used and are as described in Section II above. The home system front end 259 performs several functions, such as receiving digital data directly, or receiving TV program broadcast signals, and stripping (or extracting) the data from the signal. Various hardware configurations may be utilized to achieve the desired functions of the home system front end 259. For example, as shown in FIG. 22, the home system 258 can be configured to receive digital program multiplexes from the set top terminal 1220, from the TV 1171, or from the computer 1172 using the connector 1617. Alternatively, the home system 258 can receive the RF channel in which the digital program multiplex signal is contained using the digital TV receiver 1613 and provide the signal to a digital program broadcast connector 1617 to extract the electronic book data from the signal. Finally, the home system 258 can receive a digital data stream, which has already been extracted from the digital program multiplex, using a connector 1619. Once the digital data that is related to the electronic book system has been extracted from the TV program broadcast signal, the digital data is provided to the digital logic 609 in the home system 258 for continued processing, as described in Section II.

Figure 23:
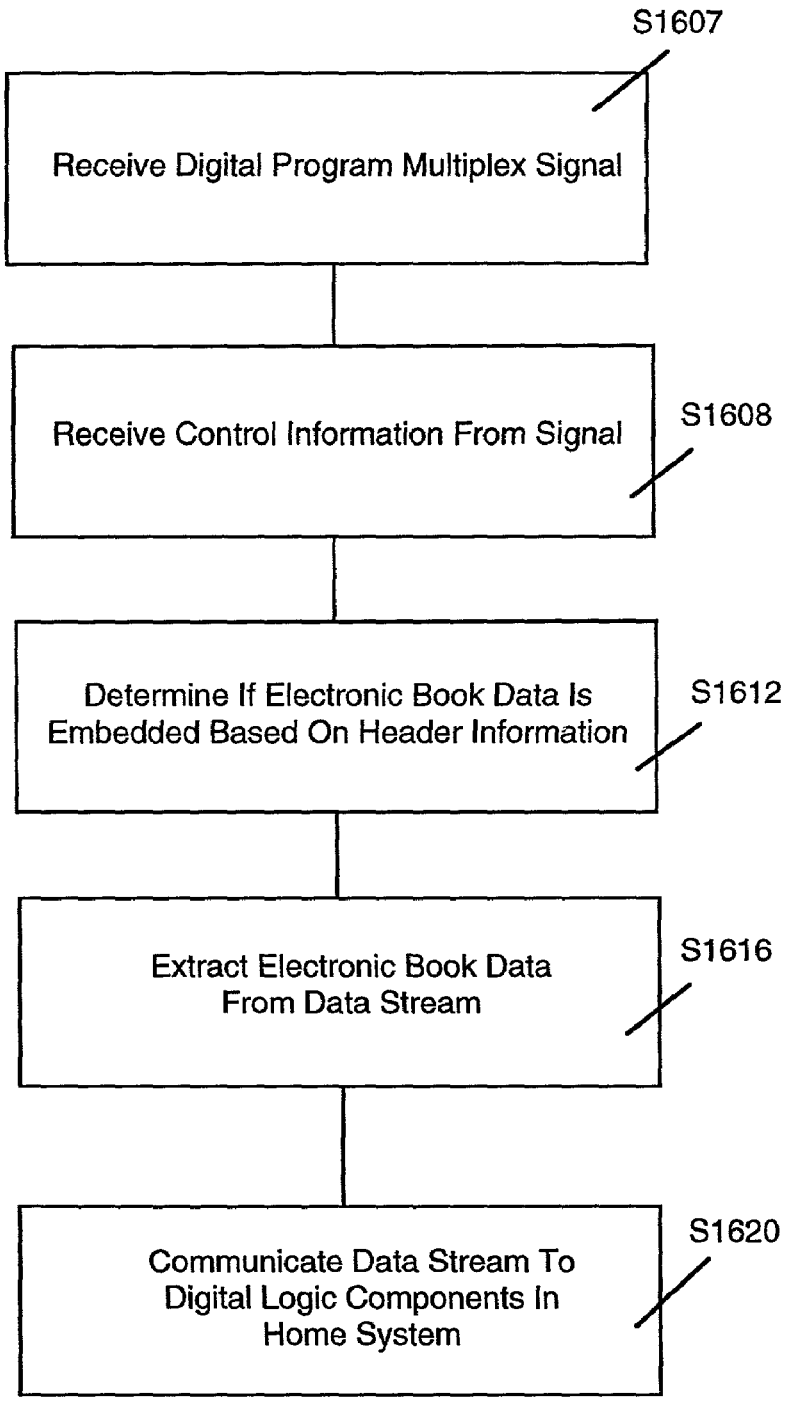
FIG. 23 is a flowchart of processes performed by a digital television program connector.

To receive and strip the data from the digital TV program signal at the consumer's home, the connector 1617 is used. FIG. 23 is a flowchart of processes performed by the connector 1617. The connector 1617 receives the digital program multiplex signal in step S1607, removes the MPEG control information from the signal in step S1608, determines if the stream contains any electronic book data embedded within it in step S1612, extracts the electronic book data from the signal in step S1616, and communicates the extracted electronic book data stream to digital logic components 609 in step S1620.

iii. Electronic Book Ordering Process for TV Program Broadcast Delivery

As described in Section II above, a subscriber selects their desired electronic book from a menu system. This menu system and its contents are updated by the operations center 250 using information delivered to the home system 258 either periodically distributed over the TV program broadcast delivery system, or delivered to the home system 258 by the billing and collection system 278 upon ordering a new electronic book. Order requests for electronic books made from this menu are forwarded to the billing and collection system 278 for processing.

In the case where the delivery is done using a two-way cable system, the set top terminal 1220 can be used to convey order request information to the local cable system 1114. The local cable system 1114 will in turn be in communication with the billing and collection system 278 or the operations center 250 that handle requests from the set top terminal 1220 for electronic book ordering or billing purposes. Further, telephone lines with modems may be used to transfer information from the set top terminal 1220 to the billing and collection system 278 or the operations center 250. Alternately, the set top terminal 1220 may incorporate a cable modem, a wireless modem, LAN connectors, T1 and T3 connectors, Asymmetric Digital Subscriber Line (ADSL) Connectors, Integrated Digital Service Network (ISDN) connectors or other advanced communications interfaces for transmitting information to the cable system 1114 or over alternate communication paths directly to the billing and collection system 278 or the operations center 250. Alternatively, the home system 258 may contact the billing and collection system 278 directly over any of these communication paths.

Figure 24A:
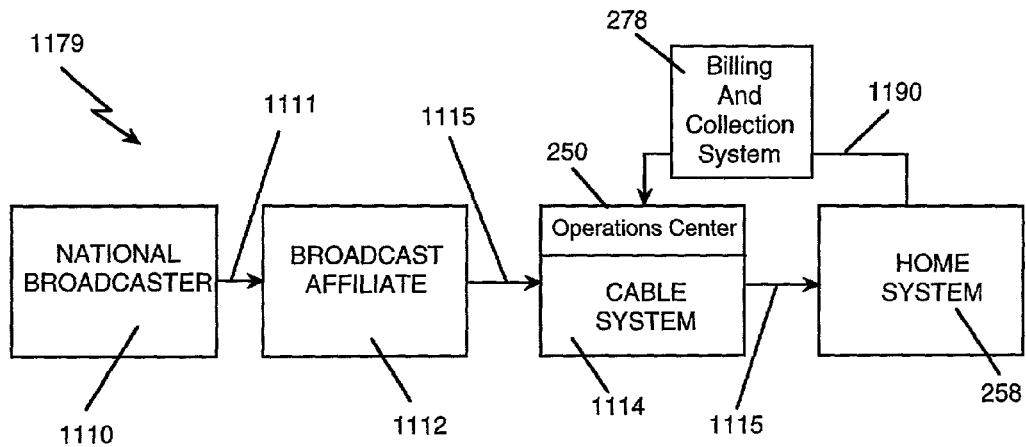
FIG. 24a-24c are examples of order systems for use in the broadcast environment of FIG. 19.
Figure 24B:
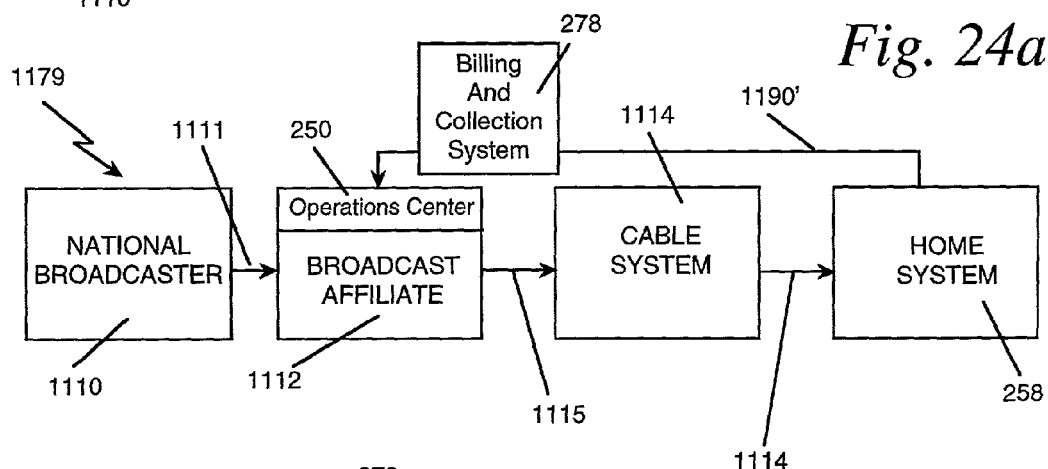
Figure 24C:
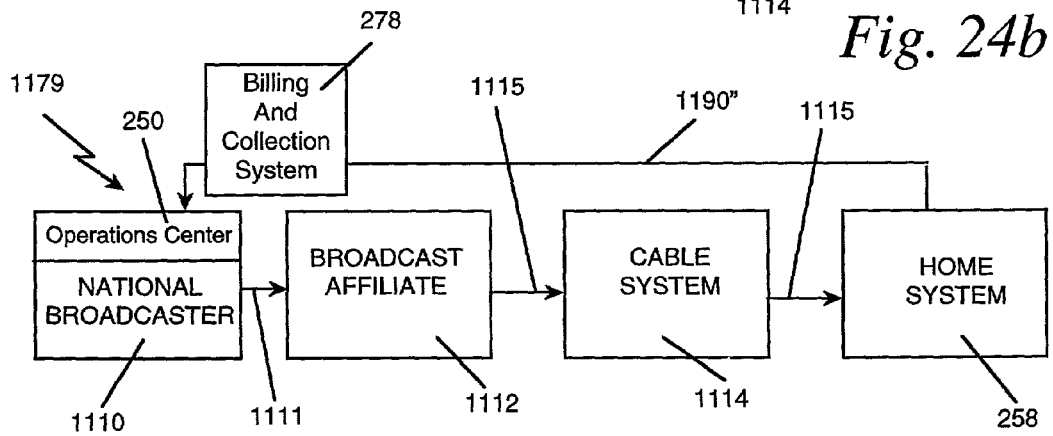

FIGS. 24*a*-24*c* show alternate arrangements of an ordering process that can be used with the programming with embedded electronic book data 1111 or 1115. In the discussion that follows, the subscriber receives the programming with embedded electronic book data 1115 from the local cable system 1114. However, the order process may also be used when the programming with embedded electronic book data 1115 is provided by the broadcast affiliate 1112 or the satellite broadcast system 1120, or from any other entity capable of providing digital broadcast programming with embedded electronic book data.

In FIGS. 24*a*-24*c*, electronic book order requests may be provided over a variety of telecommunications media including using a cable modem to the billing and collection system 278; over a proprietary two-way transmission system to the billing and collection system 278; over a fiber optic cable system to the billing and collection system 278; using a telephone modem to the billing and collection system 278, using existing telephone lines; using a cellular modem over wireless telecommunication systems; using T1 and T3 lines, Asymmetric Digital Subscriber Lines, Integrated Digital Services Network lines, and using a telephone and the POTS. Alternately, the electronic book order requests may also be provided over a LAN, such as an ethernet.

In FIG. 24a, the national broadcaster 1110 provides the programming with embedded electronic book data 1111 to the broadcast affiliate 1112. The broadcast affiliate 1112 sends the programming with embedded electronic book data 1115 to the local cable system 1114. The local cable system 1114 sends the programming with embedded electronic book data 1115 to the home system 258. To receive the requested electronic book from the programming with embedded electronic book data at the home system 258, the subscriber may initiate an order request. In the embodiment shown in FIG. 24a, the subscriber sends an order request 1190 to the billing and collection system 278, which then initiates the delivery of the requested electronic book data from the operations center 250 for inclusion in the programming.

Electronic books may also be received at the home system 258 without the subscriber providing the order request. Another subscriber may provide an electronic book for delivery to the home system 258 as a gift, for example. Electronic books also may be sent to the home system 258 on a trial, or approval basis. For example, a trial electronic book may be sent to a home system 258 on a trial basis and the trial electronic book could include a code that prevents viewing after a set, elapsed time from receipt at the home system 258. To retain viewing privileges for the trial electronic book, the subscriber could indicate a desire to purchase the trial electronic book. The operations center 250 would then return an authorization code that permits the subscriber to retain the trial electronic book on a permanent basis. Alternatively, the delivery system 200 could provide a portion of an electronic book, in an unencrypted format, such as the first chapter, and the subscriber would have to purchase the electronic book to receive the authorization code to decrypt the remainder of the electronic book.

FIG. 24b shows an alternate arrangement of the ordering process. The ordering process shown in FIG. 24b differs from that shown in FIG. 24a in that an order request 1190' is sent to the billing and collection system 278, which then initiates delivery of the electronic book data for insertion by the broadcast affiliate 1112.

FIG. 24c shows yet another arrangement of the ordering process. In FIG. 24c, an order request 1190" is sent to the billing and collection system 278, which then initiates delivery of the electronic book data for insertion by the national broadcaster 1110.

b. Operation of the Ordering System Using the Internet

In the one-way delivery environment typified by the TV program broadcast delivery environment, the use of the Internet can provide ubiquitous access to subscribers for ordering electronic books. The subscriber may log on to the Internet web site 279, using the PC 1172 of FIG. 21a, 21b, 21e, or 21f, or the television 1171' of FIG. 21c or 21d, or the home system 258 of FIG. 21g. The subscriber may then enter a subscriber identification. The Internet web site 279 may then present an individualized menu to the subscriber. The subscribers may view the individualized menu on the PC 1172, television 1171' or home system 258, for example. The individualized menu may be based on subscriber specific data, such as past electronic books ordered, for example.

When the electronic book ordering is performed on the Internet web site 279, the Internet web site 279 may also recognize the subscriber 285, based on the subscriber's automatic number identification (ANI), user name, user identification, and Internet address (i.e., REMOTE_HOST, REMOTE_ADDR, and HTTP_NAME), for example. The subscriber may also be identified by a unique subscriber identifier that is provided to the subscriber upon subscribing to a broadcast television service. Other means for identifying a subscriber include special features such as browser cookies. A browser cookie is a mechanism that allows a web site server to store limited amounts of information on a browser. The information is typically information sent to a subscriber's terminal using a Set-cookie HTTP response field header. The Set-cookie field contains the cookie content as a name/value pair, and can also contain information explaining when the cookie will no longer be valid (expires), the Internet domain for which the cookie is valid (domain), and the path portion of the URL within this domain for which the cookie is valid. Browsers that understand cookies will store the data on the set top terminal's hard disk, for example, and will return these data to the web site server from which the cookie originated within a cookie request header field. Cookies are useful for storing state information (when the subscriber last visited the web site, which resources the subscriber last used, for example) on the browser, in such a way that the information is not lost when the subscriber leaves the web site or shuts down the browser.

A web site, such as the web site 279, may use cookies to customize electronic book ordering for the subscriber. For example, the web site 279 may welcome a subscriber to the web site 279, based on the information in the cookie, and may navigate the subscriber to a menu, or individualized menu, based on previous orders provided by the subscriber. When the subscriber is identified, the web site 279 may create the individualized order menu, which the specific subscriber may download to the home system 258.

Once an order for an electronic book has been made, the billing and collection system 278 processes the order and initiates a request to the operations center 250 for the delivery of the requested electronic book for delivery over the TV program broadcast delivery system.

Figure 25:
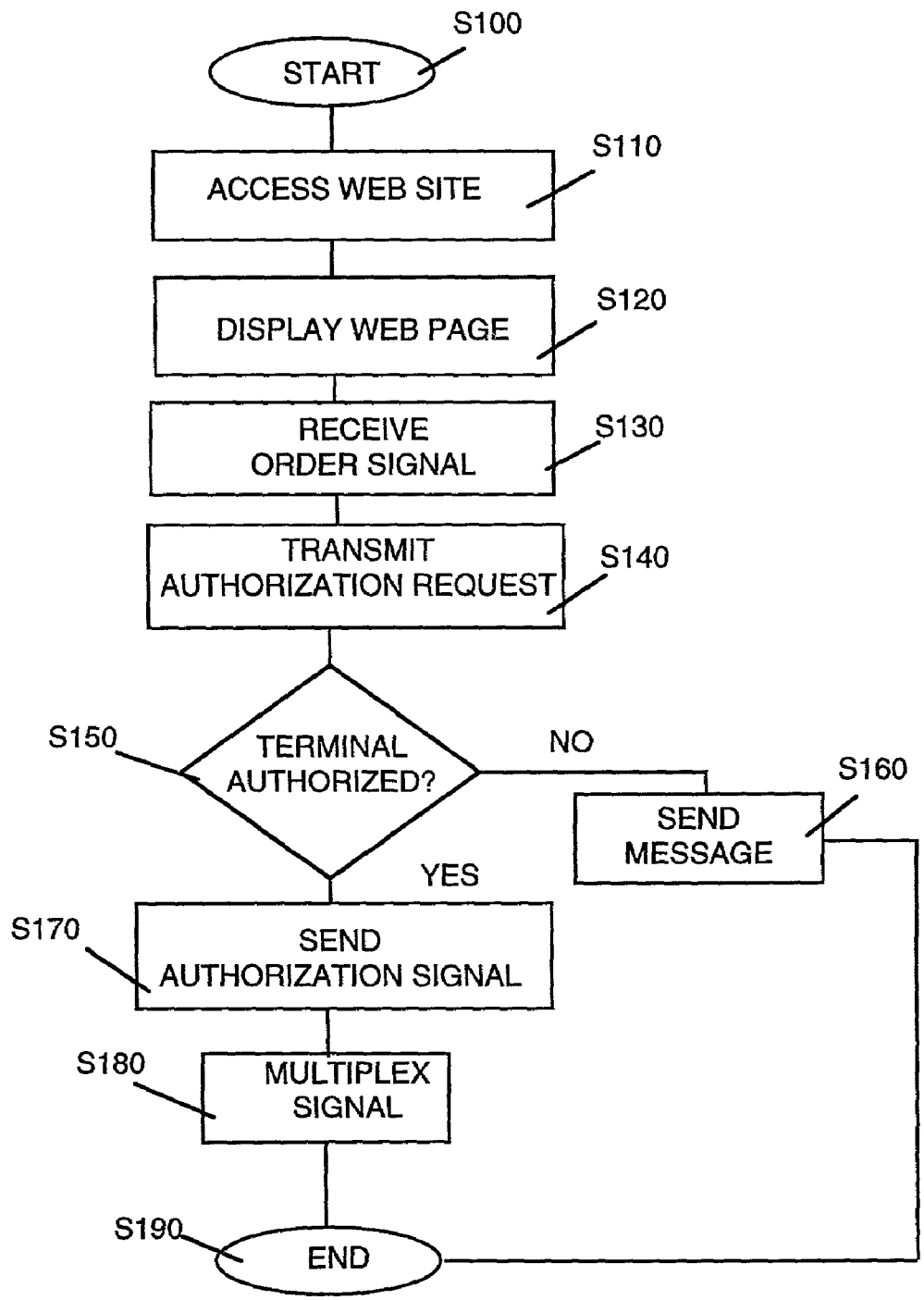
FIG. 25 is a flowchart showing steps associated with ordering over the Internet.

FIG. 25 is a flow chart of the major steps associated with ordering an electronic book using the Internet. The flow chart assumes the broadcast environment of FIG. 19.

The process begins with step S100. In step S110, the PC 1172 of FIG. 21a, 21b, 21e, or 21f, or the television 1171' of FIG. 21c or 21d, or the home system 258 accesses the web site 279. The web site 279 may be accessed by entering the address of the web site 279 into a location window of a web browser, by activating a hypertext link provided on the home system 258 menu or within an actual electronic book being viewed in the viewer 266, or by activating a hypertext link received from a different web site. The process then moves to step S120.

In step S120, a data signal showing the web site 279 home page is transmitted to the set top terminal 220, and the web site 279 home page is displayed on the requesting device. The process then moves to step S130. In step S130, the web site 279 receives the order signal 1190 for an electronic book selected by a subscriber. The order signal 1190 includes an electronic book identifier and the address and identification of the requesting home system 258. The process then moves to step S140.

In step S140, the web site 279 transmits the authorization request 1196 to the billing and collection system 278. The process then moves to step S150. In step S150, the billing and collection system 278 determines if the home system 258 from which the order signal 1190 originated is authorized to receive the selected electronic book. The billing and collection system 278 may evaluate the past credit history of the requesting subscriber. The billing and collection system 278 may determine if the subscriber's account is delinquent. If the home system 258 is not authorized to receive the selected electronic book, the process moves to step S160. Otherwise, the process moves to step S170.

In step S160, the billing and collection system 278 sends a message to the requesting home system 258 stating that the selected program cannot be accessed, along with the reason for no access. The process then moves to step S190 and ends.

In step S170, the billing and collection system 278 sends an authorization signal 1191 to the operations center 250. The process then moves to step S180. In step S180, the operations center 250 retrieves and embeds the requested electronic book data within the programming. The process then moves to step S190 and ends.

The method of ordering electronic books using the Internet is not limited to the TV program broadcast delivery embodiment. This ordering method is general in nature and may be used for ordering electronic books to be delivered using any of the delivery methods presented herein.

c. Internet Delivery Methods

Figure 26:
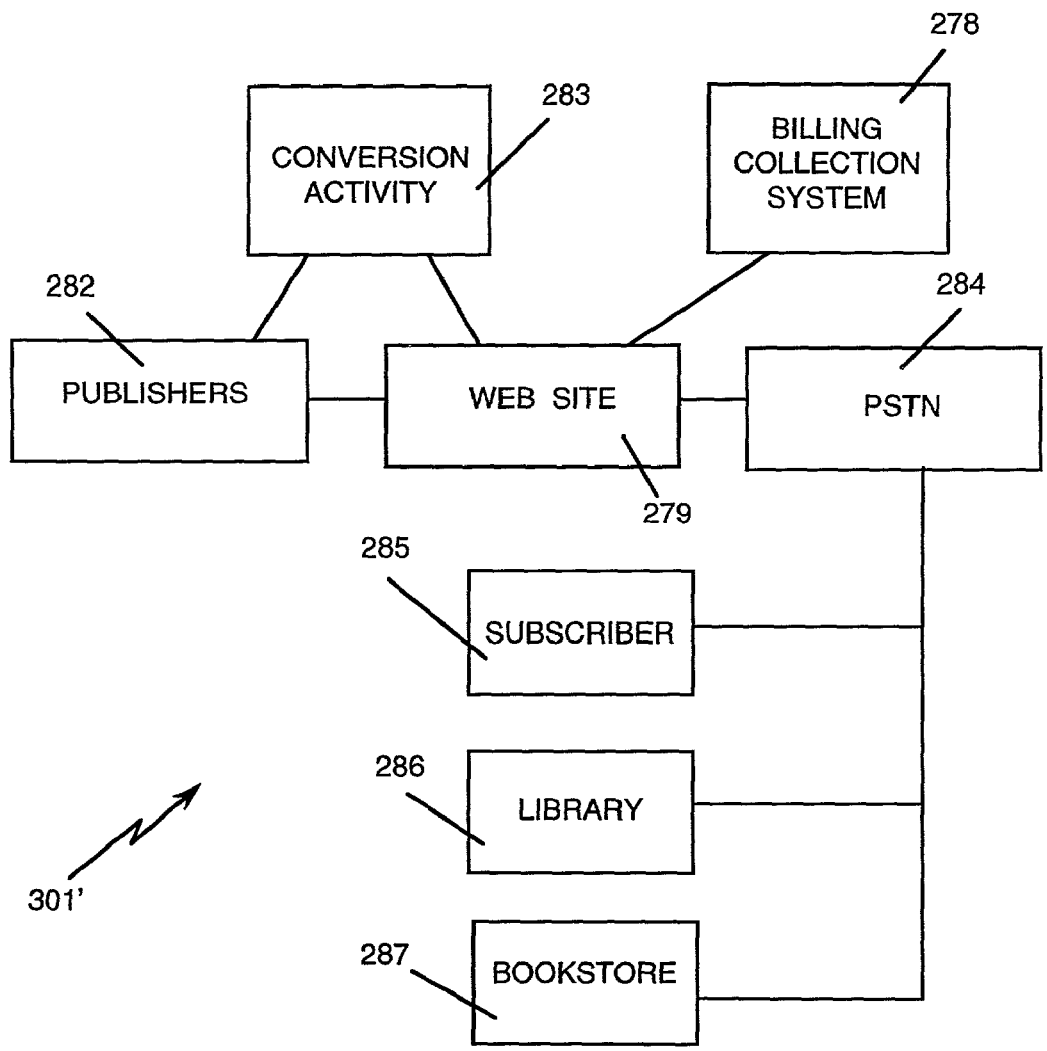
FIG. 26 is a diagram depicting components used for delivery of electronic books over the Internet.

FIG. 26 is an alternate delivery plan 301' that provides for electronic book delivery using the Internet. In FIG. 26, the publishers 282 provide the electronic books to be posted at the Internet web site 279. The publishers may convert the text and graphical data to digital format, compress the digital data, and upload the compressed digital data to the Internet web site 279. Alternately, the publishers 282 may arrange for an outside conversion activity 283 to convert the text and graphical data to digital format. The conversion activity 283 may then provide the digital data to the Internet web site 279. For example, a large on-line bookstore could gather publications in electronic form from a variety of publishers, or could convert hard-copy books to electronic form, and post the electronic books on the Internet such as at the Internet web site 279.

The electronic books may then be transferred using a public switched telephone network (PSTN), for example, or other communications systems, direct to a subscriber 285, a library 286 and a bookstore 287. The library 286 and the bookstore 287 may also provide electronic books to the subscriber 285.

When electronic books are provided by the Internet web site 279, the billing and collecting functions may be incorporated into the Internet web site 279. For example, a subscriber may pay for an electronic book selection by entering a credit card number into a data field of a page of the Internet web site 279. In this configuration, a separate billing and collection system may not be required. Alternatively, the Internet web site 279 may communicate information with the billing and collection system 278.

Electronic book delivery over the Internet may be handled using a number of methods. In a method, the electronic book may be downloaded to the requesting home system 258 immediately after the order has been processed. Alternatively, the electronic book may be e-mailed to an e-mail address that is entered as part of the ordering process. In another embodiment, as part of the ordering transaction process, the subscriber is provided with location and authorization information that allows the subscriber to retrieve the ordered electronic book at the subscriber's convenience. For delivery of subscription electronic book products, like newspapers, magazines or other periodicals, the Internet web site 279 can deliver the latest version of the product to the subscriber automatically immediately upon logon by the subscriber to the Internet web site 279. Electronic book data may also be embedded into continuous multicast streaming video, audio, or data feeds.

d. Other Delivery Methods

A number of embodiments for the delivery of electronic books have been addressed above. This subsection calls out these specific delivery embodiments, as well as presents other delivery embodiments supported by this invention. Section I presented a description of the operations center 250 and the uplink 254 used to transmit the electronic book data over the video distribution system 208, using the use of an encoder 204. The embodiments presented below use a modular encoder 2541, which inserts the electronic book text into the delivered signal and modular transmission subsystem 2542, which transmits the actual signal. Together, the modular encoder 2541 and modular transmission subsystem 2542 support the transmission functionality for each unique delivery method embodiment. Section II presented a video connector 212 used to convert the electronic book data embedded in the video signal to a format usable by the home subsystem. The embodiments presented below use a modular connector 700 that receives the delivered signal with embedded electronic book data, extracts the electronic book data, and provides the electronic book data to the digital logic 609 for further processing. The modular connector 700 supports the receive functionality for each unique delivery method embodiment.

Figure 27:
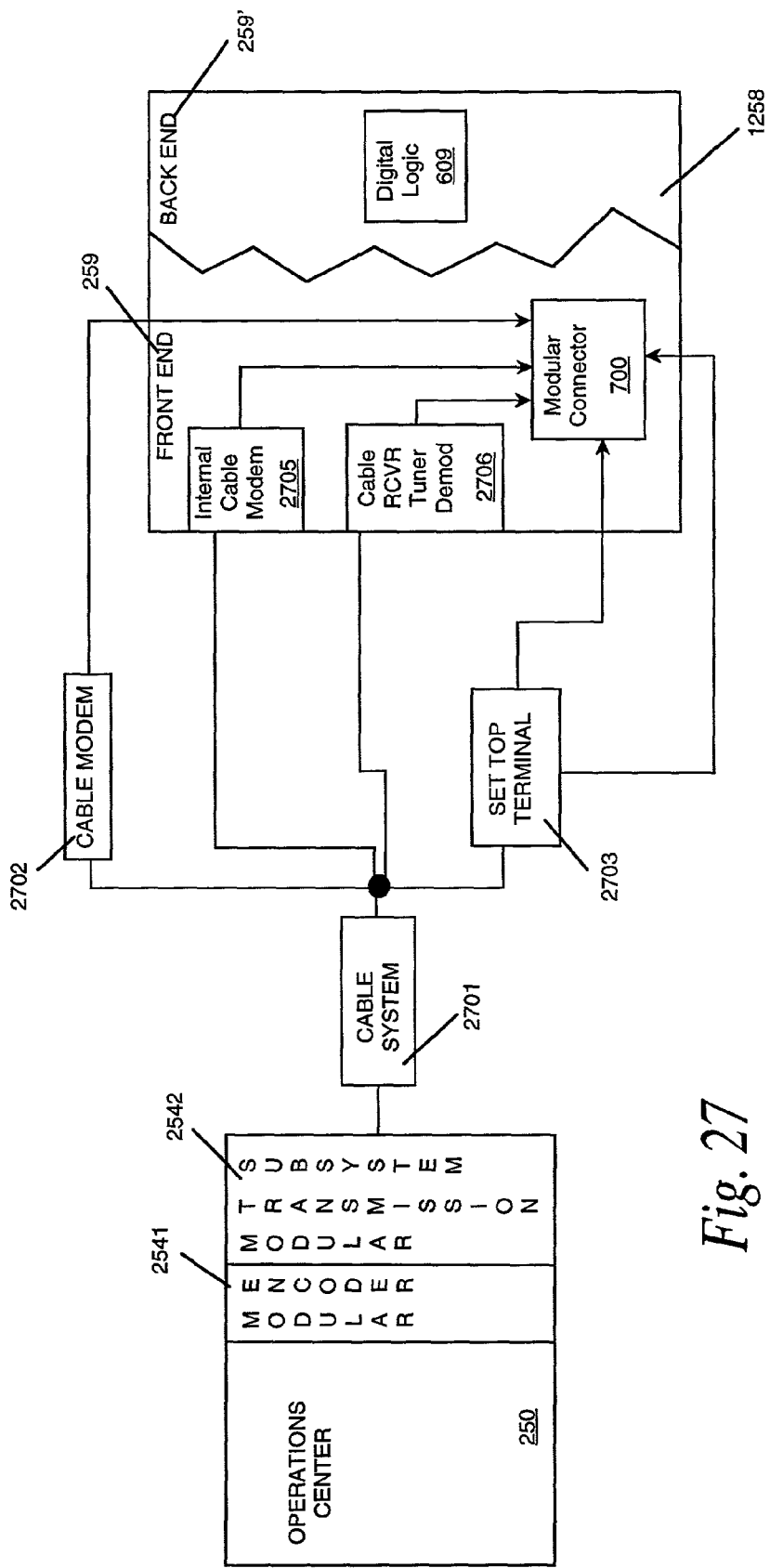
FIG. 27 presents embodiments for delivery of electronic books using a cable system.

FIG. 27 presents embodiments associated with the delivery of electronic books over a coaxial or fiber cable system 2701 to a home system 1258. Electronic book data is encoded for delivery by the modular encoder 2541, which is identical to the encoder 174 in FIG. 1*b* and formatted and transmitted by the modular transmission subsystem 2542, which is identical to the uplink 254 in FIG. 4. The signal is delivered over the cable system 2701. This signal may provide for the dedicated or non-dedicated delivery of electronic book data. This signal may also provide for ordering access from the home system 1258 to the billing and collection system 278 or operations center 250, or the signal may be a means to provide access to the Internet or other public network through which electronic books are ordered and delivered. The cable system 2701 may be a coaxial cable network, totally fiber network, hybrid fiber coax network, fiber to the curb network, or any other cable distribution technology. The signal over the cable system may be generated by a cable modem; in which an external cable modem 2702 is used to receive the signal and provide the embedded electronic book data to the home system 1258 modular connector 700 for processing. Alternatively, the home system 1258 may contain an internal cable modem 2705 which receives the signal and provides the electronic book data to the modular connector 700 for processing. In each embodiment, the modular connector 700 provides the embedded electronic book data to the digital logic 609 for further processing.

In another embodiment, the signal delivered over the cable system is a video signal. In one embodiment, the video signal is an analog video signal. In another embodiment, the video signal is a digital video signal. The home system 1258 may contain an internal cable receiver/tuner/demodulator 2706 to process the signal, and provide the embedded electronic book data to the modular connector 700, which is identical in the embodiment as video connector 212 in FIG. 2. A set top terminal 2703, or other device capable of receiving a cable video signal, such as a cable ready TV, or PC with cable tuner (not shown), may process the video signal and deliver the video signal to the connector 700 in the home system 1258 which extracts the embedded electronic book data. Alternately, the set top terminal 2703, or other such device, may extract the embedded electronic book data from the video signal and provide the electronic book data to the modular connector 700 in the home system 1258.

In another embodiment, electronic book data may be embedded within the audio signal, requiring an appropriate audio-capable modular connector 700 in the home system 1258 to extract the electronic book data from the audio signal for processing by the digital logic 609. In one embodiment, the audio signal is an analog audio signal. In another embodiment, the audio signal is a digital audio signal.

In yet another embodiment, the signal is a spread spectrum signal containing a digital data stream, requiring an appropriate spread spectrum receiver and modular connector 700 in the home system 1258 to extract the electronic book data for processing by the digital logic 609. In this embodiment, the spread spectrum signal is transmitted in the same bandwidth as the video or audio signal, but below the noise level.

Figure 28:
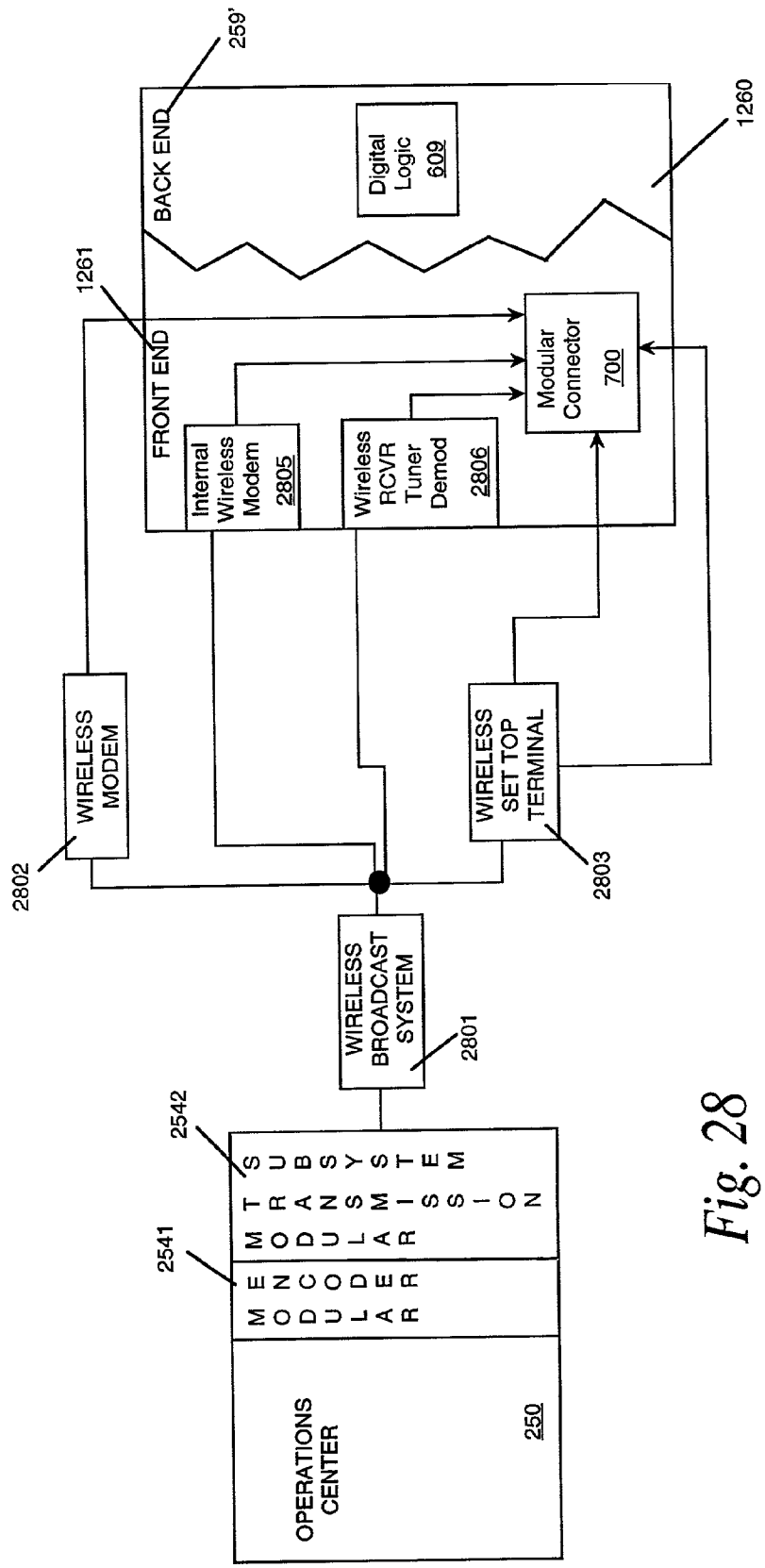
FIG. 28 presents embodiments for delivery of electronic books using a wireless broadcast system.

FIG. 28 presents embodiments associated with the delivery of electronic books over a wireless broadcast system 2801 to a home system 1260. Electronic book data is encoded for delivery by the modular encoder 2541 and formatted and transmitted by the modular transmission subsystem 2542. The signal is delivered over the wireless broadcast system 2801. This signal may provide for the dedicated or non-dedicated delivery of electronic book data. This signal may also provide for ordering access from the home system 1260 to the billing and collection system 278 or operations center 250, or the signal may be a means to provide access to the Internet or other public network through which electronic books are ordered and electronic book data is delivered. The wireless broadcast system may be a microwave multipoint delivery system (MMDS), local multipoint distribution system (LMDS), Instructional Television Fixed Service (ITFS) system, or any other wireless data, video, or telephony broadcast system, including point-to-point and point-to-multipoint microwave broadcast systems like those provided by Teligent, Winstar digital wireless network, and ATT's wireless system. The signal over the wireless broadcast system may be generated by a wireless modem, in which an external wireless modem 2802 is used to receive the signal and provide the embedded electronic book data to the home system 1260 modular connector 700 for processing. Alternatively, the home system 1260 may contain an internal wireless modem 2805, which receives the signal and provides the electronic book data to the home system 1260 modular connector 700 for processing. In each embodiment, the modular connector 700 provides the embedded electronic book data to the digital logic 609 for further processing.

In another embodiment, the signal delivered over the wireless broadcast system is a video signal. In one embodiment, the video signal is an analog video signal. In another embodiment, the video signal is a digital video signal. The home subsystem 1260 may contain an internal wireless receiver/tuner/demodulator 2806 to process the signal, and provide the embedded electronic book data to the modular connector 700. A wireless set-top terminal 2803, or other device capable of receiving a wireless video signal, such as a TV, or PC with a wireless receiver and tuner, may process the video signal and deliver the video signal to the modular connector 700 in the home system 1260, which extracts the embedded electronic book data. Alternately, the set top terminal 2803, or other such device, may extract the embedded electronic book data from the video signal and provide the data to the modular connector 700 in the home system 1260.

In another embodiment, electronic book data may be embedded within the audio signal, requiring an appropriate audio-capable modular connector 700 in the home system 1260 to extract the electronic book data from the audio signal for processing by the digital logic 609. In one embodiment, the audio signal is an analog audio signal. In another embodiment, the audio signal is a digital audio signal.

In yet another embodiment, the signal is a spread spectrum signal containing a digital data stream, requiring an appropriate spread spectrum receiver modular connector 700 in the home system 1260 to extract the electronic book data for processing by the digital logic 609. In this embodiment, the spread spectrum signal is transmitted in the same bandwidth as the video or audio signal, but below the noise level.

Figure 29:
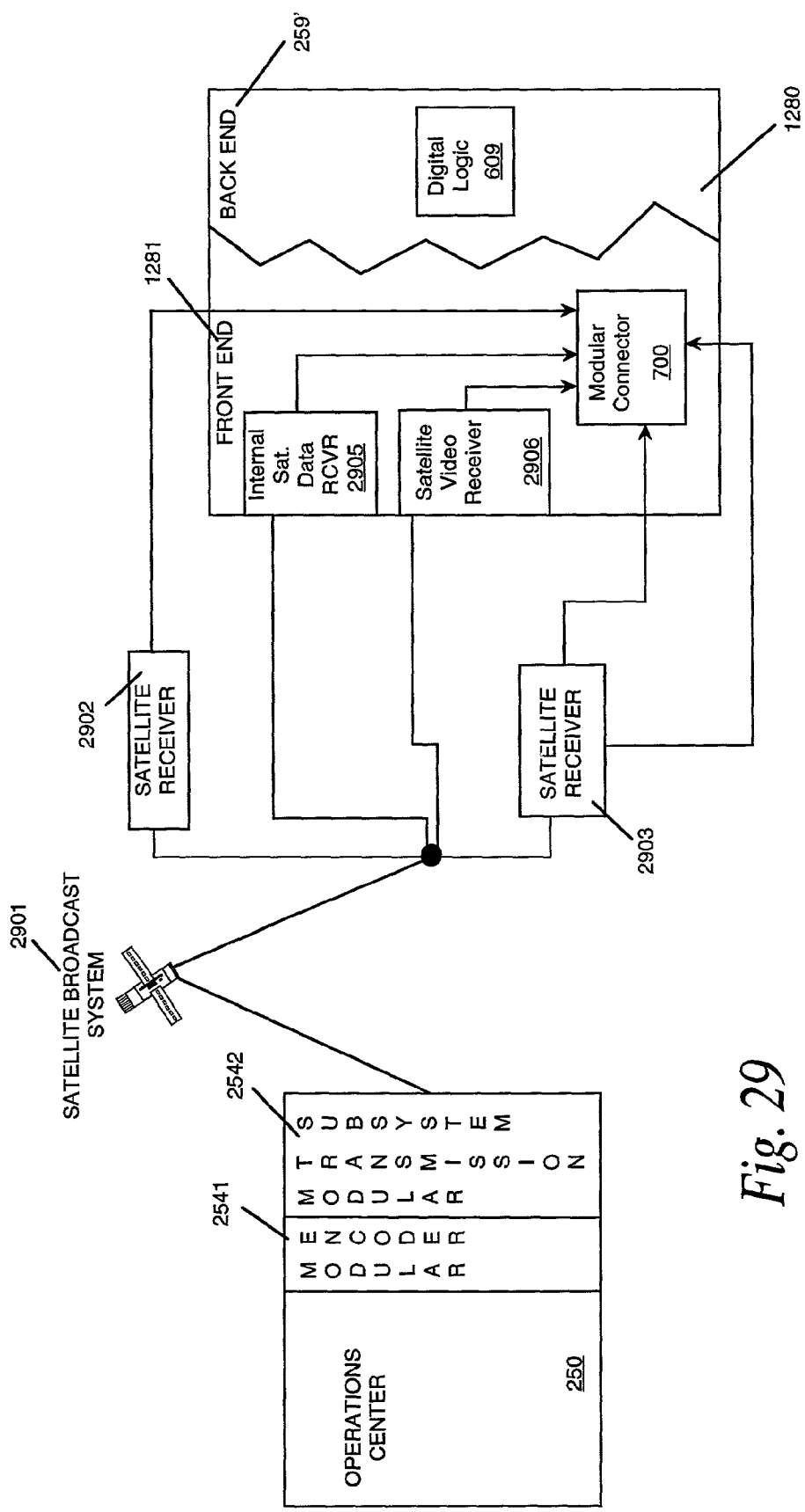
FIG. 29 presents embodiments for delivery of electronic books using a satellite broadcast system.

FIG. 29 presents embodiments associated with the delivery of electronic books over a satellite broadcast system 2901 to a home system 1280. Electronic book data is encoded for delivery by the modular encoder 2541 and formatted and transmitted by the modular transmission subsystem 2542. The signal is delivered over the satellite broadcast system 2901. This signal may provide for the dedicated or non-dedicated delivery of electronic book data. This signal may also provide for ordering access from the home system 1280 to the billing and collection system 278 or operations center 250, or the signal may be a means to provide access to the Internet or other public network through which electronic books are ordered and electronic book data is delivered. The satellite broadcast system 2901 can be a direct broadcast system like DirecTV and EchoStar, a direct to home satellite broadcast system, video network distribution broadcast system, a point-to-point or point-to-multipoint data VSAT system, a digital audio broadcast system like WorldSpace, CD Radio, or XM, or a mobile data and telephony satellite broadcast system like Iridium, Teledesic, or Globalstar. Alternatively, the satellite broadcast system can consist of regionalized broadcast services or store and forward communication services hosted on high flying balloons or on airplanes that provide communication repeater services to an small geographic region. The signal over the satellite broadcast system may be generated by a satellite data modem, in which an external satellite data receiver 2902 is used to receive the signal and provide the embedded electronic book data to the home system 1280 modular connector 700 for processing. Alternatively, the home system 1280 may contain an internal satellite receiver 2905 which receives the signal and provides the electronic book data to the home system 1280 modular connector 700 for processing. In each embodiment, the modular connector 700 provides the embedded electronic book data to the digital logic 609 for further processing.

In another embodiment, the signal delivered over the satellite broadcast system is a video signal. In one embodiment, the video signal is an analog video signal. In another embodiment, the video signal is a digital video signal. The home system 1280 may contain an internal satellite video receiver 2906 to process the signal, and provide the embedded electronic book data to the modular connector 700. A satellite receiver 2903, or other device capable of receiving a satellite video signal, such as a TV, or PC with satellite receiver, may process the video signal and deliver the video signal to the modular connector 700 in the home system 1280, which extracts the embedded electronic book data. Alternately, the satellite receiver 2903, or other such device, may extract the embedded electronic book data from the video signal and provide the data to the modular connector in the home system 258.

In another embodiment, electronic book data may be embedded within the audio signal, requiring an appropriate audio-capable modular connector 700 in the home system 1280 to extract the electronic book data from the audio signal for processing by the digital logic 609. In one embodiment, the audio signal is an analog audio signal. In another embodiment, the audio signal is a digital audio signal.

In yet another embodiment, the signal is a spread spectrum signal containing a digital data stream, requiring an appropriate spread spectrum receiver modular connector 700 in the home system 1280 to extract the electronic book data for processing by the digital logic 609. In this embodiment, the spread spectrum signal is transmitted in the same bandwidth as the video or audio signal, but below the noise level.

Figure 30:
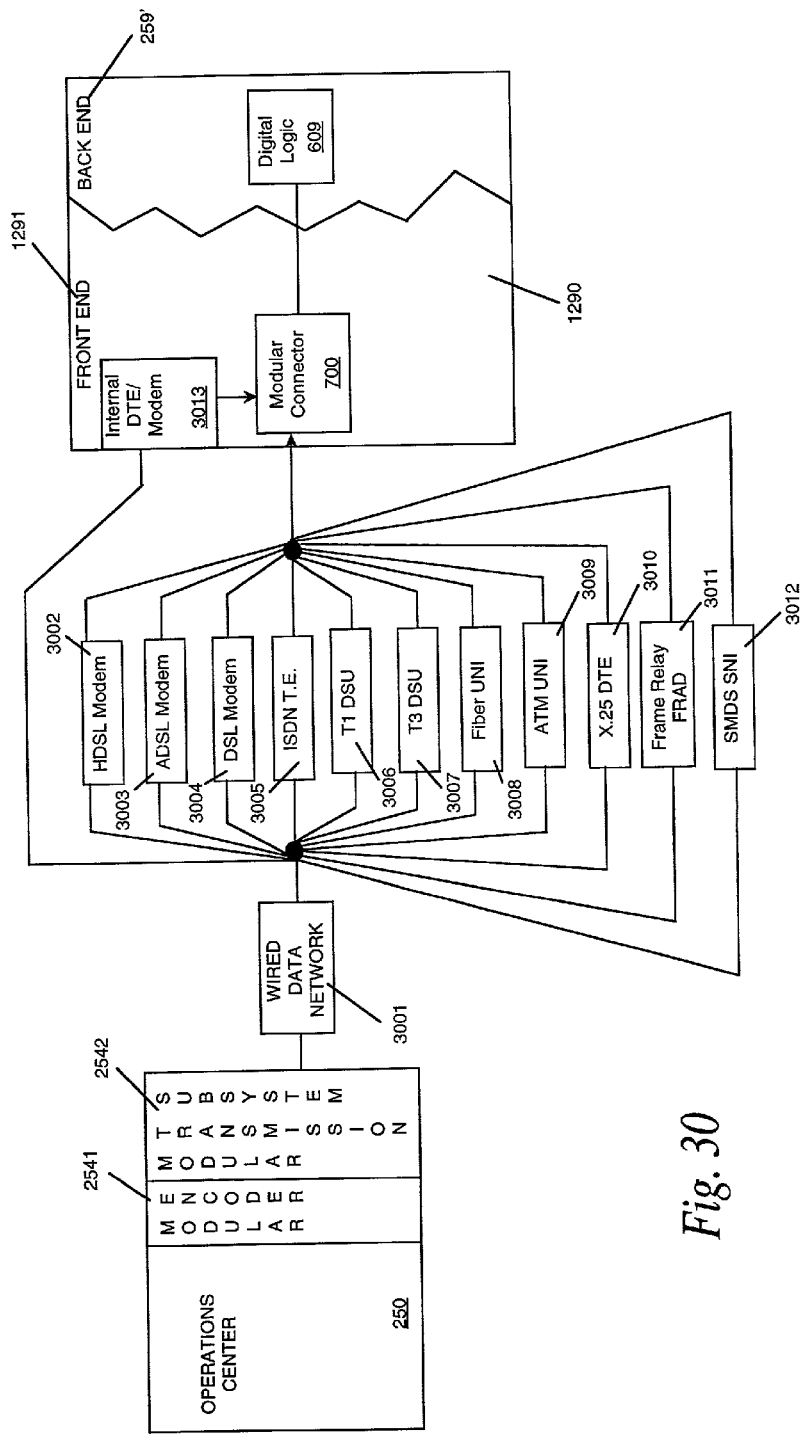
FIG. 30 presents embodiments for delivery of electronic books using a wired data network.

FIG. 30 presents embodiments associated with the delivery of electronic books over a wired data network 3001 to a home system 1290. Electronic book data is encoded for delivery by the modular encoder 2541 and formatted and transmitted by the modular transmission subsystem 2542. The signal is delivered over the wired data network 3001. This signal may provide for the dedicated or non-dedicated delivery of electronic book data. This signal may also provide for ordering access from the home system 1290 to the billing and collection system 278 or operations center 250, or the signal may be a means to provide access to the Internet or other public network through which electronic books are ordered and electronic book data is delivered. The wired data network 3001 can be metallic wire or fiber, supporting any of a number of communication standards including HDSL, ADSL, DSL, ISDN, T1, T3, SONET, ATM, X.25, frame relay, Switched MultiMegabit Data Service (SMDS), or others. The signal sent over the wired data network may be generated by a data modem or transmission device, in which the appropriate modem, interface device, or Data Terminating Equipment (DTE) device is used to receive the signal and provide the embedded electronic book data to the home system 1290 modular connector 700 for processing. Embodiments of such receiving devices are shown in FIG. 30 as HDSL modem 3002, ADSL modem 3003, DSL modem 3003, ISDN Terminal equipment (TE) device 3005, T1 Digital service unit (DSU) 3006, T3 DSU 3007, Fiber user network interface device (UNI) 3008, ATM UNI 3009, X.25 DTE 3010, Frame relay assembler/disassembler (FRAD) 3011, and SMDS subscriber network interface device (SNI) 3012. Alternatively, the home system 1290 may contain an internal modem or DTE 3013, which receives one or more signal types and provides the received signal with embedded electronic book data to the home system 1290 modular connector 700 for processing. Finally, the home system 1290 may be attached to a wired LAN using a transceiver. In this embodiment, electronic book data may be delivered over the LAN at any time. One example of how this embodiment may be used is in a university environment where each student has an electronic book home subsystem attached to the LAN. Professors can then deliver textbooks and assignments to selective students. In each embodiment, the modular connector 700 provides the embedded electronic book data to the digital logic 609 for further processing.

Figure 31:
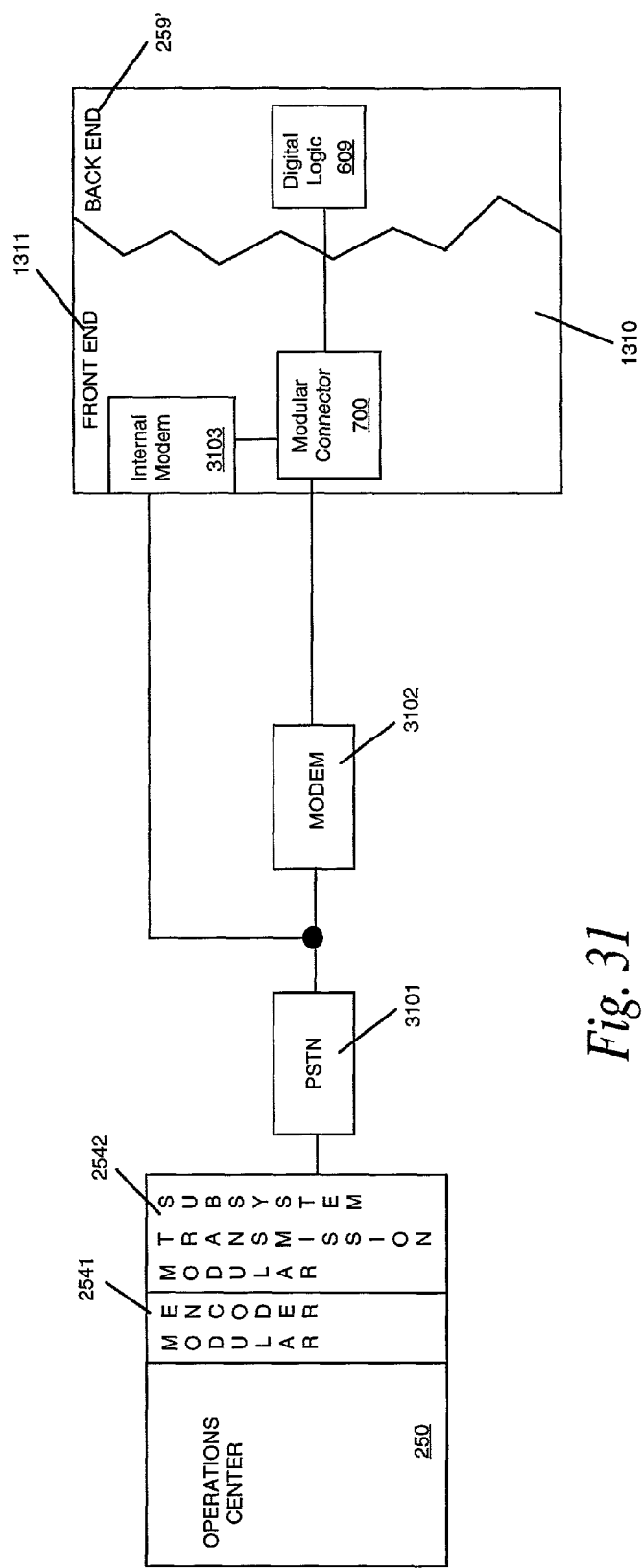
FIG. 31 presents embodiments for delivery of electronic books using the PSTN.

FIG. 31 presents embodiments associated with the delivery of electronic books using the public switched telephone network (PSTN) 3101 to a home system 1310. Electronic book data is encoded for delivery by the modular encoder 2541 and formatted and transmitted by the modular transmission subsystem 2542. The signal is delivered over the PSTN 3101. This signal may provide for ordering access from the home system 1310 to the billing and collection system 278 or operations center 250, or the signal may be a means to provide access to the Internet or other public network through which electronic books are ordered and electronic book data is delivered. The signal sent over the PSTN may be generated by a data modem or transmission device, in which the appropriate modem 3102 is used to receive the signal and provide the embedded electronic book data to the home system 1310 modular connector 700 for processing. Alternatively, the home system 1310 may contain an internal modem 3103, which receives the signal and provides the received signal with embedded electronic book data to the home system 1310 modular connector 700 for processing. In each embodiment, the modular connector 700 provides the embedded electronic book data to the digital logic 609 for further processing.

Figure 32:
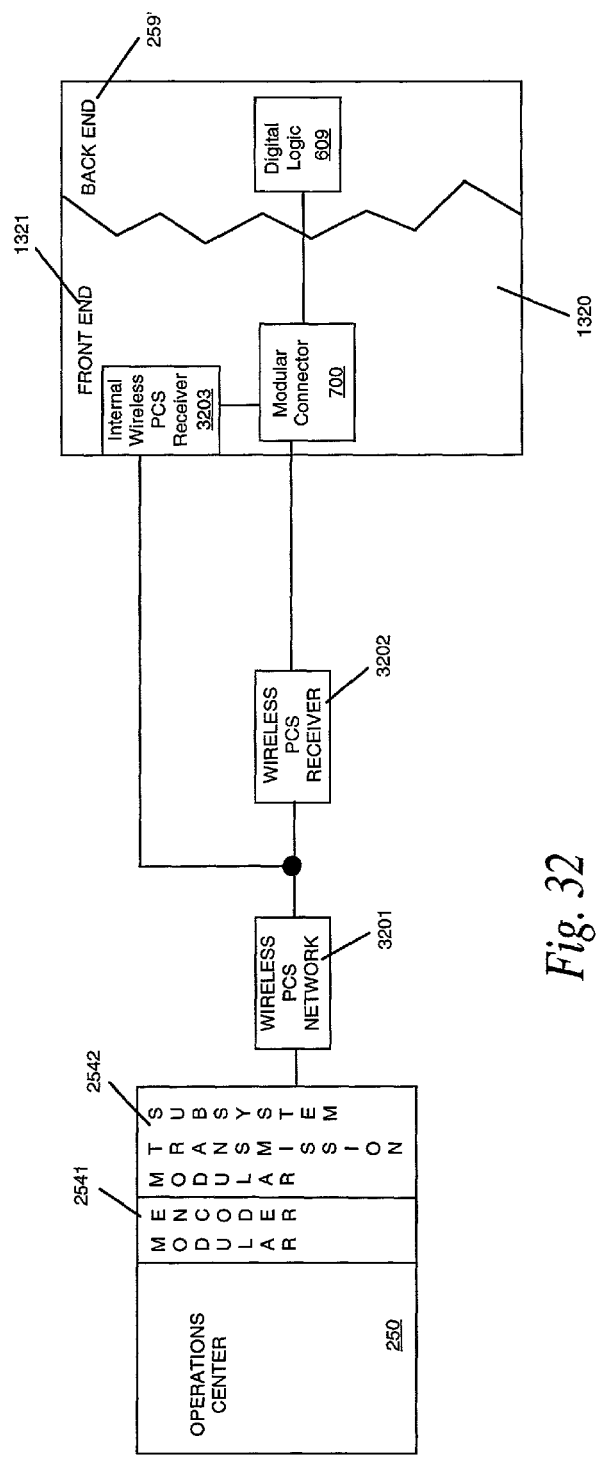
FIG. 32 presents embodiments for delivery of electronic books using a wireless PCS network.

FIG. 32 presents embodiments associated with the delivery of electronic books using wireless personal communications system (PCS) 3201 to a home system 1310. Electronic book data is encoded for delivery by the modular encoder 2541 and formatted and transmitted by the modular transmission subsystem 2542. The signal is then delivered over the PCS network 3201. The wireless PCS system may be, for example, a wireless LAN, digital cellular telephony network, analog cellular telephony network, digital cellular radio system, analog cellular radio system, digital pager network, analog pager network, or Personal Communication Network (PCN). This signal may provide for the dedicated or non-dedicated delivery of electronic book data. This signal may also provide for ordering access from the home system 1320 to the billing and collection system 278 or operations center 250, or the signal may be a means to provide access to the Internet or other public network through which electronic books are ordered and electronic book data is delivered. A wireless PCS receiver 3202 is used to receive the signal and provide the embedded electronic book data to the home system 1320 modular connector 700 for processing. Alternatively, the home system 258 may contain an internal wireless PCS receiver 3203 which receives the signal and provides the received signal with embedded electronic book data to the home system 1320 modular connector 700 for processing. In each embodiment, the modular connector 700 provides the embedded electronic book data to the digital logic 609 for further processing.

Returning to FIG. 19, several embodiments are shown associated with the delivery of electronic books using a national or local television broadcaster's signal. The signal from the national broadcaster 1110 can be delivered to the home subsystem 258', 285", or 258''' using a satellite system 1122, using a broadcast affiliate 1112 terrestrially, or using a local cable system 1114. Alternatively, the local television broadcast affiliate 1112 can originate the signal which can be delivered to the home system 258', 258" or 258''' terrestrially, or using a local cable system 1114. In one embodiment, the video signal is an analog video signal and the electronic book data is embedded in the video signal. In another embodiment, the video signal is a digital video signal and the electronic book data is carried as an independent data stream. In another embodiment, electronic book data may be embedded within the audio signal. In one embodiment, the audio signal is an analog audio signal. In another embodiment, the audio signal is a digital audio signal.

In yet another embodiment, the signal is a spread spectrum signal containing a digital data stream, requiring an appropriate spread spectrum receiver modular connector, such as the connector 700 of FIG. 32, in the home system 258', 258" or 258''' to extract the electronic book data for processing by the digital logic 609. In this embodiment, the spread spectrum signal is transmitted in the same bandwidth as the video or audio signal, but below the noise level.

Alternatively, several embodiments are associated with the delivery of electronic books using a national or local radio broadcaster's signal. The signal from the national radio broadcaster can be delivered to the home system 258', 258" or 258''' using the =satellite system 1122, or using a broadcast affiliate 1122. Alternatively, the radio broadcast affiliate 1122 can originate the signal, which can be delivered to the home system 258', 258" or 258''', terrestrially. In one embodiment, the audio signal is an analog audio signal and the electronic book data is embedded in the audio signal. In another embodiment, the audio signal is a digital audio signal and the electronic book data is carried as an independent data stream. In yet another embodiment, the electronic book data is embedded in a sub-carrier of the analog audio broadcast. In a final embodiment, the signal is a spread spectrum signal containing a digital data stream, requiring an appropriate spread spectrum receiver modular connector 700 in the home system 258', 258", or 258''' to extract the electronic book data for processing by the digital logic 609. In this embodiment, the spread spectrum signal is transmitted in the same bandwidth as the audio signal, but below the noise level.

In any of the delivery methods above, the delivery path may be used to establish connectivity to the Internet, allowing Internet delivery of electronic book data as presented early in this section.

In an alternative delivery embodiment, the electronic book system can be modified, as was presented in FIG. 15 and discussed above, to be used at public libraries, schools, bookstores, newspaper stands or stand-alone kiosks, for example. Public newsstands for electronic books and periodicals may be conveniently located, such at the corner store on a New York City street corner, at an airport, or even on an airplane. The main unit at the public library, school, bookstore, newsstand, or kiosk may be the file server 900 as shown in FIG. 15. The file server 900 is a large electronic memory unit that can store thousands of books, newspapers, or periodicals. Various electronic storage means may be used in the file servers, such as hard disks, read-write CD ROMs and read-only CD ROMs. The controller 908 in FIG. 15 is able to download books to public viewers 912. The bookstores or libraries can rent the public viewer 912 to customers with the text for one or two books loaded onto the public viewer 912. Alternatively, the customer may own the viewer. The customer returns to the file server 900 from time to time to receive textual data for a book, which the customer can read and delete or store permanently on the customer's own home system 258. Based on the specific information known about a customer, advertisements contained in the electronic books may be customized, creating a unique version of the downloaded newspaper, magazine, or book for each customer.

Electronic book data also may be delivered as content stored on physical devices like a floppy disk, magnetic tape, Smart Card device, Memory Stick device, or any other portable memory storage device and provided to a subscriber for transfer to the home system 258. Each electronic book memory storage device can contain a unique identifier, one or more electronic book files, and associated viewing authorization information. Viewing of any electronic book file from the memory device may be supported without restriction. Alternatively, some or all electronic book files on the memory device may be available for limited viewing or may require authorization from the billing and collection system 278 prior to being viewed. In this case, the home system 258 may contact the billing and collection system 278 for authorization prior to viewing.

Figure 33:
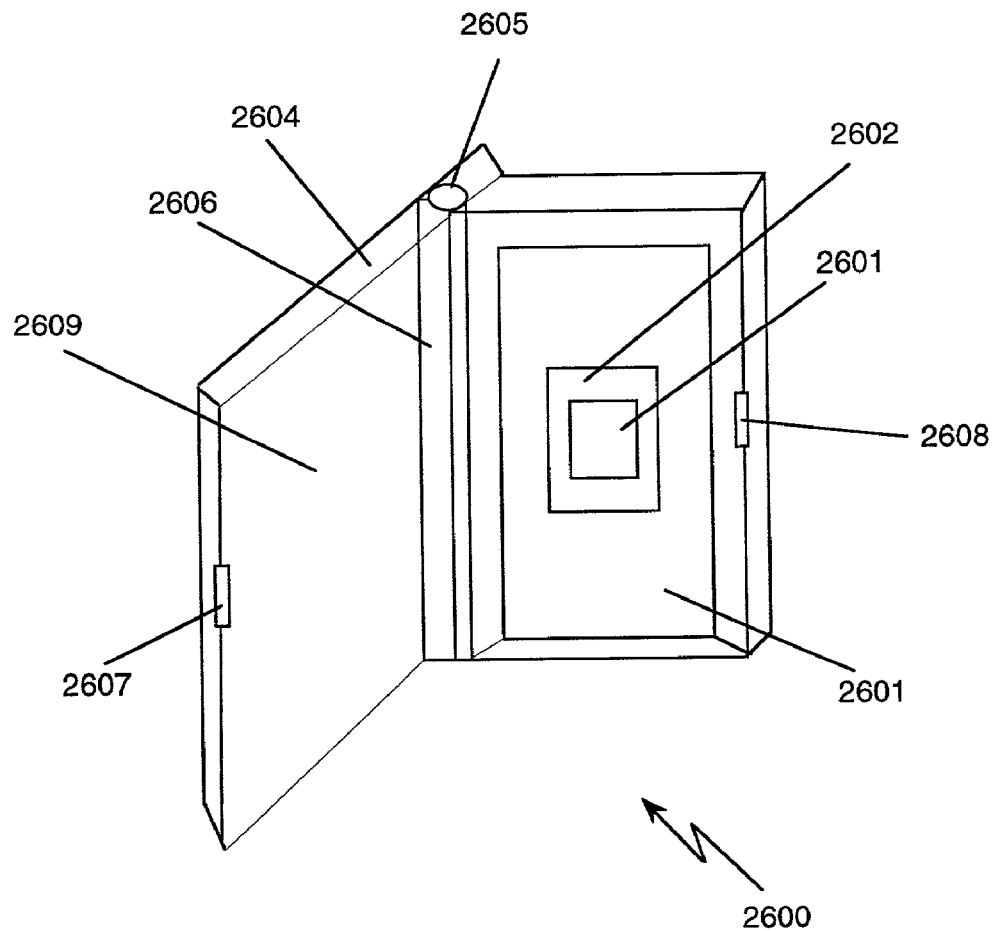
FIG. 33 shows a storage device that stores a portable storage medium containing an electronic book.

When the electronic book is delivered on a portable storage medium, such as the Smart Card device or the Memory Stick device, the electronic book and its storage medium may be packaged in a manner that protects the storage device, and also provides a simulation of an actual book. FIG. 33 is an example of a storage device 2600 that stores an electronic book portable storage medium. A Smart Card 2601 is held in place in a recess 2602 in a back panel 2603 of the storage device 2600. A front panel 2604 is attached to the back panel 2603 by a hinge 2605 that is placed at a back spine 2606 of the storage device 2600. The front panel 2604 may be operated to close over the back panel 2603 to completely cover the storage medium 2601. The front panel 2604 may incorporate a clasp, or similar locking device, that engages a corresponding detent 2608 in the back panel 2603 so as to securely close the storage device 2600.

The front panel 2604 of the storage device 2600 may include a cover 2609 that replicates a front cover, or dust jacket of a hard copy book corresponding to the electronic book. Similarly, the back panel 2603 may include a display similar to that existing on a back cover, or dust jacket of the corresponding hard copy book. A cover such as the cover 2609 may be a piece of paper or similar material that is inserted into the front panel 2604, for example. Alternately, the cover 2609 may be a permanently fixed replication of the front cover of the corresponding hard copy book. The resulting storage device 2600 may thus emulate the corresponding hard copy book, and may be stored on an actual bookshelf, or other storage area, in the same manner as the corresponding hard copy book.

Figure 34:
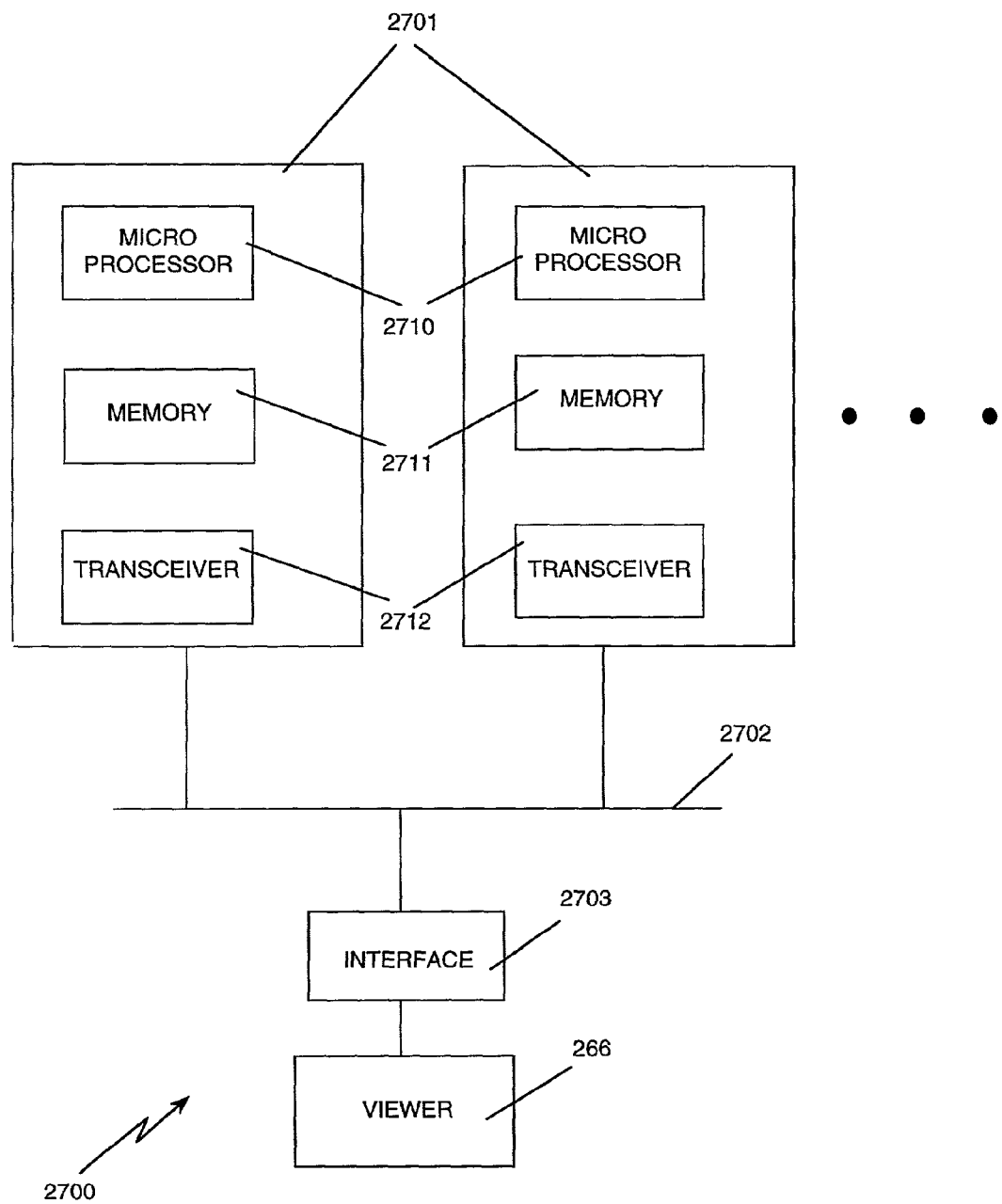
FIG. 34 is a block diagram of an alternate system for requesting and delivering electronic books.

Electronic book data may also be delivered from a machine or other device to the home system 258. FIG. 34 shows a system 2700 of machines 2701 that are coupled by a communications network 2702. The communications network 2702 may be any wired or wireless system previously described herein. The communications network 2702 may also be an electrical distribution system, such as a home wiring system that is rated at 110 and 220 volts, for example. The system 2700 may include an interface 2703 through which the viewer 266 communicates with the machines 2701. For example, the interface 2703 may be a plug-in device that may be inserted into a 110-volt wall socket. Such a device 2703 may include a wired or wireless interface to the viewer 266.

The machines 2701 may include a microprocessor 2710, a memory 2711, and a transceiver 2712, which may be incorporated in VLSI, for example. Included in the memory 2711 may be one or more electronic books that may be downloaded to the viewer 266, or otherwise viewed by the viewer 266 using the interface 2703. For example, a home appliance could include in its memory, an electronic technical manual related to the home appliance. To access the electronic technical manual, the viewer 266, through the interface 2703, may transmit a code or similar "handshake" to cause the microprocessor 2710 to transmit the electronic technical manual, using the transceiver 2712, to the viewer 266.

The electronic book system 200 may also incorporate a book preview mechanism. Such a preview mechanism may provide the look and feel of browsing through a selection of books or magazines in a bookstore. Thus, the subscriber may browse electronic books, electronic magazines, and electronic newspapers, for example, before purchasing the electronic books, newspapers or magazines. Electronic book previews were previously described with respect to FIGS. 14*i* and 14*j*. Such electronic book previews may be provided as an on-line service, an off-line service, or both.

The on-line electronic book preview mechanism may use an Internet web site, such as the web site 279, to display electronic book previews. To obtain an electronic book preview, the subscriber may communicate with, or access, the web site 279 using the viewer 266, or one of the other devices shown in FIGS. 21*a*-21*g* including the set top terminal 1220, the personal computer 1172 and the television 1171, for example. Once in communication with the Internet web site 279, the subscriber may select an electronic book preview to view from a list or menu, such as the menu 866 shown in FIG. 13, for example, of available electronic book previews. The selected electronic book preview may then be displayed on a web page of the Internet web site 279, and may be viewed on the viewer, 266, the television 1171 or the personal computer 1172, for example.

Other on-line sites may be used to display electronic book previews. In general, any addressable node, such as an e-mail address, for example, in a telecommunications network may be used as a display site for electronic book previews.

The electronic book previews may also be provided off-line, to be downloaded to the home system 258, for example. The subscriber may access the Internet web site 279 and download an electronic file that includes the electronic book preview. The electronic book preview may be stored in the library or the viewer, for example. The subscriber may then view the electronic book preview using the viewer 266, the television 1171, or the personal computer 1172, for example.

When the electronic book previews are provided for downloading to the home system 258, the electronic book previews may be provided in encrypted format or in unencrypted format.

The delivery methods discussed above that allow for dedicated, full time delivery can be used to provide continuous distribution of electronic book data including requested electronic books from subscribers, electronic books to be broadcast to all subscribers, updated menu contents, and updated advertising. For the delivery methods discussed above that allow for non-dedicated or user established connectivity, the operations center 250 may manage the timing and delivery of content by delivering the electronic book only when requested, or periodically, to ensure delivery for those home systems that may not be able to receive the delivery. Finally, the delivery methods discussed above that are capable of two-way communication may be used to provide a return path to the operations center 250 or billing and collection system 278 for the purpose of ordering or requesting updated electronic book information.

Additionally, although the home system 258 is presented as an independent device that directly interfaces with the delivery system 200, the home system 258 may connect to the delivery system 200 through a set top terminal, TV, PC, radio, or any other device capable of receiving the signal provided by the delivery system 200. Additionally, the home system 258 may not be an independent apparatus, having some or all of its functionality supported within the set top terminal, TV, PC, radio, or any other device capable of receiving the signal provided by the delivery system. e.

f. Alternative Ordering Methods

Any of the delivery methods described in the section above are viable embodiments for providing access from the home system 258 to the billing and collection system 278 or operations center 250. In an embodiment, the modular connector 701, as shown in FIGS. 6b and 8, may be used to provide the specific protocol formatting and transmission processing to allow the home system 258 to use the communication path. In the embodiment where the PSTN is used to provide access, the modular connector 701 includes the phone connector 270 and the modem 611 as depicted in FIG. 6b. In the embodiment where the cellular phone system is used to provide access, the modular connector 701 includes the cellular phone or PCN phone 611' as depicted in FIG. 6b.

g. Mobile Environments

A feature provided by the delivery methods using a wireless broadcast system 2801, satellite broadcast system 2901, wireless personal communication system 3201, or terrestrial television broadcast system, is mobility of the electronic book home system or viewer 266. This mobility allows for ordering and receiving electronic book data anytime or anywhere, from sitting on a beach in Florida to sitting on a bus in New York City. This mobility allows for the delivery of electronic book data subscription products such as daily newspapers, monthly magazines, or books from book-of-the-month clubs. These subscription products may be delivered automatically to the appropriate home system 258 or electronic book viewer 266. Enhanced end-to-end error correction techniques can be added to the transmission system to ensure higher probability of receipt for these mobile environments. Additionally, transmission methods may be implemented that resend packets of electronic book data, changing their delivered order on each resend, to improve likelihood of receipt. For lower bandwidth mobile environments, an electronic book file may be broken up into packets and the packets sent a limited number of times. If the electronic book file is not received completely, the electronic book viewer 266 may initiate a request to the operations center 250 to resend only that portion of the electronic book file yet to be received.

A variety of delivery mechanisms, systems and methods have been described for ordering and delivery of electronic books. One of ordinary skill in the art will recognize that the above description is that of preferred embodiments of the invention and that various changes and modifications may be made thereto without departing from the spirit and scope of the invention as defined in the following claims.

What is claimed is:

1. A method for providing electronic books to a subscriber, comprising:

receiving, via a processor of a library unit, a request for an electronic book from an electronic book ordering site, wherein the library unit has a library ID, and wherein the electronic book ordering site includes an electronic book viewer that has a electronic book viewer ID;

requesting the electronic book from an operation center; determining that a status of an account associated with the electronic book viewer is current, determining that the electronic book viewer is an authorized viewer;

transmitting a data signal and a local authorization code from the operation center to the library unit, wherein the data signal comprises an encrypted content of the requested electronic book, and at least two unique ID numbers, receiving, at the library unit, the data signal and the local authorization code; storing the received authorization code;

matching by the library unit the at least two unique ID numbers with the library ID and the electronic book viewer ID, transmitting based upon the matching the data signal and the local authorization code to the electronic book viewer, and at the electronic book viewer, prior to viewing decrypting the encrypted content of the electronic book using the local authorization code;

displaying pages of the electronic book; storing the electronic book in a memory, and controlling viewing of the electronic book via a control panel of the electronic book viewer, wherein the electronic viewer is separate from the library unit and communicates with library unit via a wired or wireless interface.

2. The method of claim 1, wherein the library unit further comprises an external interface to an external receiver, the external receiver receiving the data, the external interface transmitting the data to the library unit.

3. The method of claim 2, wherein the external receiver is a television receiver.

4. The method of claim 2, wherein the external receiver is a radio receiver.

5. The method of claim 2, wherein the external receiver is a spread spectrum receiver.

6. The method of claim 2, wherein the external receiver is a modem.

7. The method of claim 1, wherein the library unit is a set top terminal operably connected to a television, and wherein the step of receiving the data signal receives broadcast television program signals, the data signal multiplexed with the television program signals, the method further comprising demultiplexing the data signal and the television program signals.

8. The method of claim 1, wherein the library unit is a smart card incorporated into a digital television, and wherein the step of receiving the data signal receives broadcast television program signals, the data signal multiplexed with the television program signals, the method further comprising demultiplexing the data signal and the television program signals.

9. The method of claim 1, wherein the library unit is a smart card incorporated into a digital television, and wherein the digital television comprises a receiver that receives broadcast television program signals.

10. The method of claim 9, wherein the digital television further comprises a demultiplexer that demultiplexes the received digital broadcast television program signals and the data signal.

11. The method of claim 1, wherein the library unit is a personal computer.

12. The method of claim 11, wherein the personal computer further comprises a connector that couples the personal computer to a digital television, the digit television comprising a second receiver that receives the digital broadcast television program signals and the data signal, and wherein the personal computer sends the data signal and the local authorization code to decrypt the data signal.

13. The method of claim 12, wherein the connector is one of a radio frequency connector, an infra red connector and a wired connector.

14. The method of claim 13, wherein the wired connector comprises RS-232 connections and an RS-232 cable.

15. A method for providing electronic books to a subscriber, comprising:
  receiving, via a processor of an endpoint site, a request for an electronic book from an electronic book ordering site, wherein the end point site has an endpoint ID, and wherein the electronic book ordering site includes an electronic book viewer that has a electronic book viewer ID;
  requesting the electronic book; determining that a status of an account associated with the electronic book viewer is current, determining that the electronic book viewer is an authorized viewer;
  transmitting a data signal and a local authorization code to the endpoint site, wherein the data signal comprises an encrypted content of the requested electronic book, and at least two unique ID numbers,
  receiving, at the endpoint site, the data signal and the local authorization code; storing the received authorization code;
  and matching at endpoint site the at least two unique ID numbers with the endpoint ID and the electronic book viewer ID, transmitting based upon the matching the data signal and the local authorization code to the electronic book viewer, and at the electronic book viewer, prior to viewing decrypting the encrypted content of the electronic book using the local authorization code;
  wherein the step of transmitting the data signal and the local authorization code to the endpoint site is performed by one of a telephone modem, a cable modem, a wireless modem, an integrated services digital network (ISDN) connector, a fiber optic connector, a local area net (LAN) connector and a satellite antenna connector.

16. A method for providing electronic books to a subscriber, comprising:
  receiving, via a processor of an endpoint site, a request for an electronic book from an electronic book ordering site, wherein the end point site has a endpoint ID, and wherein the electronic book ordering site includes an electronic book viewer that has a electronic book viewer ID;
  requesting the electronic book; determining that a status of an account associated with the electronic book viewer is current, determining that the electronic book viewer is an authorized viewer;
  transmitting a data signal and a local authorization code to the endpoint site, wherein the data signal comprises an encrypted content of the requested electronic book, and at least two unique ID numbers,
  receiving, at the endpoint site, the data signal and the local authorization code; storing the received authorization code; and
  matching at endpoint site the at least two unique ID numbers with the endpoint ID and the electronic book viewer ID, transmitting based upon the matching the data signal and the local authorization code to the electronic book viewer, and at the electronic book viewer, prior to viewing decrypting the encrypted content of the electronic book using the local authorization code;
  wherein the data signal and the authorization code are received through an interface, wherein the interface comprises one of a radio frequency connector, a telephone modem, a cable modem, a wireless modem, an integrated digital services network connector, a fiber optic connector, and a local area net connector and a satellite antenna connector.

17. A method for providing electronic books to a subscriber, comprising:
  receiving, via a processor of an endpoint site, a request for an electronic book from an electronic book ordering site, wherein the end point site has a endpoint ID, and wherein the electronic book ordering site includes an electronic book viewer that has a electronic book viewer ID;
  requesting the electronic book; determining that a status of an account associated with the electronic book viewer is current, determining that the electronic book viewer is an authorized viewer;
  transmitting a data signal and a local authorization code to the endpoint site, wherein the data signal comprises an encrypted content of the requested electronic book, and at least two unique ID numbers,
  receiving, at the endpoint site, the data signal and the local authorization code; storing the received authorization code; and
  matching at endpoint site the at least two unique ID numbers with the endpoint ID and the electronic book viewer ID, transmitting based upon the matching the data signal and the local authorization code to the electronic book viewer, and at the electronic book viewer, prior to viewing decrypting the encrypted content of the electronic book using the local authorization code;
  wherein the step of communicating generates an electronic book menu, and wherein the method further comprising sending commands, via a remote control, to scroll the electronic book menu and to select a desired electronic book for ordering.

18. The method of claim 17, wherein the remote control is one of a wired control, an infra red control, and a radio frequency control.

19. A method for providing electronic books to a subscriber, comprising:
- receiving, via a processor of an endpoint site, a request for an electronic book from an electronic book ordering site, wherein the end point site has a endpoint ID, and wherein the electronic book ordering site includes an electronic book viewer that has a electronic book viewer ID;
- requesting the electronic book; determining that a status of an account associated with the electronic book viewer is current, determining that the electronic book viewer is an authorized viewer;
- transmitting a data signal and a local authorization code to the endpoint site, wherein the data signal comprises an encrypted content of the requested electronic book, and at least two unique ID numbers,
- receiving, at the endpoint site, the data signal and the local authorization code; storing the received authorization code; and
- matching at endpoint site the at least two unique ID numbers with the endpoint ID and the electronic book viewer ID, transmitting based upon the matching the data signal and the local authorization code to the electronic book viewer, and at the electronic book viewer, prior to viewing decrypting the encrypted content of the electronic book using the local authorization code;
- wherein the electronic book is provided using a cable television network.

20. A method for providing electronic books to a subscriber, comprising:
- receiving, via a processor of an endpoint site, a request for an electronic book from an electronic book ordering site, wherein the end point site has a endpoint ID, and wherein the electronic book ordering site includes an electronic book viewer that has a electronic book viewer ID;
- requesting the electronic book; determining that a status of an account associated with the electronic book viewer is current, determining that the electronic book viewer is an authorized viewer;
- transmitting a data signal and a local authorization code to the endpoint site, wherein the data signal comprises an encrypted content of the requested electronic book, and at least two unique ID numbers,
- receiving, at the endpoint site, the data signal and the local authorization code; storing the received authorization code; and
- matching at endpoint site the at least two unique ID numbers with the endpoint ID and the electronic book viewer ID, transmitting based upon the matching the data signal and the local authorization code to the electronic book viewer, and at the electronic book viewer, prior to viewing decrypting the encrypted content of the electronic book using the local authorization code;
- wherein the electronic book is provided via a broadcast.

21. The method of claim 20, wherein the broadcast is provided from a national broadcaster.

22. The method of claim 20, wherein the broadcast is provided from a broadcast affiliate.

23. A method for providing electronic books to a subscriber, comprising:
- receiving, via a processor of an endpoint site, a request for an electronic book from an electronic book ordering site, wherein the end point site has a endpoint ID, and wherein the electronic book ordering site includes an electronic book viewer that has a electronic book viewer ID;
- requesting the electronic book; determining that a status of an account associated with the electronic book viewer is current, determining that the electronic book viewer is an authorized viewer;
- transmitting a data signal and a local authorization code to the endpoint site, wherein the data signal comprises an encrypted content of the requested electronic book, and at least two unique ID numbers,
- receiving, at the endpoint site, the data signal and the local authorization code; storing the received authorization code; and matching at endpoint site the at least two unique ID numbers with the endpoint ID and the electronic book viewer ID, transmitting based upon the matching the data signal and the local authorization code to the electronic book viewer, and at the electronic book viewer, prior to viewing decrypting the encrypted content of the electronic book using the local authorization code;
- wherein the electronic book is provided using a satellite broadcast, and wherein the satellite broadcast includes one or more of a direct to-home broadcast, a video network distribution broadcast, a regional broadcast, and a forward communications service broadcast.

24. A method for providing electronic books to a subscriber, comprising:
- receiving, via a processor of an endpoint site, a request for an electronic book from an electronic book ordering site, wherein the end point site has a endpoint ID, and wherein the electronic book ordering site includes an electronic book viewer that has a electronic book viewer ID;
- requesting the electronic book; determining that a status of an account associated with the electronic book viewer is current, determining that the electronic book viewer is an authorized viewer;
- transmitting a data signal and a local authorization code to the endpoint site, wherein the data signal comprises an encrypted content of the requested electronic book, and at least two unique ID numbers,
- receiving, at the endpoint site, the data signal and the local authorization code; storing the received authorization code; and
- matching at endpoint site the at least two unique ID numbers with the endpoint ID and the electronic book viewer ID, transmitting based upon the matching the data signal and the local authorization code to the electronic book viewer, and at the electronic book viewer, prior to viewing decrypting the encrypted content of the electronic book using the local authorization code;
- wherein the ordering site includes one of a local cable system, a broadcast affiliate, a national broadcaster, an intranet site, an electronic book store and an electronic library.

25. The method of claim 24, wherein the step of transmitting sends an electronic book selection to the local cable system, the local cable system returning the local authorization code.

26. The method of claim 24, wherein the local authorization code is multiplexed with digital broadcast television program signals.

27. The method of claim 24, wherein the step of transmitting sends an electronic book selection to the broadcast affiliate, the broadcast affiliate returning the local authorization code.

28. The method of claim 27, wherein the local authorization code is multiplexed with digital broadcast television program signals.

29. The method of claim 24, wherein the step of transmitting sends a program selection to the national broadcaster, the national broadcaster returning the local authorization code.

30. The method of claim 29, wherein the local authorization code is multiplexed with digital broadcast television program signals.

31. The method of claim 24, wherein the ordering site comprises an authorization system, the authorization system receiving the request of the electronic book and generating an authorization signal, the authorization signal providing the local authorization code.

32. The method of claim 31, wherein the ordering site is co-located with one of the local cable company, the broadcast affiliate and the national broadcaster.

33. The method of claim 31, wherein the ordering site system includes a billing system, the billing system receiving the authorization signal and generating a billing record.

34. The method of claim 33, wherein the billing record debits a subscriber's account.

35. The method of claim 33, wherein the billing system sends the billing record to a subscriber for payment.

36. The method of claim 33, wherein the billing system charges a subscriber's credit card account.

37. A method for providing electronic books to a subscriber, comprising:
receiving, via a processor of an endpoint site, a request for an electronic book from an electronic book ordering site, wherein the end point site has a endpoint ID, and wherein the electronic book ordering site includes an electronic book viewer that has a electronic book viewer ID;
requesting the electronic book; determining that a status of an account associated with the electronic book viewer is current, determining that the electronic book viewer is an authorized viewer;
transmitting a data signal and a local authorization code to the endpoint site, wherein the data signal comprises an encrypted content of the requested electronic book, and at least two unique ID numbers,
receiving, at the endpoint site, the data signal and the local authorization code; storing the received authorization code; and
matching at endpoint site the at least two unique ID numbers with the endpoint ID and the electronic book viewer ID, transmitting based upon the matching the data signal and the local authorization code to the electronic book viewer, and at the electronic book viewer, prior to viewing decrypting the encrypted content of the electronic book using the local authorization code;
wherein the ordering site includes an electronic book menu, receives the electronic book selection and receives the processor identification.

38. The method of claim 37, wherein the ordering site includes a billing system, the billing system receiving the local authorization code and generating a billing record.

39. A method for providing electronic books to a subscriber, comprising:
receiving, via a processor of an endpoint site, a request for an electronic book from an electronic book ordering site, wherein the end point site has a endpoint ID, and wherein the electronic book ordering site includes an electronic book viewer that has a electronic book viewer ID;
requesting the electronic book; determining that a status of an account associated with the electronic book viewer is current, determining that the electronic book viewer is an authorized viewer;
transmitting a data signal and a local authorization code to the endpoint site, wherein the data signal comprises an encrypted content of the requested electronic book, and at least two unique ID numbers,
receiving, at the endpoint site, the data signal and the local authorization code; storing the received authorization code; and
matching at endpoint site the at least two unique ID numbers with the endpoint ID and the electronic book viewer ID, transmitting based upon the matching the data signal and the local authorization code to the electronic book viewer, and at the electronic book viewer, prior to viewing decrypting the encrypted content of the electronic book using the local authorization code;
wherein the local authorization code, comprises: an identification code; an address; and one or more electronic book identifiers, wherein the identification code uniquely identifies the electronic book viewer receiving electronic book access authorization, the address identifies a location of the electronic book viewer and routing instructions, and the one or more electronic book identifiers specify the electronic books that are authorized for decrypting.

40. A method for providing electronic books to a subscriber, comprising:
receiving, via a processor of an endpoint site, a request for an electronic book from an electronic book ordering site, wherein the end point site has a endpoint ID, and wherein the electronic book ordering site includes an electronic book viewer that has a electronic book viewer ID;
requesting the electronic book; determining that a status of an account associated with the electronic book viewer is current, determining that the electronic book viewer is an authorized viewer;
transmitting a data signal and a local authorization code to the endpoint site, wherein the data signal comprises an encrypted content of the requested electronic book, and at least two unique ID numbers,
receiving, at the endpoint site, the data signal and the local authorization code;
storing the received authorization code; and matching at endpoint site the at least two unique ID numbers with the endpoint ID and the electronic book viewer ID, transmitting based upon the matching the data signal and the local authorization code to the electronic book viewer, and at the electronic book viewer, prior to viewing decrypting the encrypted content of the electronic book using the local authorization code;
wherein the electronic book selection comprises a subscription.

41. The method of claim 40, wherein the subscription is for an electronic newspaper.

42. The method of claim 40, wherein the subscription is for an electronic magazine.

43. The method of claim 40, wherein the subscription is received at the endpoint site periodically upon a log on of the method.

44. A method for providing electronic books to a subscriber, comprising:

receiving, via a processor of an endpoint site, a request for an electronic book from an electronic book ordering site, wherein the end point site has a endpoint ID, and wherein the electronic book ordering site includes an electronic book viewer that has a electronic book viewer ID;

requesting the electronic book; determining that a status of an account associated with the electronic book viewer is current, determining that the electronic book viewer is an authorized viewer;

transmitting a data signal and a local authorization code to the endpoint site, wherein the data signal comprises an encrypted content of the requested electronic book, and at least two unique ID numbers, receiving, at the endpoint site, the data signal and the local authorization code; storing the received authorization code; and matching at endpoint site the at least two unique ID numbers with the endpoint ID and the electronic book viewer ID, transmitting based upon the matching the data signal and the local authorization code to the electronic book viewer, and at the electronic book viewer, prior to viewing decrypting the encrypted content of the electronic book using the local authorization code;

wherein the data signal further comprises a menu of available electronic books.

45. The method of claim 44, wherein the menu includes an electronic book abstract, author, cost and year of publication of an original hard copy text.

46. The method of claim 44, wherein the menu includes a review of the electronic book.

47. The method of claim 44, wherein the menu includes a hypertext link to a web site on an Internet.

48. The method of claim 44, wherein the menu includes submenus.

49. The method of claim 48, wherein the submenus include an electronic book selection confirmation submenu.

50. The method of claim 44, wherein the menu is displayed on a web page of an Internet, the web page including a home page and additional pages, the home page and the additional pages accessible by operation of forward, back and home buttons.

51. The method of claim 44, wherein the menu is provided in a hard-copy format, the hard copy format including electronic book identifiers.

52. The method of claim 51, wherein one or more of the electronic book identifiers are entered into the endpoint site to send the electronic book selection.

53. The method of claim 52, wherein the electronic book identifiers are entered into the endpoint site by operation of a remote control coupled to the endpoint site.

54. The method of claim 52, wherein the electronic book identifiers are entered into the endpoint site by operation of a soft key board displayed on a viewer.

55. The method of claim 52, wherein the electronic book identifiers are entered into the endpoint site by operation of a key board coupled to a personal computer.

56. A system that provides electronic books to a subscriber, comprising:

means for receiving, via a processor of a library unit, a request for an electronic book from an electronic book ordering site, wherein the library unit has a library ID, and wherein the electronic book ordering site includes an electronic book viewer that has a electronic book viewer ID;

means for requesting the electronic book from an operation center; means for determining that a status of an account associated with the electronic book viewer is current, determining that the electronic book viewer is an authorized viewer;

means for transmitting a data signal and a local authorization code to the endpoint site, wherein the data signal comprises an encrypted content of the requested electronic book, and at least two unique ID numbers, means for receiving, at the library unit, the data signal and the local authorization code;

means for matching by the library unit the at least two unique ID numbers with the library ID and the electronic book viewer ID, means for storing the received authorization code;

means for transmitting based upon the matching the data signal and the local authorization code to the means for viewing, and the means for viewing comprising:

means for prior to viewing decrypting the encrypted content of the electronic book using the local authorization code;

means for displaying pages of the electronic boo; means for storing the electronic book, and means for controlling viewing of the electronic book via a control panel of the electronic book viewer, wherein the means for viewing is separated from the library unit and communicates with the library unit via a wired or wireless interface.

57. A non transitory computer-readable medium having control logic stored therein that when executed causes a computer to perform the steps of:

receiving, via a processor of a library unit, a request for an electronic book from an electronic book ordering site, wherein the library unit has a library ID, and wherein the electronic book ordering site includes an electronic book viewer that has a electronic book viewer ID;

requesting the electronic book from an operation center;

determining that a status of an account associated with the electronic book viewer is current, determining that the electronic book viewer is an authorized viewer;

transmitting a data signal and a local authorization code to the library unit, wherein the data signal comprises an encrypted content of the requested electronic book, and at least two unique ID numbers, receiving, at the library unit, the data signal and the local authorization code and matching by the library unit the at least two unique ID numbers with the library ID and the electronic book viewer ID;

storing the received authorization code;

transmitting based upon the matching the data signal and the local authorization code, and viewing comprising:

prior to viewing decrypting the encrypted content of the electronic book using the local authorization code;

displaying pages of the electronic book;

storing the electronic book, and controlling viewing of the electronic book via a control panel of the electronic book viewer, wherein viewing is separated from the library unit and communicates with the library unit via a wired or wireless interface.

* * * * *